US012764374B2

(12) United States Patent
Todd

(10) Patent No.: US 12,764,374 B2
(45) Date of Patent: Oct. 13, 2026

(54) SYSTEMS, METHODS, APPARATUS FOR THE INTEGRATION OF MOBILE APPLICATIONS AND AN INTERACTIVE CONTENT LAYER ON A DISPLAY

(71) Applicant: SKREENS ENTERTAINMENT TECHNOLOGIES, INC., Norwood, MA (US)

(72) Inventor: Marc Todd, Foxboro, MA (US)

(73) Assignee: SKreens Entertainment Technologies, Inc., Foxborough, MA (US)

( * ) Notice: Subject to any disclaimer, the term of this patent is extended or adjusted under 35 U.S.C. 154(b) by 0 days.

(21) Appl. No.: 17/378,126

(22) Filed: Jul. 16, 2021

(65) Prior Publication Data

US 2021/0344991 A1 Nov. 4, 2021

Related U.S. Application Data

(63) Continuation-in-part of application No. 17/032,528, filed on Sep. 25, 2020, now abandoned, which is a (Continued)

(51) Int. Cl.
*H04N 21/234* (2011.01)
*G06F 21/12* (2013.01)
(Continued)

(52) U.S. Cl.
CPC ......... *H04N 21/4316* (2013.01); *G06F 21/12* (2013.01); *H04N 21/4126* (2013.01); *H04N 21/4307* (2013.01); *H04N 21/4431* (2013.01)

(58) Field of Classification Search
None
See application file for complete search history.

(56) References Cited

U.S. PATENT DOCUMENTS 5,495,576 A 2/1996 Ritchey et al.
6,102,963 A 8/2000 Agrawal
(Continued)

FOREIGN PATENT DOCUMENTS

CN 1471794 A 1/2004
CN 1574975 A 2/2005
(Continued)

OTHER PUBLICATIONS

Epstein, Linda A., "TabletPc2.com Exclusive—First Look at The New TabletKiosk Sahara i500 Tablet PC", XP055500027, Retrieved from the Internet: URL:http://www.tabletpc2.com/First_Look_TabletKiosk_Sahara_i500_Tablet_PC-Article1102601.html, retrieved on Aug. 15, 2018, Jun. 1, 2011, pp. 1-9.
(Continued)

*Primary Examiner* — Brian T Pendleton
*Assistant Examiner* — Jean D Saint Cyr
(74) *Attorney, Agent, or Firm* — GTC Law Group PC & Affiliates

(57) ABSTRACT

Systems and methods for content display are disclosed. An example system may include an authentication system configured to receive a request from an application to authenticate the application, and to send an instruction to a content delivery system to provide an application programming interface (API) to the application based on authenticating the application. The content delivery system may be configured to provide the API to the application based on receiving the instruction from the authentication system, to receive a call from the application to the API to display content, and to cause the content to be displayed on a display device based on the call to the API.

42 Claims, 74 Drawing Sheets

Related U.S. Application Data continuation of application No. PCT/US2019/024055, filed on Mar. 26, 2019, which is a continuation-in-part of application No. 16/013,815, filed on Jun. 20, 2018, now abandoned, which is a continuation of application No. PCT/US2017/056534, filed on Oct. 13, 2017.

(60) Provisional application No. 63/053,213, filed on Jul. 17, 2020, provisional application No. 62/686,795, filed on Jun. 19, 2018, provisional application No. 62/680,395, filed on Jun. 4, 2018, provisional application No. 62/648,709, filed on Mar. 27, 2018, provisional application No. 62/541,408, filed on Aug. 4, 2017, provisional application No. 62/518,925, filed on Jun. 13, 2017, provisional application No. 62/407,685, filed on Oct. 13, 2016.

(51) Int. Cl.

| | |
|---|---|
| ***H04N 21/2389*** | (2011.01) |
| ***H04N 21/24*** | (2011.01) |
| ***H04N 21/258*** | (2011.01) |
| ***H04N 21/41*** | (2011.01) |
| ***H04N 21/43*** | (2011.01) |
| ***H04N 21/431*** | (2011.01) |
| ***H04N 21/434*** | (2011.01) |
| ***H04N 21/443*** | (2011.01) |
| ***H04N 21/858*** | (2011.01) |

(56) References Cited

U.S. PATENT DOCUMENTS

| | | | |
|---|---|---|---|
| 6,166,736 | A | 12/2000 | Hugh |
| 6,188,429 | B1 | 2/2001 | Martin et al. |
| 6,931,660 | B1 | 8/2005 | Kalluri et al. |
| 7,373,414 | B2 | 5/2008 | Evron et al. |
| 8,327,277 | B2 | 12/2012 | Thakkar et al. |
| 8,386,304 | B2 | 2/2013 | Chen et al. |
| 8,421,840 | B2 | 4/2013 | Eleftheriadis et al. |
| 9,210,361 | B2 | 12/2015 | Todd |
| 9,230,368 | B2 | 1/2016 | Keane et al. |
| 9,240,058 | B1 * | 1/2016 | Amacker ............. G06F 16/955 |
| 9,571,866 | B2 | 2/2017 | Todd |
| 9,743,119 | B2 | 8/2017 | Todd |
| 10,499,118 | B2 | 12/2019 | Todd |
| 10,552,442 | B1 * | 2/2020 | Lusk .................. H04L 63/0884 |
| 11,284,137 | B2 | 3/2022 | Todd |
| 2001/0033296 | A1 | 10/2001 | Fullerton et al. |
| 2002/0067433 | A1 | 6/2002 | Yui et al. |
| 2003/0084456 | A1 | 5/2003 | Ryan et al. |
| 2005/0066089 | A1 | 3/2005 | Karaoguz et al. |
| 2005/0185711 | A1 | 8/2005 | Pfister et al. |
| 2006/0282785 | A1 | 12/2006 | McCarthy et al. |
| 2007/0007998 | A1 | 1/2007 | Bollinger |
| 2007/0024705 | A1 | 2/2007 | Richter et al. |
| 2007/0024706 | A1 | 2/2007 | Brannon et al. |
| 2007/0097206 | A1 | 5/2007 | Houvener et al. |
| 2007/0204302 | A1 | 8/2007 | Calzone |
| 2007/0234388 | A1 | 10/2007 | King |
| 2007/0252912 | A1 | 11/2007 | Valente et al. |
| 2007/0291108 | A1 | 12/2007 | Huber et al. |
| 2008/0010654 | A1 | 1/2008 | Barrett et al. |
| 2008/0066111 | A1 | 3/2008 | Ellis et al. |
| 2008/0092166 | A1 | 4/2008 | Bastable et al. |
| 2008/0163059 | A1 | 7/2008 | Craner |
| 2008/0239160 | A1 | 10/2008 | Ho et al. |
| 2008/0244641 | A1 | 10/2008 | Ho et al. |
| 2008/0300055 | A1 | 12/2008 | Gelman et al. |
| 2009/0037966 | A1 | 2/2009 | Rolls et al. |
| 2009/0083225 | A1 | 3/2009 | Jacobs et al. |
| 2009/0115901 | A1 | 5/2009 | Winter et al. |
| 2009/0184981 | A1 | 7/2009 | De |
| 2009/0189974 | A1 | 7/2009 | Deering |
| 2009/0210491 | A1 | 8/2009 | Thakkar et al. |
| 2009/0235295 | A1 | 9/2009 | Bell et al. |
| 2009/0256965 | A1 | 10/2009 | Moote et al. |
| 2009/0298032 | A1 | 12/2009 | Johnson |
| 2009/0310947 | A1 | 12/2009 | Chillie |
| 2010/0002069 | A1 | 1/2010 | Eleftheriadis et al. |
| 2010/0066677 | A1 | 3/2010 | Garrett et al. |
| 2010/0066813 | A1 | 3/2010 | Jorke |
| 2010/0088634 | A1 | 4/2010 | Tsuruta et al. |
| 2010/0161409 | A1 | 6/2010 | Ryu et al. |
| 2010/0162164 | A1 | 6/2010 | Kwon et al. |
| 2010/0180304 | A1 | 7/2010 | Hassell et al. |
| 2010/0302348 | A1 | 12/2010 | Richards |
| 2010/0333044 | A1 | 12/2010 | Kethireddy |
| 2011/0004839 | A1 | 1/2011 | Cha et al. |
| 2011/0023064 | A1 | 1/2011 | Tsai et al. |
| 2011/0043696 | A1 | 2/2011 | Onogi et al. |
| 2011/0126255 | A1 | 5/2011 | Perlman et al. |
| 2011/0173102 | A1 | 7/2011 | Burns et al. |
| 2011/0179436 | A1 | 7/2011 | Candelore |
| 2011/0310221 | A1 | 12/2011 | Meuninck et al. |
| 2012/0044420 | A1 * | 2/2012 | Payson .................. H04N 21/44 348/E5.022 |
| 2012/0092328 | A1 | 4/2012 | Flaks et al. |
| 2012/0151535 | A1 | 6/2012 | Ramdeo |
| 2012/0188233 | A1 | 7/2012 | Shuster et al. |
| 2012/0198500 | A1 | 8/2012 | Sheeley |
| 2012/0210350 | A1 | 8/2012 | Mccoy et al. |
| 2012/0260167 | A1 | 10/2012 | Friedlander et al. |
| 2012/0317598 | A1 | 12/2012 | Gilson |
| 2013/0021438 | A1 | 1/2013 | Tucker |
| 2013/0023337 | A1 | 1/2013 | Bowers et al. |
| 2013/0061273 | A1 | 3/2013 | Reisman |
| 2013/0111051 | A1 | 5/2013 | Yaron et al. |
| 2013/0125171 | A1 | 5/2013 | Sharif-Ahmadi et al. |
| 2013/0145251 | A1 | 6/2013 | Jureidini et al. |
| 2013/0170697 | A1 * | 7/2013 | Zises ......................... G06T 3/40 382/103 |
| 2013/0219479 | A1 * | 8/2013 | DeSoto ................... H04L 63/10 726/6 |
| 2013/0262686 | A1 * | 10/2013 | Hill ..................... H04L 65/4038 709/228 |
| 2013/0278631 | A1 | 10/2013 | Border et al. |
| 2013/0278828 | A1 | 10/2013 | Todd |
| 2013/0335407 | A1 | 12/2013 | Reitan et al. |
| 2013/0337889 | A1 | 12/2013 | Gagner et al. |
| 2013/0344947 | A1 | 12/2013 | Cannon et al. |
| 2014/0098185 | A1 | 4/2014 | Davari et al. |
| 2014/0136935 | A1 | 5/2014 | Santillie et al. |
| 2014/0195675 | A1 | 7/2014 | Silver |
| 2014/0206428 | A1 | 7/2014 | Thompson et al. |
| 2014/0250518 | A1 * | 9/2014 | Schneider ............... G06F 21/34 726/9 |
| 2014/0267581 | A1 | 9/2014 | Cronin |
| 2014/0379866 | A1 | 12/2014 | Perlman et al. |
| 2015/0036050 | A1 | 2/2015 | Huang |
| 2015/0103142 | A1 | 4/2015 | Karlsson et al. |
| 2015/0309687 | A1 | 10/2015 | Herigstad et al. |
| 2015/0373402 | A1 | 12/2015 | Zimmeri et al. |
| 2016/0104351 | A1 | 4/2016 | Gangas et al. |
| 2016/0180239 | A1 | 6/2016 | Frankel et al. |
| 2016/0182924 | A1 | 6/2016 | Todd |
| 2016/0210411 | A1 | 7/2016 | Mentis |
| 2016/0234535 | A1 | 8/2016 | Todd |
| 2016/0241542 | A1 * | 8/2016 | Kim ...................... H04L 63/083 |
| 2016/0269712 | A1 | 9/2016 | Ostrover et al. |
| 2016/0283438 | A1 | 9/2016 | Chen et al. |
| 2017/0105053 | A1 | 4/2017 | Todd et al. |
| 2017/0255826 | A1 | 9/2017 | Chang et al. |
| 2017/0311004 | A1 | 10/2017 | Li et al. |
| 2017/0337602 | A1 | 11/2017 | Davis |
| 2018/0001208 | A1 | 1/2018 | Thompson et al. |
| 2018/0278597 | A1 | 9/2018 | Helms et al. |
| 2018/0316939 | A1 | 11/2018 | Todd |
| 2018/0316940 | A1 | 11/2018 | Todd |
| 2018/0316941 | A1 | 11/2018 | Todd |
| 2018/0316942 | A1 | 11/2018 | Todd |
| 2018/0316943 | A1 | 11/2018 | Todd |

(56) References Cited

U.S. PATENT DOCUMENTS

| | | | |
|---|---|---|---|
| 2018/0316944 | A1 | 11/2018 | Todd |
| 2018/0316945 | A1 | 11/2018 | Todd |
| 2018/0316946 | A1 | 11/2018 | Todd |
| 2018/0316947 | A1 | 11/2018 | Todd |
| 2018/0316948 | A1 | 11/2018 | Todd |
| 2021/0019982 | A1 | 1/2021 | Todd |

FOREIGN PATENT DOCUMENTS

| | | | |
|---|---|---|---|
| CN | 101321254 | A | 12/2008 |
| CN | 101753878 | A | 6/2010 |
| CN | 101753878 | B | 11/2011 |
| CN | 102883226 | A | 1/2013 |
| CN | 103024504 | A | 4/2013 |
| EP | 1848212 | A2 | 10/2007 |
| EP | 2842309 | | 3/2015 |
| GB | 2533524 | B | 11/2020 |
| KR | 100799675 | B1 | 1/2008 |
| KR | 1020100130091 | A | 12/2010 |
| KR | 1020150016264 | A | 2/2015 |
| KR | 101968183 | B1 | 4/2019 |
| WO | 2013163291 | A1 | 10/2013 |
| WO | 2015/031802 | A1 | 3/2015 |
| WO | 2017112520 | A9 | 6/2017 |
| WO | 2018071781 | A2 | 4/2018 |
| WO | 2018071781 | A3 | 5/2019 |
| WO | 2019191082 | A2 | 10/2019 |
| WO | 2019191082 | A3 | 11/2019 |

OTHER PUBLICATIONS

PCT/US13/37983 , "International Application Serial No. PCT/US13/37983, International Search Report and Written Opinion mailed Jun. 19, 2013", Skreens Entertainment Technologies, Inc., 12 pages.

PCT/US2013/037983 , "International Application Serial No. PCT/US2013/037983, International Preliminary Report On Patentability With Written Opinion mailed Nov. 6, 2014", Skreens Entertainment Technologies, Inc, 10 Pages.

PCT/US2014/053491 , "International Application Serial No. PCT/US2014/053491, International Preliminary Report on Patentability and Written Opinion mailed Mar. 10, 2016", Skreens Entertainment Technologies, Inc., 12 Pages.

PCT/US2014/053491 , "International Application Serial No. PCT/US2014/053491, International Search Report and Written Opinion mailed Dec. 9, 2014", Skreens Entertainment Technologies, Inc., 15 Pages.

PCT/US2016/066924 , "Application Serial No. PCT/US2016/066924, International Search Report and Written Opinion mailed Mar. 24, 2017.", 7 pages.

PCT/US2016/066924 , "International Application Serial No. PCT/US2016/066924, International Preliminary Report on Patentability and Written Opinion mailed Jul. 5, 2018", Skreens Entertainment Technologies, Inc., 5 Pages.

PCT/US2017/056534 , "International Application Serial No. PCT/US2017/056534, International Preliminary Report on Patentability mailed May 16, 2019", Skreens Entertainment Technologies, Inc., 8 pages.

PCT/US2017/056534 , "International Application Serial No. PCT/US2017/056534, International Search Report and Written Opinion mailed Feb. 5, 2018", Skreens Entertainment Technologies, Inc., 12 Pages.

PCT/US2019/024055 , "International Application Serial No. PCT/US2019/024055, International Preliminary Report on Patentability mailed Oct. 8, 2020", Skreens Entertainment Technologies, Inc., 34 pages.

PCT/US2019/024055 , "International Application Serial No. PCT/US2019/024055, International Search Report and Written Opinion mailed Oct. 4, 2019", Skreens Entertainment Technologies, Inc., 39 pages.

PCT/US2019/024055 , "International Application Serial No. PCT/US2019/024055, Invitation to Pay Additional Fees mailed Jul. 1, 2019", Skreens Entertainment Technologies, Inc., 7 pages.

Unknown , "Sahara Slate PC i500 Tablet PCs", XP055499964, Retrieved from the Internet: URL:https://www.newwavetech.com/PDFs/Vendor/TabletKiosk/TK%20Sahara%20i500%20product%20sheet.pdf, retrieved on Aug. 15, 2018, Sep. 28, 2011, 2 pages.

* cited by examiner

Notes, images, documents, videos, etc. are shared, and anyone in room may post overlay both local and to other TVs and move them around!

SYSTEMS, METHODS, APPARATUS FOR THE INTEGRATION OF MOBILE APPLICATIONS AND AN INTERACTIVE CONTENT LAYER ON A DISPLAY

CROSS-REFERENCE TO RELATED APPLICATIONS

This application claims the benefit of priority to U.S. Provisional Patent Application Ser. No. 63/053,213, filed on Jul. 17, 2020, entitled "SYSTEMS, METHODS, APPARATUS FOR THE INTEGRATION OF MOBILE APPLICATIONS AND AN INTERACTIVE CONTENT LAYER ON A DISPLAY."

Furthermore, this application is a continuation-in-part of, and claims priority to, U.S. patent application Ser. No. 17/032,528, filed Sep. 25, 2020, now published on Jan. 21, 2021, as US 2021/0019982, and entitled "SYSTEMS AND METHODS FOR GESTURE RECOGNITION AND INTERACTIVE VIDEO ASSISTED GAMBLING".

U.S. patent application Ser. No. 17/032,528 claims priority to, and is a continuation of, International Application Serial No.: PCT/US2019/024055, filed Mar. 26, 2019, now published on Oct. 3, 2019 as WO 2019/191082, and entitled "SYSTEMS, METHODS, APPARATUS AND MACHINE LEARNING FOR THE COMBINATION AND DISPLAY OF HETEROGENEOUS SOURCES".

International Application Serial No.: PCT/US2019/024055 is a continuation-in-part of, and claims priority to, U.S. patent application Ser. No. 16/013,815, filed Jun. 20, 2018, now published on Nov. 1, 2018 as US 2018/0316939, and entitled "SYSTEMS AND METHODS FOR VIDEO PROCESSING, COMBINATION AND DISPLAY OF HETEROGENEOUS SOURCES BACKGROUND".

U.S. patent application Ser. No. 16/013,815 claims priority to, and is a continuation of International Application Ser. No. PCT/US17/56534, filed on Oct. 13, 2017, now published on Apr. 19, 2018 as WO 2018/071781 and entitled "SYSTEMS AND METHODS FOR VIDEO PROCESSING AND DISPLAY".

International Application PCT/US17/56534 claims priority to the following U.S. Provisional Applications: (1) U.S. Provisional Application Ser. No. 62/407,685, filed on Oct. 13, 2016, and entitled "Video Display System"; (2) U.S. Provisional Application Ser. No. 62/518,925, filed on Jun. 13, 2017, entitled "Systems and Methods for Video Processing and Display"; and (3) U.S. Provisional Application Ser. No. 62/541,408 filed on Aug. 4, 2017, entitled "Systems and Methods for Video Processing and Display".

International Application Serial No.: PCT/US2019/024055 claims the benefit of priority to the following U.S. Provisional Patent Applications: (1) U.S. Provisional Application Ser. No. 62/648,709, filed on Mar. 27, 2018, entitled "SYSTEMS AND METHODS FOR VIDEO PROCESSING AND MACHINE LEARNING"; (2) U.S. Provisional Application Ser. No. 62/680,395, filed on Jun. 4, 2018, entitled "METHODS AND SYSTEMS FOR VIDEO DISPLAY WITH GESTURE CONTROL"; and (3) U.S. Provisional Application Ser. No. 62/686,795, filed on Jun. 19, 2018, entitled "SYSTEMS, METHODS, APPARATUS AND MACHINE LEARNING FOR THE COMBINATION AND DISPLAY OF HETEROGENEOUS SOURCES."

Each of the foregoing applications is incorporated herein by reference in its entirety.

BACKGROUND

The present disclosure generally relates to the field of video and audio content, control, and display, including for television and other display devices.

Traditionally, television entertainment has been understood to be one program being displayed on a television or display device like a personal computer (PC) or mobile device. For example, a viewer may watch a movie on a large screen television that is being aired on a television network. The viewer "tunes into" the network by changing a television station or setting a cable box to the network channel. The program is output out of the set top box or other device and displayed on the television with audio. If the viewer wants to see what is on another network, he changes the channel on the cable box (or other) and after a moment the television displays what is being transmitted on that channel or network.

Advertising and program structure are set up to break up the content of a program or movie to place other video messages, such as product advertisement, local advertisement, channel advertisement, government emergency message, and the like. Typically, a viewer watches through the interruption of the movie content and sees the advertisement or other message unless the user changes the channel while the program or movie is at the break.

This advertising and single channel viewing set up often causes the behavior of the viewer with the control of the television to start "channel changing" or "flipping" or "channel surfing". Other causes of hyper channel changing typically occur when a viewer wants to see other live events on other channels, a slow or boring section in the video content stream occurs, or for a host of other reasons. Ultimately "channel surfing" is viewer experience driven in their efforts to maximize entertainment or information from the television. This behavior often results in the viewer with the television control being the only person to be able to watch or enjoy the television, often the family or those in the household or group watching the television will disband to separate display devices to "surf" to the video content of their choice, often exhibiting the same behavior.

Television viewing set up, especially for large screen flat panel television viewing, is typically achieved by hooking up various video input devices, such as a DVD player, a cable box, a satellite box, a video game console, an over the top video from the internet (OTT) box, and other inputs to the television. Then, by use of a select input button on the television, the viewer selects the video input device that takes control of the whole television picture. In some models, the television allows a "picture in picture" mode where video from two devices can be displayed at one time with one small and one large. This mode offers a bit of control, but not enough to satisfy most users.

The evolving changes in viewer sophistication, especially technical sophistication, combined with significantly increased access to various types and sources of video content has outpaced the ability of the current television viewing and control model. To complicate the picture, often while the viewer is flipping and surfing, he/she is also on a PC, laptop, tablet, smartphone, or other mobile devices to operate applications, typically connected to the Internet, for further experience.

The entertainment industry including content creators, content providers, service providers, television manufacturers, advertisers and internet companies are all currently limited in the ability to present a combined, easy to use and expandable television presentation that is outside their scope of expertise. Therefore, what is needed is a system that considers all these combined interests and creates a new user experience framework for television viewers.

Large scale, high definition television screens have become widely popular in homes and in various other venues, including entertainment and retail venues. Also, entertainment content sources have proliferated, with a vast range of HD video, Internet, and application content available. Some use has been made of "picture-in-picture" features, and some providers have channels that show a mix of the video content from some other channels, allowing a viewer to see what is happening on another channel to allow timely navigation to the other channel; however, a need exists for improved interfaces that allow users more control over the on-screen experience, as well as the methods and systems that enable such interfaces.

The infrastructure around television screens has also changed in recent years, as "smart home" or "Internet of Things" (IoT) devices are located to an increasing extent in many homes. Many of these devices include voice interfaces, and a need exists for the new user experience framework to account for and take advantage of such devices and interfaces.

Changes have also occurred in the networks that carry video, Internet and other content. Content is increasingly handled by cloud platforms, where a wide range of content delivery, management, security and other features can be provided. Certain cloud platform providers now include flexible processing hardware, such as field programmable gate arrays (FPGAs).

SUMMARY

Methods and systems are provided that use novel cloud hardware architectures to enable improved user experiences. The systems and methods contemplated herein allow for a new generation of entertainment possibility by decoupling the limitation of the video input sources that take control of the entire television screen for single video picture viewer experience. While "picture in picture" is a feature that allows viewing of two video contents on the same television, it is too limited, because there is no ability to multiplex input from more than one video input source (i.e., a cable box and video game console, for example). Moreover, picture-in-picture does not provide the flexibility required to expand the entertainment potential. The systems and methods herein enable an integration of Internet content and video content. Further, these inventions may allow a content creator, distributor, and/or owner to directly engage with an end viewer via Internet access over an Internet video container at the same time the video content is broadcast. This engagement provides a new infrastructure for new ideas to enhance entertainment, social interaction, advertisements, the point of sale, and other benefits for the industry.

In a first embodiment, a system is provided for multiplexing both a plurality of video content (live and/or deferred time) and multiple video access mediums or sources (such as cable television, satellite, video games, DVD players, closed circuit video, internet video such as clips, programming and movies, and the like.) The system achieves this in a viewer friendly manner to enhance entertainment and other entertainment possibilities. The output of a selected video content is seen in a container referred to herein as a video container. This video container does not necessarily need to fill an entire screen of a display device. A plurality of video containers may be displayed on a television or other display device simultaneously and may be positioned in various manners, including overlapping one another. The layering of various content in various containers under user control, and the capabilities for enabling the same, are collectively referred to as "interactive multi-layer" or "IML" in some cases in this disclosure.

The system may include one or more inputs with access to one or more video programs. The video programs or video content may be live linear content such as broadcast television, cable/satellite stations, and others, from various sources. The video content may also be video on demand content such as movies that get delivered on command from a viewer. The video content could also be delivered over the Internet or streaming video. Any video source that can be displayed on a viewing screen including video conferencing and security video could be inputs to the system. Additionally, any entertainment media that could be displayed in or on an entertainment device, such as a PC, mobile device, or television, could be a video content input; including digital radio, web page interaction, video game input and output and others.

The video container is a logical container that is displayed on the television screen and is an area where a particular video is played out and viewed. In many embodiments, the video container may be substantially rectangular in shape to match the video content aspect ratios, though the video container may be any shape. The video play out does not exceed the boundary of the video container. In some embodiments, the video container may be sized and resized, in near real-time to form different size bounding rectangles from small to as large as the screen of the display device. Preferably, the video picture may scale to fit the bounding rectangle of the video container. Moreover, in some embodiments, the video container may be positioned and repositioned in near real-time to put the frame of the rectangle in viewer selectable position on the television screen, including overlapping other video containers.

The video container may also have many properties that include but are not limited to: video container type (global video container, sports video container, movie video container, or web video container, etc.), a content filter, a list of channels with location, point of sale data (like credit card info), permissions for viewer log-in, and others. These properties allow particular video containers to be programmed with properties, and repeatedly accessed, which may enhance a user experience.

In one embodiment, the properties of the video container may allow a viewer to confine and control content type in a particular video container, which may enhance ease of use. For example, instead of "surfing" through an entire channel guide to find any sporting events, a video container could be configured with a filter to display only live sporting events across all input services. In another example, a video container may be configured to show only network news programming. In these embodiments, video container configurations may allow the viewer to quickly view all sports or news programs to find one of interest.

Video containers are independent from each other. Therefore, multiple video containers may be sized and positioned by a viewer for a better entertainment experience. For example, suppose a viewer wanted to watch a football game, two baseball games, and the news at the same time. The viewer could launch the appropriate video containers for each of the four desired programs, resize and position each in accordance to his needs.

The present disclosure describes a smart video processing system, the system according to one disclosed non-limiting embodiment of the present disclosure can include, a plurality of input pipelines, each configured to receive an input content stream from at least one of a plurality of heterogeneous input sources and generate a corresponding processed content stream; at least one artificial intelligence system configured to process at least one of the input content streams and the processed content streams to determine a result; and an intelligent layering system to generate a layered output content stream based on the result, wherein the layered output content stream is synchronized with the received content stream of at least one of the pipelines.

A further embodiment of any of the foregoing embodiments of the present disclosure may further include a content mixing and layering module to integrate the plurality of processed content streams corresponding to the plurality of pipelines, wherein the content mixing and layering module adds at least one content element based on the result to generate and output at least one of an IP stream and a video signal.

A further embodiment of any of the foregoing embodiments of the present disclosure may further include an AI system that includes: an input module configured to receive user input to configure machine learning; and a machine learning module configured to adjust at least one of a weight and a parameter of an algorithm of an artificial intelligence system based on the user input.

A further embodiment of any of the foregoing embodiments of the present disclosure may include situations wherein the AI system is selected from the group consisting of: a face recognition system, a natural language processing system, a speech recognition system, a pattern recognition system, an object recognition system, a voice recognition system, a motion prediction system, an object classification system, an action classification system, a content recognition system, and a threat detection system.

A further embodiment of any of the foregoing embodiments of the present disclosure may include situations wherein the layered output content stream comprises at least one element selected from a list of elements, the list consisting of: an icon indicating a result of the artificial intelligence system; an indication of a level of confidence in the result; a highlighting element; a recommendation; an alert, and an obscuring element.

A further embodiment of any of the foregoing embodiments of the present disclosure may include situations wherein the result comprises a determination of a presence of an object, a determination an absence of an object, or an identification of an object.

A further embodiment of any of the foregoing embodiments of the present disclosure may include situations wherein the result further comprises a location of the object in the received content stream.

The present disclosure describes a smart video processing device, the device according to one disclosed non-limiting embodiment of the present disclosure can include a plurality of input pipelines, each structured to receive an input content stream from one of a plurality of heterogeneous input sources, to generate a corresponding plurality of processed input content streams; at least one artificial intelligence module structured to process at least one of the plurality of input content streams and the processed input content streams to determine an AI result; an intelligent layering module structured to generate a layered content stream based on the AI result; and a content mixing and layering module structured to integrate the plurality of processed input content streams and the layered content stream to generate and output at least one of an IP stream and a video signal, wherein the layered content stream is synchronized with the processed input content stream.

A further embodiment of any of the foregoing embodiments of the present disclosure may further include a second AI module that includes an input module structured to receive user input to configure machine learning, and a machine learning module structured to adjust at least one of a weight and a parameter of an algorithm of the at least one artificial intelligence module based on the user input.

A further embodiment of any of the foregoing embodiments of the present disclosure may include situations wherein the AI module is selected from the group consisting of: a face recognition module, a natural language processing module, a speech recognition module, a pattern recognition module, an object recognition module, a voice recognition module, a motion prediction module, an object classification module, an action classification module, a content recognition module, and a threat detection module.

The present disclosure describes a smart video processing method, the method according to one disclosed non-limiting embodiment of the present disclosure can include generating a plurality of processed input content streams, each processed input content stream corresponding to an input content stream from one of a plurality of heterogeneous input sources; determining an AI result based on at least one of the plurality of processed input content streams and the input content streams; generating a layered content stream based on the AI result; synchronizing the layered content stream with the at least one of the plurality of processed input content streams; integrating the plurality of processed input content streams and the layered content stream to product an interactive multi-layer session; and generating a video signal comprising the interactive multi-layer session.

A further embodiment of any of the foregoing embodiments of the present disclosure may include situations wherein the AI result comprises a determination of a presence of an object, a determination an absence of an object, or an identification of an object.

A further embodiment of any of the foregoing embodiments of the present disclosure may include situations wherein the AI result further comprises a location of the object in the processed input content stream.

A further embodiment of any of the foregoing embodiments of the present disclosure may include situations wherein the layered content stream comprises at least one element selected from a list of elements, the list consisting of: an icon indicating a result of an artificial intelligence system; an indication of a level of confidence in the result; a highlighting element; a recommendation; an alert, and an obscuring element.

A further embodiment of any of the foregoing embodiments of the present disclosure may include situations wherein determining an AI result comprises at least one of the group consisting of recognizing a face, recognizing speech, recognizing a patter, recognizing an object, recognizing a voice, predicting a motion, classifying an object, classifying an action, and detecting a threat.

A further embodiment of any of the foregoing embodiments of the present disclosure may further include receiving a user input; and adjusting at least one of a weight and a parameter used in the determination of an AI result based on the user input and based on at least one of the plurality of processed input content streams and the layered content stream.

The present disclosure describes a video processing system, the system according to one disclosed non-limiting embodiment of the present disclosure can include a content layering and mixing system for processing a set of received content streams from a plurality of pipelines and related to a set of corresponding input content streams of the plurality of pipelines to produce an interactive, multi-layer content session for display on a device of a user; and an artificial intelligence system configured to receive input from at least one of the set of input content streams and the set of received content streams to provide a result, wherein the content layering and mixing system uses the result to at least one of configure and augment the multi-layer content session.

A further embodiment of any of the foregoing embodiments of the present disclosure may include situations wherein configuring the multi-layer content session comprises at least one of: enlarging a content area of a received content stream, omitting the display of a received content stream, moving a position of a received content stream, re-sizing a received content stream, adjusting a transparency of a received content stream, adjusting an audio of a received content stream, and selecting what received content streams to display.

A further embodiment of any of the foregoing embodiments of the present disclosure may include situations wherein augmenting the multi-layer content session comprises at least one addition selected from a list of additions, the list consisting of: adding an icon indicating a result of the artificial intelligence system; adding an indication of a level of confidence in the result; adding a highlighting element; adding a recommendation; adding an alert, and adding an obscuring element.

A further embodiment of any of the foregoing embodiments of the present disclosure may further include an intelligent layering system to create, based on the result, a layered output content stream for input to the content layering and mixing system.

A further embodiment of any of the foregoing embodiments of the present disclosure may include situations wherein the layered output content stream is synchronized with at least one of the received content streams.

A further embodiment of any of the foregoing embodiments of the present disclosure may include situations wherein the layered output content stream comprises at least one output indicator selected from a list of output indicators, the list consisting of: an icon indicating a result of the artificial intelligence system, an indication of a level of confidence in the result, a highlighting element, a recommendation, an alert, and an obscuring element.

A further embodiment of any of the foregoing embodiments of the present disclosure may further include a user input interface to receive user input from a plurality of user devices, the user input interface further structured to provide, based on the received user input, configuration information to at least one of: the intelligent layering system, the content layering and mixing system, and the artificial intelligence system.

A further embodiment of any of the foregoing embodiments of the present disclosure may include situations wherein the result comprises a determination of a presence of an object, an absence of an object, or an identification of an object.

The present disclosure describes a method, the method according to one disclosed non-limiting embodiment of the present disclosure can include processing a set of received content streams from a plurality of pipelines and related to a set of corresponding input content streams to the plurality of pipelines to produce an interactive, multi-layer content session; analyzing, using an artificial intelligence system, the set of input content streams and the set of received content streams to produce a result; and augmenting the interactive, multi-layer content session based on the result.

A further embodiment of any of the foregoing embodiments of the present disclosure may include situations wherein analyzing further includes analyzing the interactive, multi-layer content session.

A further embodiment of any of the foregoing embodiments of the present disclosure may further include configuring the interactive, multi-layer content session based on the result.

A further embodiment of any of the foregoing embodiments of the present disclosure may include situations wherein configuring the interactive, multi-layer content session comprises at least one of: enlarging a content area of a received content stream, omitting a display of a received content stream, moving a position of a received content stream, re-sizing a received content stream, adjusting a transparency of a received content stream, adjusting an audio of a received content stream, and selecting what received content streams to display.

A further embodiment of any of the foregoing embodiments of the present disclosure may further include creating a layered output content stream based on the result.

A further embodiment of any of the foregoing embodiments of the present disclosure may further include synchronizing the layered output content stream with at least one of the received content streams.

A further embodiment of any of the foregoing embodiments of the present disclosure may include situations wherein the processing further includes processing the layered output content stream with the set of received content streams.

The present disclosure describes a video processing device, the device according to one disclosed non-limiting embodiment of the present disclosure can include a plurality of input pipelines, each configured to receive an input content stream and output a received content stream; a content layering and mixing module configured to process a set of received content streams and to produce an interactive, multi-layer content session for display on a device of a user; and an artificial intelligence module configured to analyze at least a plurality of the received content streams and the interactive, multi-layer content session to provide a result, wherein the content layering and mixing module uses the result to at least one of configure and augment the multi-layer content session.

A further embodiment of any of the foregoing embodiments of the present disclosure may further include an intelligent layering module configured to create, based on the result, a layered output content stream as input to the content layering and mixing system.

A further embodiment of any of the foregoing embodiments of the present disclosure may further include a user input module configured to receive user input from a plurality of user devices, the user input module further configured to provide, based on the received user input, configuration information to at least one of: the intelligent layering module, the content layering and mixing module, and the artificial intelligence module.

The present disclosure describes a video processing system, the system according to one disclosed non-limiting embodiment of the present disclosure can include a content layering and mixing system for processing a set of received content streams to produce an interactive, multi-layer content session for display on a device of a user; and a plurality of heterogeneous artificial intelligence systems, each configured to analyze input from at least one of the set of received content streams and the interactive, multi-layer content session to provide a corresponding result, wherein the content layering and mixing system uses the results of the plurality of heterogeneous artificial intelligence systems to at least one of configure and augment the multi-layer content session.

A further embodiment of any of the foregoing embodiments of the present disclosure may include situations wherein the heterogeneous artificial intelligence systems are selected from the group consisting of: a face recognition system, a natural language processing system, a speech recognition system, a pattern recognition system, an object recognition system, a voice recognition system, a motion prediction system, an object classification system, an action classification system, a content recognition system, and a threat detection system.

A further embodiment of any of the foregoing embodiments of the present disclosure may include situations wherein a subset of the plurality of heterogeneous artificial intelligence systems may be arranged in parallel to concurrently analyze input from a common received content stream of the set of received content streams.

A further embodiment of any of the foregoing embodiments of the present disclosure may include situations wherein a subset of the plurality of heterogeneous artificial intelligence systems may be arranged in series to sequentially analyze input from a common received content stream of the set of received content streams.

A further embodiment of any of the foregoing embodiments of the present disclosure may include situations wherein a first artificial intelligence system may provide a result to a second artificial intelligence system to assist in an analysis by the second artificial intelligence system.

A further embodiment of any of the foregoing embodiments of the present disclosure may include situations wherein the result may be selected from the group consisting of a presence of an object, an absence of an object, a location of the object, a degree of confidence in the analysis performed by the first artificial intelligence, and an outline of the object.

A further embodiment of any of the foregoing embodiments of the present disclosure may include situations wherein at least one of the heterogeneous artificial intelligence systems is a machine learning system.

A further embodiment of any of the foregoing embodiments of the present disclosure may further include a user interface designed to receive input from a user, wherein the machine learning system analyzes the user input together with the at least one of a set of received content streams and the interactive, multi-layer content session and identifies an improvement for another heterogeneous artificial intelligence system.

A further embodiment of any of the foregoing embodiments of the present disclosure may include situations wherein the input from the user is selected from the group consisting of: acceptance of an identification, rejection of an identification, verification of a presence of an object, verification of an absence of an object, a relocation of a highlight element, a relocation of a concealing element, a correction of an alert, a selection between options, and a new rule.

A further embodiment of any of the foregoing embodiments of the present disclosure may include situations wherein the improvement is selected from the group consisting of: altering an algorithm and changing at least one parameter.

The present disclosure describes a method of video processing, the method according to one disclosed non-limiting embodiment of the present disclosure can include receiving input content streams from at least two heterogeneous content sources, processing each of the input content streams to produce a received content stream; performing a first analysis of the received content stream corresponding to at least one of the at least two heterogeneous content sources, wherein the first analysis comprises using at least one of a plurality of analysis techniques to identify a first result; creating layering output content based on the first result and a set of rules; combining the received content stream and the layering output content to produce an interactive, multi-layer content session.

A further embodiment of any of the foregoing embodiments of the present disclosure may include situations wherein the at least one of a plurality of analysis techniques is selected from the group consisting of: facial recognition, natural language processing, speech recognition, pattern recognition system, object recognition, voice recognition, motion prediction, object classification, action classification, a content recognition, and threat detection.

A further embodiment of any of the foregoing embodiments of the present disclosure may further include performing a second analysis of the received content stream, wherein the second analysis comprises using at least one of a plurality of analysis techniques to identify a second result.

A further embodiment of any of the foregoing embodiments of the present disclosure may include situations wherein the first analysis and the second analysis occur sequentially.

A further embodiment of any of the foregoing embodiments of the present disclosure may further include performing a second analysis of the received content stream to determine a second result, wherein the second analysis occurs in parallel with the first analysis, and the layering output content is further based on the second result.

A further embodiment of any of the foregoing embodiments of the present disclosure may further include performing a second, machine learning analysis of the received content stream and the interactive, multi-layer content session to produce a recommendation; and configuring the first analysis based on the recommendation.

A further embodiment of any of the foregoing embodiments of the present disclosure may further include performing a second, machine learning analysis of the received content stream and the interactive, multi-layer content session to produce a recommendation; and augmenting the multi-layer content session based on the recommendation.

The present disclosure describes a smart video processing device, the device according to one disclosed non-limiting embodiment of the present disclosure can include a content layering and mixing module configured to process a set of received content streams to produce an interactive, multi-layer content session for display on a device of a user; and a plurality of heterogeneous artificial intelligence modules, each configured to analyze input from at least one of the set of received content streams and the interactive, multi-layer content session to provide a result, and wherein the content layering and mixing module is configured to use the result of the plurality of heterogeneous artificial intelligence modules to configure the multi-layer content session.

A further embodiment of any of the foregoing embodiments of the present disclosure may include situations wherein a subset of the plurality of heterogeneous artificial intelligence modules may be arranged in parallel to concurrently analyze input from a common received content stream from the set of received content streams.

A further embodiment of any of the foregoing embodiments of the present disclosure may include situations wherein a subset of the plurality of heterogeneous artificial intelligence modules may be arranged in series to sequentially analyze input from a common received content stream from of the set of received content streams.

The present disclosure describes a video processing system, the system according to one disclosed non-limiting embodiment of the present disclosure can include a first content layering and mixing system for processing a set of received content streams from a plurality of pipelines and related to a set of corresponding input content streams of the plurality of pipelines to produce an interactive, multi-layer content session for display on a user display device; and a plurality of artificial intelligence systems configured to analyze at least one of the set of received content streams and the interactive, multi-layer content session to provide a set of results, wherein the plurality of artificial intelligence systems includes at least one artificial intelligence system within a cloud computing environment and at least one artificial intelligence system on a user video device; wherein the first content layering and mixing system uses the set of results of the plurality of artificial intelligence systems to at least one of configure the first content layering and mixing system and augment the multi-layer content session.

A further embodiment of any of the foregoing embodiments of the present disclosure may include situations wherein the user video device comprises the user display device of the user.

A further embodiment of any of the foregoing embodiments of the present disclosure may include situations wherein the user video device comprises: a plurality of ASICs configured as input pipelines to transform a set of input content streams into a set of corresponding display content streams; and an ASIC configured to encode the interactive, multi-layer content session as a display ready video stream, wherein the first content layering and mixing system is implemented on an FPGA.

A further embodiment of any of the foregoing embodiments of the present disclosure may include situations wherein the first content layering and mixing system is located within the cloud computing environment.

A further embodiment of any of the foregoing embodiments of the present disclosure may include situations wherein the interactive, multi-layer content session provided by the first content layering and mixing system is provided as a content input source to a second content layering and mixing system located on the user video device.

A further embodiment of any of the foregoing embodiments of the present disclosure may further include a second content layering and mixing system, located within the cloud computing environment, for processing a set of content input sources located within the cloud computing environment to produce an interactive, multi-layer content session that is provided to the first content layering and mixing system, and wherein the first content layering and mixing system is located on the user video device.

A further embodiment of any of the foregoing embodiments of the present disclosure may include situations wherein the user video device comprises: a plurality FPGAs configured to implement: a plurality of input pipelines to transform a set of input content streams into a set of corresponding received content streams; a first content layering and mixing system; and an encoder to convert the interactive, multi-layer content session to a display-ready video stream.

A further embodiment of any of the foregoing embodiments of the present disclosure may include situations wherein the user video device further comprises a graphics processing unit to implement a subset of the plurality of input pipelines.

A further embodiment of any of the foregoing embodiments of the present disclosure may include situations wherein the configuring comprises an action selected from the group consisting of: a selection of what received content streams to show; a selection of a timing of display of content within a feed; a grouping of received content streams into composites; a layering of received content streams; an annotation of a received content stream; a sizing of a received content stream; a re-sizing of a received content stream; a placement of a received content stream; an addition of a content source; a highlighting of an item; a selection of content sources; a configuration of content; a movement to a location within a received content stream; a location of a received content stream; and a change in detection modes for a received content stream.

The present disclosure describes a video processing device, the device according to one disclosed non-limiting embodiment of the present disclosure can include a first content layering and mixing module structured to process a set of received content streams from a plurality of pipelines and related to a set of corresponding input content streams of the plurality of pipelines to produce an interactive, multi-layer content session for display on a user display device; a plurality of artificial intelligence modules structured to analyze at least one of the set of received content streams and the interactive, multi-layer content session to provide a set of results, wherein the plurality of artificial intelligence modules includes at least one artificial intelligence module on a user video device; and a communications module structured to provide at least one of the set of received content streams and the interactive, multi-layer content session to a remote artificial intelligence module and receive results from the remote artificial intelligence module, wherein the first content layering and mixing module uses the results of the plurality of artificial intelligence modules on the user video device and the results from the remote artificial intelligence module to at least one of configure the first content layering and mixing module and augment the multi-layer content session.

A further embodiment of any of the foregoing embodiments of the present disclosure may include situations wherein the user video device comprises the user display device of the user.

A further embodiment of any of the foregoing embodiments of the present disclosure may include situations wherein the user video device comprises: a plurality of ASICs configured as input pipelines to transform a set of input content streams into a set of corresponding display content streams; and an ASIC configured to encode the interactive, multi-layer content session as a display ready video stream, wherein the first content layering and mixing module is implemented on an FPGA.

A further embodiment of any of the foregoing embodiments of the present disclosure may include situations wherein the first content layering and mixing module is located within a cloud computing environment.

A further embodiment of any of the foregoing embodiments of the present disclosure may include situations wherein the interactive, multi-layer content session provided by the first content layering and mixing module is provided as a content input source to a second content layering and mixing module located on the user video device.

A further embodiment of any of the foregoing embodiments of the present disclosure may further include a second content layering and mixing module, located within a cloud computing environment, for processing a set of content input sources located within the cloud computing environment to produce an interactive, multi-layer content session that is provided to the first content layering and mixing module, wherein the first content layering and mixing module is located on the user video device.

A further embodiment of any of the foregoing embodiments of the present disclosure may include situations wherein the user video device comprises: a plurality FPGAs configured to implement: a plurality of input pipelines to transform a set of input content streams into a set of corresponding received content streams; a first content layering and mixing module structured to combine the set of received content streams to create the interactive, multi-layer content session; and an encoder module structured to convert the interactive, multi-layer content session to a display ready video stream.

A further embodiment of any of the foregoing embodiments of the present disclosure may include situations wherein the user video device further comprises a graphics processing unit to implement a subset of the plurality of input pipelines.

A further embodiment of any of the foregoing embodiments of the present disclosure may include situations wherein the configuring comprises an action selected from the group consisting of: a selection of what received content streams to show; a selection of a timing of display of content within a feed, a grouping of received content streams into composites; a layering of received content streams; an annotation of a received content stream; a sizing of a received content stream; a re-sizing of a received content stream; a placement of a received content stream; an addition of a content source; a highlighting of an item; a selection of content sources; a configuration of content; a movement to a location within a received content stream; a location of a received content stream; and a change in detection modes for a received content stream.

The present disclosure describes a video processing system, the system according to one disclosed non-limiting embodiment of the present disclosure can include a content layering and mixing system for processing a set of input content streams to produce an interactive, multi-layer content session for a display on a device of a user; and an artificial intelligence system configured to take input from at least one of the set of input content streams and a set of output of the content layering and mixing system to provide a result, wherein the content layering and mixing system uses the result to at least one of configure or augment the multi-layer content session and wherein the artificial intelligence system is configured to learn from a set of user interactions with a set of multi-layer content sessions and to provide results that progressively improve the output of the content layering and mixing system.

A further embodiment of any of the foregoing embodiments of the present disclosure may include situations wherein the set of user interactions comprises at least one action selected from the group consisting of indicating an item to be recognized and configuring an action to occur upon recognition of an item.

A further embodiment of any of the foregoing embodiments of the present disclosure may include situations wherein the learning comprises collaborative filtering of the results from other users.

A further embodiment of any of the foregoing embodiments of the present disclosure may include situations wherein the user interactions are selected from a list consisting of: user input, user sizing of a display element, user positioning of a display element, user movement of a display element, user utilization, user viewing, and user searches.

A further embodiment of any of the foregoing embodiments of the present disclosure may include situations wherein improving the output of the content layering and mixing system comprises improvements to an efficiency of an encoding system.

A further embodiment of any of the foregoing embodiments of the present disclosure may include situations wherein improvements to the efficiency of the encoding system comprise providing information about elements of interest to the encoding system.

A further embodiment of any of the foregoing embodiments of the present disclosure may include situations wherein the elements of interest in an image are encoded at a higher resolution relative to elements not indicated to be of interest.

The present disclosure describes a video processing device, the device according to one disclosed non-limiting embodiment of the present disclosure can include a content layering and mixing module structured to process a set of input content streams to produce an interactive, multi-layer content session for display on a display device of a user; and an artificial intelligence module structured to analyze input from at least one of the set of input content streams and a set of output of the content layering and mixing module to provide a result, wherein the content layering and mixing module uses the result to at least one of configure or augment the multi-layer content session and wherein the artificial intelligence module is structured to learn from a set of user interactions with a set of multi-layer content sessions and to provide results that progressively improve the output of the content layering and mixing module.

A further embodiment of any of the foregoing embodiments of the present disclosure may include situations wherein the set of user interactions comprises at least one action selected from the group consisting of indicating an item to be recognized and configuring an action to occur upon recognition of an item.

A further embodiment of any of the foregoing embodiments of the present disclosure may include situations wherein the learning comprises collaborative filtering of the results from other users.

A further embodiment of any of the foregoing embodiments of the present disclosure may include situations wherein the user interactions are selected from a list consisting of: user sizing of a display element, user positioning of a display element, user movement of a display element, user input, user utilization, user viewing, and user searches.

A further embodiment of any of the foregoing embodiments of the present disclosure may include situations wherein improving the output of the content layering and mixing module comprises improvements to an efficiency of an encoding module.

A further embodiment of any of the foregoing embodiments of the present disclosure may include situations wherein improvements to the efficiency of the encoding module comprise providing information about elements of interest to the encoding module.

A further embodiment of any of the foregoing embodiments of the present disclosure may include situations wherein the elements of interest in an image are encoded at a higher resolution relative to elements not indicated to be of interest.

The present disclosure describes a video processing method, the method according to one disclosed non-limiting embodiment of the present disclosure can include processing a set of input content streams; producing an interactive, multi-layer content session for display on a display device of a user; analyzing and learning from input from at least one of the set of input content streams and the interactive, multi-layer content session; providing a result that progressively improves the interactive, multi-layer content session; and configuring the multi-layer content session.

A further embodiment of any of the foregoing embodiments of the present disclosure may further include collaboratively filtering the results with those from other users.

A further embodiment of any of the foregoing embodiments of the present disclosure may include situations wherein the user interactions are selected from a list consisting of: user sizing of a display element, user positioning of a display element, user movement of a display element, user input, user utilization, user viewing, and user searches.

A further embodiment of any of the foregoing embodiments of the present disclosure may further include improving an efficiency of an encoding system.

A further embodiment of any of the foregoing embodiments of the present disclosure may further include providing information about elements of interest to the encoding system.

A further embodiment of any of the foregoing embodiments of the present disclosure may further include encoding the elements of interest at a higher resolution relative to elements not indicated to be of interest.

The present disclosure describes a video processing system, the system according to one disclosed non-limiting embodiment of the present disclosure can include a content layering and mixing system for processing a set of received content streams to produce an interactive, multi-layer content session for display on a user display device, wherein at least one of the set of received content streams is from an access monitoring camera; and an artificial intelligence system configured to analyze the at least one received content stream from the access monitoring camera and produce a result, wherein the content layering and mixing system uses the result from the artificial intelligence system to at least one of configure or augment the multi-layer content session based on the result, and wherein the result from the artificial intelligence system is used by the content layering and mixing system to trigger presentation of the received content stream from the access monitoring camera on the display of the user display device and minimize other content when a threat is detected in the at least one received content stream from the access monitoring camera.

A further embodiment of any of the foregoing embodiments of the present disclosure may include situations wherein the result from the artificial intelligence system is used by the content layering and mixing system to provide an alert on the display of the user display device when movement is detected in the at least one received content stream from the access monitoring camera.

A further embodiment of any of the foregoing embodiments of the present disclosure may include situations wherein the result from the artificial intelligence system is used by the content layering and mixing system to provide a warning on the display of the user display device when a threat is detected in the at least one received content stream from the access monitoring camera.

A further embodiment of any of the foregoing embodiments of the present disclosure may include situations wherein the detection of the threat comprises at least one of: detection of a weapon, detection of a fire, or detection of an individual identified as a threat.

A further embodiment of any of the foregoing embodiments of the present disclosure may further include a user input system to receive user input from a user device; a machine learning system configured to take the result and the received user input and at least one of configure or augment the artificial intelligence system.

A further embodiment of any of the foregoing embodiments of the present disclosure may include situations wherein the result from the artificial intelligence system is used by the content layering and mixing system to trigger presentation of the at least one received content stream from the access monitoring camera on the display of the user display device when movement is detected in the at least one received content stream from the access monitoring camera.

A further embodiment of any of the foregoing embodiments of the present disclosure may include situations wherein the result from the artificial intelligence system is used by the content layering and mixing system to trigger presentation of the received content stream from the access monitoring camera on the display of the user display device when a threat is detected in the at least one received input stream from the access monitoring camera.

The present disclosure describes an access control method, the method according to one disclosed non-limiting embodiment of the present disclosure can include processing a set of received content streams to produce an interactive, multi-layer content session for display, wherein at least one of the set of received content streams is from an access monitoring camera; analyzing the at least one received content stream from the access monitoring camera and producing a result; and augmenting the interactive multi-layer content session based on the result.

A further embodiment of any of the foregoing embodiments of the present disclosure may further include minimizing, in the interactive, multi-layer content session, other received content streams and maximizing the at least one received content stream from the access monitoring camera.

A further embodiment of any of the foregoing embodiments of the present disclosure may include situations wherein the result comprises detection of movement in the at least one received content stream from the access monitoring camera.

A further embodiment of any of the foregoing embodiments of the present disclosure may include situations wherein the augmenting comprises including an alert as part of the interactive, multi-layer content session.

A further embodiment of any of the foregoing embodiments of the present disclosure may include situations wherein the augmenting comprises presenting the received content stream from the access monitoring camera as part of the interactive, multi-layer content session.

A further embodiment of any of the foregoing embodiments of the present disclosure may include situations wherein the result comprises detection of a threat in the at least one received content stream from the access monitoring camera.

A further embodiment of any of the foregoing embodiments of the present disclosure may include situations wherein the detection of the threat comprises at least one of detection of a weapon, detection of a fire, or detection of an individual identified as a threat.

A further embodiment of any of the foregoing embodiments of the present disclosure may include situations wherein the augmenting comprises including a warning as part of the interactive, multi-layer content session.

The present disclosure describes a video processing device, the device according to one disclosed non-limiting embodiment of the present disclosure can include a content layering and mixing module structured to process a set of received content streams to produce an interactive, multi-layer content session for display on a user display device, wherein at least one of the set of received content streams is from an access monitoring camera; and an artificial intelligence module structured to take the at least one received content stream from the access monitoring camera and produce a result, wherein the content layering and mixing module uses the result from the artificial intelligence module to at least one of configure and augment the multi-layer content session based on the result.

A further embodiment of any of the foregoing embodiments of the present disclosure may include situations wherein the result from the artificial intelligence module is used by the content layering and mixing module to provide an alert on the display of the user display device when movement is detected in the at least one received content stream from the access monitoring camera.

A further embodiment of any of the foregoing embodiments of the present disclosure may include situations wherein the result from the artificial intelligence module is used by the content layering and mixing module to provide a warning on the display of the user display device when a threat is detected in the at least one received content stream from the access monitoring camera.

A further embodiment of any of the foregoing embodiments of the present disclosure may further include a user input module structured to receive user input from a user device; and a machine learning module structured to take the result and the received user input and at least one of configure and augment the artificial intelligence module.

A further embodiment of any of the foregoing embodiments of the present disclosure may include situations wherein the result from the artificial intelligence module is used by the content layering and mixing module to trigger presentation of the at least one received content stream from the access monitoring camera on the display of the user display device when movement is detected in the at least one received content stream from the access monitoring camera.

The present disclosure describes a video processing system, the system according to one disclosed non-limiting embodiment of the present disclosure can include a content layering and mixing system for processing a set of received content streams from a plurality of pipelines having a set of corresponding input content streams to produce an interactive, multi-layer content session for display on a user device; and an artificial intelligence system configured to receive input from at least one of the set of input content streams and the set of received content streams, wherein the artificial intelligence system is configured to recognize a gesture from the received input, wherein the content layering and mixing system configures or augments the multi-layer content session based on the recognized gesture.

A further embodiment of any of the foregoing embodiments of the present disclosure may include situations wherein the user device further comprises a user-facing camera having a user-facing camera and wherein the artificial intelligence system is further configured to process the received input from the user-facing camera and recognize a gesture.

A further embodiment of any of the foregoing embodiments of the present disclosure may include situations wherein the recognized gesture is one of a hand gesture, an arm gesture, a head gesture, an eye movement, a facial movement, a leg gesture, and a body gesture.

A further embodiment of any of the foregoing embodiments of the present disclosure may include situations wherein configuring the multi-layer content session comprises at least one of: enlarging a content area of a received content stream, omitting the display of a received content stream, moving a position of a received content stream, re-sizing a received content stream, adjusting a transparency of a received content stream, adjusting an audio of a received content stream, or selecting what received content streams to display.

A further embodiment of any of the foregoing embodiments of the present disclosure may include situations wherein the content layering and mixing system augments the multi-layer content session by at least one action selected from a list consisting of: adding an icon indicating the recognized gesture, adding an overlay to a received content stream based on the recognized gesture, adding a highlighted element to a received content stream based on the recognized gesture, adding marking to a received content stream based on the recognized gesture, adding additional information to the multi-layer content session, and adding a menu for further decisions.

A further embodiment of any of the foregoing embodiments of the present disclosure may further include an intelligent layering system to create, based on the recognized gesture, a layered output content stream for input to the content layering and mixing system.

A further embodiment of any of the foregoing embodiments of the present disclosure may include situations wherein the layered output content stream is synchronized with at least one of the received content streams.

A further embodiment of any of the foregoing embodiments of the present disclosure may include situations wherein the layered output content stream comprises at least one output indication selected from a list of output indicators, the list consisting of: an icon indicating the recognized gesture, an indication of confidence in the recognized gesture, a highlighting element, an alert, and an obscuring element.

A further embodiment of any of the foregoing embodiments of the present disclosure may further include a user-input interface to receive user input from a plurality of user devices, the user-input interface further structured to provide, based on the received user input, configuration information to at least one of the intelligent layering system, the content layering and mixing system, or the artificial intelligence system.

The present disclosure describes a method, the method according to one disclosed non-limiting embodiment of the present disclosure can include processing a set of received content streams from a plurality of pipelines having a set of corresponding input content streams to produce an interactive, multi-layer content session for display on a user device; and analyzing input from at least one of the set of input content streams and the set of received content streams; recognizing a gesture from the received input; and augmenting, the multi-layer content session based on the recognized gesture.

A further embodiment of any of the foregoing embodiments of the present disclosure may further include processing received input from a user-facing camera of the user device to recognize a gesture.

A further embodiment of any of the foregoing embodiments of the present disclosure may include situations wherein analyzing further includes analyzing the interactive, multi-layer content session.

A further embodiment of any of the foregoing embodiments of the present disclosure may further include configuring the interactive, multi-layer content session based on the recognized gesture.

A further embodiment of any of the foregoing embodiments of the present disclosure may include situations wherein configuring the multi-layer content session comprises at least one of: enlarging a content area of a received content stream, omitting the display of a received content stream, moving a position of a received content stream, re-sizing a received content stream, adjusting a transparency of a received content stream, adjusting an audio of a received content stream, or selecting what received content streams to display.

A further embodiment of any of the foregoing embodiments of the present disclosure may further include creating a layered content stream based on the recognized gesture.

A further embodiment of any of the foregoing embodiments of the present disclosure may further include synchronizing the layered content stream with at least one of the received content streams.

The present disclosure describes a video processing device, the device according to one disclosed non-limiting embodiment of the present disclosure can include a plurality of input pipelines, each configured to receive an input content stream and output a received content stream; a content layering and mixing module configured to process a set of received content streams and to produce an interactive, multi-layer content session for display on a device of a user; and an artificial intelligence module configured to analyze at least one of the received content streams to recognize a gesture, wherein the content layering and mixing module uses the recognized gesture to at least one of configure and augment the multi-layer content session.

A further embodiment of any of the foregoing embodiments of the present disclosure may include situations wherein the artificial intelligence module analyzes received input from a user-facing camera of the user device to recognize a gesture.

A further embodiment of any of the foregoing embodiments of the present disclosure may further include an intelligent layering module configured to create, based on the recognized gesture, a layered output content stream as input to the content layering and mixing module.

The present disclosure describes a video processing system, the system according to one disclosed non-limiting embodiment of the present disclosure can include a content layering and mixing system for processing a set of received content streams from a plurality of pipelines having a set of corresponding input content streams to produce an interactive, multi-layer content session for display on a user device; and an artificial intelligence system configured to receive input from at least one of the set of input content streams and the set of received content streams, wherein the artificial intelligence system is configured to recognize an object or person of interest from the received input, wherein the content layering and mixing system configures or augments the multi-layer content session based on the recognized object or person of interest.

A further embodiment of any of the foregoing embodiments of the present disclosure may include situations wherein configuring the multi-layer content session comprises initiating a search for content relevant to the recognized object or person of interest.

A further embodiment of any of the foregoing embodiments of the present disclosure may include situations wherein configuring the multi-layer content session comprises selecting a content stream for display that includes the object or person of interest upon recognition of the object or person of interest.

A further embodiment of any of the foregoing embodiments of the present disclosure may include situations wherein configuring the multi-layer content session comprises at least one of enlarging a content area of a received content stream, omitting the display of a received content stream, moving a position of a received content stream, re-sizing a received content stream, adjusting a transparency of a received content stream, adjusting an audio of a received content stream, or selecting what received content streams to display.

A further embodiment of any of the foregoing embodiments of the present disclosure may include situations wherein augmenting the multi-layer content session comprises at least one action selected from a list consisting of: adding an icon indicating the recognized object or person of interest, adding an overlay to a received content stream based on the recognized object or person of interest, adding a highlighted element to a received content stream based on the recognized object or person of interest, adding marking to a received content stream based on the recognized object or person of interest, adding additional information to the multi-layer content session, and adding a menu for further decisions.

A further embodiment of any of the foregoing embodiments of the present disclosure may further include an intelligent layering system to create, based on the recognized object or person of interest, a layered output content stream for input to the content layering and mixing system.

A further embodiment of any of the foregoing embodiments of the present disclosure may include situations wherein the layered output content stream comprises at least one output indication selected from a list of output indicators, the list consisting of: an icon indicating the recognized object or person of interest, an indication of confidence in the recognized object or person of interest, a highlighting element, an alert, and an obscuring element.

A further embodiment of any of the foregoing embodiments of the present disclosure may further include a user input interface to receive user input from a plurality of user devices, the user input interface further structured to provide, based on the received user input, configuration information to at least one of: the intelligent layering system, the content layering and mixing system, or the artificial intelligence system.

The present disclosure describes a method, the method according to one disclosed non-limiting embodiment of the present disclosure can include processing a set of received content streams from a plurality of pipelines having a set of corresponding input content streams to produce an interactive, multi-layer content session for display on a user device; analyzing, by an artificial intelligence system, input from at least one of the set of input content streams and the set of received content streams; recognizing, using the artificial intelligence system, an object or person of interest from the received input; and augmenting the multi-layer content session based on the recognized object or person of interest.

A further embodiment of any of the foregoing embodiments of the present disclosure may further include analyzing, by artificial intelligence system, the interactive, multi-layer content session.

A further embodiment of any of the foregoing embodiments of the present disclosure may further include configuring the interactive, multi-layer content session based on the recognized object or person of interest.

A further embodiment of any of the foregoing embodiments of the present disclosure may include situations wherein configuring the multi-layer content session comprises selecting a content stream for display which comprises the object or person of interest upon recognition of the object or person of interest.

A further embodiment of any of the foregoing embodiments of the present disclosure may include situations wherein configuring the multi-layer content session comprises initiating a search for content relevant to the recognized object or person of interest.

A further embodiment of any of the foregoing embodiments of the present disclosure may include situations wherein configuring the multi-layer content session comprises at least one of: enlarging a content area of a received content stream, omitting the display of a received content stream, moving a position of a received content stream, re-sizing a received content stream, adjusting a transparency of a received content stream, adjusting an audio of a received content stream, or selecting what received content streams to display.

A further embodiment of any of the foregoing embodiments of the present disclosure may further include creating a layered output content stream based on the recognized object or person of interest.

A further embodiment of any of the foregoing embodiments of the present disclosure may further include synchronizing the layered output content stream with at least one of the received content streams.

The present disclosure describes a video processing device, the device according to one disclosed non-limiting embodiment of the present disclosure can include a plurality of input pipelines, each configured to receive an input content stream and output a display output stream and an analysis output stream; a content layering and mixing module configured to process a set of display output streams and to produce an interactive, multi-layer content session for display on a device of a user; and an artificial intelligence module configured to analyze at least one of the input content streams or at least one the analysis output streams to recognize an object or person of interest, wherein the content layering and mixing module uses the recognized object or person of interest to at least one of configure or augment the multi-layer content session.

A further embodiment of any of the foregoing embodiments of the present disclosure may include situations wherein the artificial intelligence module analyzes received input from a user-facing camera of the user device to recognize an object or person of interest.

A further embodiment of any of the foregoing embodiments of the present disclosure may further include an intelligent layering module configured to create, based on the recognized object or person of interest, a layered output content stream as input to the content layering and mixing module.

The present disclosure describes a video processing system, the system according to one disclosed non-limiting embodiment of the present disclosure can include a content layering and mixing system for processing a set of received content streams to produce an interactive, multi-layer content session for display on a device of a user, wherein the set of received content streams includes a gambling content stream; and an artificial intelligence system configured to receive input of the user from a camera, wherein the artificial intelligence system is configured to recognize a user gesture using the received input of the user, wherein the content layering and mixing system takes an action relating to the gambling content stream based on the recognized user gesture.

A further embodiment of any of the foregoing embodiments of the present disclosure may include situations wherein the camera is a user-facing camera of the user device.

A further embodiment of any of the foregoing embodiments of the present disclosure may include situations wherein the recognized user gesture comprises: a hand gesture, an arm gesture, a head gesture, an eye movement, a leg gesture, or a body gesture.

A further embodiment of any of the foregoing embodiments of the present disclosure may include situations wherein the action relating to the gambling content stream comprises at least one of: enlarging a content area of the gambling content stream, omitting the display of the gambling content stream, moving a position of the gambling content stream, re-sizing the gambling content stream, adjusting a transparency of the gambling content stream, adjusting an audio of the gambling content stream, or initiating communication with the gambling content stream.

A further embodiment of any of the foregoing embodiments of the present disclosure may include situations wherein the action relating to the gambling content stream the multi-layer content session comprises at least one action selected from a list consisting of: adding an icon indicating the recognized gesture, adding an overlay to the gambling content stream based on the recognized gesture, adding a highlighted element to the gambling content stream based on the recognized gesture, adding additional information to the multi-layer content session, and adding a menu for further decisions.

A further embodiment of any of the foregoing embodiments of the present disclosure may further include an intelligent layering system to create, based on the recognized user gesture, a layered output content stream for input to the content layering and mixing system.

A further embodiment of any of the foregoing embodiments of the present disclosure may include situations wherein the layered output content stream is synchronized with the gambling content stream.

The present disclosure describes a video processing system, the system according to one disclosed non-limiting embodiment of the present disclosure can include processing a set of received content streams to produce an interactive, multi-layer content session for display on a device of a user, wherein the set of received content streams includes a gambling content stream; analyzing received input of the user from a camera to recognize a user gesture; and taking an action relating to the gambling content stream based on the recognized user gesture.

A further embodiment of any of the foregoing embodiments of the present disclosure may include situations wherein the camera is a user-facing camera of the user device.

A further embodiment of any of the foregoing embodiments of the present disclosure may include situations wherein the recognized user gesture comprises: a hand gesture, an arm gesture, a head gesture, an eye movement, a leg gesture, or a body gesture.

A further embodiment of any of the foregoing embodiments of the present disclosure may include situations wherein taking an action relating to the gambling content stream comprises at least one of: enlarging a content area of the gambling content stream, omitting the display of the gambling content stream, moving a position of the gambling content stream, re-sizing the gambling content stream, adjusting a transparency of the gambling content stream, adjusting an audio of the gambling content stream, or initiating communication with the gambling content stream.

A further embodiment of any of the foregoing embodiments of the present disclosure may include situations wherein taking an action relating to the gambling content stream the multi-layer content session comprises at least one action selected from a list consisting of: adding an icon indicating the recognized gesture, adding an overlay to the gambling content stream based on the recognized gesture, adding a highlighted element to the gambling content stream based on the recognized gesture, adding additional information to the multi-layer content session, and adding a menu for further decisions.

A further embodiment of any of the foregoing embodiments of the present disclosure may further include creating, based on the recognized user gesture, a layered output content stream.

A further embodiment of any of the foregoing embodiments of the present disclosure may include situations wherein the layered output content stream comprises at least one of a visible element or a hidden element.

A further embodiment of any of the foregoing embodiments of the present disclosure may include situations wherein the hidden element comprises at least one of: tagging a content stream, adding to metadata, or annotating.

A further embodiment of any of the foregoing embodiments of the present disclosure may include situations wherein the visible element comprises at least one of: circling an item, highlighting a subject, highlighting a recognized activity, or labelling an object.

A further embodiment of any of the foregoing embodiments of the present disclosure may further include synchronizing the layered output content stream with the gambling content stream.

The present disclosure describes a video processing system, the system according to one disclosed non-limiting embodiment of the present disclosure can include a content layering and mixing system for processing a set of received content streams to produce an interactive, multi-layer content session for display on a device of a user, wherein the set of received content streams includes a received content stream corresponding to a camera input comprising an image of the user; and an artificial intelligence system configured to process the received content stream corresponding to the camera input to identify a person in the received content stream as the user and provide the user identity to the content layering and mixing system, wherein the content layering and mixing system personalizes the multi-layer content session based on the user identity.

A further embodiment of any of the foregoing embodiments of the present disclosure may include situations wherein personalizing the multi-layer content session comprises at least one of: selecting a personalized advertisement for display on the user device, enlarging a content area of a received content stream, making a set of content owned or licensed by the user available for display, omitting the display of a received content stream, moving a position of a received content stream, re-sizing a received content stream, adjusting a transparency of a received content stream, adjusting an audio of a received content stream, or selecting what received content streams to display.

A further embodiment of any of the foregoing embodiments of the present disclosure may include situations wherein personalizing the multi-layer content session comprises at least one action selected from a list consisting of: adding an icon indicating the identified user, adding an overlay to a received content stream based on the identified user, adding a highlighted element to a received content stream based on the identified user, adding marking to a received content stream based on the identified user, adding additional information to the multi-layer content session, and adding a menu for further decisions.

A further embodiment of any of the foregoing embodiments of the present disclosure may further include an intelligent layering system to create, based on the user identity, a layered output content stream for input to the content layering and mixing system.

A further embodiment of any of the foregoing embodiments of the present disclosure may include situations wherein the layered output content stream is synchronized with at least one of the received content streams.

A further embodiment of any of the foregoing embodiments of the present disclosure may further include a user input interface to receive user input from a plurality of user devices, the user input interface further structured to provide, based on the received user input, configuration information to at least one of: the intelligent layering system, the content layering and mixing system, or the artificial intelligence system.

The present disclosure describes a method, the method according to one disclosed non-limiting embodiment of the present disclosure can include processing a set of received content streams to produce an interactive, multi-layer content session for display on a device of a user; analyzing received input from a camera; processing the received input to determine, based on an image, an identity of the user; and personalizing, the multi-layer content session based on the identity of the user.

A further embodiment of any of the foregoing embodiments of the present disclosure may include situations wherein personalizing the multi-layer content session comprises selecting a personalized advertisement for display on the user device.

A further embodiment of any of the foregoing embodiments of the present disclosure may include situations wherein\ personalizing the multi-layer content session comprises selecting a content stream for display on the user device.

A further embodiment of any of the foregoing embodiments of the present disclosure may include situations wherein personalizing the multi-layer content session comprises at least one of: enlarging a content area of a received content stream, making a set of content owned or licensed by the user available for display, omitting the display of a received content stream, moving a position of a received content stream, re-sizing a received content stream, adjusting a transparency of a received content stream, adjusting an audio of a received content stream, or selecting what received content streams to display.

A further embodiment of any of the foregoing embodiments of the present disclosure may further include creating a layered output content stream based on the identified user.

A further embodiment of any of the foregoing embodiments of the present disclosure may further include synchronizing the layered output content stream with at least one of the received content streams.

A further embodiment of any of the foregoing embodiments of the present disclosure may include situations wherein the layered output content stream comprises at least one of a visible element, or a hidden element.

A further embodiment of any of the foregoing embodiments of the present disclosure may include situations wherein the hidden element comprises at least one of a tag for the content stream, a label for the content stream, metadata, or an annotation.

A further embodiment of any of the foregoing embodiments of the present disclosure may include situations wherein the visible element comprises at least one of:

circling an item, highlighting a subject, highlighting a recognized activity, or labelling an object.

In embodiments, a video display system includes a computerized media processing unit, also known as a media processing system, configured to receive a plurality of content from a plurality of content sources and configured to combine the plurality of content from the plurality of content sources to generate and output a video signal containing an interactive multi-layer stream receivable by at least one display device. The interactive multi-layer stream includes a plurality of video layers all displayable on the at least one display device simultaneously with independently variable size and position under the control of a user. The plurality of video layers includes a layer configured to display a portion of content from one linear TV source and another layer configured to display one of an IP TV source, a video game platform source, an Internet source, and a device source. The system includes a computing device in communication with the media processing unit. The computing device has an interface that displays a representation of the plurality of video layers as arranged on the display device and which is configured to receive command inputs from a user to control, in near real time, the size, position, and the content of each of the plurality of video layers on the at least one display device.

In embodiments, each of the plurality of video layers is capable of simultaneously displaying video content independent of the size, position, and content of the other video layers. In embodiments, each of the plurality of video layers is capable of being sized without regard to an aspect ratio of the content received from the corresponding content source, and each of the plurality of video layers is configured to adjust at least one of size, shape, position, overlap, and transparency based on command inputs from the user. In embodiments, the one linear TV source is one of a cable TV provider, a satellite TV provider, and a network provider. The game platform source is one of a gaming platform, a hand-held gaming device, an online gaming platform, and a PC-based gaming platform. The device source is one of a web camera, a security camera, a doorbell camera, a web camera, and an Internet of Things device.

In embodiments, the device source is one of a web camera, a security camera, a doorbell camera, a web camera, and an Internet of Things device and the interactive multi-layer stream is configured to include a content stream from the device source having one of a text stream, an audio stream, an animation stream, and a visual content stream. In embodiments, the computerized media processing unit includes hybrid processor and field programmable gate arrays configured to form the interactive multi-layer stream receivable by the at least one display device. In embodiments, at least a portion of the hybrid processor and field programmable gate arrays are located in one of the at least one display device, in a cloud network facility, in a set top box, and in combinations thereof. In embodiments, the computerized media processing unit includes hybrid processor and field programmable gate arrays deployed in a cloud network facility to provide large-scale parallel processing and configured to form the interactive multi-layer stream receivable by the at least one display device. In embodiments, the system includes an advertising module in communication with the media processing unit that outputs a signal included in the interactive multi-layer stream having an advertisement video.

In embodiments, a video display system includes a computerized media processing unit configured to receive a plurality of video content from a plurality of heterogeneous content sources and configured to combine the plurality of video content from the plurality of heterogeneous content sources to generate and output a video signal receivable by at least one display device. The video signal output by the media processing unit includes a plurality of video containers all displayable on the at least one display device simultaneously with independently variable size and position under the control of a user. The system includes a computing device in communication with the media processing unit. The computing device includes at least one voice integration unit having a voice interface configured to receive command inputs from a user to control in near real time at least a portion of the content on the at least one display device.

In embodiments, each of the plurality of video containers is capable of simultaneously displaying video content independent of the size, position, and video content of the other of the plurality of video containers. Each of the plurality of video containers is capable of being sized without regard to an aspect ratio of the content received from the corresponding content source.

In embodiments, the computing device includes at least two voice integration units configured to be located in separate rooms of a building and associated with the at least one display and another display. The computerized media processing unit is configured to move in near real time at least a portion of the content between the at least one display device and the other display device when the at least two voice integration units detect the user moving between the separate rooms. In embodiments, the computerized media processing unit includes hybrid processor and field programmable gate arrays configured to form an interactive multi-layer stream receivable by the at least one display device. In embodiments, the computerized media processing unit is configured to output the video signal receivable by at least one display device that includes a message confirming receipt of the command inputs from the user through the at least one voice integration unit relevant to content in one of the video containers. In embodiments, the message confirming receipt of input from the user through the at least one voice integration unit includes a confirmation of additional information sent to the user relevant to the content on the at least one display device and responsive to a request from the user obtained by the at least one voice integration unit for the additional information.

In embodiments, the message confirming receipt of input from the user through the at least one voice integration unit includes a confirmation of a vote relevant to the content on the at least one display device and responsive to a request from the user obtained by the at least one voice integration unit to place the vote. In embodiments, the message confirming receipt of input from the user through the at least one voice integration unit includes a display of one of a graphic, an emoji, and a message in response to the content on the at least one display device and responsive to a request from the user obtained by the at least one voice integration unit. In embodiments, the computerized media processing unit is configured to output the video signal receivable by at least one display device and another display device that includes a message from the user through the at least one voice integration unit displayed in one of the video containers on the at least one display device and the other display device.

In embodiments, the computerized media processing unit is configured to output the video signal receivable by at least one display device that includes a message to the user displayed in one of the video containers and based on command inputs from another user through the at least one voice integration unit. In embodiments, the message to the user displayed in one of the video containers is one of a command and a question from the other user through the at least one voice integration unit. In embodiments, the computerized media processing unit is configured to output the video signal receivable by at least one display device that includes a video feed added in response to receipt of the command inputs from the user through the at least one voice integration unit requesting the added video feed.

In embodiments, a video display system includes a computerized media processing unit configured to receive a plurality of video content from a plurality of heterogeneous content sources and configured to combine the plurality of video content from the plurality of heterogeneous content sources to generate and output in combination an IP stream and a video signal receivable by at least one display device. The video signal output by the media processing unit includes a plurality of video containers all displayable on the at least one display device simultaneously with independently variable size and position under the control of a user. The IP stream is directed through a first buffer and the video signal is directed through a second buffer that is different than the first buffer. The system includes a computing device in communication with the media processing unit. The computing device has an interface that displays a representation of the plurality of video containers as arranged on the display device and which is configured to receive command inputs from a user to control, in near real time, at least one video container whose content is provided through the IP stream.

In embodiments, the IP stream is directed through the first buffer and a video compression facility. In embodiments, the plurality of video content from a plurality of heterogeneous content sources includes restricted content. The computerized media processing unit is configured to prevent the restricted content from being directed to the IP stream. In embodiments, the computerized media processing unit is configured to be in communication with each of a plurality of users having a computing device. The representation of the plurality of video containers as arranged on the display device is adjustable based on one of collaborative or competitive input from the plurality of users. In embodiments, information based on the one of collaborative or competitive input from the plurality of users is directed through the IP stream and displayable on the display device. In embodiments, information from one of games, social media, dating services, matching services, chatting functions, dedicated audio, fantasy sports services is directed through the IP stream and displayable on the display device.

In embodiments, a video display system includes a computerized media processing unit that is configured to receive video content from each of a plurality of different source devices, such as a cable set top box, a satellite set top box, a gaming station, a streaming video set top box, a DVD player, a computing device such as a PC, laptop, tablet, or smartphone, or any device that provides output for a television, such as in HDMI format or an internet packet compressed streaming format, or the like. The media processing unit is configured to aggregate and blend different selected video content from the different source devices to generate as output a blended video signal in HDMI format which is receivable by a television. One of the source devices may be a network computing device that is configured to run a web-based application that provides access to internet video content to the media processing unit, provides a graphical user interface for the video display system, and provides control instructions to the media processing unit. The graphical user interface allows a user to select content from one or more of the source devices to view on the television.

The video signal output by the media processing unit may comprise a plurality of video containers all displayable on the television simultaneously with variable size and variable position, such as under the control of a user, wherein each of the plurality of video containers is capable of simultaneously displaying respective video content from one of the plurality of source devices, independent of the size, position, and video content of the other video containers. A video content displayable in a background video container on the television may comprise the graphical user interface. The media processing unit is configured to control the size and position of each of the other video containers on the background container in response to control instructions of the web-based application. These control instructions may take the form of programmed instructions of the web-based application (such as a predetermined or default layout of video containers) or user interactions with the graphical user interface to control the size and/or position of each container.

The web-based application may run in a web browser of the network computing device, or may be a native application running on the network computing device, or may be an HTML, HTML5, java, JavaScript, Adobe or Adobe flash application. In embodiments, the network computing device may be a personal computer, a laptop computer, a tablet, a smartphone, or the like. The graphical user interface may be displayed on the television or may be displayed on the network computing device running the web-based application, on another computing device, or on one of the source devices providing content to the system. In embodiments, the graphical user interface may be displayed on the television and mirrored in a computing device separate from the television for control of the size and position of at least one of the plurality of video containers in response to user commands to the mirrored graphical user interface. The graphical user interface also controls the selection of content for at least one of the plurality of video containers displayable on the television in response to user commands.

In embodiments, media processing unit may include a FPGA that is reconfigurable. For example, the FPGA can be reconfigured via software that is downloaded from the internet, such as a web portal on the internet, providing the ability to dynamically change a feature set of the hardware of the media processing unit such as to improve speed of blending of the different video sources to produce unique blended video signal outputs to the television.

A formatting module of the media processing unit is configured to resize the content of each of the plurality of video source devices such that it is displayable within a respective video container on the television.

A video container may be resized or repositioned based on activity detected by the web-based application. A background video container may display one or more widgets. A separate input device may be used to provide control commands to the graphical user interface, such as an input device that is associated with a respective one of the plurality of content source devices. A plurality of input devices may be provided, each of the input devices under the control of a respective user for simultaneously controlling a respective one of the plurality of video containers.

In embodiments, a video display system is providing that includes a computerized media processing unit configured to receive video content from each of a plurality of different source devices including at least one of a cable set top box, a satellite set top box, a gaming station, a streaming video set top box, and a DVD player, and at least one network computing device configured to run a web-based application that provides internet video content to the media processing unit, provides a graphical user interface for the video display system, and provides control instructions to the media processing unit, the media processing unit configured to aggregate and blend different selected video content and generate as output the blended video content as a video signal in HDMI format or another format which is receivable by a television or other display device. The video signal output by the media processing unit may comprise a plurality of video containers all displayable on the television simultaneously with variable size and variable position, wherein each of the plurality of video containers is capable of simultaneously displaying respective video content selected from one of the plurality of source devices, independent of the size, position, and video content of the other video containers; and wherein the media processing unit is configured to control the size and position of each of the video containers on the television in response to control instructions of the web-based application, which control instructions comprise at least one of programmed instructions of the web-based application and user interactions with the graphical user interface. In embodiments, the video content displayable in a respective one of the plurality of video containers may comprise a portion of the video content from the respective source device up to the entirety of the video content from that source device.

In embodiments, a video display system may include a television and a network computing device for running a web-based application that provides a graphical user interface for the video display system and access to internet video content; and a computerized media processing unit configured to receive video content from each of a plurality of different source devices, wherein one of the plurality of source devices is the network computing device for providing control instructions to the media processing unit via the web-based application. The media processing unit is configured to aggregate and blend different video content from the different source devices and generate as output the blended video content as a single video signal in a format which is receivable by the television. The video signal output by the media processing unit comprises a plurality of video containers all displayable on the television simultaneously with variable size and variable position, wherein each of the plurality of video containers is capable of simultaneously displaying respective video content from one of the plurality of source devices, independent of the size, position, and video content of the other video containers; and wherein the media processing unit is configured to control the size and position of each video container on the television in response to control instructions of the web-based application, which control instructions comprise at least one of programmed instructions of the web-based application and user interactions with the graphical user interface.

The system contemplated herein may also be configured to allow multiple people to privately listen to an audio of the video container of interest on the television while others watching the same television or other video display can listen to audio from different video containers. In one embodiment, the multiple audio outputs are transmitted via streaming mechanism from the video containers system to mobile devices over communications networks that are connected to the system, as well as private headsets. In one embodiment of operation, different video containers may provide a particular, identifiable audio output channel. A user having a personal headset may connect the headset to an audio device in electronic communication with the system. The audio device may be configured to change channels to provide access to the identifiable audio output channels of each video container. In this way, a user may easily access the audio channels of the various video containers. Audio devices may include, but are not limited to, computers, cellular phones, devices specifically configured for the present teachings, televisions, video game consoles, and the like.

The system contemplated herein may further comprise a video camera and may be enabled to provide a video conferencing service allowing video communication between two or more users. In one embodiment, the video conferencing service may allow a plurality of users to watch a live broadcast and discuss the broadcast using the video conference system. The video conferencing system may be between two users or may be between three or more users. In still another embodiment, a security camera feed may be displayed in a video container. In further embodiments utilizing social interaction aspects, a first user may send a video container from his display device to a display device of a second user, allowing the second user to view what the first user is viewing on the sent video container. This feature may be tied into packages such as the video conferencing service.

In one embodiment, properties of a screen may be manipulated by a network computing device. The network computing device is defined broadly herein to include computing devices connected to a network, as well as other input devices such as a remote control, PCs with web page access to a web interface to the container system, body and/or hand motion devices, voice command devices and other control input devices that can be connected to video container system. In one embodiment, the system may be enabled to bring a video container into full-screen mode upon command and may return to a view showing multiple video containers upon command. In another embodiment, the video container system may be configured to have one large video container displayed, and a number of smaller video containers displayed on the same display device. In this embodiment, the system may be configured to allow a video on a smaller video container to be switched with a video on the large video container on command.

Video containers may have many properties to control the bounds of the function the video containers. One such property is the display type. A video container may be a video display type that provides video play out features and functions. Other display types are possible and one such type is an internet type. The internet video container provides the same sizing and position capability, but instead of video playout, it may perform web based application functions such as HTML, Java Script, Java applets, etc. This allows a programmable application to be hosted on the internet and to be executed in the internet video container.

For example, if a viewer wants to have a video container for all news channels, the video container may have a list of news channels like CNN®, Foxnews®, etc. and would not display or consider other stations like the Disney® Channel because that is not news. The property of the video container may receive video programming across a variety of sources, so for example the news channels may come in through a cable source, a satellite dish source, and an internet source. All of these sources that provide news programming may (or may not depending on the properties) be displayed in the video container. Another example is a video container is configured to list the top 20 most popular video clips on the internet for the current day. Each time launched the list is refreshed by video containers to find the top clip links for that day.

In one embodiment, a video container and content may be streamed, both audio and video, to a mobile device, PC or other display devices. In this embodiment, the video content system may be configured as an integrated video access system providing video access to a plurality of devices simultaneously.

In another embodiment, a single video container system may be operative with a plurality of display devices, the system providing a plurality of different video containers to the different display devices. In a further embodiment, a single control device may control the video container content and layout on all of the plurality of display devices and may allow transfer of one video container from one display device to another. In one example, a single video container system may be employed at a bar having five large screen televisions. A single control device may control all of the video containers displayed on each of the five televisions. Further, this control device may allow transfer of a video container from a first television to a second television. In a further embodiment, the system may allow the five televisions to act as a single large display and may allow movement of video containers as if the televisions were a single display.

The video container system structure also provides many opportunities to expand advertising strategy and function. Control of video container layout and placement may allow spare television screen space for advertisement. Further, interactive Web video containers may allow direct viewer input for advertisement acknowledgment, purchase of items, point of sale, opinion input and more. Moreover, video or text advertisements may be downloaded during video streaming and displayed in various video containers at different times based on criteria and available display space and video container space. In one embodiment, an advertising module may be in communication with the system. The advertising module may provide a video content to the system specifically for advertisements. In further embodiments, a particular video container may be dedicated to the advertising module video content.

The video container system has an optional connection over internet to a video container website where the viewer may log in and set up an account to control features of the video container system. Features may include the ability to choose if viewer analytics may be collected and sent to the web account for use for dynamic advertising strategies and other uses. In one embodiment, the viewer analytics may be stored in a data storage module to store viewer data for access by a service provider. This connection from a video container system to a computer in the network also provides the structure to enable social interaction with friends in real-time, views of what friends are watching, what is popular programming from a group of social system users, and sharing of video container settings including lists of popular video content channels from distributed sources.

The present disclosure provides methods and systems that provide users with improved control over what content is displayed on a screen, such as a large format HD or 4 k television screen, including providing the ability to manipulate display location, sizing, transparency, and other features related to a number of video sources of heterogeneous origin, such as television content, IP-based content, games, applications, and various other types of viewable content. The present disclosure provides, among other things, a video display system for multiplexing a plurality of heterogeneous sources and a plurality of heterogeneous content into flexible, controllable, interactive video containers that are displayed on televisions or other display devices for enhanced entertainment possibilities. In accordance with exemplary and non-limiting embodiments, systems and methods for the simultaneous display and interaction with multiple heterogeneous sources are disclosed.

Also disclosed are methods of programming video containers by a user such that interactions with one container can result in alterations in related video containers; methods of programming video containers using a user interface capable of adjusting the transparency of overlapping video containers that display wide format media from a single media processing unit; methods of programming video containers by providing a user interface having at least four display containers that can be placed and sized via end user interaction. The user interface can control the user experience. In embodiments, the user interface can include a background video container and other video containers can overlay a user interface video container. The user interface may be one of an HTML5 application running on a computing device such as a PC, such as in a web browser or as a native PC application; and the user interface can interact with another application or website to obtain one or more of user preferences, widgets, and store analytics and the user interface can communicate with a formatting module of a media processing unit to control overlay and appearance of the video container output display.

Additionally, disclosed are methods of enabling an end user to adjust the shape of video containers such the shape of the container is arbitrary, geometric, non-rectangular, or free-form in shape; methods of enabling an end-user to blend two or more heterogeneous sources, where at least one source is video content and one is animation content, into a single video container wherein a time sync may be established between the video and the animation; methods of enabling an end-user to blend together two or more video streams wherein the end user establishes the synchronization between the two or more video streams. The content of heterogeneous source types may be blended on the fly by relaying them to an output buffer on a FPGA (field programmable gate array) that is a component of a media processing unit.

Also, disclosed herein are methods of overlaying blended content within a bounded box region on a display screen that receives output created by a device such as a media processing unit that handles multiple inputs, such as HDMI inputs or an HDMI output stream. A user interface can be provided to allow an end user of a video display system with a display screen to overlay selected content within a bounded region of pixels/video container on the display screen receiving output from a media processing unit that handles multiple inputs, such as HDMI inputs, or an HDMI output stream.

In embodiments, a video display system may allow interaction with displayed video containers using a control interface or components of a native device that can provide a feed to one of the containers.

In embodiments, a video display system may comprise a computerized media processing unit configured to receive at least a plurality of content including at least one of video, audio, graphics and internet content from a plurality of heterogeneous content source types providing such content and configured to output a video signal receivable by a display device; and wherein the video signal output by the media processing unit comprises a plurality of arbitrarily shaped video containers all displayable on the display device simultaneously, each of the plurality of video containers capable of displaying video content independent of the video content of the other video containers; wherein the video content displayed may comprise, at a given instance, a portion of the video content from the source up to the entirety of the video content from the source.

In embodiments, a user interface may be provided which has at least four display containers for display on a video display screen wherein the different containers are capable of playing, at the same time, heterogeneous content types selected from video format content, HDTV format content, packet-based content, video game content and audio content.

In embodiments, a method of inspecting a tag in an output stream created from multiple input streams is disclosed in order to determine what content was displayed on what part of the screen of a display device at a particular time, wherein the output stream can include an HDMI output stream, and the input stream can include HDMI input streams. This information can be used for e-commerce purposes, or to provide an analytic report based on the use of the device.

In embodiments, methods of tracking can include filtering audio content associated with video content to be displayed wherein the filter suppresses audio content in the human auditory range, summing the filtered audio content with the audio content associated with the video container of primary interest; and sending the combined audio to an audio output device associated with a user.

In embodiments, a video stream can be provided that specifies a related stream of IP-based widgets that display themselves when the video plays. A widget can determine the selection of a video stream from multiple possible video streams when the widget is displayed on the video screen. Widget content can be shared with other users in a user-blended HDMI video and IP-TV environment. A widget can be recommended to users for a user-blended, large screen, HDTV environment based on similarity to other users. Video content can be recommended to users for a user-blended, large screen, HDTV environment based on similarity to other users. A personalized, contextual group of widgets that are preferred by a particular user can be organized and displayed based on the context of content displayed on the display screen from an HDMI output device that handles multiple HDMI input streams. A customized user interface can be provided which comprises one or more groups comprising widgets, and internet browser windows, wherein a user is able to flip between groups of widgets. A user interface can be provided which comprises one or more groups of widgets and internet browsers, wherein the selection of widgets within a group may be partially auto-populated based on the content of other video containers.

In embodiments, a system for processing multiple heterogeneous data sources having video content wherein the video content comprises meta-data embedded into the image content can include one or more of information about the scene content of the video, links to related internet sites, links to related social networking sites and channels, sales channels, and executable scripts. A transcoder module can extract the meta-data from the image and act on the encoded meta-data according to a rule set.

In embodiments, a media processing unit or video display device may include four or more input ports, one or more output ports, and a FPGA, wherein the input ports may be HDMI input ports, and the output ports may be HDMI output ports. The FPGA may be a single FPGA, wherein the FPGA processes the individual inputs in parallel and writes the processed input to a memory buffer according to placement parameters specified by a formatting module, wherein the contents of the memory buffer are then output using one or more output ports. Hardware may be remotely upgraded using a communications network to upload new images to the FPGA.

The FPGA may be programmable on the fly to enable at least one of selection, blending and overlay logic for the output of an HDMI stream to video containers of a display device while managing multiple HDMI input streams.

In embodiments, a custom/ASIC chip may take multiple HDMI inputs and provide a single HDMI output stream, with parallel processing of input streams and a logic module for resizing and handling of overlay information among HDMI input streams.

In embodiments, a video display system handling multiple HDMI inputs and providing a single HDMI output stream may include a synchronization means for handling bit-by-bit competition on overlapping output regions of multiple video containers displayed on a display device. A bounding box of pixel locations may be provided for display of the HDMI output stream of a FPGA to a display device. The system may convert content to feed displays greater than 4 k by combining multiple video streams and upconverting to a larger video output stream.

Video display systems described herein may be used for various applications. For example, a system for improved "TTY" communication may be provided which includes two or more video containers wherein at least one video container shows the TTY text and at least one video container shows a person.

In embodiments, a system for closed caption display may be provided wherein the closed captions are displayed in a separate, related video container allowing the end user to scroll back through the closed captions, wherein an interface to the closed caption video container is through a controller or a secondary device such as a tablet or smartphone, and the user may control color and size of font, and position and size of closed caption video container relative to related video.

In embodiments, a display screen may be provided having at least two video containers displayed wherein one video container displays marketing material comprising one or more of advertisements, videos, order forms, surveys, and games relating to the video content in a related video container.

In embodiments, a method of providing and monitoring personalized content as part of a video display system may include a website for storing and serving personalized content including one or more of user preferences, user information, information regarding user hardware, system, and configuration information, storing, and serving widgets from content vendors based on user preferences and information; and collecting and storing analytics. A user may perform one-click shopping at their television as part of the video container environment.

The present disclosure depicts a video display system that allows a new generation of entertainment possibilities by decoupling the limitation of various types of input sources, and related devices, such as set top boxes or video game consoles that each conventionally take control of an entire television screen or display for a single video viewer experience. While "picture in picture" features and mix channels allow viewing of more than one video content stream on the same television screen, these features are conventionally controlled by a single input source device and are very limited, among other things by the absence of the ability for the viewer to choose input from another device source, such as a cable box, video game console, satellite radio internet, DVD, RVU protocol or the like. In order to access other content, a user is typically required to select a different input source device, which then controls the entire display screen. Moreover, picture in picture and mix channels are mainly limited to allowing a user to navigate to particular content in a timely way, not providing the flexibility of the methods and systems disclosed herein.

Systems described herein decouple the display from the plurality of heterogeneous inputs facilitating independent control of one or more of screen layout and video container characteristics, input devices and the like. This control may use a multitude of control devices including one or more of mobile devices such as smartphones, tablets and the like, PCs, remote controls, wireless mouse/keyboard devices and the like. The system may receive input from one or more of these control devices and provides universal remote control functionality enabling the user to control the larger system comprising the display, the video display system, the plurality of input devices, such as set top boxes, video game stations, internet applications, internet set top boxes, video cameras, and the like.

In one embodiment, the system is able to accept and process multiple heterogeneous input sources simultaneously and merge them into a combined output stream in which the content of the different input sources may be displayed in video containers having independent and arbitrary positions, sizes, aspect ratios, shapes, relative transparency levels and the like. In a further embodiment, the different input sources may be linked such that the content of a video container may influence one or more of the appearance, behavior, or available controls of one or more linked video containers. In a variation on the above embodiment, user interactions with a video container or its contents may result in changes in one or more of appearance, behavior, or options of linked video containers.

In embodiments, the system may include or be integrated with a system for handling voice commands, such as the Alexa™, Siri™, Cortana™, IBM Watson™, or other voice interfaces, such that the content of one or more video containers may be configured to reflect voice inputs, such as by providing requested informational or entertainment content, configuring a container as indicated by a voice command, or the like.

In embodiments, the system may include capabilities for handling video containers using cloud infrastructure capabilities, such as FPGAs, or digital signal processors (DSPs), or other customer semiconductor application specific integrated circuits that may be deployed in the cloud, so that interactive, multi-layer user experiences are enabled by taking user commands from a local device to the cloud, configuring a multi-layer session in the cloud, encoding the session for a user device, delivering the session to the user device, decoding the session, and displaying the session on the user's device, where the session includes layering of various types of content in one or more user-controlled containers in any of the ways described throughout this disclosure.

The present disclosure describes a method of displaying content on a display device, and the method according to a disclosed, non-limiting embodiment of the present disclosure can include receiving, from an application, a request to authenticate the application; authenticating the application; according to the authenticated application, providing an application programming interface (API) to the application; receiving, from the application, a call to the API to display content; and causing to output the content on the display device.

The present disclosure describes a content display system, and the content display system according to a disclosed, non-limiting embodiment of the present disclosure can include an authentication system configured to receive a request from an application to authenticate the application, and to send an instruction to a content delivery system to provide an application programming interface (API) to the application based on authenticating the application; and the content delivery system configured to provide the API to the application based on receiving the instruction from the authentication system, to receive a call from the application to the API to display content, and to cause the content to be displayed on a display device based on the call to the API.

These and other systems, methods, objects, features, and advantages of the present inventions will be apparent to those skilled in the art from the following detailed description of the many embodiments and the drawings. All documents mentioned herein are hereby incorporated by reference as if fully set forth herein.

BRIEF DESCRIPTION OF THE FIGURES

The disclosure and the following detailed description of the many embodiments thereof may be understood by reference to the following figures.

DETAILED DESCRIPTION

Figure 1:
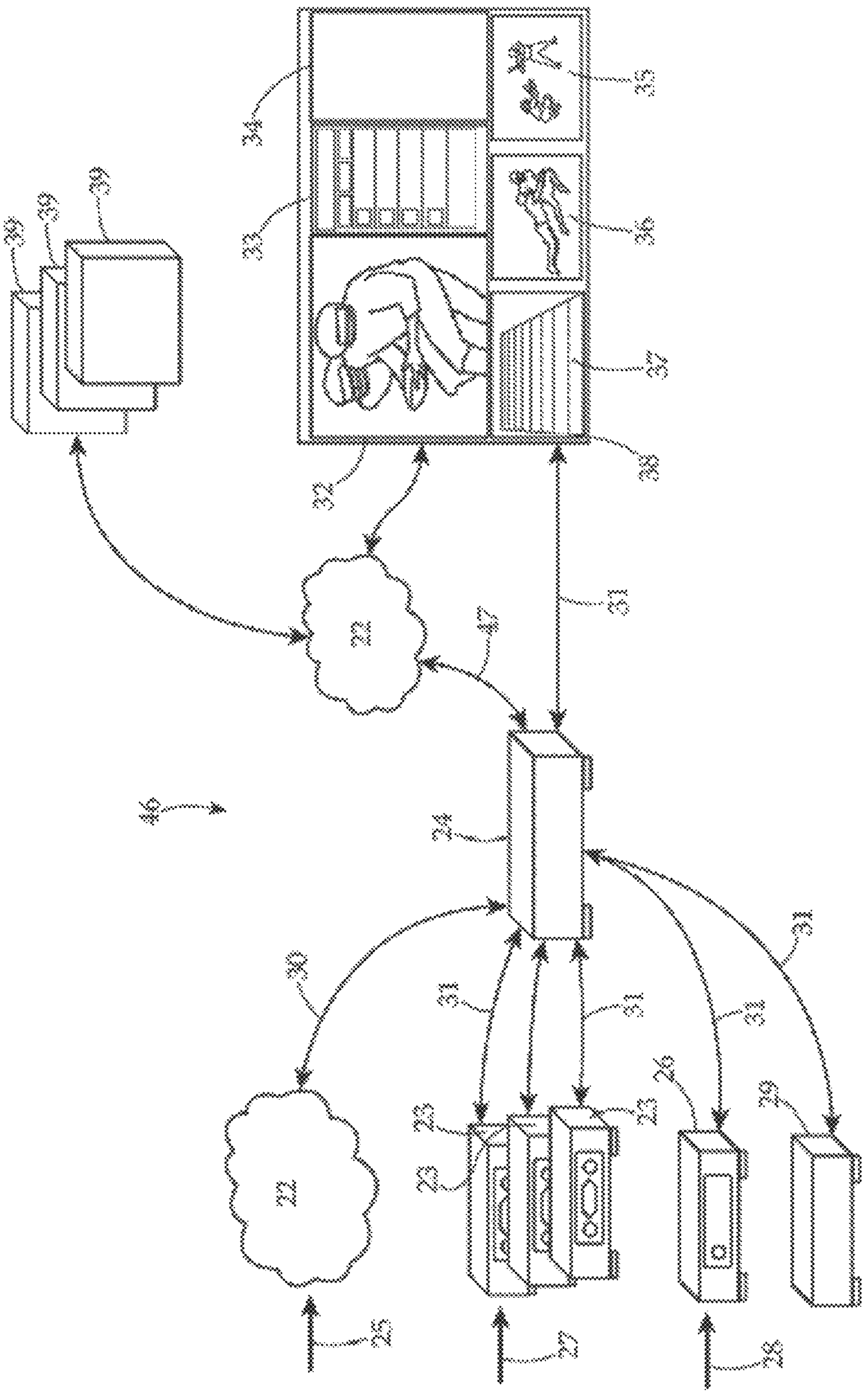
FIG. 1 is a diagrammatic view of an exemplary video container system in accordance with the present disclosure.

FIG. 1 illustrates an exemplary embodiment of a video display system 46 for presenting multiple views of content from heterogeneous input sources 25 comprising one or more of audio, video, internet, computer, video game and the like that may be displayed on a television or display device 38 or other display device and presented to one or more viewers. The multiple heterogeneous input sources 25 may be displayed in multiple independent video containers on the television or display device 38 or other display devices. In embodiments, the system supports four or more independent video containers on a video display screen wherein the different video containers are capable of simultaneously playing or displaying content from independent, heterogeneous sources, such as from separate sources or source devices. A media processing system 24 may be configured in whole or in part as a software program that runs on a computer and the corresponding hardware may be implemented entirely in silicon or some combination thereof. The media processing system 24 takes in content from the multiple heterogeneous input sources 25 and produces a video signal that a television or display device 38 may play for viewers in the various video containers.

Heterogeneous input sources 25 may comprise output from one or more of a set top box 23 receiving video content from a service provider, a DVD or video game console 29, a VHS, an internet video device 26 (connected to IP network to Internet 28) such as a webcam, mobile device camera, personal computer camera, surveillance camera, video conference camera, video conference system or other camera, satellite feed, such as for satellite television or radio, connected mobile device such as a tablet, smartphone or other device, local video devices such as a camera or baby monitor, and the like. Content from heterogeneous input sources 25 may be received via IP data streams received via Ethernet, coaxial cable supporting Multimedia over Coax Alliance, MOCA, 802.11, 4G or other transmission means and the like, wherein the IP data stream may be compliant with Universal Plug and Play, UPnP, Digital Living Network Alliance, DLNA, RVU and other guidelines, protocols, standards and the like, over HDMI cable, output of a set top box 23, DVD or video game console 29, VHS, internet video device 26, local video device, mobile devices such as a tablet or smartphone or the like.

The media processing system 24 controls the access to the heterogeneous content of heterogeneous input sources 25 by a variety of channel or content selection mechanisms including but not limited to HDMI channel change commands over HDMI cable 31, Multicast IP leave/join over communications network 30, user interactions with a remote control, user interactions with the native control interface of one of the heterogeneous input sources 25, and the like.

The media processing system 24 takes commands from the viewer or viewers using traditional remote controls, network computing devices 39 such as a mobile device like a tablet or smartphone, a computer, a game controller, a wireless keyboard, or the like. The network computing devices 39 are in communication with the media processing system 24 via a communications network 22. Examples of such commands may be instructions to resize, position, select content, link video containers, manipulate video container properties such as transparency and shape, manipulate web content in video container, interact with local and web-based applications and other control functions. Those commands determine how the video container system will select content and present video and audio to the viewer via the output to a television or display device 38. The network computing devices 39 may also provide video content or other displayable content to the media processing unit.

Figure 2:
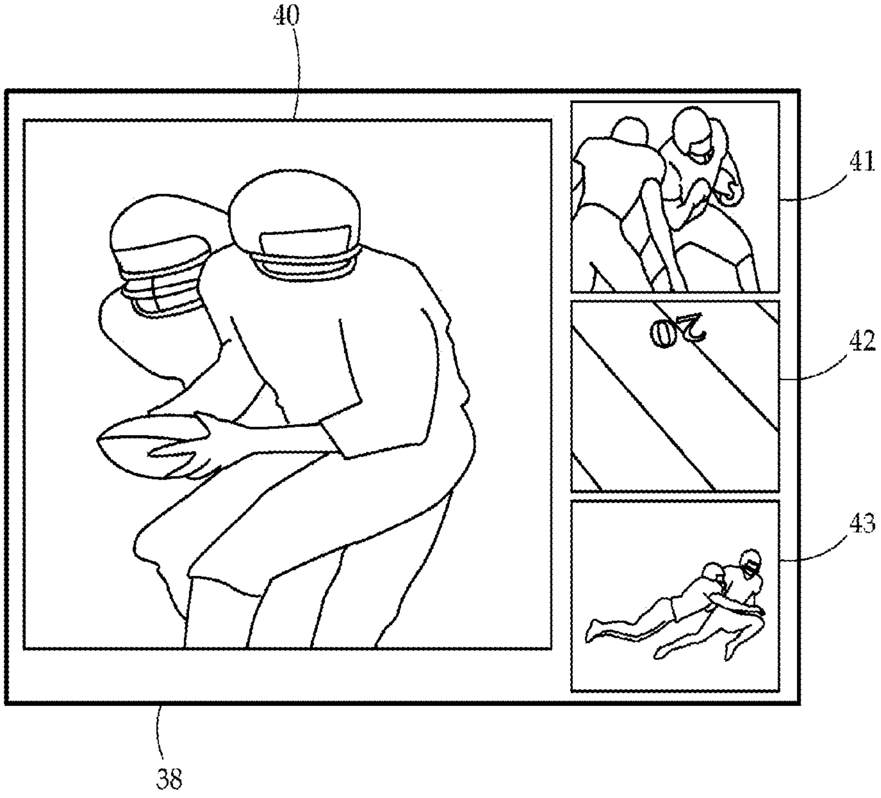
FIG. 2 is a diagrammatic view depicting an embodiment of the video container system configured specifically to have four video containers in accordance with the present disclosure.

FIG. 2 shows an embodiment of video containers configured specifically to have four video containers 43, 42, 41, 40 on a television or display device 38. Video container 40 has a larger size and is positioned on the left side of the television or display device 38. Three smaller video containers 41, 42 and 43 are positioned on a right side of the screen and each show different television channel video content. Video container 40 may have its own properties configured by the user as to what to watch, from which source, etc. In the embodiment shown, video container 40 is showing a particular sporting event. Other sporting events taking place at the same time are shown in video containers 41, 42 and 43. In some embodiments, alternate camera views of the same sporting event may be shown in the smaller video containers 41, 42, 43, thereby providing multiple viewpoints of the sporting event. Alternate camera views may further be employed with other video such as live television content, enhanced movies, and programming configured to present multiple camera views, among others.

Figure 3:
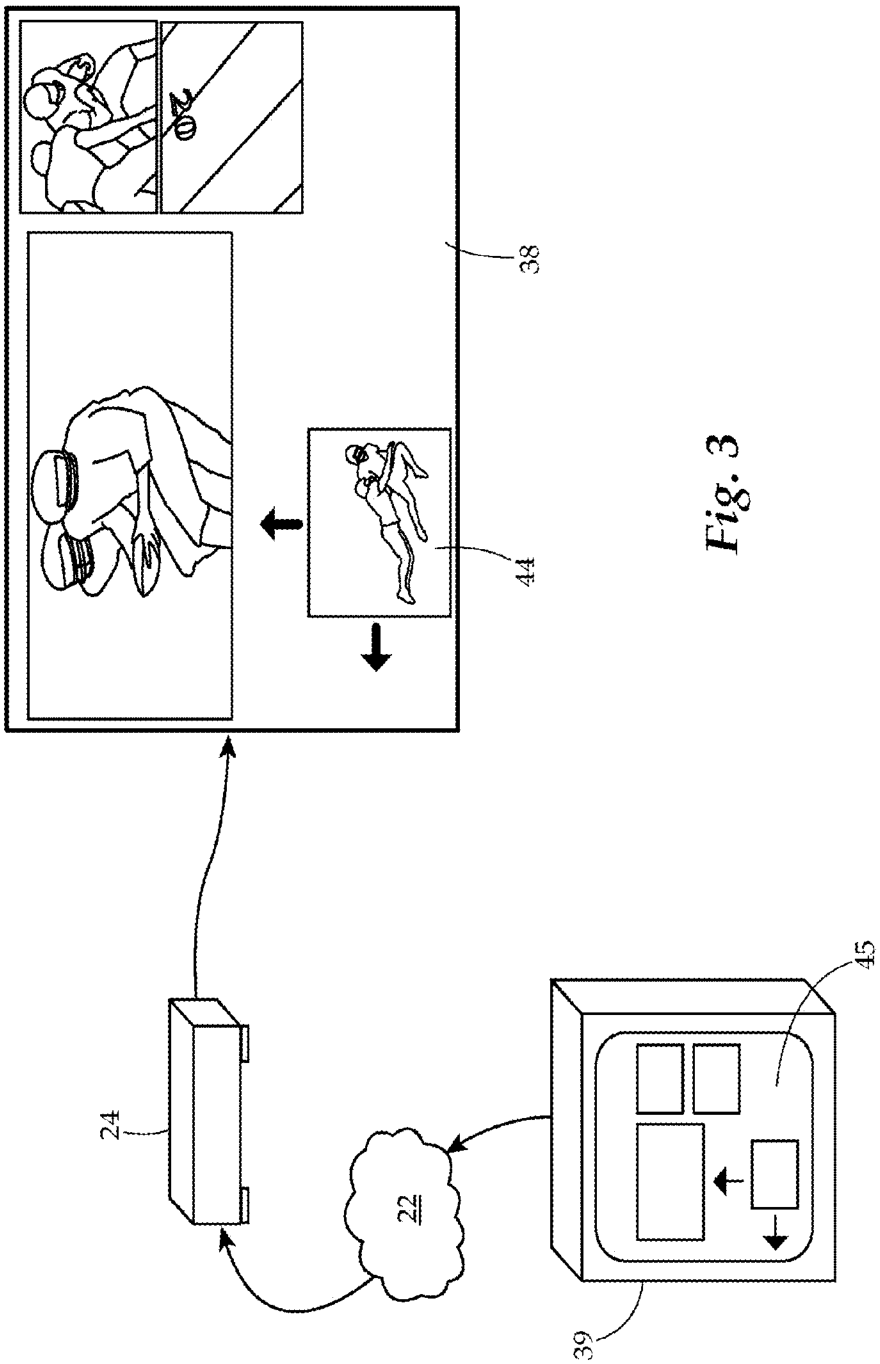
FIG. 3 is a diagrammatic view depicting a logical representation of how a video container may be resized and positioned on a television or other display device in accordance with the present disclosure.

FIG. 3 shows an embodiment of a logical representation of a video container 44 being resized and positioned on a television or display device 38. The network computing device 39 displays the video container bounding box rectangle or video container representation 45. The network computing device 39 such as a mobile or PC device may act as a user interface and allow the viewer or user to resize the video container representation 45 shown on the network computing device 39 and then transmits a command over a communications network 22 to the media processing system 24. The media processing system 24 then changes the size and position of the video container 44 and matches the video container representation 45 on the television or display device 38. In one embodiment, the network computing device 39 may have a touch screen interface. In this embodiment, a user may utilize the touch screen interface to move the video containers on the display device 38. For example, a user may "pinch" a representation of one video container on the display device 38 to make it smaller. Similarly, a user may touch and "drag" a representation of a video container on the display device 38 to move it across the display device 38.

Figure 4:
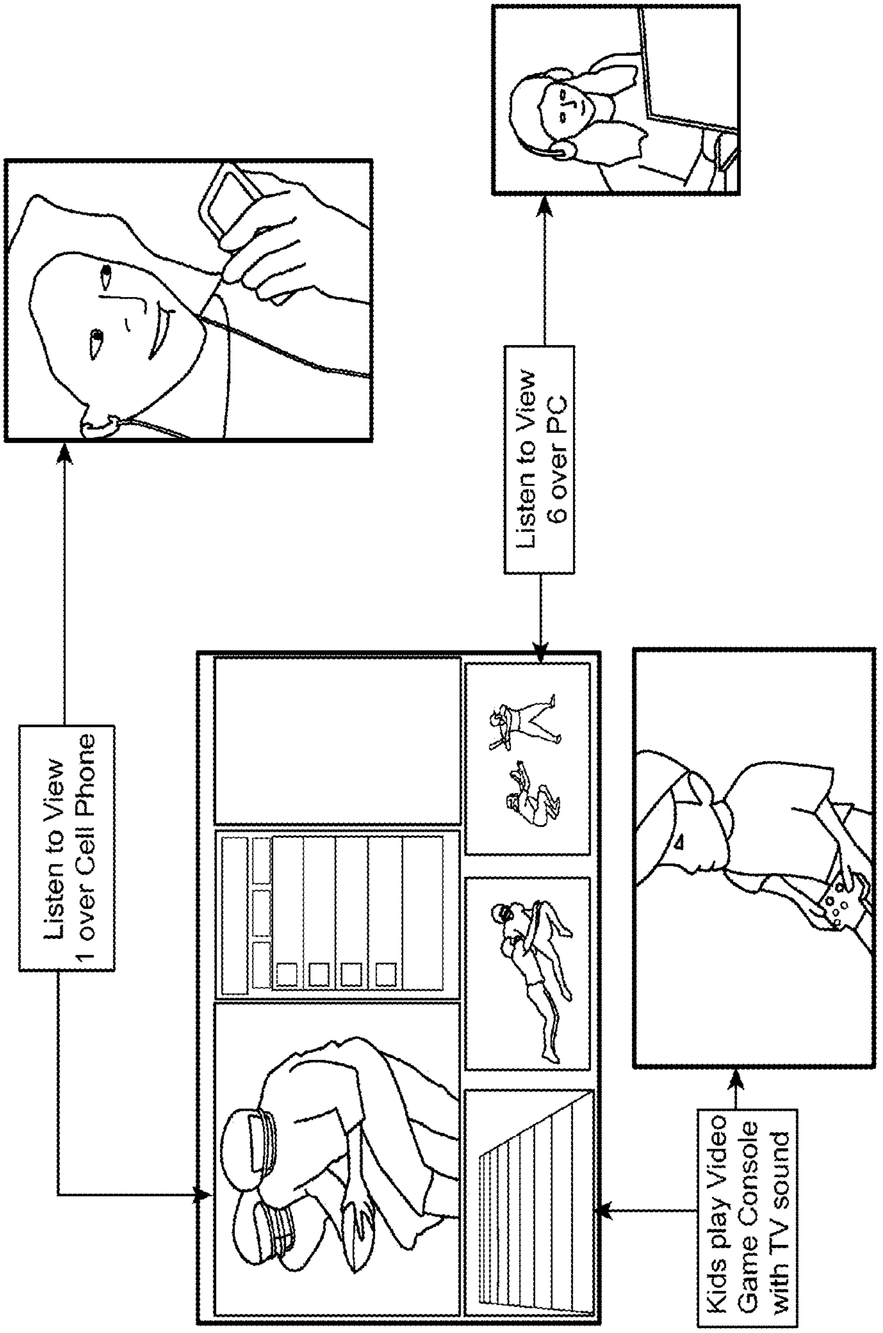
FIG. 4 is a diagrammatic view depicting a logical representation of how the video container system allows one or more mobile devices to connect to the system and select an audio of a particular video container on the display device in accordance with the present disclosure.

FIG. 4 shows a logical representation of an embodiment of the system allowing one or more mobile and/or PC devices to connect to the video container system 46 and receive an audio output corresponding to a particular video content. In this embodiment, a user may select a particular video container view on the television or display device 38. The video containers system can then stream the audio for that video container selected to the mobile or PC device that optionally may have a private audio headset. This may allow many people to listen to different video container content without hearing other video container content. The present embodiment shows a first user listening to view 1 over a cellular phone connected to a headset. A second user is listening to view 6 over a PC connected to a headset. A third user is playing a video game and listening to the sound from the television speakers.

Figure 5:
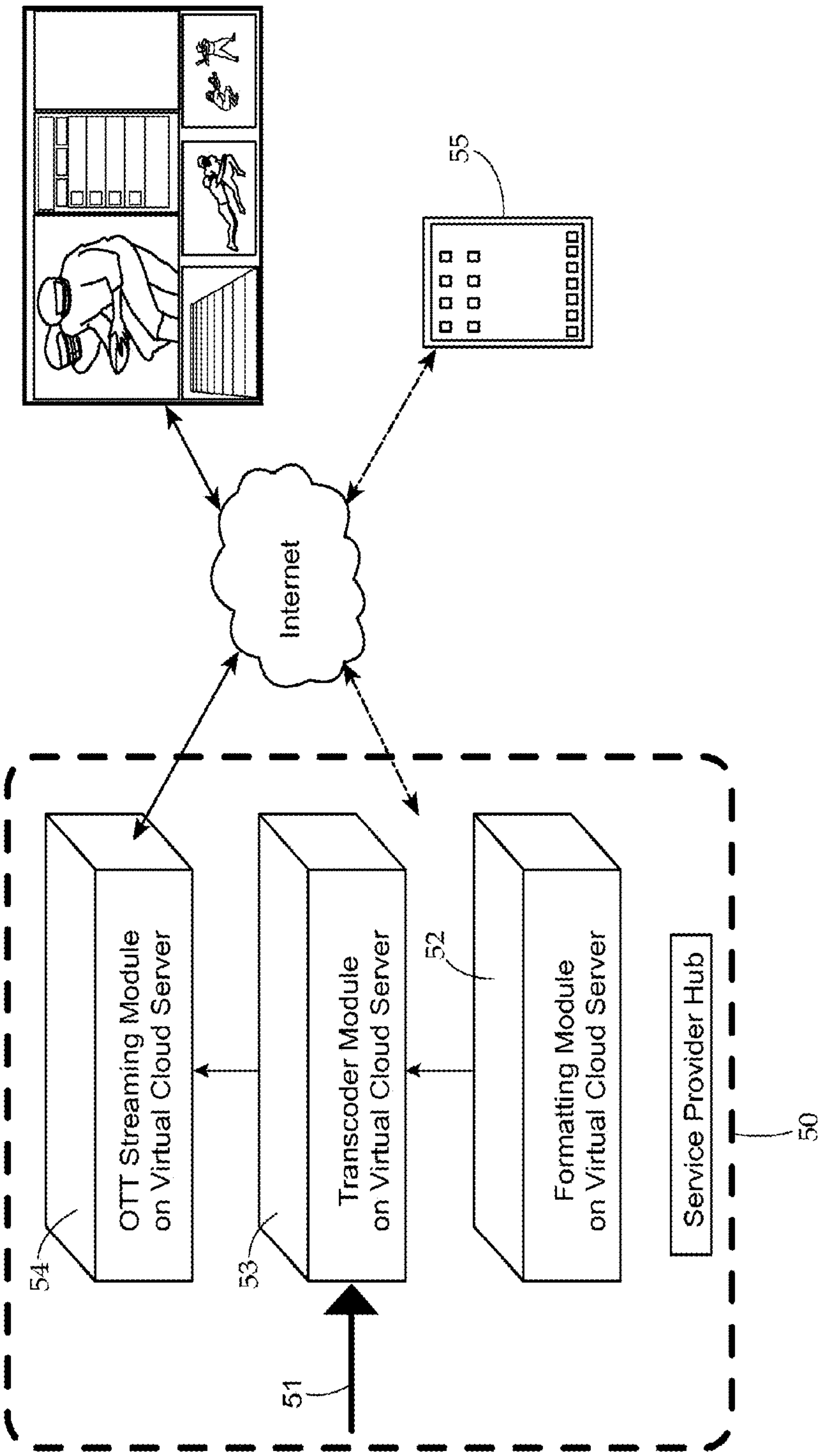
FIG. 5 is a diagrammatic view depicting an embodiment of the video container system hosted by a remote server, which then provides video directly to a video device, such as a television or tablet computer in accordance with the present disclosure.

FIG. 5 shows an embodiment wherein the video container system is hosted by a remote server or "cloud", which then provides video directly to a television or display device 38 such as tablet computer. An offsite service provider hub 50 may receive input video content 51 from one or a plurality of sources. This video may be received into a transcoder module 53. A formatting module 52 may be in communication with the transcoder module 53. The formatting module 52 instructs the transcoder module 53 of what video streams to present, and what the proper format and presentation of video containers is. The transcoder module 53 then receives the video content and instructions and outputs video formatted in various video containers as desired by a remote user. An over-the-top (OTT) streaming module 54 receives the formatted video container data and outputs the same in a streaming data output to the internet or other data connection. An end user may then receive the formatted video over the internet on their television or display device 38. Control of the formatting and video content of the video containers may be achieved by transmitting a signal from a controller 55, over the internet or communications network, to the formatting module 52, which will instruct the transcoder module 53 to change its output, as discussed above. This embodiment may allow centralized control of the system and may require less hardware and setup for an end user.

Figure 6:
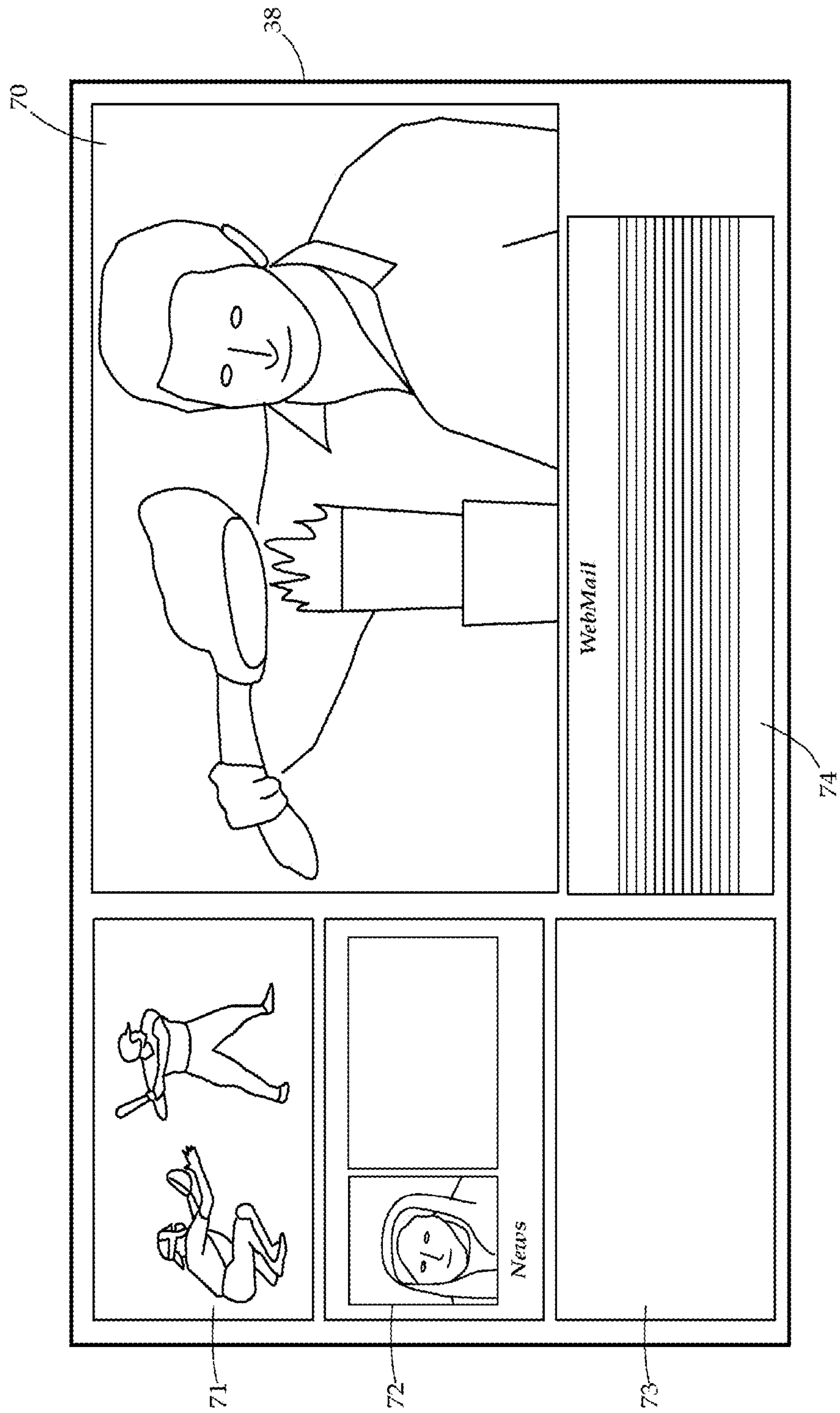
FIG. 6 is a diagrammatic view depicting an embodiment demonstrating a variety of video and internet video containers on a single display device shown here as a television in accordance with the present disclosure.

FIG. 6 provides an embodiment demonstrating a variety of video and internet video containers on a single display device—shown here as a television or display device 38. A large video container 70 is positioned in an upper right corner of the television or display device 38. The large video container 70 serves as the primary viewing area and in this embodiment, is showing a major network prime-time show. On a left side of the television or display device 38 are three video containers 71, 72, 73, which are smaller than the large video container 70. A top video container 71 displays a sporting event video. A central video container 72 displays a news program, and a bottom video container 73 may be used for "channel surfing" for example to find a video for display in the large video container 70 during a commercial break. Further, at a bottom right portion of the television or display device 38 is an internet video container 74. The internet video container 74 is shown accessing a webmail interface for checking email. This internet embodiment may allow a user to utilize a television as a single unit for internet usage and television viewing, as opposed to a user having multiple devices such as a laptop and television.

It should be noted that the arrangement (including location and possible overlap with other containers), format and configuration of the various video containers 70, 71, 72, and 73 may be varied in any number of ways, and is limited only to the size and technical limitations of the display device.

Figure 7:
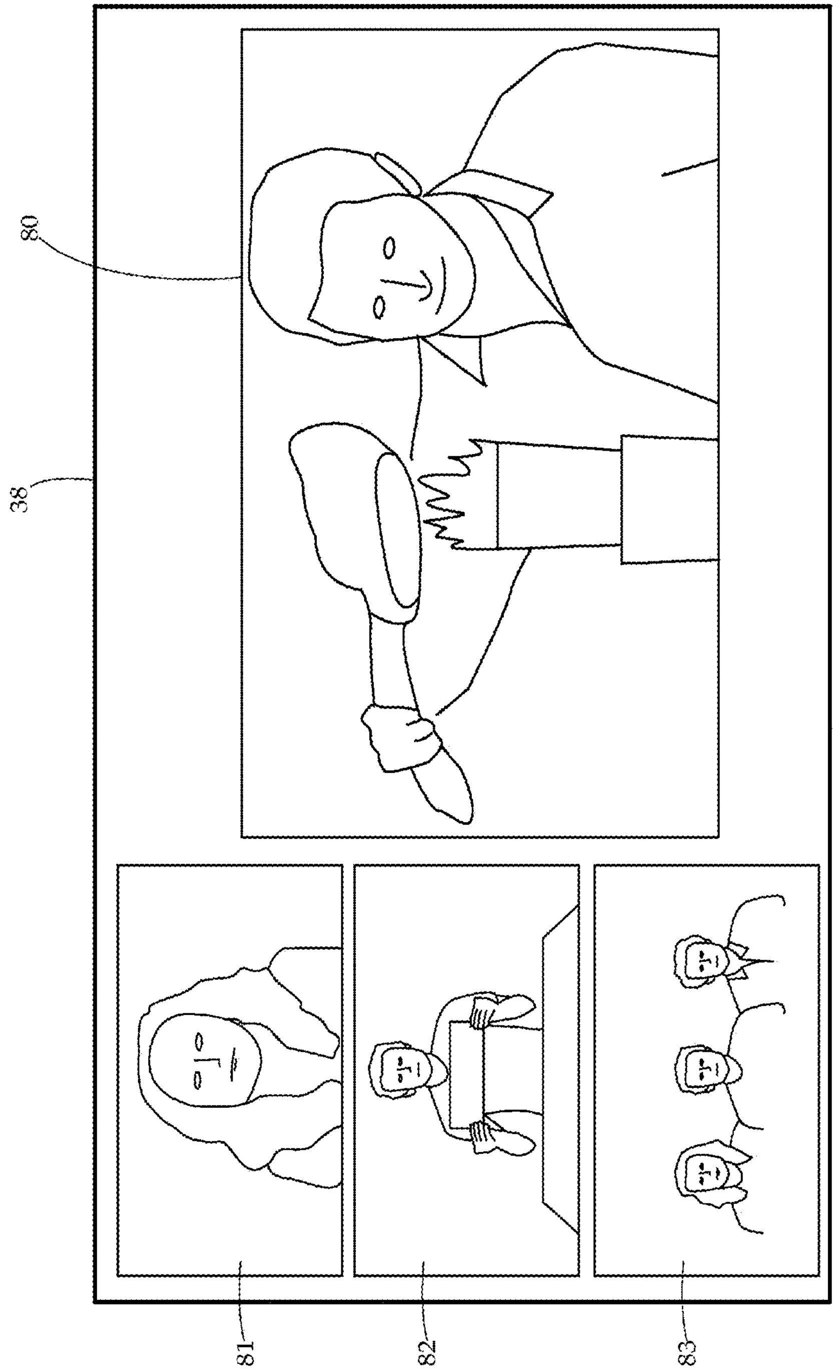
FIG. 7 is a diagrammatic view depicting another embodiment of the video container system having a plurality of video containers arranged on a display device shown in this figure as a television in accordance with the present disclosure.

FIG. 7 provides an embodiment of the video container system of a plurality of video containers arranged on a display device, shown in this figure as a television or display device 38. The arrangement of FIG. 7 provides video containers all relating to the same program, but from different video sources. A large central video container 80 is positioned at a center right of the television or display device 38. A video content of this video container is a main camera view(s) of a broadcast television show. Three smaller video containers 81, 82 and 83 are positioned at a left side of the television or display device 38. A top video container 81 displays a video from the internet providing an alternative viewpoint from what is displayed on the main program in the central video container 80. In one embodiment, the video container 81 may display viewer video responses to a live broadcast in the central video container 80. A middle video container 82 displays a video displaying a further alternative viewpoint from what is displayed on the main program in the central video container 80. A bottom video container 83 displays a video displaying a further alternative viewpoint from what is displayed on the main program in the central video container 80. The content of the video containers 80, 81, 82, 83 may come from a variety of sources such as a cable feed, internet, satellite dish, pre-recorded content, and the like. Further, the source of the content in the smaller video container 81, 82, 83 may be different from the source of the content in the central video container 80.

Figure 8:
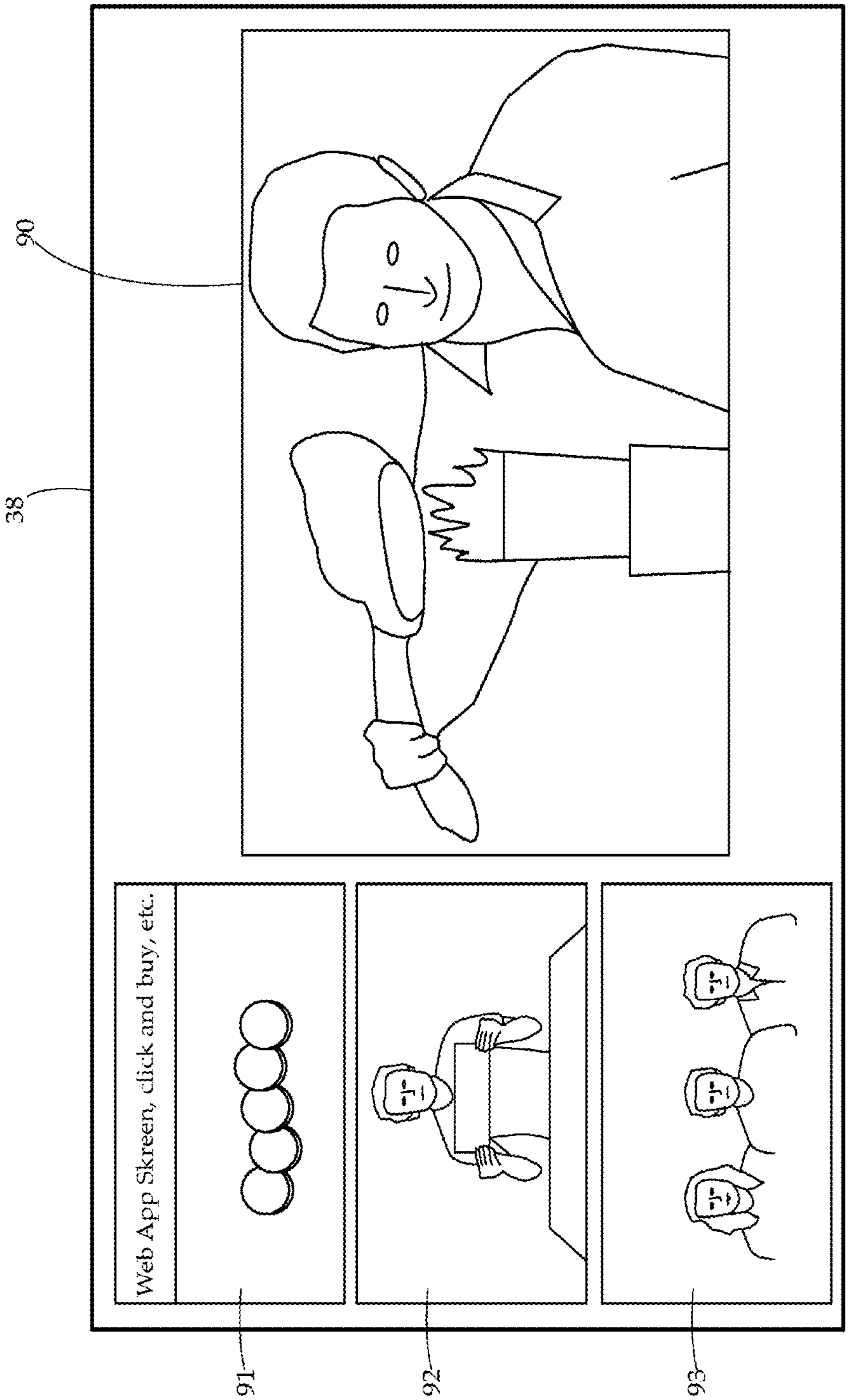
FIG. 8 is a diagrammatic view depicting still another embodiment of the video container system having a plurality of video containers arranged on a display device shown in this figure as a television in accordance with the present disclosure.

FIG. 8 provides an embodiment of the video container system of a plurality of video containers arranged on a display device, shown in this figure as a television or display device 38. The arrangement of FIG. 8 provides video containers all relating to the same program, but from different video sources. A large central video container 90 is positioned at a center right of the television or display device 38. A video content of this video container is a main camera view(s) of a broadcast television show. Three smaller video containers 91, 92 and 93 are positioned at a left side of the television or display device 38. A top video container 91 displays an interactive internet interface. This interface may contain point of sale marketing, polling, voting, interactive gaming, and the like. A middle video container 92 displays a video displaying an alternative viewpoint from what is displayed on the main program in the central video container 90. A bottom video container 93 displays a video displaying a further alternative viewpoint from what is displayed on the main program in the central video container 90. The content of the video containers 90, 91, 92, 93 may come from a variety of sources such as a cable feed, internet, satellite dish, may be pre-recorded, and the like. Further, the source of the content in the smaller video container 91, 92, 93 may be different from the source of the content in the central video container 90.

One or more of the system's heterogeneous input sources 25 of FIG. 1 may comprise audio content. The video display system 46 may be operable to automatically transmit to audio output devices associated with the television or display device 38 or display the audio associated with a video container of primary interest. The identification of a video container of interest may be derived based on one or more of the following: selection by the user of a container of interest via a menu (on screen), switching among containers on screen via remote control until preferred audio is heard, data from input devices capable of tracking the gaze of one or more users to determine what container is being watched, or a rule set, such as one that indicates among various containers default and/or customized (e.g., personalized) rules as to what audio is preferred when multiple containers are present, and the like. By way of example of a default rule set, when a container containing talk show content shares a screen with a container containing video game content, a rule could indicate that the talk show audio content will be heard unless the user takes action to select the video game audio content, as one might conclude that it is unlikely a user would watch a talk show without hearing the audio, while a user might often play a video game without sound. Similar default rules may be developed for various pairs or larger groups of containers of content, and such rules might be customized to particular situations or personalized to preferences of particular users, such as by selection of preferences in a menu or by tracking user behavior to provide audio selection based on previous selections by the user in similar situations. In embodiments, identification of the video container of interest may be based on length of gaze on a particular video container, a defined activation signal such as blinking twice, an activation mechanism set up by configuration, the size of the video container or the like. As the apparent video container of interest changes, the system may switch between audio content being played. The system may decode and blend the audio content of all the video containers and selectively reduce the sound levels of audio content not associated with the video container. The blended audio may then be output to one or more of television speakers, auxiliary speakers, mobile devices, blue tooth headphones and the like. In embodiments, the audio for the container of interest could, for example, be sent to the main front speaker in a surround sound system with audio for another container being played through the back speakers, optionally at lower volume.

Figure 9:
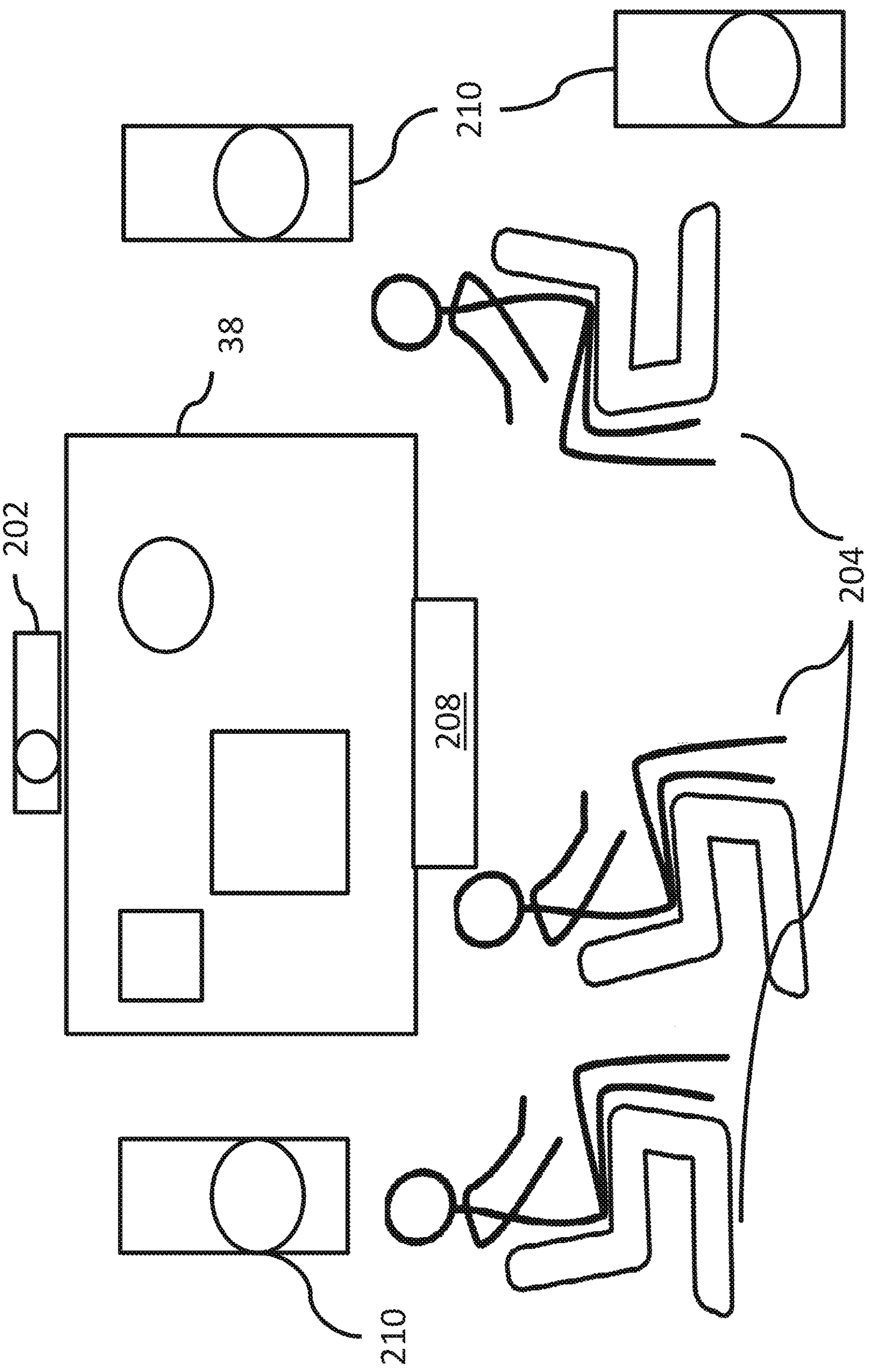
FIG. 9 is a diagrammatic illustration of a tracking system for tracking a video container of interest in accordance with the present disclosure.

FIG. 9 shows a television or display device 38 with a tracking system 202. The tracking system 202 may track the eye movements of one or more viewers 204. Based on the tracked eye movements of the viewers the video display system 46 may identify one or more video containers of primary interest. The system may be in a mode where a single video container of primary interest is identified based on the interest of one or more viewers 204. In this mode, a principal viewer may be identified, or the eye movements of more than one viewer evaluated according to a rule set to identify the video container of primary interest. If a single video container of interest is identified, the associated audio content may be output to one or more of television speakers 208, auxiliary speakers 210, mobile devices 212, blue tooth headphones 304 and the like.

Identification of the video container of interest may be based on length of gaze on a particular video container, a defined activation signal such as blinking twice, an activation mechanism set up by configuration, the size of the video container or the like. As the apparent video container of interest changes, the system may switch the audio content being played to that associated with the current video container of interest. The system may decode and blend the audio content of all the video containers and selectively reduce the sound levels of audio content not associated with the video container. The blended audio may then be output to one or more of television speakers 208, auxiliary speakers 210, mobile devices 212, headphones 304 and the like.

In some embodiments, the system may be capable of tracking an individual video container of primary interest for each of two or more users. In some embodiments, the audio content associated with the video container of primary interest for each user may be routed to an audio output selected by the user such as one or more of television speakers 208, auxiliary speakers 210, mobile devices such as a tablet or smartphone, headphones 304 and the like. In an alternate embodiment, the audio content may be directionally output to the various users through mechanisms such as directional audio speakers, wireless headsets and the like.

Figure 10:
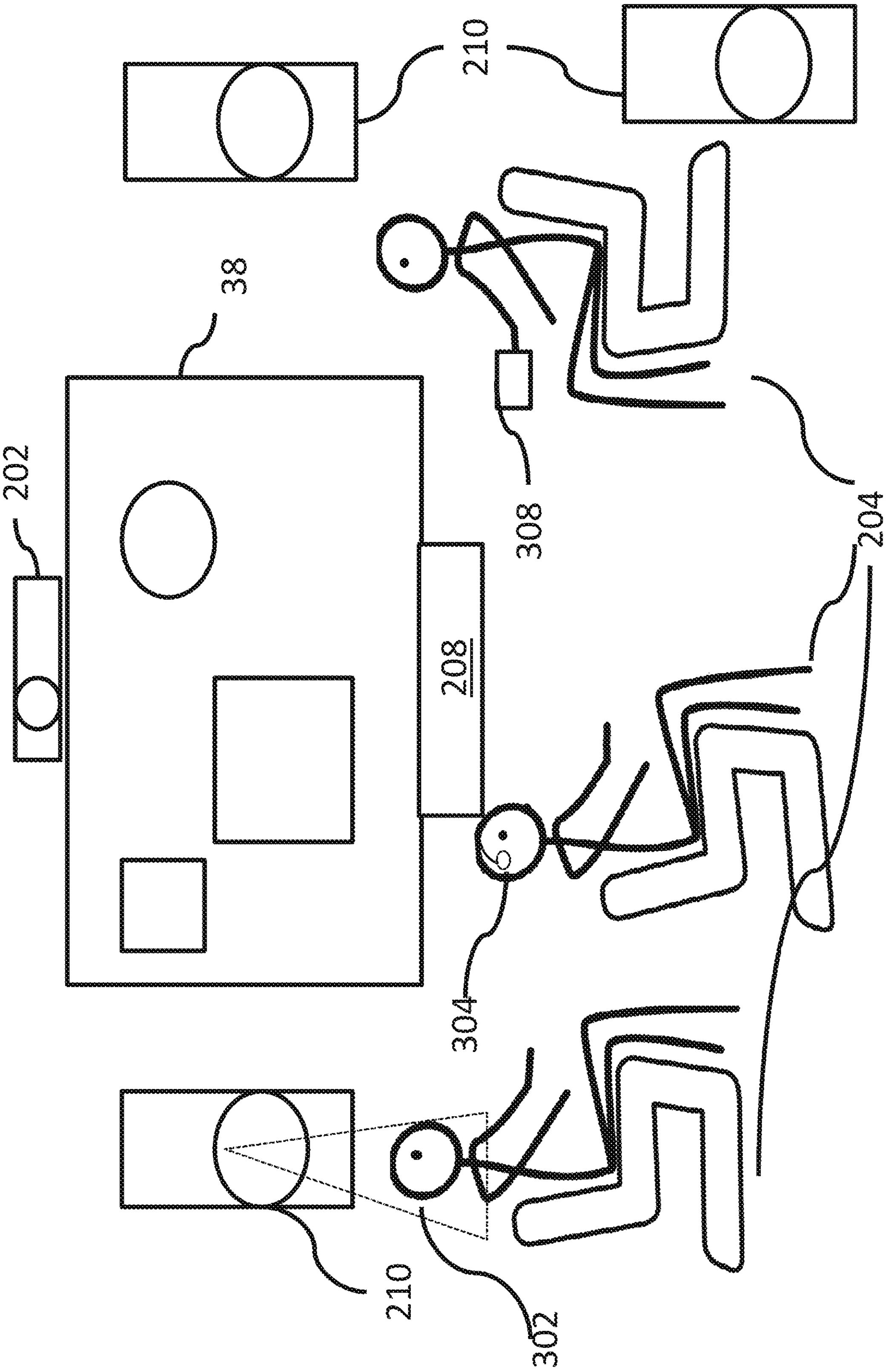
FIG. 10 is a diagrammatic illustration of playing audio associated with multiple video containers of interest in accordance with the present disclosure.

FIG. 10 illustrates an embodiment where individual video containers of interest are identified for the one or more viewers 204 and respective audio associated with each video container of interest is output such that it may be heard by the associated one or more viewers. The audio may be output via an auxiliary speaker 210 creating directional audio 302, headphones 304, a mobile device 308 or the like. The headphones 304 may be connected with a wire, blue-tooth enabled or the like.

Figure 11:
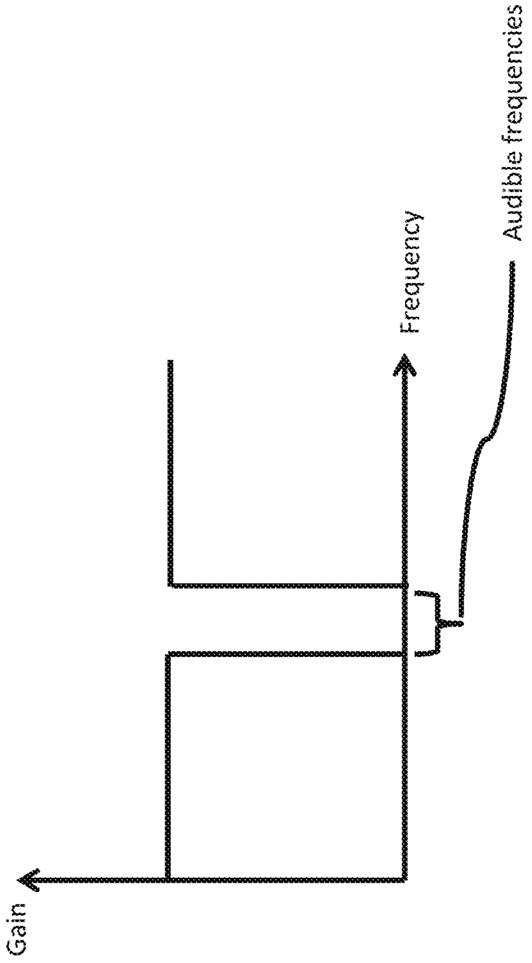
FIG. 11 is a diagrammatic view depicting an example of a notch filter in accordance with the present disclosure.

Some viewer monitoring services, such as offered by Nielsen™ rating services, listen for audio signals embedded in the content to determine what is being watched. In one embodiment, the system may decode the audio associated with all video containers being displayed and pass all decoded audio through a notch filter. FIG. 11 shows an exemplary notch filter where frequencies audible to the human ear are suppressed and frequencies not audible by human ear are preserved. The filtered signals are then summed, together with the full signal(s) associated with the one or more video containers of primary interest to the one or more viewers 204. The combined signals may then be re-encoded and sent to selected audio output devices as discussed above. An audio-based tracking device may identify one or more audio signals, encoded at frequencies outside of those audible to the human ear, associated with the one or more heterogeneous source content being displayed. The one or more users hear only the audio associated with the video container of primary interest.

Figure 12:
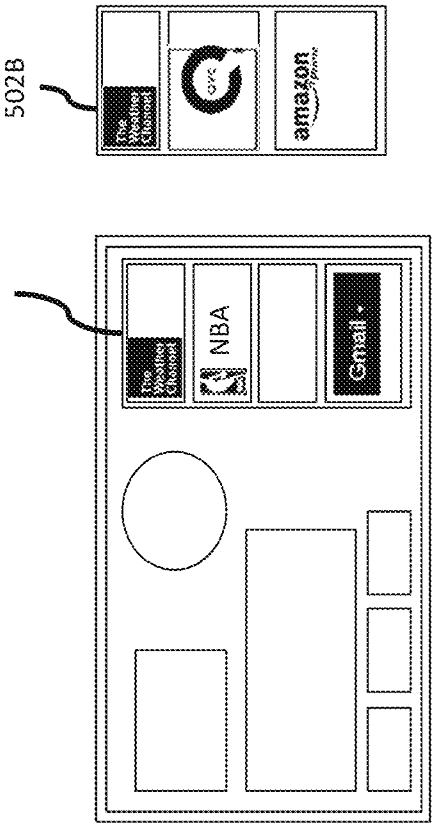
FIG. 12 is a diagrammatic view depicting an example of a display including video content and a group of widgets in accordance with the present disclosure.

In one embodiment, a video container may comprise a widget where a widget is one of a website, an application running locally or remotely, a social media interface, a shopping application, or the like. Two or more widgets may be grouped in such a way that the user may interact with the group of widgets as a whole. In some embodiments, there may be multiple groups of widgets. The user may be able to flip between the displays of different groups of widgets. FIG. 12 shows an example of a television or display device 38 or other display with a group of widgets 502 comprising one or more widgets 504. A group of widgets 502A is currently being displayed. A group of widgets 502B represents an additional group of widgets that the viewer 204 may alternately select to display. The system would enable the viewer 204 to flip between the group of widgets 502A and 502B. The widgets in a group may be personalized based on user identity, demographics, user preferences and the like. The widgets in a group may be partially preselected and grouped by the user.

The selection of widgets in a group may be partially auto-populated based on the content of other video containers. In some embodiments, the video stream may comprise metadata indicating widgets to be displayed. In other embodiments, widgets may be displayed based on a rule-set in the video display system. An example of rule-based widgets may be the display of groups of widgets based on the combination of the genre being displayed and user demographic and personal information. An example of linking video content and widgets is shown in FIG. 12. In this example, the display comprises a video container having a baseball game and a group or gang of widgets. The group or gang of widgets comprising one or more of default and user-specified widgets such as a weather app, a stock market ticker, and the like. Additionally, because there is a baseball game being shown in a video, the group of widgets may also comprise a link to team branded merchandise for the teams playing, statistics on the particular players on screen and the like.

In some embodiments, interaction with one or more of the widgets may result in a change in other video containers. The change may comprise one or more of the addition of video containers to the display, a change in the input being displayed in one or more on-screen video containers, the closure of one or more current video containers and the like. In a non-limiting example, selection of replay in a team widget may result in an additional video container showing the identified play being added to the outgoing video stream. In another non-limiting example, a widget may include a selection of video streams such as different screen angles in a sports game and selection of a camera angle might result in the addition of a video container on the screen or a change in the camera angle being displayed in an existing on-screen video container. In one example, a sports event may be shown in one video container with smaller video containers in proximity showing alternate camera angles of the same event. Selection of a video container containing one of the alternate camera angles may result in enlargement of that video container and the reduction in the size of the larger video container comprising content related to the same sporting event, swapping of content between video containers or the like.

A widget or group of widgets may be shared between users. A user may recommend various widgets or video content to others via social networking channels, email, one or more websites, and the like. The user may receive recommendations for widgets or video content based on similarities to other users where the similarities may include demographics, user preferences, viewing habits and the like.

Content of video containers displayed on the screen may be changed using one or more of: direct user initiation such as changing a channel or changing a layout; user interaction with a widget resulting in changes to a separate yet linked video container; user interaction such as changing the input or input channel of a video container which may result in a change in the group of widgets displayed, and an interrupt from the internet which may initiate the opening of a new video container or widget. An internet initiated, newly opened video container or widget may contain an alert, a favorite user program, emergency broadcast alerts and the like.

In some embodiments, widgets may be present in a cluster or gang of widgets but "hidden" from view a portion of the time and then "pop-up" asynchronously based on an internet signal, an external alert or event, content embedded in one of the heterogeneous sources, programmatically according to a rules set, or the like. In some embodiments, the widget may take action, such as appearing asynchronously, based on external events. The system may allocate resources to each video container and widget regardless of whether the video container or widget is currently viewable in the output video stream. Upon resource allocation, a hidden widget may check for triggering events to determine whether to take action. In an illustrative example, a user may select an NBA widget. Among the user selectable options for the widget, may be the option to pop up whenever one of the users preferred teams is ready for tip-off. When this particular widget receives system resources it may check user preferences and game status and take appropriate action such as display a message that the game is about to start, open up a new video container at a particular location on screen, change the input of a currently viewable video container to the game and the like. In other embodiments, a widget could poll for weather alerts, incoming calls, new email, urgent text messages, reminders, device alerts such as a low battery on an oxygen tank and the like.

In one embodiment, a widget may check search the text of the closed caption meta-data which may be associated with video content. The text may be analyzed for trigger words, phrases, repetition of keywords and the like. Closed caption text associated with the content of current video containers may be searched as well as the closed caption text associated with other channels of interest. A rule set may comprise actions to be taken upon the identification of said trigger words and the like. Actions may comprise the pop-up of a widget, opening a new video container, changing the content of an existing video container and the like.

Some shopping widgets may have access to user profile information that may include shopping credentials. A widget specification may include an option to simplify the purchase process and enable one-click shopping for identified sites.

Figure 13:
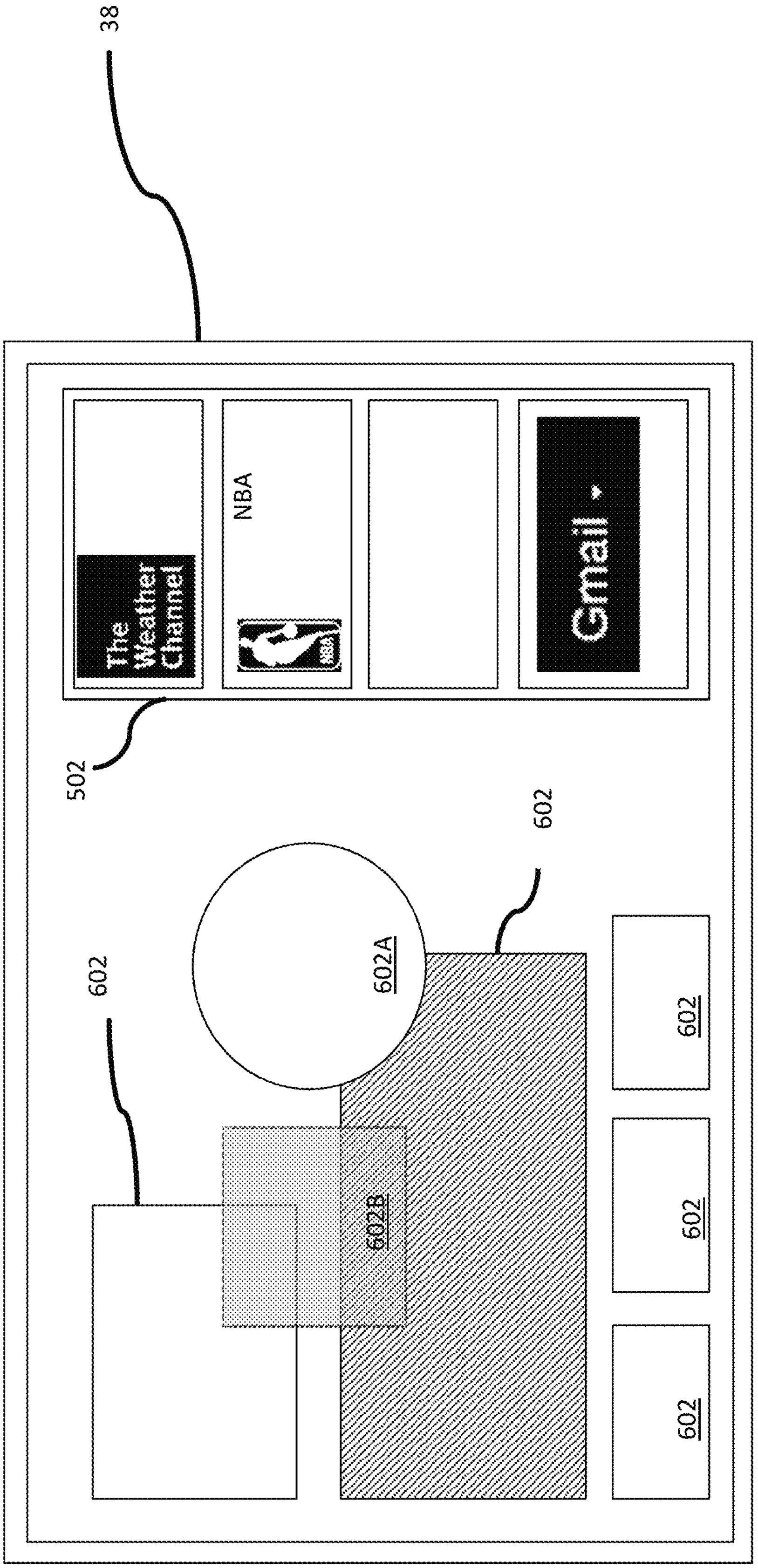
FIG. 13 is a diagrammatic view that shows an example of linked widgets and video containers in accordance with the present disclosure.

The video display system of this disclosure is designed to provide a user with extensive control over the viewing experience including one or more of content, display layout, interactive properties, and the like. A user may be provided with tools to specify and control his or her viewing experience with in-system control tools that may be displayed on the television or display device 38 or display screen, such as in a video container. The control tools may be manipulated using standard user interface mechanisms such as a mouse, trackball, joystick, motion tracking system, touch screen, or the like, or via a mobile device such as a tablet or smartphone, PC, or the like. In another embodiment, the user may specify viewing one or more of video container layout, parameters, user preferences and the like on a website or by using a local or remote application. A user interface application may allow the user to select from pre-set layouts or to explicitly and arbitrarily size, position and shape each video container to be displayed. The shape of a video container may be rectangular, circular, other geometric shapes, free-form shape, or the like. The user interface may enable the sizing, positioning and the like of four or more video containers. The user interface may allow the user to identify which video container should be in front when two or more video containers overlay one another. Additionally, the user interface may allow the user to specify a degree of transparency associated with a plurality of video containers when two or more video containers overlay one another. FIG. 13 shows an example of a television or display device 38 or other display devices on which may be seen a plurality of video containers 602. The plurality of video containers 602 comprises a circular video container 602A, an example of one video container 602A overlaying and obscuring a portion of another video container. There is also an example of a partially transparent video container 602B.

In another embodiment, the user may be able to explicitly link the content of various video containers and individual or groups of widgets. The user may be able to specify inter-container relationships, interactions, and the like in such a way that an interaction with one container may result in a change in another video container, including one or more of alternate content being shown, changes in size, position, shape, transparency, and visibility, alternate options available for the video container, and the like. An illustrative and non-limiting example of this would be where user selection of a genre in one video container would change the selection of channels available in another video container.

In another embodiment, the user may be able to synchronize the input from two or more heterogeneous input sources and then blend the output in a single video container. The unsynchronized input might result in a mismatch between frames from the different sources. It may be desirable to synchronize the inputs such that contiguous full frames from each source are blended together rather than blending one source containing the last half of one frame and the beginning of the next with another source that is showing a complete frame.

Another embodiment comprising synchronization of two or more heterogeneous outputs may comprise blending two or more of video, animation content, game output, direct camera feeds and the like. This may allow a user to place themselves into the action of the game, video, and the like.

The system may support multiple input devices including mobile devices such as tablets, smartphones and the like, remote controls, PCs, game controllers, mice, trackballs, joysticks, motion tracking systems, voice activation, speech recognition components, wireless keyboards, and the like.

There may be multiple heterogeneous sources being displayed in video containers and visible as part of the combined output of the system. The user may wish to interact with the individual content of the one or more video containers. The user may also wish to interact with the system's graphical user interface to control layout, video container parameters and the like. This may be achieved by using one or more user input devices, such as network computing devices 39 of FIG. 1. In some embodiments, the user may interact with the content of a video container using another input device, such as one associated with the source of the video container content, and may interact with the system using an input device associated with the system. However, it may be confusing and time consuming for the user to switch between different devices.

Thus, in an embodiment of this system, it may be possible for the user to utilize a single input device to control both the system parameters as well as the various heterogeneous input sources. The system may be able to toggle between interpreting received signals as inputs to the system graphical user interface (GUI) and as inputs to the input source of a currently active video container. In an illustrative and non-limiting implementation, the system may identify when a particular video container has been selected. The system input device may or may not have an explicit option to select between system GUI control and control of source input. When the system receives commands intended for an input source, the signal is translated or remapped into a corresponding signal appropriate for the intended input source and re-sent using one or more of a communications channel such as an HDMI command channel, an infrastructure such as an IP network, IR laser, or the like, to the input source that maps to the active video container.

In another embodiment, a third party remote control device or a control device for one of the heterogeneous input sources may be linked to the display system and act as both an input device for the system GUI and as an input device for one or more of the heterogeneous input sources. Additionally, signals from such a third party remote control device may be interpreted by the system as being for yet another input source. In an illustrative example, the joystick for an xBox™ game system, one of the systems heterogeneous input sources, may also act as the controller for the system graphical user interface GUI, as well as a controller for an old VHS tape system, another of the systems potential heterogeneous input sources.

In one embodiment, it may be possible to mirror the system's graphical user interface, GUI, on one or more secondary displays such as a tablet, a PC, a laptop, a mobile device, a smartphone, a second television, or the like. This may provide the user with the ability to utilize interface capabilities that may be associated with the secondary display such as a keyboard, touchscreen, and the like. These additional interface capabilities may enhance the user experience and the user's ability to edit widgets, input user preferences and personal data, setup synchronizing of a plurality of heterogeneous sources, adjust shape, size, and transparency of video containers, enter complex statements for searching or editing text fields and the like. The mirrored GUI may be implemented by serving the same video output to more than one television or display device 38. Alternately, the same GUI and control may be achieved by a native application developed using a common API to that used for the system GUI.

Figure 14:
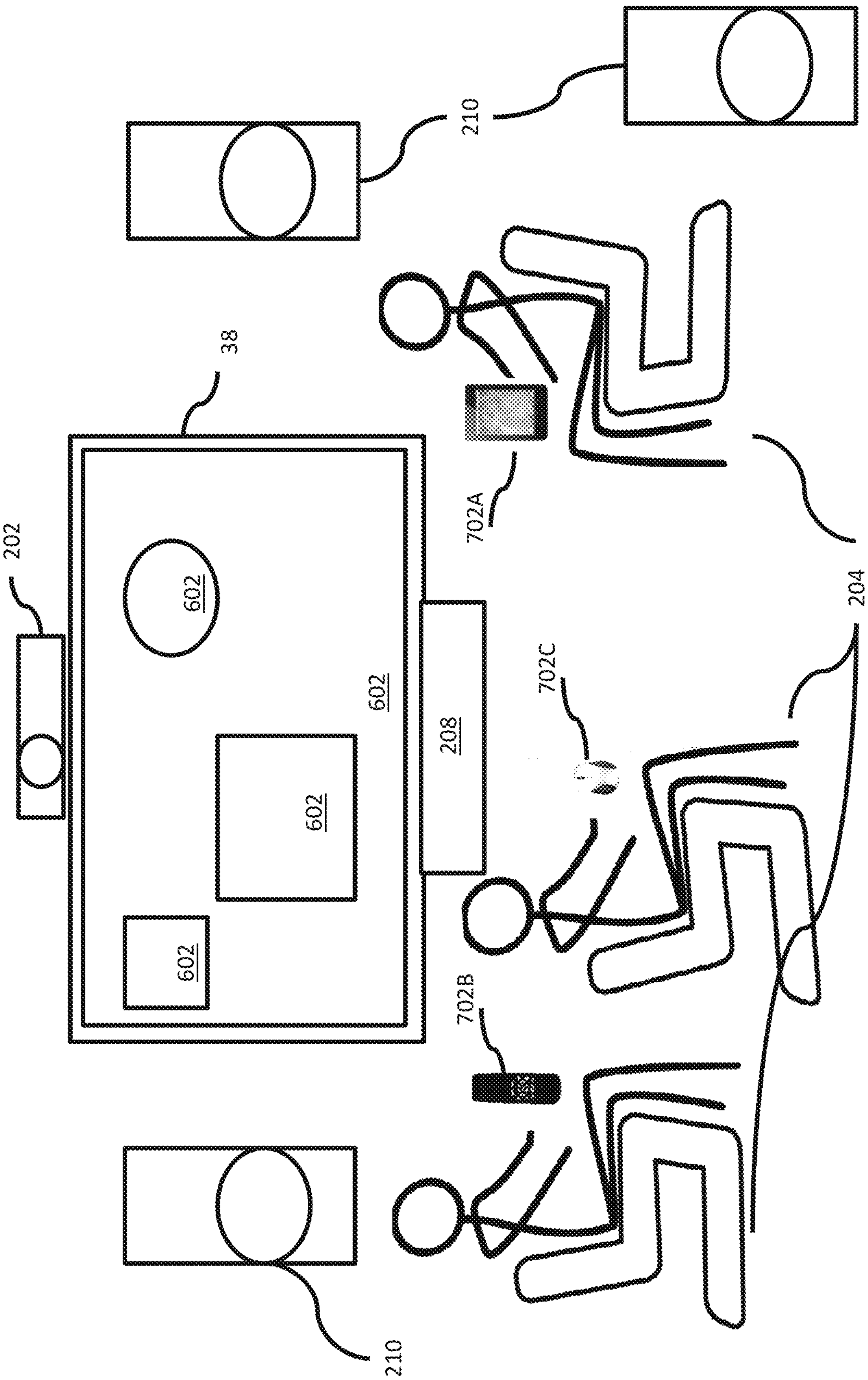
FIG. 14 is a diagrammatic view that shows an example of using a single remote control for both the video display system and the heterogeneous input sources in accordance with the present disclosure.

In some embodiments, the system may support the simultaneous receipt of GUI control information from one or more input devices. FIG. 14 shows an illustrative example of this embodiment with multiple input devices simultaneously controlling a single television or display device 38 or display device. FIG. 14 shows three viewers 204 watching a single television or display device 38 or other display comprising a background video container 602 and three additional video containers 602 displaying content independent of the other video containers. Each viewer may have a separate input device 702 being one or more of a mobile device 702A such as a table or smartphone, remote control 702B, PCs, game controllers, mice 702C, track-ball, joystick, motion tracking system and the like. With their individual input devices 702, each viewer 204 may specify one or more of content, size, position, change in size or position, transparency, and the like of one or more of the video containers 602. The viewers 204 may "battle" each other for the control of all the video containers 602 or reach a compromise regarding control over the individual windows/video containers 602. The individual viewers 204 may each control the content, size, position, transparency, and the like of one or more unique video containers. In some embodiments, each viewer 204 may provide a unique user ID to the system, allowing the system to apply user preferences and associated user data to the video container in their control including channels, color schemes, widgets, user purchase data and the like.

Figure 15:
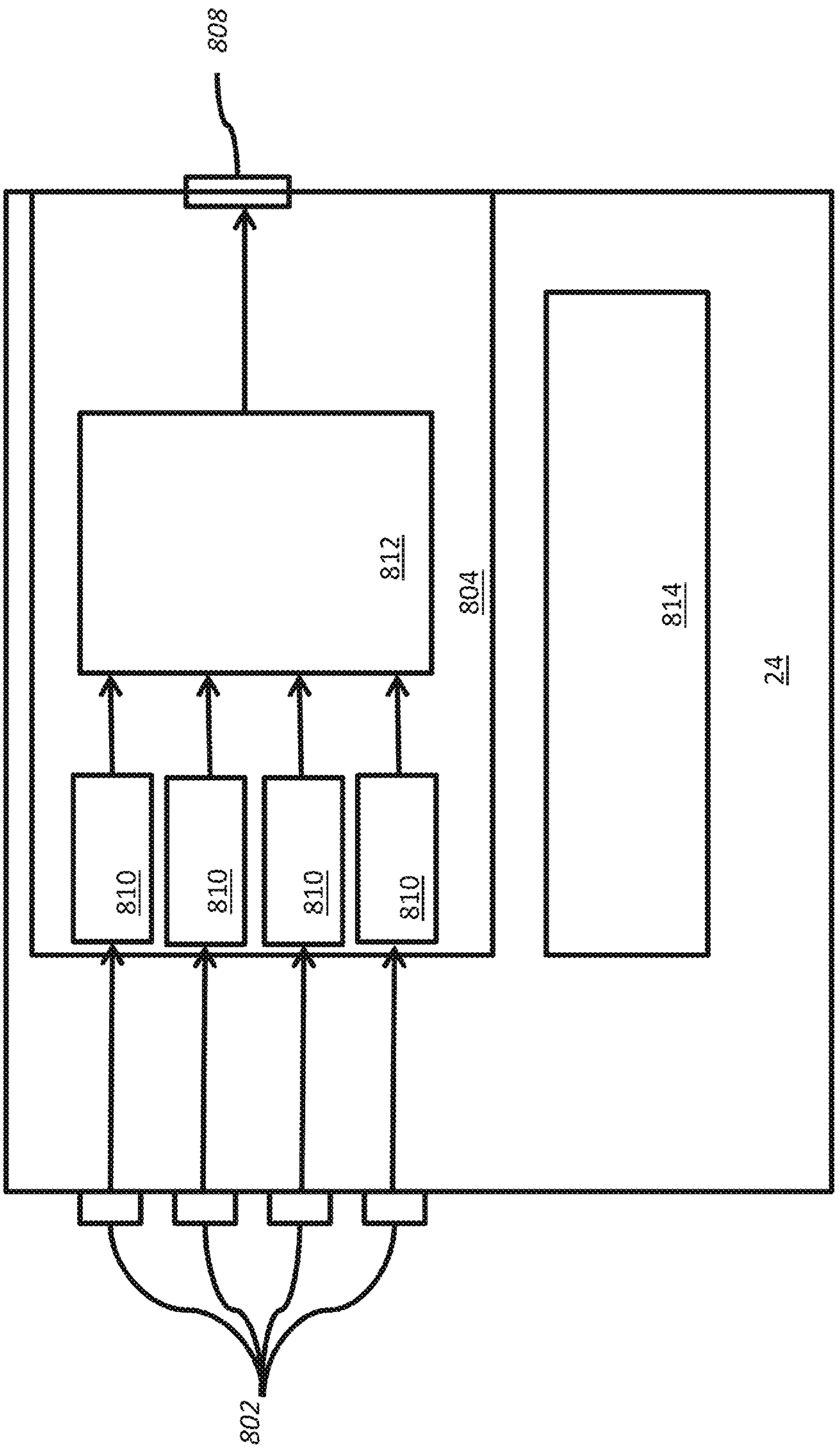
FIG. 15 is a diagrammatic view that shows an example of video display system with multiple input ports in accordance with the present disclosure.

In another embodiment, the multiple input devices may be used by the viewers to play games against one another, the computer, other users on the internet, "televised" game shows and the like. In some embodiments, the game may be linked to game show that is televised, broadcast, digitally distributed and the like. A widget may be developed to play a particular game show such as "Price is Right", "Wheel of Fortune" or the like. The live game may comprise metadata in addition to video and audio content. The widget may be designed to synchronize with a live game or a previous game using show number or other identifying information. The synced widget may enable the viewers to play alongside the televised participants In one embodiment of a video display system, shown in FIG. 15, there is a computerized media processing system 24 comprising four or more input ports 802, a FPGA 804, custom chip, programmable logic device or the like and an output port 808. In addition, the embodiment may comprise additional electronics hardware and software elements. Each input port 802 may support receipt of data in a format such as HDMI, DVI, IP data stream comprising raw, encrypted, unencrypted, or other video data schemes such as Universal Plug and Play, UPnP, digital living network alliance, DLNA, RVU, and the like. The system may comprise input ports 802 comprising support for one or more of the above input formats. In some embodiments, all the input ports 802 may be HDMI compatible. In some embodiments, all the input ports 802 may be for the receipt of IP data streams. IP data streams may be received via Ethernet, coaxial cable supporting Multimedia over Coax Alliance, MOCA, 802.11, 4G or other transmission means and the like. In yet other embodiments, there may be a mix of input port 802 types. The input ports 802 may be connected in parallel to a single FPGA 804 or other programmable logical devices wherein the programmable device is designed to process in parallel the multiple inputs in separately allocated processing areas 810 on the device. As the content from each input port 802 is processed in parallel, the subsequent output data streams are written to a common memory buffer 812. The common memory buffer 812 may also be located on the same FPGA 804, logical device, or the like. Processing the individual inputs in parallel on the FPGA 804 and storing the processed data on the same FPGA 804 eliminates the need to move data across a computer bus and may enhance processing speed. The contents of the common memory buffer 812 are combined in conformance with parameters provided by the formatting module 814 and written to the output port 808.

Figure 16:
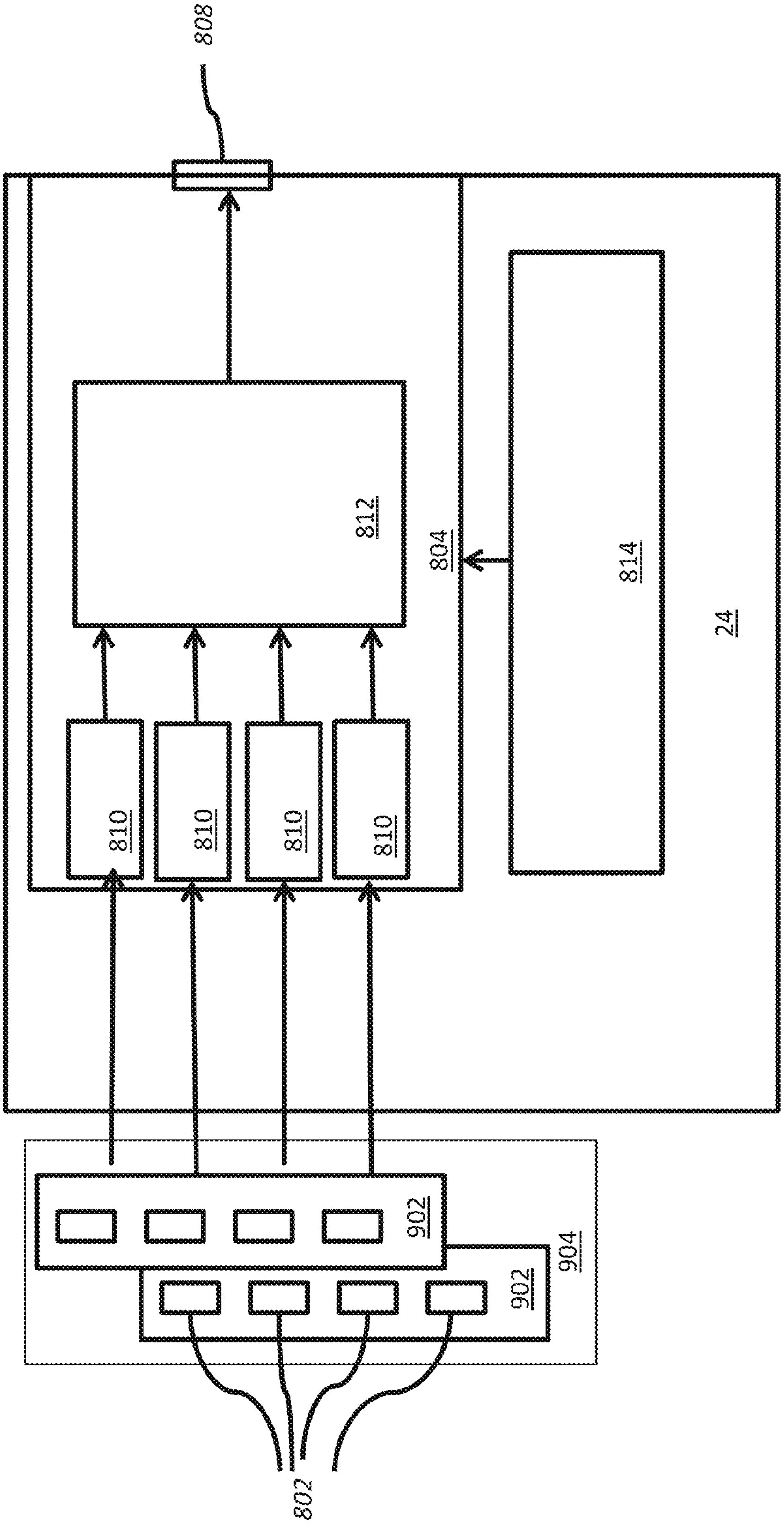
FIG. 16 is a diagrammatic view that shows details of the system hardware in accordance with the present disclosure.

In another embodiment, shown in FIG. 16 the computerized media processing system 24 may have twelve or more input ports 802 and a FPGA 804. The input ports 802 may be connected in parallel to a single FPGA 804 or other programmable logic devices. In yet another embodiment, there may be multiple input ports 802 configured in sets wherein the sets 902 of input ports 802 are multiplexed 904 into a single FPGA 804 or other programmable logic devices. In this embodiment, at any given time, the FPGA 804 would be able to parallel process only the multiple input ports 802 associated with a given set 902 of input ports 802. In addition to multiple input ports 802, the computerized media processing system 24 may have one or more output ports 808 comprising support for one or more of HDMI, DVI, Internet Protocol, RVU, Universal Plug and Play, UPnP, and Digital Living Network Alliance, DLNA protocols and the like.

As the individual input ports 802 are processed, a portion or all of the output data stream for each input port 802 is written to a common memory buffer 812. The specifics of what portion of each data stream is written to the output buffer, the location at which the output may be written, the extent of overlay or blending of multiple heterogeneous data stream outputs and the like are performed in conformance with parameters provided by the formatting module 814 and a rule-set. The formatting module 814 may specify the display location for each input port 802 including the spatial location, the size of the display window, the shape of the display window, the overlap between video display containers including any overlay, and the transparency or blending of display windows. The FPGA 804 or processing module comprises circuitry capable of processing and combining the multiple inputs as specified by the parameters from the formatting module 814 and then sending the resultant, combined output to one or more of the output ports 808.

The FPGA 804 or other processing modules may comprise a logic module for resizing and handling of overlay information among input ports 802. The system may handle multiple input ports 802 and comprise a synchronization module or process for handling or avoiding bit-by-bit competition on overlapping output regions of a display device. In one embodiment, the formatting module 814 may provide a bounding box of pixel locations for display to the output port 808 of a FPGA 804 or other logical devices.

While the system for implementing this video display method has been described in terms of certain hardware configurations these should not be considered limiting. It should be understood that the functionality of decoding and processing multiple input streams simultaneously and displaying the processed content in a set of video containers having arbitrary parameters for size, shape and the like may be accomplished in a variety of ways. The decoding and processing may be done locally using one of a variety of schemes such as a computer and software wherein the computer has sufficient processing power to process the multiple inputs in parallel, a combination of customized hardware and software, a custom FPGA, or some combination thereof. Portions of decoding and processing may take place in the cloud with the final combined output being streamed to the local display device. In one embodiment portions of the decoding and processing may be distributed across various components of the larger system with some portions being done by a set top box, the television, or the like.

In embodiments, portions of decoding and processing may take place in a cloud. By way of this example, a cloud-based IML may cascade among multiple cloud instances to create many more layers 3028 than a cloud-based IML, using a single cloud instance. These additional layers 3028 created by cascading among multiple cloud instances may extend to a television display (TV) 2608 or other display devices 38 having local IML feeds. A cloud-based IML cascaded among multiple cloud instances may support hybrid acceleration/processor configurations. Hybrid acceleration/processor configurations may include, without limitation, a FPGA/processor configuration, a DSP/processor configuration, and an ASIC/processor configuration.

In embodiments, a TV display 2608 or other display devices 38 may or may not include local IML feeds. A TV display 2608 or other display devices 38 without local IML feeds may only have a minimal network connection and video decoder to receive a raw or decoded video stream to a video buffer and display the decoded video stream to a display via a pixel generator. In embodiments, a cloud-based IML may produce a video feed. The cloud-based IML in this example is receiving inputs from heterogeneous input sources 25, including video inputs from multiple PCs and a web page overlay. The web page overlay in this example may allow for a notes and annotations layer to be added to the video feed. In this example, a green screen function may be used to subtract the web page overlay from the PC video inputs. As a result of this green screen functionality, the only visible objects that remain in the video feed may be those that have not been subtracted, creating the web page overlay effect.

The video feed may then be sent to a group of viewers who may be viewing the same feed on multiple display devices 38. The cloud-based IML may send the video feed to these multiple display devices 38 by opening multiple layered video feeds 4200. The interactive functionality of the IML, combined with the ability of viewers to view the same video feed on multiple display devices 38 may allow the viewers to interact with the multiple layered video feeds 4200 from different locations by drawing on the feeds, adding notes to them and the like.

In some embodiments, it may be possible to upgrade the firmware of the FPGA or other programmable logic devices. This may be done remotely using a communications network, locally using a DVD or other portable computer readable medium, and the like to upload a new image or data to the FPGA.

In some embodiments, the upgrade of the FPGA may facilitate a rotating hardware key system enabling a user or system authentication prior to allowing licensed content to be displayed in one or more video containers. The use of a cloud or a website to maintain user profiles and information may enable the registration of the unit in combination with a user authentication widget. The video display system could then authenticate and enable the playback of digital rights management, DRM, protected media without the need to access individual websites for authentication.

In some embodiments, the FPGA or other programmable logic devices may be programmable in situ. This may allow updates to the rule sets for one or more of blending, overlay logic and the like, security features, new transport protocols for IP, HDMI, or other transport systems for new ways to connect inputs to the system and the like.

It will be appreciated in light of the disclosure that the video container system 46 may use a FPGA that may allow for specific circuits to be created and to execute video processing acceleration functions. In addition to using a FPGA to execute these video processing acceleration functions, a video container system 46 may also use other semiconductor types in some embodiments. Other semiconductor types may include digital signal processors (DSP's), application specific integrated circuits (ASIC's) and hybrid acceleration semiconductors, for example. The circuit logic required in order to implement video processing acceleration functions may be implemented in any of these semiconductor types, as well as other suitable semiconductor types. In embodiments, video container system 46 may also use hybrid acceleration/processor configurations to execute video processing acceleration functions. Hybrid acceleration/processor configurations may include a hybrid FPGA and processor configuration, a hybrid acceleration semiconductor and processor configuration, as well as other hybrid processor configurations.

In one embodiment, the video output of the system may be higher picture resolutions, such as 4K. The system may generate this larger output stream by combing multiple lower resolution video streams (such as 1080, 720, and the like), up-converting to a single 4K or other higher resolution video stream and the like.

Video data is frequently transmitted in a compressed format such as MPEG2, MPEG4 encoded video and audio and the like. The compression facilitates transportation of large amounts of data across limited bandwidth channels, for example, video over cable to a home. However, once the compressed format data is received, processing is required to retrieve the uncompressed video and audio data. Additionally, processing may be needed to decrypt additional encoding such as security, digital rights management, DRM, and the like. Once the data has been thus processed it may be configured for output compliant with one or more of the following protocols; HDMI, DVI, Internet Protocol, RVU, Universal Plug and Play, UPnP, and Digital Living Network Alliance, DLNA protocols and the like. This data manipulation may require significant processing capacity. Typical consumer video display equipment may only be equipped to process a single high resolution or possibly two low definition data streams simultaneously.

Due to the limited capacity of typical existing consumer display equipment, it may be desirable to provide additional processing power to facilitate the simultaneous processing of multiple compressed and or encrypted data streams. In one embodiment, this may be done by leveraging the HDMI control lines in conjunction with one or more external processors such as HDMI stick PCs, PC, other set top boxes, and the like. Using the HDMI control lines these external processors may be used as secondary devices to decode and decompress video and then output using the standard HDMI output lines.

In an illustrative and non-limiting example, the compressed video may be received by a primary set top box, STB, via cable, satellite, internet infrastructure or the like. The format of this compressed video may be MPEG2 Transport Stream, a standard broadcast video standard, MPEG4, or the like. The primary STB may have more than one tuner to select a desired program and receive the compressed data containing the audio and video of the desired program in an MPEG2 Transport Stream, MPEG4 data stream or the like. The compressed data may be sent by the STB over an out-of-band local internet connection, a control channel in the HDMI protocol, or other transport mechanisms, to the video display system of this disclosure. The compressed data may then be sent to one or more of the secondary processing devices for decompression and decoding. The decompressed and decoded video and audio content may then be output using the HDMI interface.

In a variation on this embodiment, the use of external processing capacity such as HDMI stick PCs, PCs, and other set top boxes may be replaced by additional processing capacity on the FPGA. The FPGA or other programmable logic devices, logic chip or the like may comprise one or more decoders for decompressing MPEG2 Transport Stream, MPEG4 and the like. The results of the decompression may then be transferred to one of the input port processing areas on the FPGA for integration into the output video stream.

In another variation of this embodiment, the FPGA, or other programmable logic devices, logic chip or the like may be incorporated into the primary set top box, STB. In this embodiment, multiple tuners may be connected by electronic bus (PCIe, parallel, etc.) to the FPGA. Thus, decompression is done in the set top box, STB, and the decompressed and/or decrypted video and audio content is then transmitted to the video display system.

In one embodiment, the system may transfer data between ports such as HDMI ports, IP Ethernet ports, and the like. In this manner, the system may send packet data between any program or device connected to the system such as being able to send data live from an internet widget to an xBox™ or the like to be processed live and the like. The ability to transfer data directly between programs may reduce complexity including reducing the need for extra wires, eliminating some remote controls, and the like.

In an illustrative and non-limiting example, statistics from a live basketball game may be transferred via the video display system to an xBox™ or the like attached to the system. The xBox™ or the like may play a basketball video game according to the statistics of the live game as received from the video display system. This may enable a user to see, via an xBox™ or the like basketball game, a graphics rendition of real basketball game events where the game is played according to the live statistics passed by a basketball widget.

In an embodiment, one or more of the heterogeneous sources may comprise a "second screen" application enabling the system to display applications and content intended for display on a smartphone, a tablet, or other mobile devices for display in a video container. In another embodiment, the system may mirror the display of a tablet, smartphone, or mobile device in a video container displayed as part of the combined system output.

In one example, one of the HDMI inputs to the media processing unit may comprise a graphical user interface (GUI). This GUI may be displayed in a background video container over which additional video containers may be displayed. This GUI may be one of an HTML5 application (with HTML5 code) running in web browser, a native application running on the video display device or the like. A user of the video display device or system may interact with this user interface through a variety of input devices including one or more of mobile devices such as smartphones, tablets and the like, PCs, remote controls, wireless mouse/keyboard devices and the like. A user of the video display device or system may select a user profile via the GUI causing the user interface to interact with another application, website, or the like to access one or more of user preferences, user associated widgets, personal user data including usernames, passwords, and purchase information, user preferred layout and channels and the like. Additionally, the identification of a unique user may allow the system, either the video system or a remote application, website or the like, to gather and store analytics on the particular user, their viewing habits, nature of one or more of input channels being displayed, location, size, shape, transparency and the like of each video container on the screen, which widgets are displayed, the number of widgets and the nature and extent of widget interactions, video game activity including game identity, length of play, and the like, time and date information, which channel had corresponding sound being played, relationships between shows, widgets and the like displayed together, co-viewing of different material and the like. The identification of a unique user may enable the system to limit the display of certain content, widget access, data collection and the like based on the age of the user. The user interface may communicate with the formatting module to provide parameters relating to the layout and appearance of the output display.

The user interface may be accessed simultaneously by one or more input methods such as at the video display device, using a local application or a remote application running on a PC, mobile device, or the like, or accessing a website via a web browser on a device and a communication network, or the like. In embodiments, a user interface accessed and displayed in such a manner enables the creation of a profile of a unique user including allowing the user to specify information about their personal demographics such as name, gender, payment information such as credit card, PayPal™ account information and the like. Additionally, the user may specify preferred genres, favorite teams, newsstations, areas of interest, default screen layout including number, size, position and default content of video containers, widget preferences and the like. In some embodiments, access to the different levels of customization may be available based on user enrollment in different business models. In another embodiment, the user interface may gather information about the particular hardware, system, and software configuration of the user's video display device.

Figure 17:
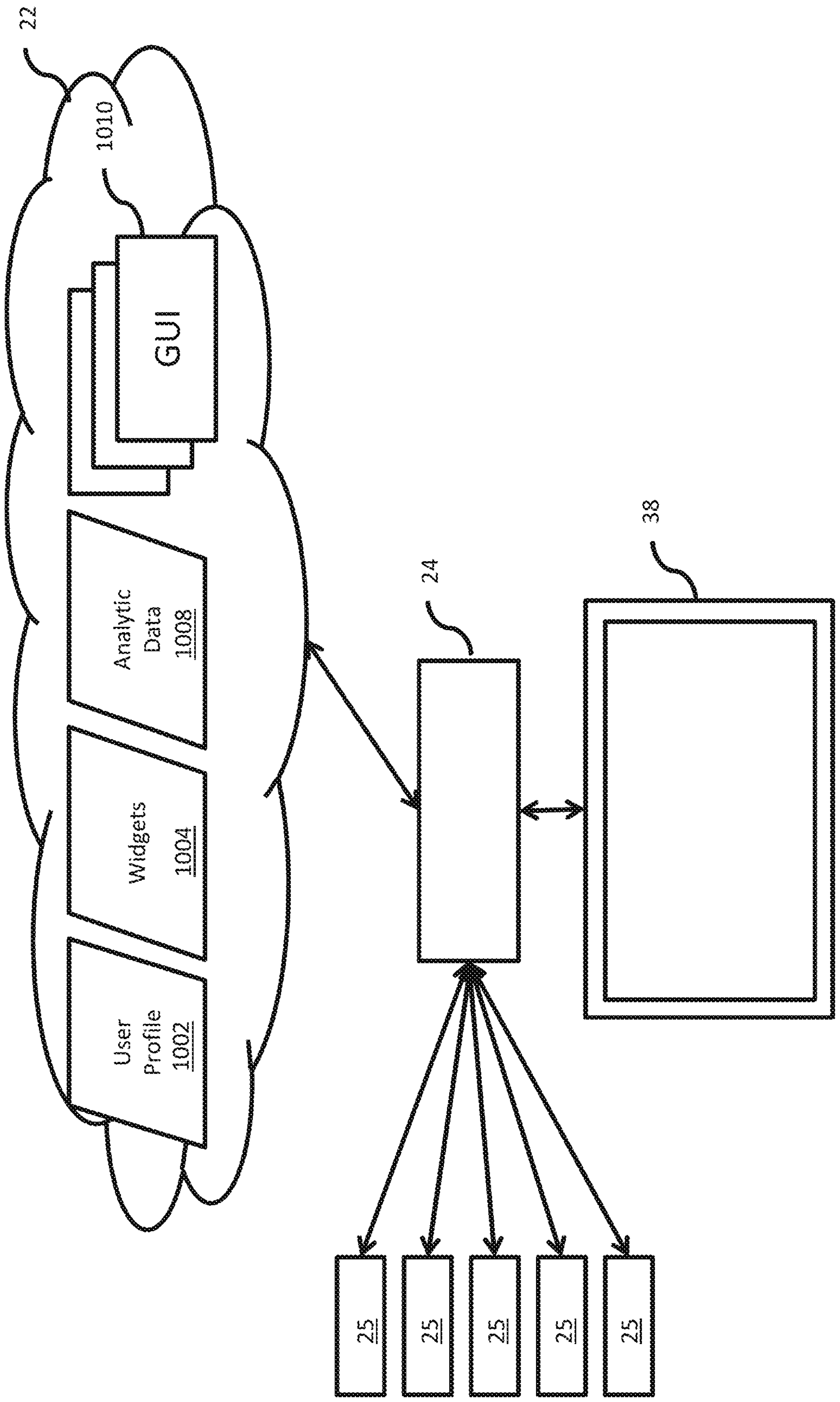
FIG. 17 is a diagrammatic view that illustrates the use of a user profile in accordance with the present disclosure.

FIG. 17 shows an embodiment, where the user profile is selected, the video display system may access a website or server via a communications network 22 which would provide the particular video display system with one or more of the user's personal preferences 1002 including default display layout, channels, widget selections and the like. The same or another website may act as a widget server 1004 providing the latest widgets to the video display system. Analytic data 1008 may also be stored in the cloud 1702.

In one embodiment, the HDMI input may comprise video content in which meta-data has been embedded into the video stream. The embedded metadata may comprise information about the scene content of the video stream, links to related internet sites, links to related social networking sites and channels, sales channels, executable scripts, and the like. In one example, the video content may be a televised game and the embedded meta-data may include information about the team, information on the individual players, links to the team's website and the like. In another example, the video content may comprise a news show and the embedded meta-data may include links to additional information on the topic being discussed, information on the newscasters, secondary stories, and the like. In a further example, the video content may comprise a home-shopping channel and the embedded meta-data may contain links to information about the individual items for sale, information on designers, information on related accessories and the like.

In one embodiment, the video display system extracts embedded meta-data from the video content of the plurality of input sources and acts on the meta-data according to a rule set. In one embodiment, the inclusion of meta-data may result in information scrolling across the bottom of the video container in which that video is displayed. In another embodiment, the meta-data and rules may result in a widget being displayed. In another embodiment, the meta-data and rule-set may result in a Twitter™ feed related to the video content being displayed on the larger screen. These examples are meant to be illustrative and not exhaustive.

The system may track information about the viewing habits of users. The data gathered may be used to enable e-commerce, target advertising, collect analytics on device usage, and the like. In some business models, background, content, and service providers may base advertising charges based on how many people are watching a program as measured by the Nielsen™ rating system or a similar service provider. In one embodiment, meta-data, tags, and the like embedded in the input content may be subsequently embedded in the output stream where it may be measured by a tracking device. In another variant, meta-data, tags, or the like may be stored under the direction of the media processing unit. Storage may be local to the video display unit or to a remote website or server via the communications network. This meta-data may be combined with information including the nature of one or more of input channels being displayed, location, size, shape, transparency and the like of each video container on the screen, which input channel had corresponding audio being played, which widgets are displayed, the number of widgets and the nature and extent of widget interactions, video game activity including game identity, length of play, and the like, time and date information, which channel had corresponding sound being played, relationships between shows, widgets and the like displayed together, time and date information and the like.

In one embodiment, the system may monitor the quality of the network quality, transport stream, corresponding content integrity, image quality and the like. Network monitoring may comprise a widget that measures bandwidth and quality of the network. The network widget may be initiated by one or more of a user, a remote technician, an automatic scan system or the like. The widget may cause special tracer IP packets with time stamps to be sent with the source content to measure turnaround back to the content delivery network, CDN, to measure throughput, latency, and the like. The transport stream sent over the network may be one or more of MPEG2, MPEG4 encoded video and audio, and the like. A monitoring widget may collect statistics, images and the like and perform tests for speed, noise, quality, and the like, and perform analysis of test results over time, time of day, and the like. These statistics may be sent to a central website or server over the communications network where collective analysis for errors in transport or content over regions of service may be performed.

In one embodiment, the system may be used for gaming. This embodiment comprises internet widgets that accept bets over the internet or other communication networks and one or more video containers displaying live video content. Currently, users may use a PC, tablet, smartphone, or the like to visit one or more gaming websites which enable users to see options for placing bets, create an account, fund an account, and place bets. These gaming web sites may constantly update the odds, payout, and closed bets. These gaming web sites may have corresponding widgets enabling bets to be seen and placed on the video display system of this disclosure. These widgets may enable asynchronous popups displaying information such as hot bets options, time running down for a game or race to place a bet, results as they occur, and the like. System stored user preferences and purchase data may allow for automatic login to the gaming widgets and corresponding gaming websites.

In another variation, metadata about one or more sports events, races, game show, political race or other competitions and the like being shown in one or more video containers may be sent to a gaming widget. The gaming widget may use information about the current sports event, race, or the like, information about upcoming events on a particular input channel, similar competitive events such as games, races, and the like to identify and show relevant bet options such as options for the current competition, future games or races, multiple simulcast races, multiple games shows with those multiple bet options shown, related competitive events and the like. The gaming widget with these options may be displayed as a popup if it is not already visible on the screen. Once a bet has been placed, information regarding the bet may be displayed in proximity to a video container showing the event. Active and available bets may be listed and selectable in the widget. Selection of specific bet or option may result in the relevant event, if available, being displayed in a new or existing video container.

The system may display one or more live games, races, competitive events, and the like, make grids of relevant content, and allow a user to resize content of interest. Alternatively, the system may auto size video containers based on the size or importance of bet relating to the one or more live games, races, and competitions being displayed in the various video containers. The system may visually identify the video containers displaying content where the viewer may have a winning or losing bet. Visual indicators may include a red ring around games viewer is losing and green around ones winning versus the bets made or similar visual indicators.

In one embodiment, the system may utilize one input source to take "snapshots" of each game across multiple channels. The system may tune into each game of interest and take a picture or short video of each and then display the "snapshots" in a gaming widget. The widget may rotate through the series of "snapshots" enabling the user to watch and get a sense of the various games. The user may then select a "snapshot" to see the game of interest in a larger format resulting in the display of the selected game in one or more of an existing video container, a pop up second video container or the like.

The system may send user statistics, game statistics in combination with information on the content of visible video containers to a gaming widget to facilitate mid game betting. In an illustrative example, a video container displaying a basketball game that is in the second quarter and an NBA widget with live statistics on the basketball game are both visible on the display. If one team is losing by 20 points the system may send information from the NBA widget such as the game score, inning, current outs, and the like together with the game being watched to the gaming widget. The gaming widget may then pop up a mid-game bet giving +25 to the losing team. The viewer may then place a bet. Additionally, statistics on individual players may be sent facilitating individual proposition bets such as how many steals a player will have, how many rebounds, and the like.

In one embodiment, local input and output devices such as cameras, joysticks, tactile stimulators and sensors and the like may be driven by widgets and linked to content in other video containers such as video content, games, and social interaction sites. These embodiments could be used for applications and content where tactile input and feedback enhances the content such as learning musical instruments, physical therapy, adult content, and the like.

In one embodiment, the system displays marketing or advertising material based on the content of displayed video containers. The system may open up a new video container to display the advertising material. The system may overlay a video container with a partially transparent video container whose content comprises related advertising material. The advertising material may comprise one or more of advertisements, videos, order forms, surveys, games, promotional websites, linked social websites, and the like.

In one embodiment, the system may comprise an improved TTY system for the deaf. Currently, one means of distance communication for the deaf comprises a TTY system where the user may place a "call" and the communication is accomplished via text being entered by the user and responses seen on the user's display. This embodiment comprises two or more video containers wherein one would show the text similar to a current TTY system. However, an additional video container might show an image of the users. This would enhance communication since a significant amount of information is communicated non-verbally.

In another embodiment, the system may comprise an improved closed caption system. Currently video content may include metadata with the text of the audio content. In current systems opting to display the closed caption content may result in the text of the audio being displayed on the bottom of the screen. The text may obscure a portion of the video content and be difficult to read due to size, lack of contrast and the like. In this embodiment, the selection to display the closed caption information for a video source may result in a new video container being displayed showing the closed caption text. The position and size of this video container may be manipulated by the user for ease of viewing. It may be possible to scroll back through the content of the closed caption text.

In another embodiment, the system may comprise a home command control center where the interface comprises a number of widgets and video containers. These widgets may enable one or more of asynchronous pop-ups for events such as door openings, sump pump status, motion detected, idle time on devices and the like, control options to manipulate devices, display output from home video cameras while watching other video containers and the like. Control options available in such a widget may include turning a device on or off, locking windows and doors remotely, turning on one or more alarms or sirens, sending a text message or audio or video phone call, teleconference, or the like, either automatically or with user input, to a person of interest such as the police, physician, a relative, security company or the like.

In one embodiment, an HDMI stick personal computer, a personal computer program with wireless HDMI, or widget from web server may function as a home control system monitoring one or more of security, home appliance status, and the like. In an illustrative example, a computer or web service may receive data indicative of motion from an external home security camera. This information may be sent to the video display system and displayed as a pop-up widget with a text message, video clip or the like.

In one example, the system may be programmed to power connected input devices on or off via HDMI or IP command based on one or more of current display status, idle time, user parameters and the like.

In one example, the system may be programmed to cycle through a series of camera systems, websites with cameras, baby monitors, door monitors and the like. These camera views may be displayed in a background video container while other video containers are displayed in the foreground. Audio may also be programmed to pop open a widget based on programmatic rules or external events. An illustrative example of audio may be switching to audio from an infant's room on a periodic basis or when a noise is detected in the room.

In another embodiment, the user may scroll through images and videos from a tablet, smartphone, camera, or the like connected to the system. The images may be shown in one video container while other video content and widgets are displayed elsewhere on the screen. The system may be enabled to auto scroll through the images on the device without user intervention if desired.

In an embodiment, the system may comprise a system and method for one or more of enhanced social commentary, social interaction and the like related to one or more of broadcast events, sports events, remotely interactive video games, on-line gaming, and the like. In this embodiment, the system may obtain information about the content of a video container through one or more of meta-data embedded in the video and extracted by the system, information associated with channel selection and time available in a database or online, or the like. Information about the content of displayed video containers, together with one or more of user preferences, options, and analytics may cause a widget to open. The widget may display a social website or channel related to the video content being displayed. The widget may be opened on the main display device or on a secondary display device. The ability to interact with others who are watching the same video content may create more excitement about the show through user interactions and shared experiences in cyberspace. Twitter hashtags may be automatically entered, extended, and removed by other video container activity, including channel changes, new programs, history of surfing widgets, closed caption word or phrase or groups of words and the like.

In an illustrative example, users watching a reality TV show such as American Idol, Iron Chef, or the like, may chat together about the relative merits of the contestants, contestant appearance, opinions regarding the contest and the judges and the like. The social site or channel may collect these interactive comments, poll participating users for questions to be displayed on the show, filter people into smaller topic groups for augmentation of the show, and the like. It may be desirable to utilize this information from users together with analytics of viewer behavior and provide advertising specifically targeted to these engaged viewers.

In another illustrative example, social commentary such as tweets and the like could be incorporated into a video game as bubbles over a user's character, across the bottom of the screen or in a separate video container. A game server could provide data regarding the relative placement for messages and the system could translate this information to accommodate the actual size and location of the video container displaying the game content.

In one embodiment, the system may comprise Voice over IP, VOIP, on the television. The system may allow voice calls to connect and play on the display and through the associated audio output devices while watching multiple shows. The system may mute the sound of the TV in the audio that is transmitted back to the caller but combines the sound from the caller together with the previously selected audio output being sent to the one or more audio devices. In one example, the user may be playing an online video game with remote friends and conversing with them via VOIP simultaneously.

In another embodiment, the system may integrate the functionality of one or more smartphones. This embodiment may include one or more video containers enabled to display a smartphone user interface. This interface would enable a user of the video display system to engage in smartphone activities and applications such as texting, FaceTime™, Skype™ and the like via display of the smartphone user interface. The system may also allow multiple video and voice calls simultaneously to multiple video and widget activity on the screen.

In one embodiment, the system may accept input designed to be blended to produce a stereo or 3D effect. This content may include meta-data describing the stereo effect to be achieved, which view, left or right, is represented and the like. The system may then cause the two or more content streams to be synchronized, blended, and presented to the user. In some cases, the output device may be a 3D television, stereo glasses of the like. In some cases, the system may represent the views in red and green separations for use with colored glasses.

In an embodiment, the system may act as a virtual living room or virtual bar, or the like. A widget running in full-screen mode and logged into a 3D virtual room may position a character or avatar on the screen to represent one more of the user and others who may be logged into a common social site or the like. The users may manipulate the avatars in such a way that they walk around the virtual rooms. A voice over IP connection may allow users to communicate verbally with each other. In another embodiment, the system may blend live video over the 3D room where the live video may be manipulated for one or more of size, proportion, and angle to approximate the virtual environment. In one implementation position coordinates, such as x, y, and angle may be provided by the virtual environment widget. The system may then display the video at the location and in the orientation indicated in such a way that the user may see real video blended into a virtual environment. In an example, the system may be emulating a virtual sports bar. The system would insert the video of the game at the appropriate position with the virtual sports bar. A group of friends participating in this virtual sports bar may each be represented by an avatar and interact with one another. The virtual reality widget could provide parameters that would enable the system to keep the video content of the different systems synchronized so that all users are seeing the content simultaneously.

In one embodiment, the system may comprise a video conference system. The video conference system may display a plurality of video containers whose input comprises one or more of live broadcast video, video, and audio input from two or more sites, mirrored computer screens and the like. In some embodiments, the live broadcast video may be synchronized between the different sites in such a way that all participants are viewing the same content simultaneously.

In one embodiment, the system may comprise a financial desk such as that used by financial traders and the like. This embodiment would comprise multiple video containers whose input comprises one or more of live broadcast videos such as financial news, current stock prices and one or mirrored computer screens and the like. The ability to display multiple live video feeds and the computer desktop on the same screen may facilitate the ability of the user to process information without having to switch from screen to screen for different information. Using the video display system of the many embodiments allows the screen to display both the broadcast video and the computer desktop without unduly slowing down the computer.

In one application of this system, the video display system may be placed in medical care environments such as hospitals, doctors' offices, urgent care centers, rehabilitation centers, nursing homes, home health care environments and the like. In addition to the heterogeneous input sources described above, the input of the one or more video containers may comprise one or more of output from various medical devices including device status, physiological measurements such as blood pressure, heart rate and the like, relevant instructional content for devices, patient condition, and the like. A video container may comprise an audio or audio-video call with a health care provider where the call may be initiated by one or the patient or other user or based on a rule set, data received from external devices and the like. Device status messages may comprise informational messages such as low battery, low fluid or oxygen messages and the like.

In one embodiment, the system may comprise one or more remote control widgets. A remote-control widget may provide functionality associated with a remote control associated with one of the input sources. In some embodiments, the remote-control widget would have the look and feel of a remote control associated with a specific input source. A remote-control widget may comprise functionality for remote controls associated with multiple input source devices. There may be distinct remote control widgets for each remote control associated with an input source. Upon selection of a video container, a remote-control widget may "pop-up" displaying one or more of appropriate remote control functionality such as channel controls, sound controls, menus and the like, remote control appearance and the like. A remote-control widget may be implemented using HTML code, JavaScript, JSON, and the like to send control signals to the intended source input. The controls may be sent using one or more of the following methods: by the widget directly through the input port connected to the input source device, via an IP command over the communications network or by sending a request to a cloud-based server or website which may initiate a web call to the intended input source.

Figure 18:
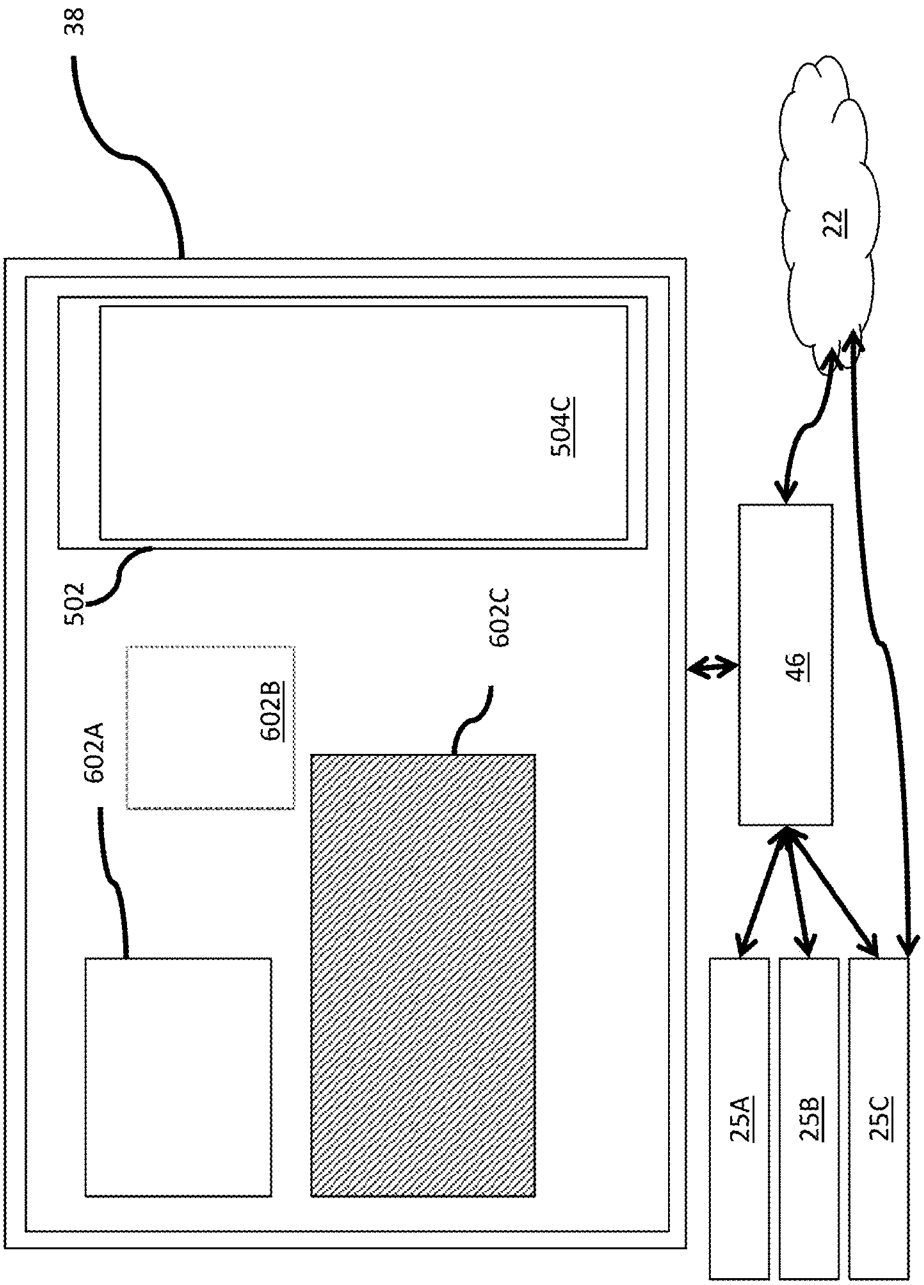
FIG. 18 is a diagrammatic view that shows an embodiment of the remote-control widget in accordance with the present disclosure.

FIG. 18 shows an embodiment of the remote-control widget. The television or display device 38 or other displays comprises three video containers 602A, 602B, and 602C with content from different heterogeneous input sources 25A, 25B, and 25C respectively. Currently, video container 602C is the primary video container and the remote-control display widget 504C is displayed. Some of the input ports may support 2-way communication protocols such as HDMI, IP, and the like. The video display system 46 may send control commands to these heterogeneous input sources 25 using these connections. In some instances, the video display system 46 may send the input controls to a 3rd party server or website using the communications network 22.

In some instances, the remote-control widget 504 may be displayed on a secondary input device such as a mobile device such as a tablet or smartphone rather than on the television or display device 38 or other displays.

Figure 19:
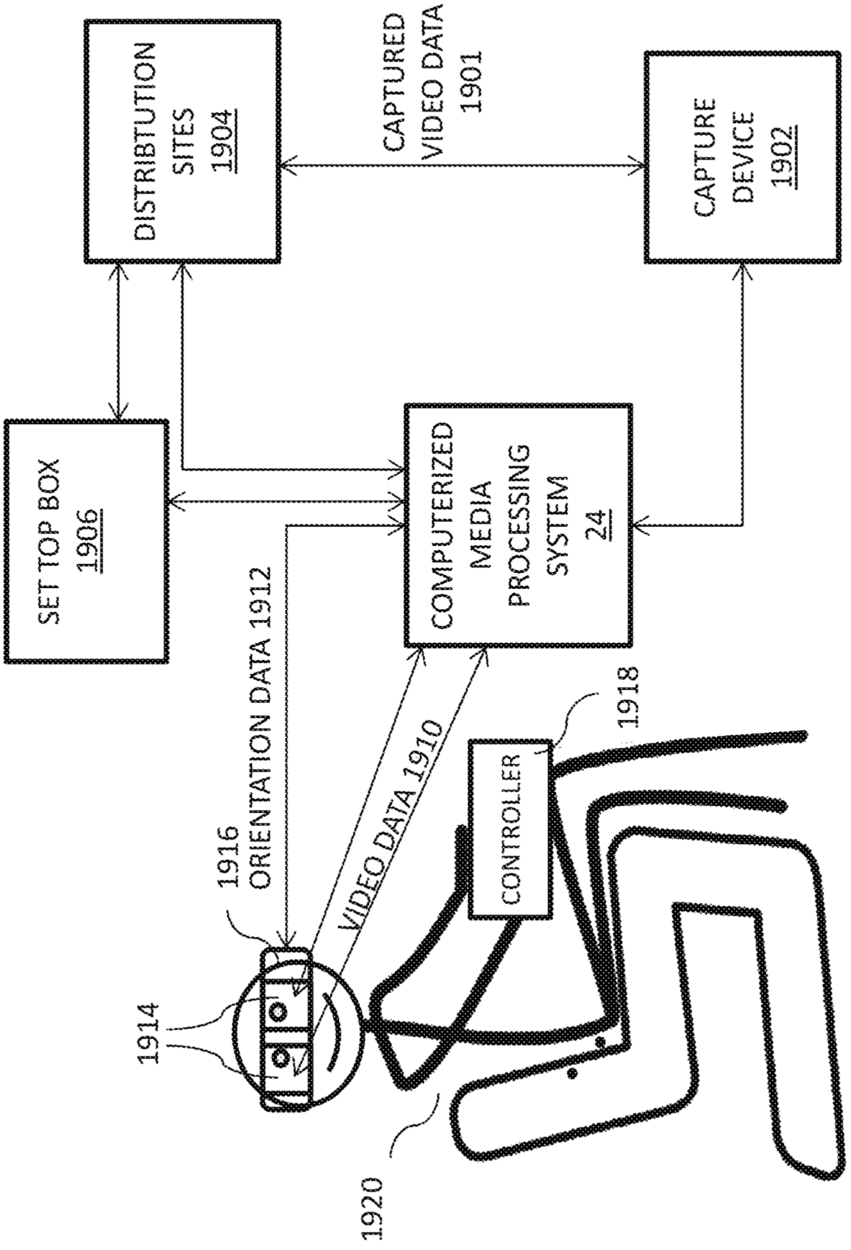
FIG. 19 is a diagrammatic view that shows an exemplary virtual reality system in accordance with the present disclosure.

In embodiments of a virtual reality system, a non-limiting example of which is shown in FIG. 19, a video capture device 1902 may send captured video data 1901 to a distribution site 1904 or directly to a computerized media processing system 24. The distribution site 1904 may broadcast the received video data or further compress the received video data and send the video data to a set top box 1906 via cable, satellite, internet infrastructure or the like. The set top box 1906 may then send the video data to the computerized media processing system 24. The computerized media processing system 24 may be in communication with a virtual reality headset 1916, set of immersive glasses, or the like, where the field of view for each eye is fully occupied by a display 1914. There may be an individual display 1914 for each eye or there may be a single large display where separate portions of the display fill the field of view for each eye. Controlling the content of the entire field of view for each eye may facilitate a fully immersive experience, such as augmented or virtual reality, for the viewer 1920.

Communications between the virtual reality headset 1916 and the computerized media processing system 24 may include video data 1910 and orientation data 1912. The viewer 1920 may have an optional controller 1918 such as a tablet, mobile device, joystick, and the like in communication with the video container system to adjust the field of view, extent view, zoom level, and video content of the virtual reality headset 1916. The viewer may use additional methods of control such as voice commands, hand motions, eye tracking, eye blinking sequences, and the like to alter the field of view, the extent of view, content, presence, or absence of pop-up video containers in the screen, and the like. The computerized media processing system 24 and the virtual reality headset 1916 may be in direct communication either through a local wireless connection, USB, a direct Ethernet connection or HDMI connection. This close connection, in conjunction with the processing power of the FPGA of the video container system, allows the system to respond to inputs, process the full video and extract the portions of interest, do optional 3D processing, or the like, all in apparent real time for the viewer. In some embodiments, the video container system may be embodied on one or more ASICs and incorporated into the virtual reality headset 1916.

The video capture device 1902 may capture a wide field of view up to a full 360-degree horizontal field of view and a full 360-degree vertical field of view, or a subset thereof. In embodiments, the video may comprise data representing up to a +/−180-degree horizontal field of view and up to +/−90-degree vertical field of view. This represents a full sphere of view. In embodiments, the video may represent a smaller field of view, such as a +/−120-degree horizontal field of view and a +/−40-degree vertical field of view, and the like.

The video capture device 1902 may capture a range of resolutions from standard SD and HD video to very high levels of resolution such as 4K, 8K, or 16K per frame. The video capture device 1902 may capture 2D video or extend the information captured to additional data to facilitate 3D viewing of the video such as capturing depth information corresponding to the captured video, capturing two synchronous video streams representative of what is seen by the right and left eyes, and the like.

The video capture device 1902 may capture electromagnetic information outside the visible spectrum such as thermal data, millimeter wave or x-ray imaging data for "x-ray" vision and the like.

The video capture device 1902 may send the high resolution, wide field of view, possibly 3D captured video data 1901 directly to the computerized media processing system 24. This may be done when the video is being captured in the same location as the computerized media processing system 24 and viewer 1920. The video capture device may compress the video data using standard video compression techniques such as those described in H264.MPEG-4, H265, high-efficiency video coding, and the like. The video may be sent in various video formats such as mp4, mkv, and the like where each frame may be an equirectangular projection or geographic projection of the portion of a sphere being captured in the video. The video data may then be uploaded to a distribution site 1904 over Ethernet, using a satellite uplink, and the like.

The distribution site 1904 may decode and broadcast the video. The distribution site may further process the received encoded video to either further encode or decode and perform additional processing such as smoothing out noise, compressing further prior to re-encoding and distributing to individual locations such as to the set top box in an individual home. The encoded video may be transmitted via cable, satellite, internet infrastructure, and the like.

The set top box 1906 may decode the video and send the video data to the computerized media processing system 24 via HDMI. Alternately, the set top box 1906 may act as a pass through and share the encoded video with the computerized media processing system 24 via Ethernet or over a local wireless connection where the computerized media processing system 24 will also decode the video.

Figure 20:
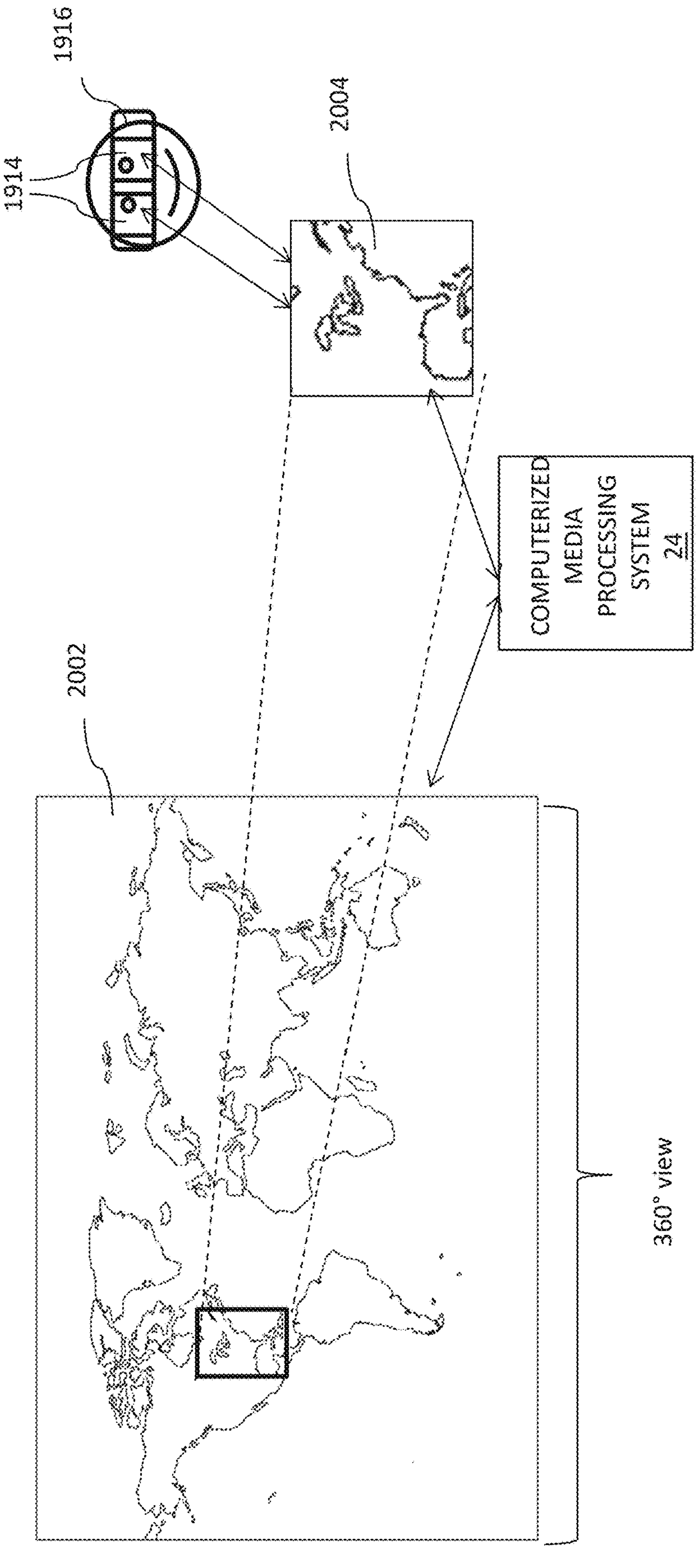
FIG. 20 is a diagrammatic view that illustrates additional details of an exemplary virtual reality system in accordance with the present disclosure.
Figure 21:
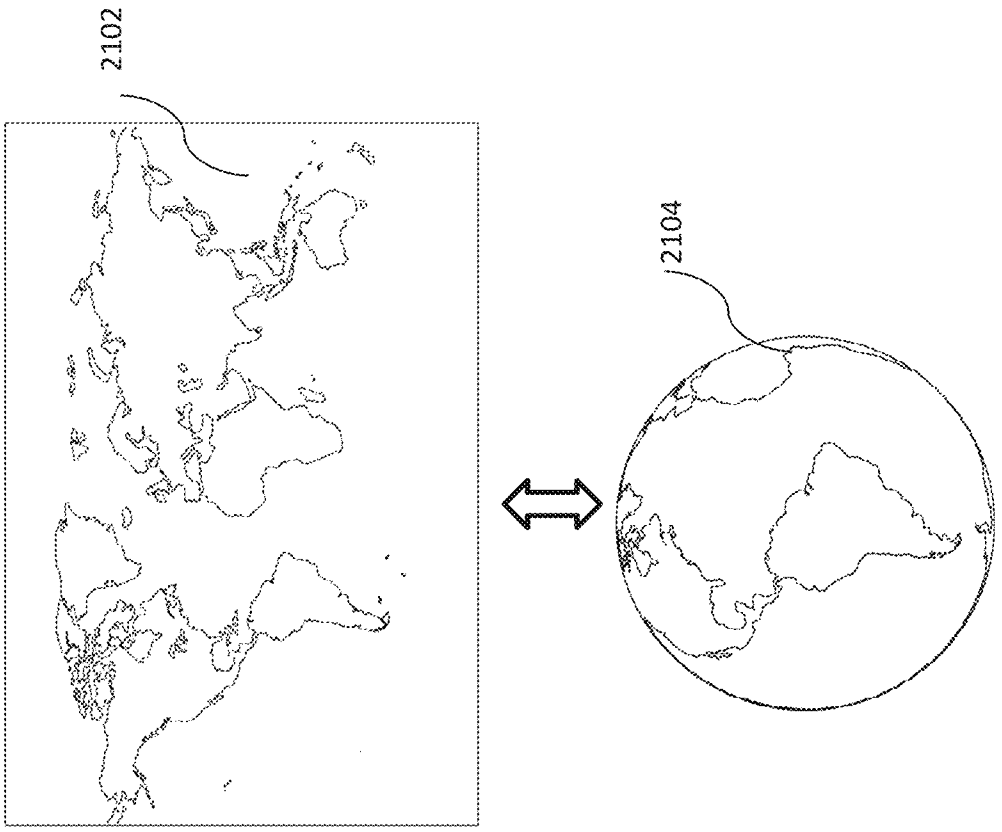
FIG. 21 is a diagrammatic view that illustrates 3D to 2D transformations in accordance with the present disclosure.

As illustrated in FIG. 20, the computerized media processing system 24 may accept the wide field of view video 2002 and then extract a portion of that video 2004 that corresponds to what is seen along a vector of view for the viewer wearing the virtual reality headset or glasses. The size of the extracted portion of the video 2004 may be dependent on the desired field of view of the glasses, the spatial resolution of the video, and the size and resolution of the displays 1914. If the portion of the original video corresponding to the appropriate field of view has insufficient pixels to fill the display 1914, the computerized media processing system 24 may resize the image. If the portion of the original video corresponding to the appropriate field of view has pixels in excess of those needed to fill the display 1914, the computerized media processing system 24 may sample the full-size image as needed. After extracting and sizing the video, the computerized media processing system 24 may provide additional image processing such as noise reduction and sharpening to enhance the image prior to presentation to the viewer. The computerized media processing system 24 may apply special effects to the image such as creating a carnival mirror effect. Depending on the format of incoming video, the computerized media processing system 24 may manipulate the image to account for the curvature of the original as captured in a flat file as shown in the flat map 2102 and globe 2104 of FIG. 21. The system may upconvert the incoming video frame rate to enhance the viewer's experience by generating additional frames through interpolation of two or more frames and other techniques. A minimum of approximately 60 frames per second is recommended to achieve a feeling of immersion and frame rates above approximately 75 frames per second are preferred as the viewer's brain may not perceive flicker readily at that frame rate and above, thus potentially reducing viewer fatigue.

In various embodiments, the vector of view for the viewer may be calculated based on viewer telemetry data from sensors on the helmet showing viewer movement and horizontal and vertical rotation of the viewer's head. The vector of view may be derived from controller 1918 inputs, such as from a joystick or game controller, a smartphone or tablet, and the like. The vector of view may be derived from sensors, external or internal to the helmet, which may measure movement and horizontal and vertical rotation of the viewer's head, whether the viewer is leaning forward or back, eye movements, eye blinking sequences, voice commands, and the like. In addition to the vector of view, viewer telemetry data may be used to manipulate the level of zoom on the video. A "zoomed in" view may result in a smaller field of view. Where the incoming video is a very high resolution this may result in more detail being shown as the viewer "zooms in." Zooming out may result in a wider field of view being shown (if available) but the level of detail may be lower as the video may be sampled to match the display resolution of the virtual reality headset. Other methods of control may include voice commands, hand gestures, eye tracking, eye blinking sequences, and the like. Viewer telemetry data may be supplied to other systems, such as gaming systems, which may generate video content on the basis of the viewer's position and orientation. Viewer telemetry data may be transmitted using wireless, USB, Ethernet, and the like.

In embodiments, the computerized media processing system 24 may accept 3-D video input which may include a left and a right image for each frame, a 2D image with a depth map or other meta-data describing features to be displayed in three dimensions. If the video input includes two images for each frame, the separate image streams may be directed to the left and right eye displays 1914. If the input comprises 2D video with metadata, the computerized media processing system 24 may process the metadata and alter the incoming 2D video based on the metadata to generate a left and a right image to be transmitted to the displays 1914 on the headset. In embodiments, the computerized media processing system 24 may take ordinary 2D video and convert to 3D video in real time. Techniques for real-time conversion of 2D to 3D are known in the art and include techniques such as motion parallax in successive frames, depth cues based on contrast, sharpness, and chrominance within a single image, and the like.

In embodiments, the video capture device may capture video data at a location or situation of interest such as a sporting event, Olympic events, a complex surgery, adult entertainment, in a home to enable someone far away to be virtually present at a family event, at live news events, remote locations such as the moon or underwater, and the like. The video capture device may be located on a robot and allow a remote user to monitor the robot's environment. The ability of the computerized media processing system 24 to blend multiple video sources may further enhance the usefulness of the system by providing informative overlays on top of the video as the viewer looks around the scene.

In an illustrative and non-limiting example, a viewer watching a live surgery may also be able to view one or more of videos of similar surgeries, overlays describing the anatomy being observed, instruction regarding best practices, video conferences with one or more other surgeons, and the like. In another example, a viewer watching a football game may be able to see an overlay with statistics for the players within the current field of view, slow motion repeats of a recent play and the like. In yet another illustrative example, a viewer browsing a store in an augmented reality may see an overlay with information such as a price and description of one or more products within the field of view.

Figure 22:
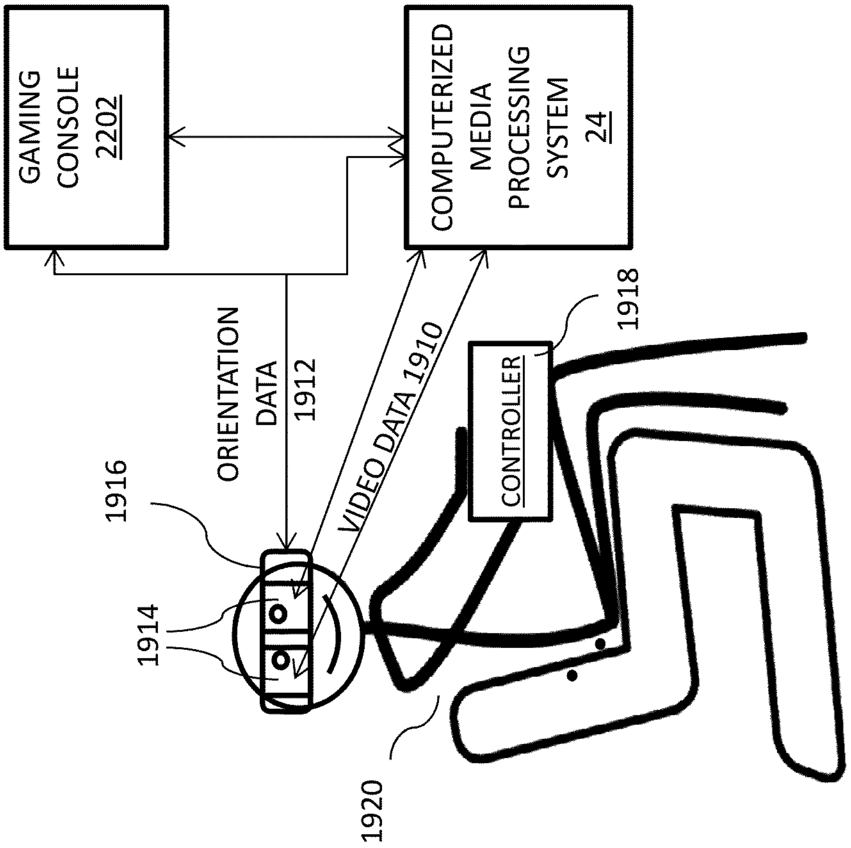
FIG. 22 is a diagrammatic view that illustrates another exemplary virtual reality system in accordance with the present disclosure.

In embodiments of a virtual reality system, a non-limiting example of which is shown in FIG. 22, a gaming console 2202 may send video to a computerized media processing system 24, which may be in communication with a virtual reality headset 1916, set of immersive glasses, or the like, where the field of view for each eye is fully occupied by a display 1914. The virtual reality headset 1916 may communicate viewer telemetry such as one or more of head orientation, eye tracking data, body movement such as leaning forward and back, and the like to the video container system where it may be used to facilitate identification of which portion of video data to send to the virtual reality headset 1916. The controller 1918 may also communicate viewer input to the video container system to facilitate identification of which portion of video data to send to the virtual reality headset 1916. The virtual reality headset 1916 may communicate the viewer telemetry directly to the gaming console 2202 which may use the data to facilitate the identification/generation of the video corresponding to the viewer's orientation and field of view. The controller 1918 may also communicate viewer input to the gaming console 2202 to facilitate identification/generation of video data to send to the virtual reality headset 1916. This generated video may then be passed to the computerized media processing system 24 for transmission to the virtual reality headset 1916. In this embodiment, the computerized media processing system 24 may manage the translation of the video generated by the gaming console 2202 to the virtual reality headset without changing the field of view of the video. Viewer telemetry may be transmitted to the video container system, gaming console and the like using wireless, USB, Ethernet, and the like.

Figure 23:
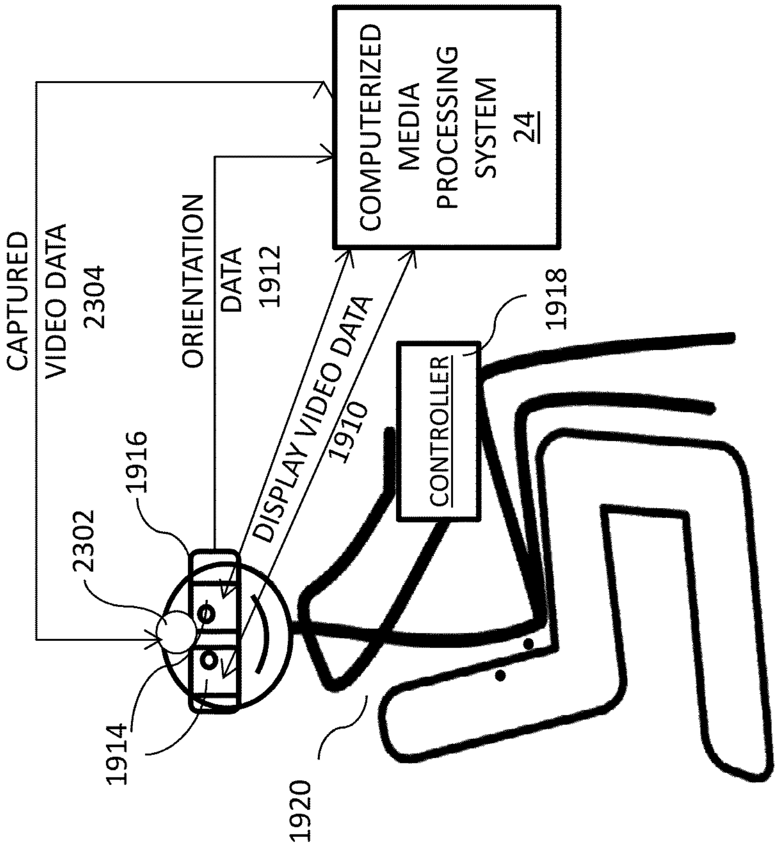
FIG. 23 is a diagrammatic view that illustrates an exemplary virtual reality system with augmented reality in accordance with the present disclosure.

In embodiments, a non-limiting example of which is shown in FIG. 23, a video capture device 2302 may be mounted to or incorporated into the virtual reality headset 1916 or otherwise worn by the viewer 1920. This video capture device 2302, which may be a 2D or 3D capture device, may capture the field of view that would have been visible to the viewer were they not wearing the virtual reality headset 1916. The video data may then be transmitted to the computerized media processing system 24. The computerized media processing system 24 may process the incoming video data and send the processed video to the displays 1914 of the virtual reality headset 1916. Given the rapid signal processing of the video container system 46 may allow the video to process to generate output video in a sufficiently brief time, under the level of human perception, such that the viewer may see substantially the same field of view that would have been seen without the virtual reality headset digitally, and in real time.

This may allow the user to easily switch between augmented reality, seeing what is around the viewer with possible overlays, and an alternate virtual reality. The switch between the views could be initiated with a hand movement, using a controller 1918, eye movement or head movement and the like without forcing the viewer 1920 to remove the virtual reality headset 1916. In embodiments, the viewer 1920 may be immersed in a virtual reality but able to pull up a small view of the immediate surroundings embedded in the larger field of view.

In embodiments, a virtual reality system may use various sensed commands in order to determine an initial desired centered orientation for viewing the video, which may be different for a user depending on a desired viewing posture of the user. For example, when watching a basketball game on a headset of the virtual reality system, a user may desire to lay on the ground with the headset on and watch the game. In such a case, when the viewer is laying down and looking up, the viewer would want to see the center of the court, rather than seeing the rafters of the basketball court. In such a case, when the viewer looks to his left or right, he may view the different parts of the court and view the game action, and when the viewer then looks to his feet, he would see the floor of the court. Thus, a way to communicate to the system a desired centered orientation for the video is needed. In embodiments of the system, head-tracking motion may activate various modes of the system. For example, when a user performs a predetermined sequence of movements with the headset on (e.g., the user initially looks up, then down, then left, then right, or another predetermined sequence), a centering mode may be initialized with information on the headset display screen stating that centering will occur in a predetermined amount of time (e.g., 3 seconds). The position of the user's head after the predetermined amount of time may then determine the desired center of the screen.

Additionally, other predetermined movements, sequence of movements sensed by a telemetry system or the like may allow a user to control various items, such as selecting different content (changing channels), changing volume, etc. The movements may be a user's head, hand, or eye movements, detected by various sensors. Voice commands may also be utilized.

In embodiments, this system may comprise a portion of a video conferencing system. A video capture device in a remote conference location may capture the entire possible field of view for a participant of a conference. In addition to the captured video, audio information could be captured as either mono or stereo and sent to the virtual reality headset as well. This system would facilitate a viewer wearing the virtual reality headset in looking around the conference room as if they were actually present. The viewer would be able to pull up additional video containers with alternate content as described elsewhere herein. Additional content may include a view of the physical environment surrounding the viewer, supporting material for the conference, social media, a game, and the like. The additional content may be shown as a partially transparent overlay on top of the content of the remote video conference.

As described elsewhere herein, the viewer may be able to watch a plurality of different video sources within the virtual reality headset where the different video sources may be displayed in different video containers on the screen, as overlays on top of real-time content, blended with other sources, and the like.

In this disclosure, the term "video content" is used consistently with its use by those skilled in the entertainment technology to refer to video and optional audio programming regardless of transport, encryption or other mechanisms that relate to how the video content is distributed or protected. For example, a movie is video content such as a news broadcast, internet video clip, video conferencing, or video from a security camera. Moreover, the terms "video" and "video content" are defined broadly to additionally apply to internet browsing such as web page viewing and other internet applications, email viewing, closed circuit video, security camera video, and other displayable and/or interactive content. The term "computer" is meant to encompass a workstation, personal computer, personal digital assistant (PDA), wireless telephone, or any other suitable computing device. Terms such as "component(s)," "device(s)" and the like are intended to refer to computer-related entity, either hardware, a combination of hardware and software, software, or software execution. For example, a component may be, but is not limited to being, a process running on a processor, a processor, an object, a reconfigurable hardware object, an executable, a thread of execution, a program, and a computer. By way of illustration, both an application running on a server and the server (or control related devices) may be components. One or more components may reside within a process and/or thread of execution and a component may be localized on one computer and/or distributed between two or more computers or control devices.

The term "near real-time" refers to sensing, detecting, capturing, and/or responding to external events nearly simultaneously (e.g., within microseconds or a few seconds) with their occurrence, or sufficiently fast to meet the expectations of the viewer, such as change a channel and view the new channel video content.

Systems and methods embodying the many present inventions may be programmed in any suitable language and technology, such as Hypertext Markup Language (HTML), Active Server Pages (ASP) and JavaScript. Alternative versions may be developed using other programming languages including but not limited to; C++, Visual Basic, Java, VHDL, other reconfigurable hardware computer languages, VBScript, Jscript, BCMAscript, XML and/or CGI. Any suitable database technology may be employed, such as: Microsoft Access, Oracle Databases, and the like.

Figure 24:
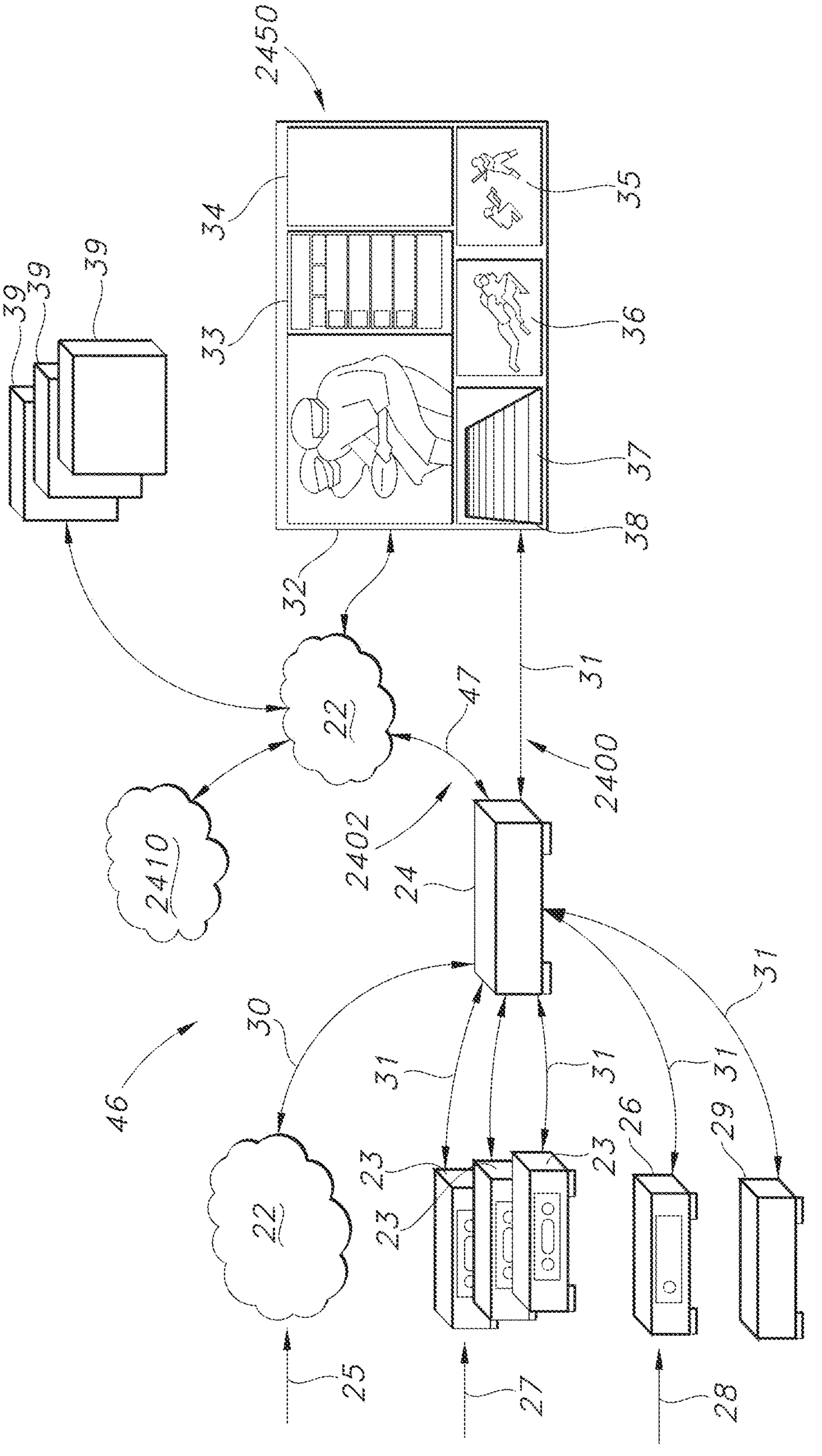
FIG. 24 is a diagrammatic view of an exemplary video display system in accordance with the present disclosure.

FIG. 24 illustrates the many aspects of the present disclosure including a video display system 46 for presenting multiple views of video content or other entertainment that may be displayed on a television 38 or other display device and presented to one or more viewers. The video display system 46 includes a computerized media processing system 24 that may be configured as a software program that runs on a computer and the corresponding hardware or may be self-contained hardware having resident computing capability. The computerized media processing system 24 that may take in many forms video content and other media streams and may produce and direct a video stream 2400 or an IP stream 2402, or both. The video stream 2400 may be directed to a television 38 or other suitable display device that may play the content of the video stream 2400 for viewers. The IP stream 2402 may be directed to a communications network 22, a cloud network facility 2410, other display devices 38, networking computing devices 39, or other suitable destinations on the Internet 28 or into local area networks that may be available through the cloud network facility. Content from multiple heterogeneous input sources 25 may be organized and directed to the video stream 2400 or the IP stream 2402, or both, and displayed as video containers in any display or device receiving the video stream 2400 or the IP stream 2402, or both, such as the television display 38 showing video containers 32, 33, 34, 35, 36, and 37, which may be collectively referred to as video containers 2450.

The heterogeneous input sources 25 may be acquired from communications networks 22, 47 over Internet protocol (or other network protocol), over HDMI cable 31, or other output of a Set Top Box 23 receiving video content 27 from a service provider, DVD, or video game console 29, internet video device 26 that may be connected to the Internet 28, or other device and/or other transport mechanism to get video content. The computerized media processing system 24 may control the access to the video content by a variety of channel or content select mechanisms including but not limited to HDMI channel change commands over HDMI cable 31, Multicast IP leave/join over communications network 30 and other.

The computerized media processing system 24 may take commands from the viewer or viewers using the network computing devices 39 (such as an iPad, iPhone, other mobiles devices, personal computers, traditional and universal remote controls, or others). The network computing devices 39 may be in communication with the computerized media processing system 24 via a communications network 22, or other forms of wireless or wired communication. Examples of such commands may be instructions to resize, position, select content, manipulate properties, manipulate web content, and other control functions that may control the one or more video containers 2450. These exemplary commands and others may determine how the video display system 46 may select content and present video and audio to the viewer in the one or more selected video containers 2450 via the output to the television 38 or other display devices via the video stream 2400 or to the IP stream 2402 to which these exemplary commands are also applicable. In one example, the network computing device 39 and the display device 38 may be the same unit and thus one device may control the video containers 2450 and their content while some or all of the video containers 2450 may be displayed on the same unit from which they are controlled.

The output to the television 38 or other display devices may be selected from many different connectors of mechanisms including but not limited to HDMI cable 31, communications network 47, 22 and/or other wired and wireless options. The computerized media processing system 24 may also re-encode the video to reformat the video containers for many different display devices and may format for transport from the computerized media processing system 24 to the display device including the television 38 or the network computing devices 2604. These formats may include but are not limited to linear broadcast transport stream over IP, file transfer, streaming (also known as over the top video (OTT)) or other.

In one aspect of the present disclosure, each video container 32, 33, 34, 35, 36, and 37, may be displayed on the television 38 and the video content of each of the video containers 2450 may be controlled by the commands issued by viewer from the network computing device 39 of the viewers. Each video container 32, 33, 34, 35, 36, or 37 may display content based on a properties set, such as video illustrated in 32, 35, and 36, video games from a video game console 29 displayed in video container 37 and internet web page or bi-directional application interfaces, as displayed in video containers 33 and 34.

The heterogeneous input sources 25 may include output from one or more of a set top box 23 receiving video content from a service provider, a DVD or video game console 29, an internet video device 26 (connected through an IP network to the Internet 28) such as a webcam, mobile device camera, personal computer camera, surveillance camera, video conference camera, video conference system or other camera, satellite feed, such as for satellite television or radio, connected mobile device such as a tablet, smartphone or other device, local video devices such as a camera or baby monitor, and the like. Content from heterogeneous input sources 25 may be received via IP data streams received via Ethernet, coaxial cable supporting Multimedia over Coax Alliance, MOCA, 802.11, 4G, 5G, or other transmission means and the like, wherein the IP data stream (i.e., input and output) may be compliant with Universal Plug and Play, UPnP, Digital Living Network Alliance, DLNA, RVU and other guidelines, protocols, standards and the like, over HDMI cable 31, output of a set top box 23, DVD or video game console 29, internet video device 26, local video device, mobile devices such as a tablet or smartphone or the like.

The media processing system 24 may control the access to the content of heterogeneous input sources 25 by a variety of channel or content selection mechanisms including but not limited to HDMI channel change commands over HDMI cable 31, Multicast IP leave/join over communications network 30, user interactions with a remote control, user interactions with the native control interface of one of the heterogeneous input sources 25, and the like.

The media processing system 24 may take commands from the viewers using traditional remote controls, one of the network computing devices 39 such as a mobile device like a tablet or smartphone, a computer, a game controller, a wireless keyboard, or the like. The network computing devices 39 may be in communication with the media processing system 24 via the communications network 22. Examples of such commands may be instructions to resize, position, select content, link video containers, manipulate video container properties such as transparency and shape, manipulate web content in the video container, interact with local and web-based applications and other control functions. Those commands may determine how the video display system 46 selects content and presents video and audio to the viewer via the output to a television or display device 38. The network computing devices 39 may also provide video content or other displayable content to the media processing system 24.

Figure 25:
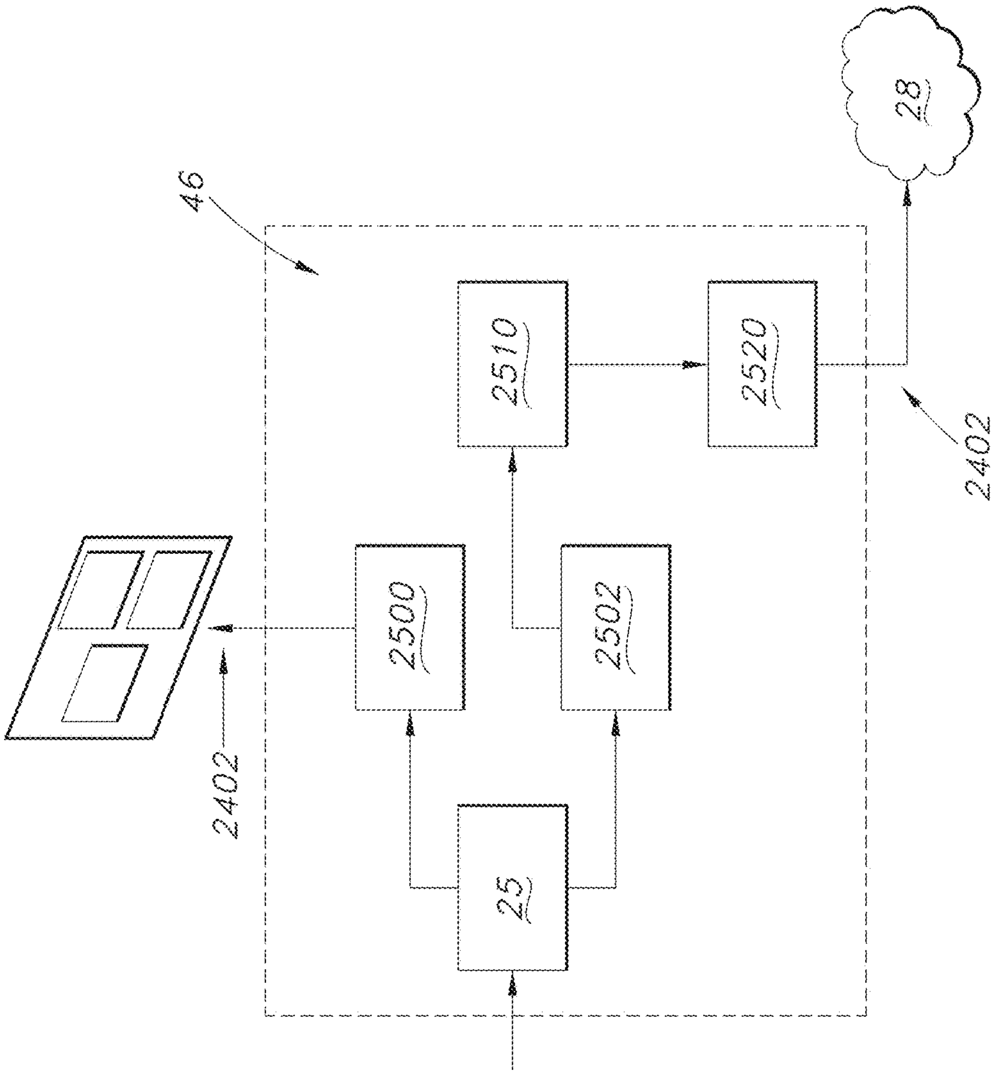
FIG. 25 is a diagrammatic view of the video display system configured specifically to produce a video signal and an internet protocol (IP) stream from its inputs in accordance with the present disclosure.

With reference to FIG. 25 and with continuing reference to FIG. 24, the media processing system 24 may be configured to have a first buffer 2500 and a second buffer 2502 in accordance with the present disclosure. The media processing system 24 may be configured to ingest content from the heterogeneous input sources 25 and display the multiple independent video containers 2450 on the television 38 or other display device, and also route the video containers 2450 to the IP stream 2402. By way of this example, the media processing system 24 may direct content to the first buffer 2500 when one or more of the video containers 2450 are selected to be sent to the television 38 or other display device. When one or more of the video containers are selected to be sent to the IP stream 2402, the media processing system 24 may direct that content to the second buffer 2502. The buffering capability of the first buffer 2500 need not be the same as the second buffer 2502.

The content of the video containers 2450 sent to the IP stream 2402 may be directed through a video compression facility 2510 that may compress the content of the one or more video containers 2450 directed the IP stream 2402 to make the content suitable for access from the Internet 28 through streaming applications, mobile platforms, or the like. In doing so, the content through the first buffer 2500 with the selected video containers 2450 may be directed to the television 38 or other display device without the need to be directed through the compression facility 2510 otherwise used for content through the IP stream 2402.

In the various aspects of the present disclosure, the video compression facility 2510 may use h.264 or MPEG-4 AVC video compression technology and direct the content in the video containers 2450 to the processer 2520 that may prepare and send the content to the IP stream 2402. The IP stream 2402 may be directed to the cloud network facilities 2410 for on demand access, live streaming facilities such as YouTube for live streaming, or other applications or environments as needed. In the various examples, the viewers may coordinate the content of the video containers 2450 through the IP stream 2402 and the video stream 2400 to the television 38 or other display device to coordinate their experience with the media on multiple platforms.

In further aspects of present disclosure, the media processing system 24 may be configured so that some of the content ingested by the media processing system 24 and displayed in one or more of the video containers 2450 may be from a protected source that may limit display of such content through a paid subscription service, licensing structure, digital rights management, or the like. The protections for the content may not permit direction or display of the protected content to or on the Internet 28 through the IP stream 2402. The media processing system 24 may be further configured to direct the protected content of the one or more video containers 2450 only to the video stream 2400 to the television 38 or other display devices 38 and to restrict the direction of such protected content to the IP stream 2402.

In further aspects, the media processing system 24 may deliver the protected content to the IP stream 2402 but in doing so the protected content is infused with in-line advertising content as one way to monetize the protected content. By way of this example, the media processing system 24 may be configured with a first buffer for blended content from the heterogeneous input sources 25 and a second buffer for receiving the same blended content but with advertising content in-line or baked into the protected content. Content from both of the buffers may be sent to the compression facility 2510 and processor 2520 to upload into the IP stream 2402 and therefore portions of the IP stream 2402 may include content with advertising in-line with the content (i.e., an IP stream with advertising), but may also include content devoid of advertisements (i.e., an IP stream without advertising). The video display system 46 may be configured so as to make the IP stream without advertising available at a different price point relative to the IP stream with advertising. The IP stream with advertising may also be made available with no charge but then advertise for access for a fee to the IP stream without advertising. It will be appreciated in light of the disclosure that advertising blockers may be configured to defeat or remove advertising that is layered over or connected to the IP stream with advertising, but adding advertising content in-line and therefore baked into the protected content may make it more difficult to remove the advertising content and it may be shown that advertising viewership may be increased accordingly.

Figure 26:
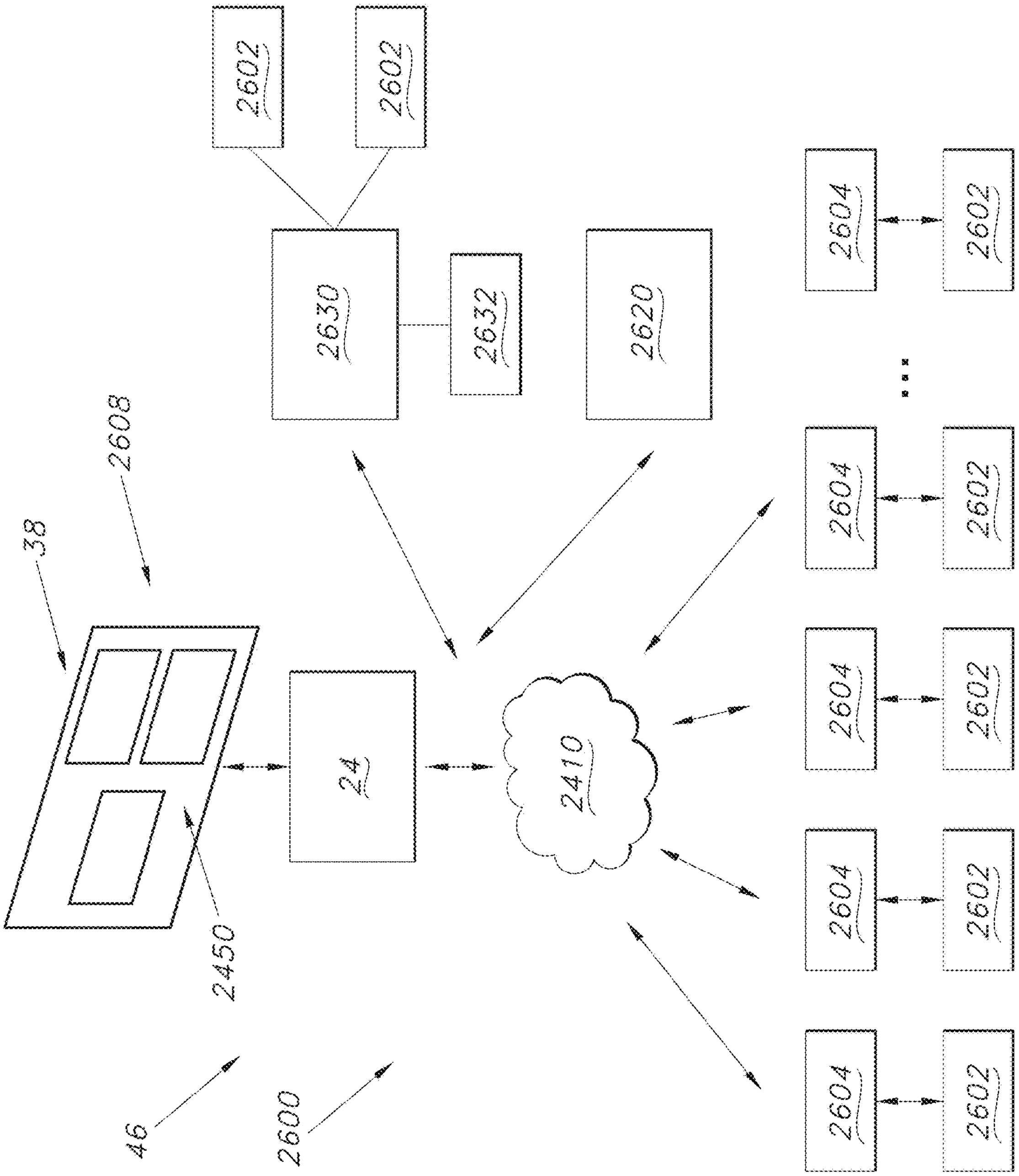
FIG. 26 is a diagrammatic view of the video display system configured to facilitate collaboration, provide specialized audio feeds, and encourage live interaction in a venue in accordance with the present disclosure.

With reference to FIG. 26 and continuing reference to FIG. 24 and FIG. 25, the video display system 46 may be configured in accordance with yet further aspects of present disclosure. In these aspects, the media processing system 24 may be configured to facilitate live audience participation feedback and collaboration platform 2600 that may be hosted and controlled by the video display system 46. The platform 2600 of the media processing system 24 may configured to connect with multiple users 2602 in a live audience through network connected devices 39, 2604 that may be mobile devices of each of the users 2602, devices provided by the venue hosting the live audience such as kiosks or table top tablet computers, or the like. The media processing system 24 may display multiple video containers 2450 (FIG. 24) on one or more televisions 2608 or other video display devices 38 visible to the live audience. Each of the video containers may contain different programming. In one example, one video container may display one sporting event while other video containers may display other sporting events. By way of this example, a relatively important sporting event may be on the largest of the video containers (and likely one of the larger screens), while relatively less important sporting events may be displayed on smaller video containers on the same display or other displays visible to the live audience. Moreover, other video containers may be dedicated to the sporting event that is displayed on the largest of video containers (e.g., one whole display to itself) by displaying ancillary information in support of the “main event.” By way of this example, the relatively important sporting event may be displayed in the largest of video containers while an IP stream 2402 may be sent to other video containers to display for example statistics of players currently making plays, team and venue information, replays of live content, or the like.

In further aspects, the users 2602 in the live audience may use their connected network devices 2604 to collaboratively change the properties or content or both of the video containers 2450 on the TV display 2608. In one aspect, the users 2602 of the live audience may take part in a competition where the winner of the competition is awarded their request for content and properties for some or all of the video containers 2450. As such, all of the users 2602 may vote on candidate configurations of the video containers so certain content may be in larger video containers relative to other content that may be in other relatively smaller video containers. In other aspects, the size and configuration of the video containers may remain constant but the users 2602 of the live audience may vote for what content is displayed in the video containers 2450. By way of the above examples, the video display system 46 may facilitate the interaction of the users 2602 in the live audience and the input of the users 2602 through their connected network devices 2604. The input from the users 2602 may be considered by the media processing system 24 or may be considered by a third-party gaming service 2620 available through the cloud network facility 2410 and in turn used by the media processing system 24. Based on the input from the users 2602 and when applicable the winning votes, the configuration, properties, and content of the video containers may be automatically changed on the televisions 38 or other devices that are visible to the users 2602 in the live audience.

In the various aspects of the present disclosure, the interaction of the viewers in the live audience and the input of the viewers through their connected network devices 2604 may occur in a live venue with a closed audience such as a tavern, amphitheater, or local music or sports venue. In further aspects, the interaction of the viewers in the live audience and the input of the viewers through their connected network devices 2604 may be in a live venue where the viewers are all in close proximity, or the viewers are remote and streaming the content, or both. In various aspects of the present disclosure, the content displayed in one or more of the video containers 2450 is live (not pre-recorded) or close to real-time. In other aspects, the content displayed in one or more of the video containers 2450 is pre-recorded. As such, the content may contain live content or all of it may be pre-recorded; but the video display system 46 may collaborate with the live audience that is local or remote or both. By way of this example, a live video and audio capture facility 2630 may capture live interaction with users 2602, live entertainment, live sports, live current events, or the like. It may be shown that interaction with a viewer may retain the viewer longer relative to only one-way communication of video and audio content. It may also be shown that advertising for content in the video containers may be more valuable the longer the viewer may be retained, and retention may improve with more interaction. In the further aspects of the present disclosure, the video display system 46 may provide games, social media, dating and matching services, and chatting functions with the viewers in the live audience. The activities may be coordinated by the video display system 46 at the venue and the viewers may use the games, social media, dating and matching services, and chatting functions to chat with other viewers or a group of viewers directly that are at the venue, remote to the venue, or both. In this example, the live video and audio capture facility 2630 may be used to capture real-time reactions and results and may also be used to further add to the profiles of the users 2602. The live video and audio capture facility 2630 may be used to also capture real-time reactions and results from a live audience 2632.

Figure 45:
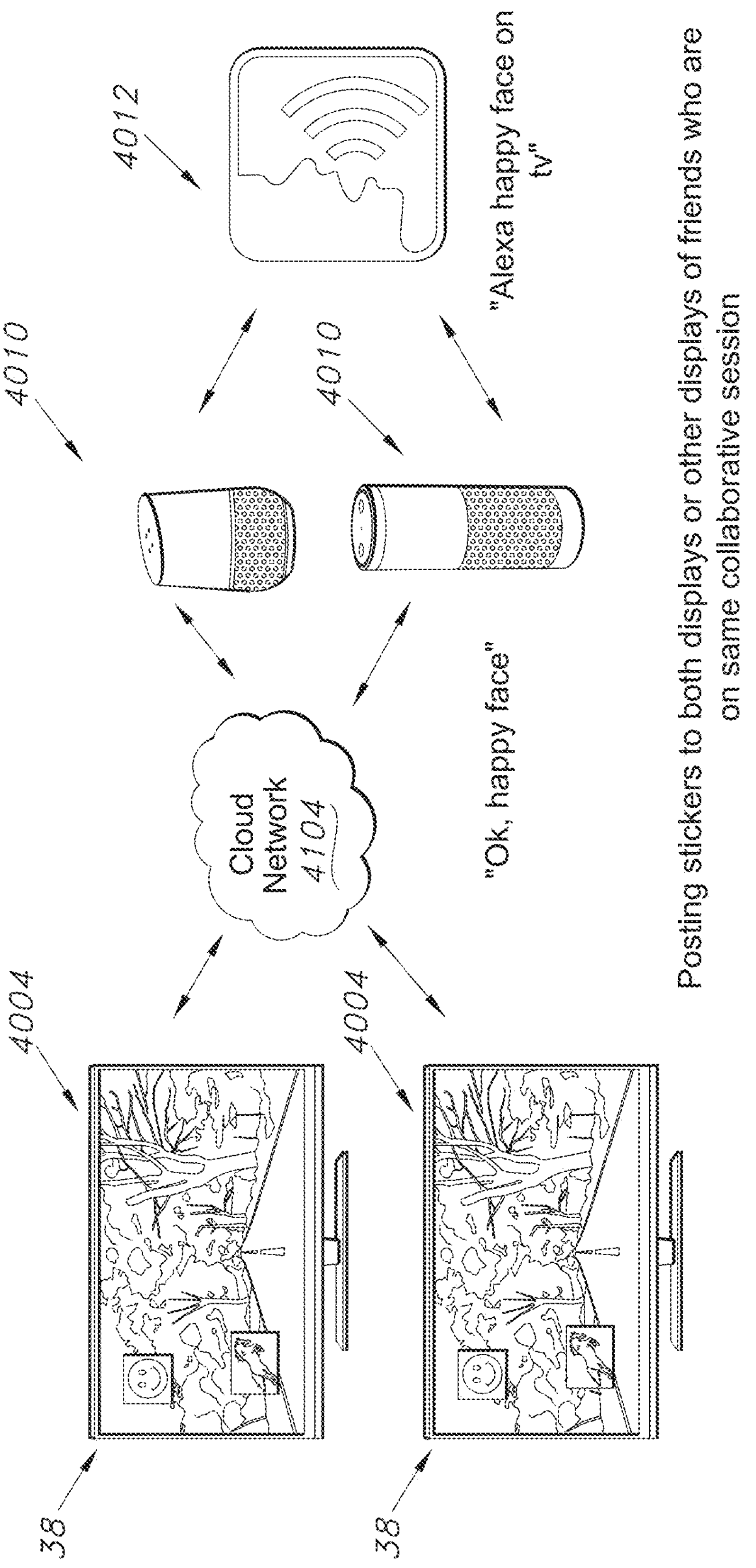
FIG. 45 is a diagrammatic view of the video display system configured to control the video display device so that the consumer may insert and react with emojis, characters, notes, graphics, pictures, that are placed on the video display device by speaking the commands to the voice integration units in accordance with the present disclosure.

In the further aspects of the present disclosure, the video display system 46 may provide characters displayed in video containers that may be controlled cooperatively or competitively by the viewers. In one example, a cartoon character may be generated and displayed in one of the video containers. In further examples, overlay content 4500 in the form of smiley faces 4502, pictures 4504, check marks, other emoji, and annotations, or the like based on activity occurring already on the video display device 38, as depicted in FIG. 45, may be generated and displayed in one of the video containers 2450. The users 2602 through collaborative interaction may move the character or other content around the TV display 2608, pose the character, make it dance, or the like. Multiple characters may be created, and each may be assigned to subset of the users 2602 or to single users 2602 so as to facilitate a streaming puppet show through interaction with users 2602, their connected network devices 2604, and interaction with the TV 2608 of the video display system 46.

In the various aspects of the present disclosure, the interaction with the users 2602, attendees in the live audience, and combinations thereof may be made available by including advertising content in the experience. As such, the advertising content may be displayed with the content displayed in the video containers 2450. The advertising content may also be displayed in one or more video containers dedicated to advertising. The advertising content may also be displayed on one or more of the network connected devices 2604 that may connect to the media processing system 24 to allow the users 2602 or other viewers to collaborate with the video display system 46 through interaction with the video display system 38. In further aspects, the users 2602 may purchase premium interaction features for the video display system 46 that may permit the users 2602 to avoid advertising content on their network connected devices 2604 when interacting with and controlling the content in the video containers 2450 on the video display system 46. The users 2602 may also purchase premium interaction features for the video display system 46 that may permit the users 2602 to avoid additional advertising content altogether whether on their television 38 or other display devices, or through a connection to the IP stream 2402.

In the various aspects of the present disclosure, the interaction with the users 2602 in the live audience, other attendees, and the input from the users 2602 through their connected network devices 2604 may also permit the users 2602 to receive an additional audio feed while in the live venue (or any location), especially in louder venues such as sports bars, amphitheaters, and music and sports venues. While interacting with the video display system 46 or simply connected to it, the users 2602 is able to select one of the video containers 2450 from which to receive the audio feed to the network connected device 2604 of one of the users 2602. One of the users 2602 may, in turn, use wired or wireless earphones or speakers with their network connected device 39, 2604 and hear the audio from the content from one of the video containers 2450 better than what could be heard individually through the usual venue speaker system or just normal sound propagation through the venue.

Figure 27:
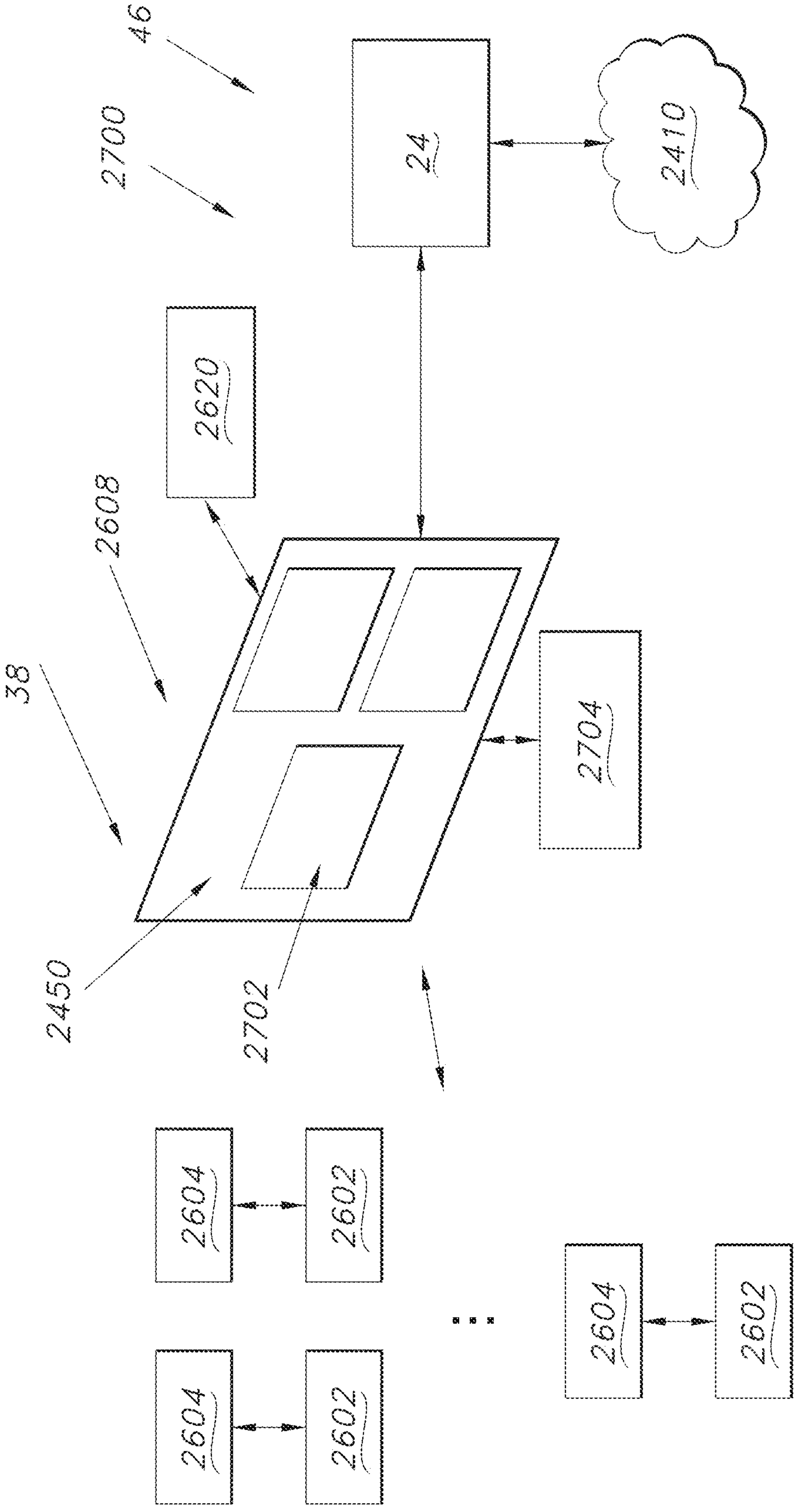
FIG. 27 is a diagrammatic view of the video display system configured to provide collaboration and teleconference and telepresence functionality in accordance with the present disclosure.

In the various aspects of the present disclosure, the video display system 46 may be configured to provide a teleconference and telepresence system 2700, as shown in FIG. 27, by providing one or more of the video containers 2450 dedicated to a video conference stream 2702. The video conference stream 2702 may be from Skype™, Facetime™, Google Hangouts™, or other conference systems that use audio and video, or audio only. The video conference stream 2702 may also be obtained from various collaboration systems, video conferencing systems, and other video distribution systems, including third-party video conferencing and distribution systems that may interact with the video display system 46. Cameras and microphones 2704 may capture video, images, and audio from the users 2602, attendees, or other views in proximity to the video display device being used by the teleconference and telepresence system 2700. The users 2602 may acquiesce control to the presenter to the extent that the content and properties of all of the video containers 2450 may be controlled by the presenter. The users 2602, however, may retain control and the teleconference feed that may be delivered to one of the video containers 2450 and the other video containers 2450 may be utilized during the teleconference for other matters related or unrelated to the teleconference feed, including additional teleconference feeds between which the users 2602 (or one of the users 2602) may select for interaction while other teleconference feeds may remain in a listen-only state.

In the various aspects of the present disclosure, the video display system 46 may configure one or more of the video containers 2450 to be floating above other content in other video containers 2450 so that one of the video containers 2450 may layer or partial layer over other video containers 2450. In these examples, one of the video containers 2450 that is configured to float above other video containers 2450 may be sized to any shape including shapes that change with content in the selected video container 2450. One of the video containers 2450 that is configured to float above the other video containers 2450 may be used for advertising. In one example, one of the video containers 2450 configured to float above other video containers 2450 may be shaped like a cartoon character dressed in sponsored content that walks across the television 2608 or other display devices 38. By way of the above example, the cartoon character dressed in sponsored content may travel so as to appear on the screens of one or more network connected devices 39, 2604 of the users 2602 that may interact with the video display system 46 and may be used as part of games or giveaways based on the location of the cartoon character.

The video display system 46 may also be configured so that one or more of the video containers 2450 may be floating above other content in other video containers 2450 so that one of the video containers 2450 may layer or partial layer over other video containers 2450 and display content selected by or delivered from an internet advertising connector. One such connector is known as Twitch™. Placement of such advertising may be done automatically. In examples where the users 2602 or other viewers are connected through the IP stream 2402 to a live internet broadcast or similar event, advertising content may be pushed from a host of the IP stream 2402 to users 2602 and other viewers through the video display system 46. Advertising content may be added live during a show, an event, or the like on the video display device 38 by a host of the IP stream in full screen, part screen, overlays, floating transparent overlays, or a host of other options. The advertising content may also be configured to be interactive with the users 2602. In one example, an advertisement for a beverage is run and includes the directions for all who are watching "to press your approve button on your phone." In this example, when 2,000 of the users 2602 hit their approve button on their network connected devices 39, 2604 within a predetermined duration, such as the next 15 seconds, all of the users 2602 who hit their approve button may receive a coupon for free beverage from the advertiser sent directly to their network connected devices 39, 2604. In these examples, the video display system 46 may make this type of deep interaction advertising possible and may provide analytics on the experience based the interaction of the users 2602, their connected network devices 39, 2604, interaction with the teleconference and telepresence system 2700, and the like.

Figure 28:
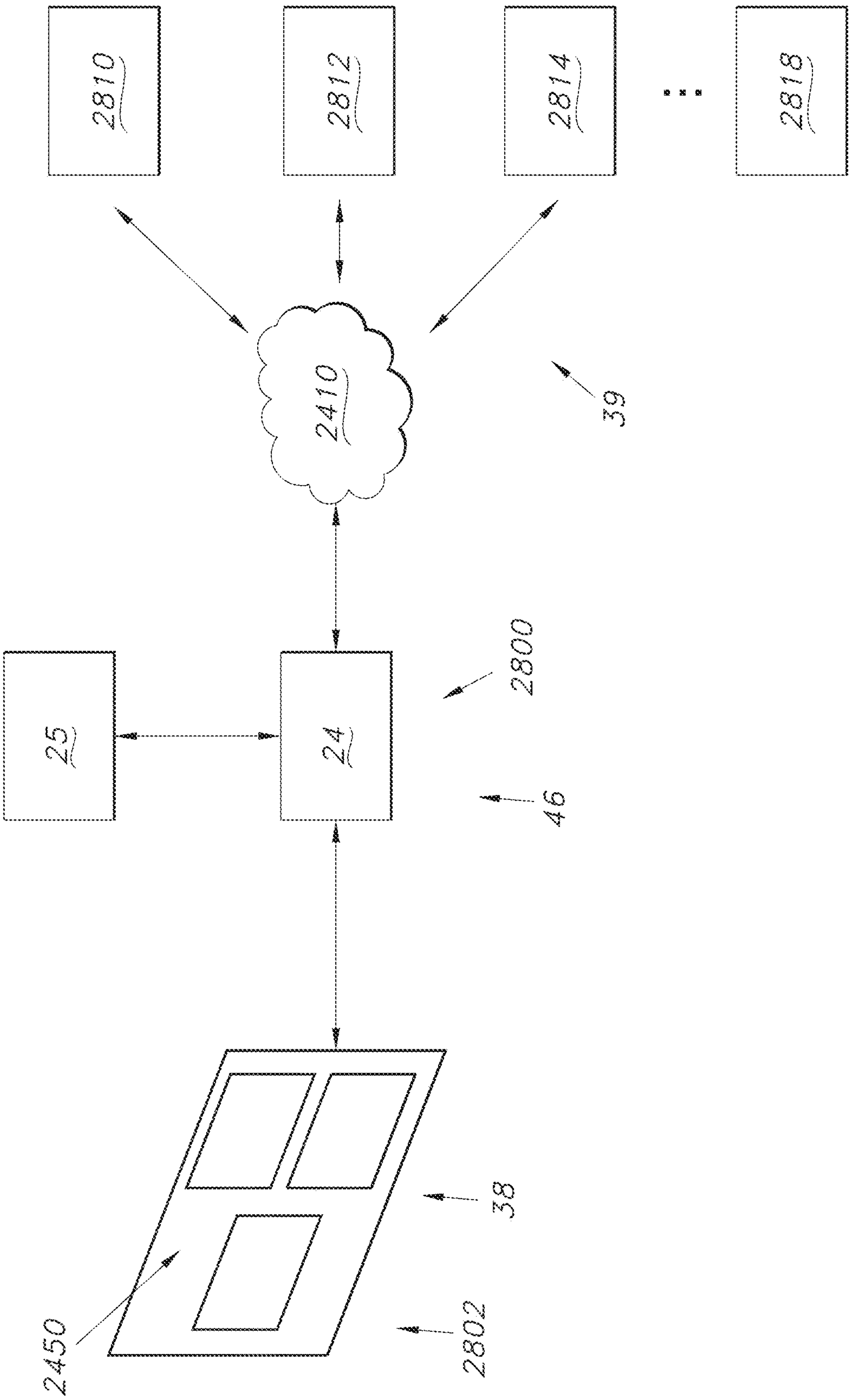
FIG. 28 is a diagrammatic view of the video display system configured to facilitate control of overlays, layers, and layouts individually controllable on the display device and through screens from IP streams received on network connected devices in accordance with the present disclosure.

With reference to FIG. 28 and continuing reference to FIG. 24 through FIG. 27, the video display system 46 with a streaming and cloud display system 2800 may include displaying video containers 2450 with different content from multiple heterogeneous input sources 25 on a TV display 2802 and on the screens of multiple network connected devices 39 connected to the video display system 46 such as a tablet 2810, a PC 2812, a mobile device 2814, another display 2818 receiving one of the IP streams 2402 (FIG. 25). By way of this example, the video display system 46 may provide a layout and arrangement of the video containers 2450 on the TV display 2802 of the video display system 46 and then provide another layout on each of the network connected devices 39. By way of this example, the streaming and cloud display system 2800 may allow the user to individually control each of the layouts on one or more the video display devices 38 including the TV display 2802 and on each of the screens of each of the network connected devices 39 including each of the tablet 2810, the PC 2812, the mobile device 2814, the additional display 2818 receiving one of the IP streams 2402 and/or another video stream 2400.

Figure 29:
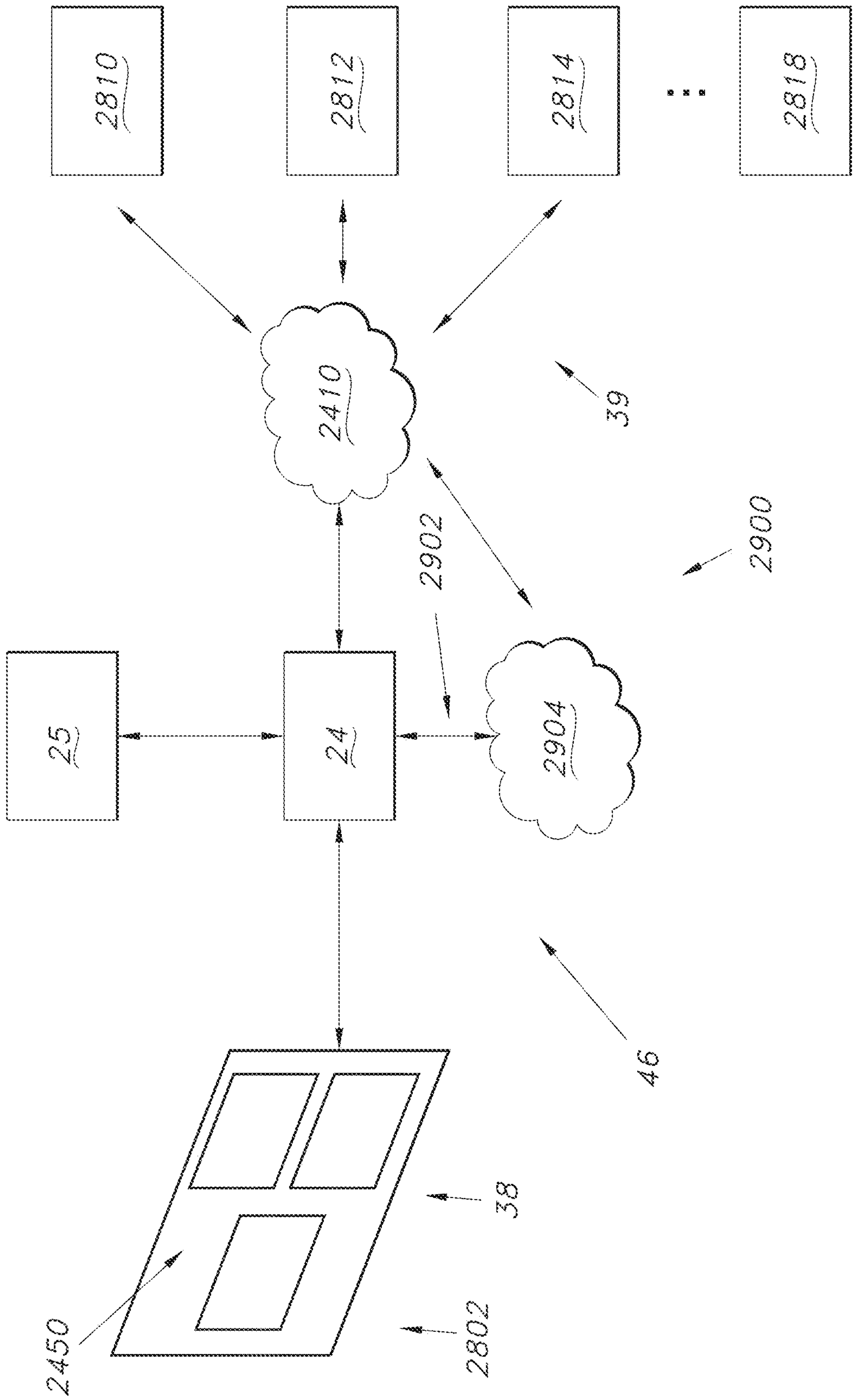
FIG. 29 is a diagrammatic view of the video display system configured to provide a closed diagnostic feedback loop to confirm session duration and status in accordance with the present disclosure.

With reference to FIG. 29 and continuing reference to FIG. 24 through FIG. 28, the video display system 46 may include a feedback application 2900 to ensure the video display system 46 is functioning properly and has sustained and sufficient connectivity to suitable cloud network facilities 2410. The video display system 46 may generate a diagnostic IP stream 2902 that may be configured so its receipt as one of the heterogonous input sources 25 may confirm the correct connectivity of the video display system 46. As such, the video display system 46 may perform diagnostics and try and re-connect when the diagnostic IP stream 2902 is not available at the one of the heterogeneous input sources 25. In one example, the feedback application 2900 may include playing application module 2904 that may pose as another one of the user 2602 or another network connected device 39 so that its connectivity in the experience is linked back to the video display system 46 to confirm the connectivity of the session and the users 2602 in the session. In these examples, users 2602, viewers, and attendees whose connection may be confirmed by the feedback application 2900 may be shown to more valuable to advertisers because the video display system may confirm the connectivity and success of the session.

Figure 30:
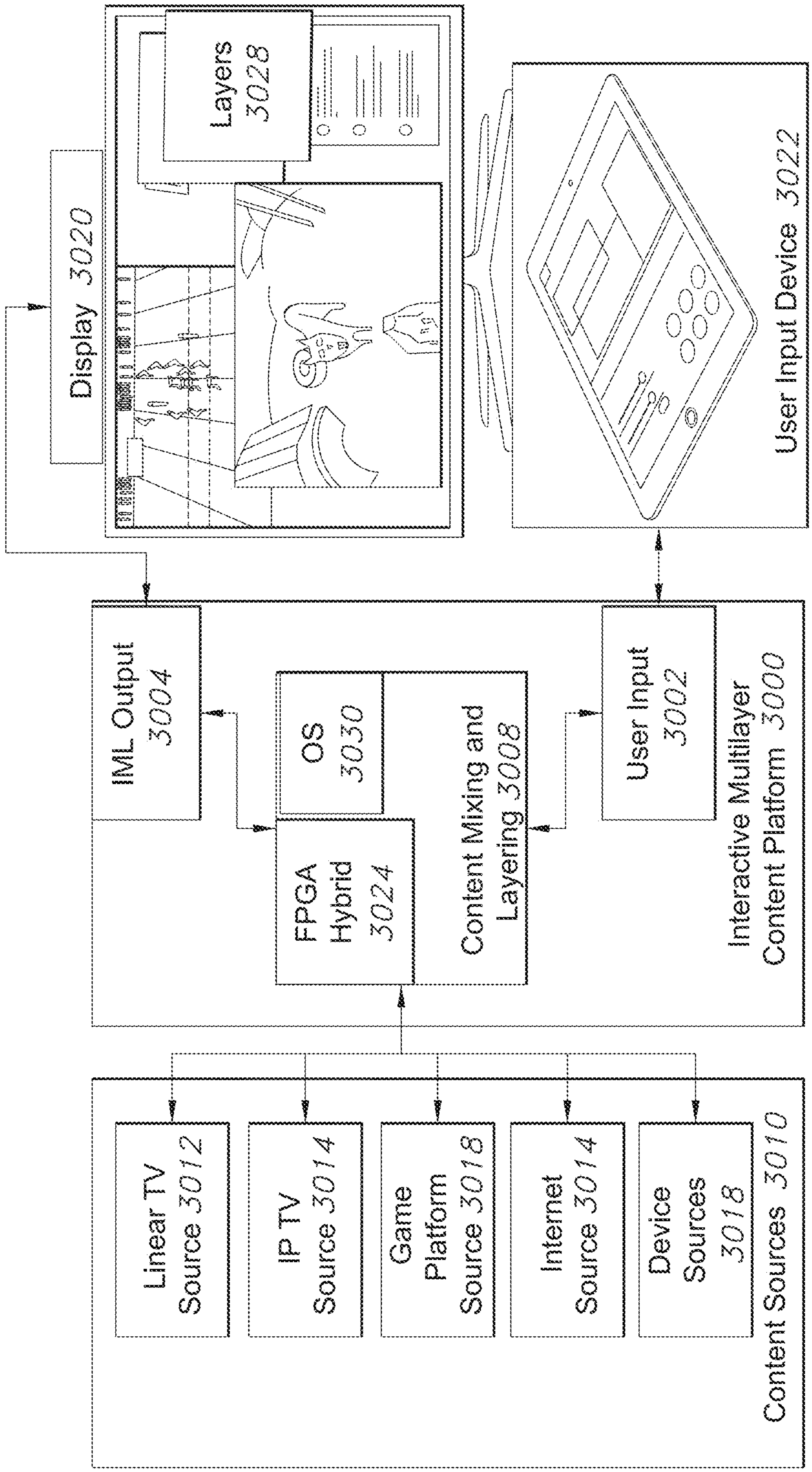
FIG. 30 is a diagrammatic view of the video display system configured to provide an interactive multi-layer content platform for providing interactive multi-layer (IML) output for a display, such as an LCD, LED or other large screen used for television, or the like in accordance with the present disclosure.

Referring to FIG. 30, a platform 3000 is provided, referred to herein as the interactive multi-layer content platform 3000 for providing interactive multi-layer (IML) output for a display 3020, such as an LCD, LED or other large screen used for television, including any projection systems, mobile devices, tablets, laptops, holograms, displays that project on to the glass of an eye glass lens, 3D/360 multi-display systems headsets or full rooms, transparent screens and wall display systems, or the like. In embodiments, the platform 3000 may have various methods, systems, components, services, processes, functions, and other elements described throughout this disclosure and in the documents incorporated herein by reference. The platform 3000 may include hardware processing elements, such as for processing video and computer content, such as one or more FPGAs 3024 and various software elements, such as an operating system 3030 that includes various components, systems, modules, services, code elements programs, functions, objects, and the like for handling inputs, processing (including content mixing and layering), outputs, and other capabilities described herein.

Under control of a user, such as through use of a user input device 3022 (such as a touchscreen of a mobile phone, tablet, remote control, home automation controller or the like), content may be flexibly and interactively mixed and layered on a display 3020, such as appearing in various layers of varying size, shape, position, transparency, etc. Layers 3028 may include various heterogeneous types of content, such as video or other audiovisual content, from various, optionally heterogeneous content sources 3010, such as linear TV sources 3012 (such as ones to which a user may have subscribed through a cable TV provider, a satellite TV provider, a network provider, or the like), IP TV sources 3014, game platform sources 3018 (such as from various proprietary gaming platforms such as the Xbox™, PlayStation™ Wii™ Switch™ and other platforms provided by Microsoft™, Nintendo™, Sony™ and other game platform providers, as well as online and PC-based gaming platforms), Internet sources 3014 (such as available through various Internet providers), and device sources (such as web cameras, security cameras, doorbell cameras and other camera sources, including for Internet of Things devices, as well as content streams from such devices, such as text, audio, animation and other audio or visual content streams, such as from smart speakers, IoT devices, home automation devices, and the like). Based on user input 3002 received from a user input device 3022, the platform 3000 may perform content mixing and layering using a content mixing and layering system 3008, rendering an interactive multi-layer (IML) output stream 3004 to the user's display 3020 that defines and renders the mix and layout of the layers 3028 at any given time. This may allow a user to place, size, resize, overlay (with desired degrees of transparency or opacity) any kind of content on desired screen locations on the display 3020, including mixes of content of different types (such as creating a mixed display of a video game being played by the user with content from an in-home camera, a TV show, and a web site). Users may take advantage of pre-stored templates and forms or may elect to organize their displays 3020 entirely according to their preferences. These and other features described throughout this disclosure and in the documents incorporated by reference herein may be enabled in various embodiments of the platform 3000.

In embodiments, source content from the content sources 3010 is fed into one or more hybrid processor and field programmable gate arrays (FPGAs), referred to as FPGA hybrids 3024, which may be programmed (and field updated) to handle mixing and layering of content to form the IML output stream 3004 for a given display 3020 or set of displays. In embodiments, the platform 3000 may be provided with distributed components in various arrangements and architectures, such as involving components located on the premises of a user or customer (such as where at least some components of the platform 3000, such as an array of FPGA hybrids 3024 are integrated into a box with input ports that accept inputs from a user's content sources 3010 and with an output port that feeds IML output stream 3004 to the users display(s) 3020). In other embodiments, one or more components, such as FPGA hybrids 3024, may be embedded or integrated into a display 3020, such as being included in the architecture of a large-screen TV, such that content mixing and layering may occur within the display device 3020 itself. In other arrangements, including ones described in the current disclosure, components of the platform 3000 may be located in a cloud computing platform and architecture, such as using new cloud computing platform capabilities that allow users to control, configure and use FPGA hybrids 3024 that are located in the cloud.

In embodiments, the layers 3028 handled by the OS 3030 may use web content, such as HTML 5 widgets, Flash animation elements, other visual presentation objects, or custom program applications in any operating systems like Linux™, iOS™, Android™ Windows™, or the like. The layers 3028 may be independent and simultaneously operating input channel into memory that the output pulls from to send to the display. Each input may run in its own "lane" and may be unaware of other inputs. This may create a system where all content sources may run in parallel, in independent multiple layers, then the user may interact with the system to move the layers back and forth, such as in the z-plane, or resize them, or perform video effects like green-screen or transparency on the layer, relative to the other layers. Further, the user may now interact with one or more web pages or other programmable applications running in one or more layers in the stack that may be an adjacent or transparent overlay to layers such as TV video programs. In doing so, the display may be turned into an interactive system that can be programed and reprogramed at will.

Figure 31:
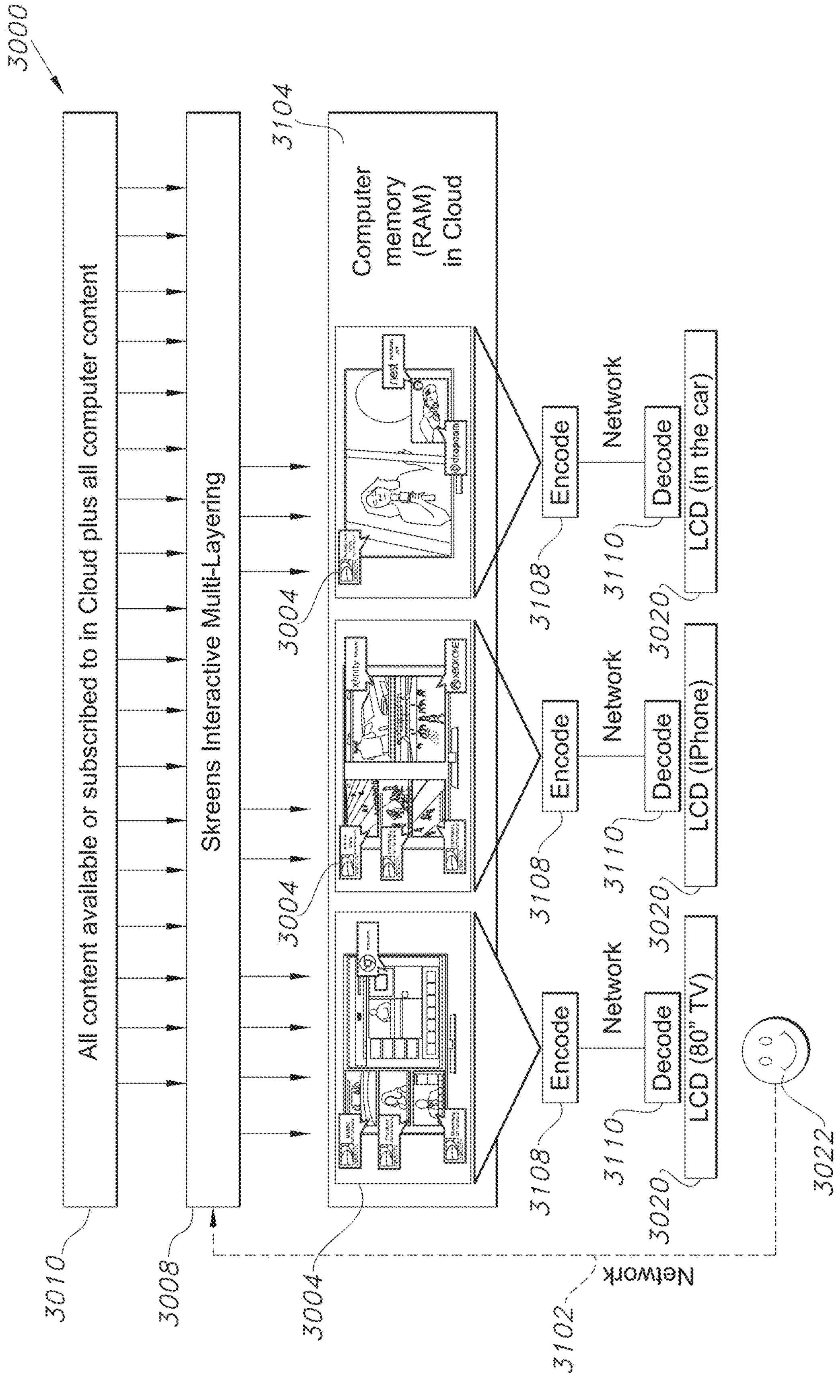
FIG. 31 is a diagrammatic view of the video display system configured to provide a cloud architecture for the platform allowing massively parallel processing with the highest available content quality delivered to any display in accordance with the present disclosure.

FIG. 31 depicts an architecture in which a cloud architecture for the platform 3000 is provided, allowing massively parallel processing with the highest available content quality delivered to any display 3020. The user controls and interacts with the platform 3000, such as using a user device 3022, over a network 3102 to change what is presented on the user's screen and how it is presented. The user's TV content is in the cloud and transferred in real time to one or more desired displays 3020, configured according to user preferences and inputs. This may include mixing high quality, high bandwidth content sources, such as 8K video sources, and may include enabling various high-quality video effects, such as green screen effects, layering, cropping, transparency, animations, logos, emojis, animations, and many other effects. Content may include a wide range of content sources 3010, such as ones to which the user subscribes, including TV, video, and Internet content. In embodiments, memory elements 3104 may be deployed in the cloud, such as RAM or other computer memory elements, such as for storing, caching, and otherwise handling content streams to enable processing, mixing, layering and other features involved in the content mixing and layering system 3008 of the platform 3000 to create an IML output stream 3004. In embodiments memory blocks 3104 for handling IML output streams 3004 may be allocated on a per display basis for each display 3020, or larger blocks of memory may be allocated to handle multiple displays 3020. An IML output stream 3004 created by the content layering and mixing system 3008 in the cloud may be encoded in the cloud using an encoder 3108, such as one that is suitable for a given display 3020, then delivered over the network 3102, decoded by a encoder/decoder 3110 and displayed on the display 3020, which may be any of a wide range of displays, such as an LCD, plasma, LED, or other displays, such as on a large screen TV, a mobile device (such as a phone or tablet), an LCD in a vehicle, and LCD interface for a machine or system (such as a dashboard or controller in an workplace), or the like.

Handling the content sources 3010 in the cloud enables various other features, such as rights management (such as controlling what content may be delivered to which displays, which content may be re-published or shared by users and the like), access control and security, provisioning (such as based on subscriptions), content tracking (such as for supporting transaction features and for tracking user behavior, such as for assisting with targeting content and advertising), intelligence (such as using user behavior and outcomes to optimize or improve one or more features or the platform 3000 by progressive improvement by machine learning), and others.

Figure 32:
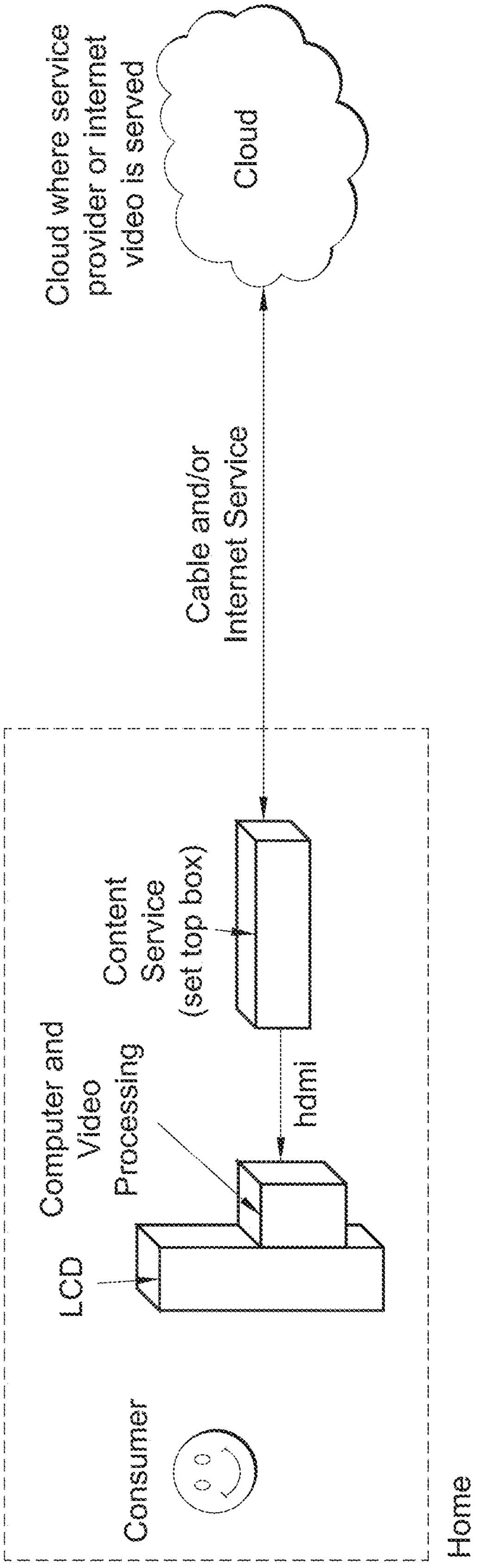
FIG. 32 (Prior Art)
FIG. 32 is a diagrammatic view depicting video content delivered to a user's display such as an LCD screen in accordance with the prior art.

FIG. 32 shows a conventional, prior art arrangement, under which video content is delivered to a user's display, such as an LCD screen. Content is delivered, such as from the cloud, by cable or Internet Service Provider (ISP) to a set top box, such as in a user's home. A cable, such as an HDMI cable or CATV cable, connects the set top box to video processing circuitry in the display device, which displays the content. The content is linear in that it remains the same stream from the point of origin in the cloud through the set top box to the user's display. Processing of the video, to the extent that it occurs, happens in the home, such as by changing the channel of the set top box to select another channel, or changing the input source on the display to use different box (such as switching to a DVD player or game platform from the cable box).

Figure 33:
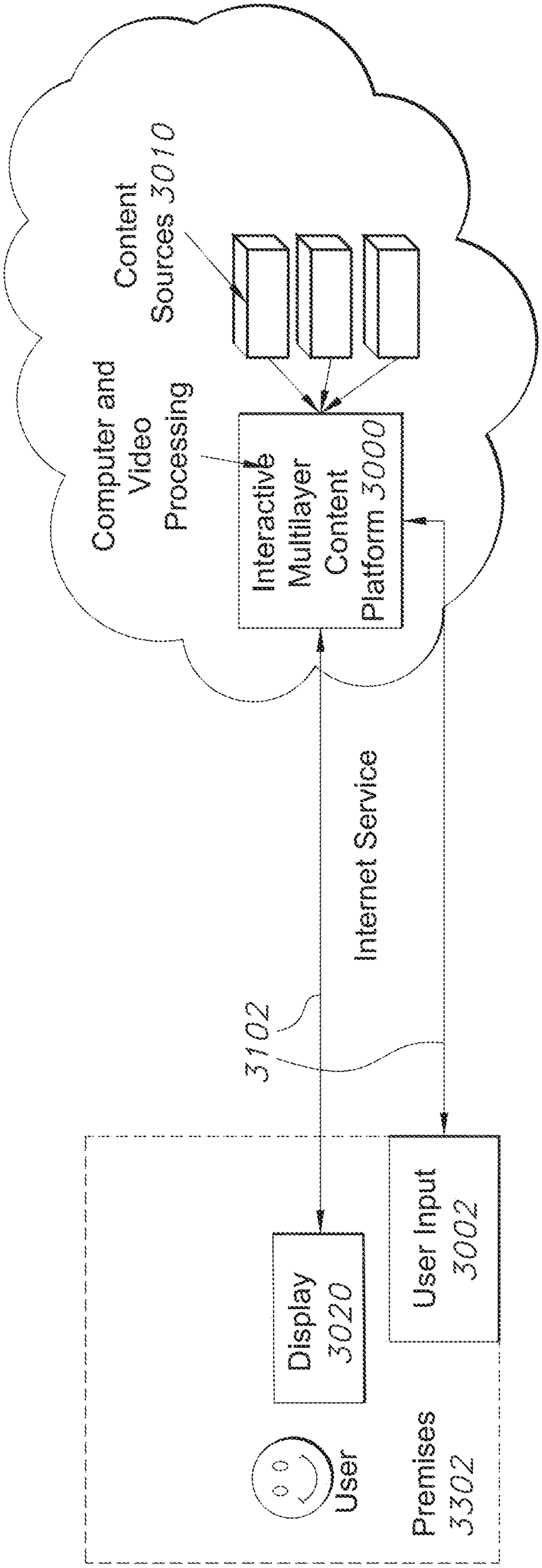
FIG. 33 is a diagrammatic view of the video display system configured to provide content sources that may be located in the cloud, such that computer and video processing functions, such as for content mixing and layering, may occur in the cloud as well instead of, or in addition to, using set top boxes in the user's home in accordance with the present disclosure.

Referring to FIG. 33, in embodiments of the platform 3000, instead of, or in addition to, using set top boxes in the user's home 3302, content sources 3010 may be located in the cloud, such that computer and video processing functions, such as for content mixing and layering 3008, may occur in the cloud as well. This effectively creates an architecture where a user's TV content is provided as a cloud service (along with other content types), such that, rather than requiring set top boxes and other video and computer processing hardware (such as set top boxes) at the premises of a display 3020 (such as a home, car, or the like), the premises 3302 may simply have a display 3020 and connection to a network 3102 (preferably one capable of handling high quality content). The cloud service may then be deployed to any display 3020 of the user, such as in the premises 3302 of the user or elsewhere (such as on a mobile device, in a car, or the like). User input 3002 may be captured at the user (such as on a touchscreen of a phone or tablet) and delivered over the network 3102 (which may be in the same band or a different channel from the one used to deliver IML, output streams 3004 from the platform 3000 to the display 3020) and used to configure the IML output streams 3004 at the platform 3000 in the cloud. Placing the computer and video processing in the cloud, allows the platform 3000 to provide a wide range of mixing and layering functions in the cloud, avoiding or minimizing the need for boxes or hardware at the home 3302.

Figure 34:
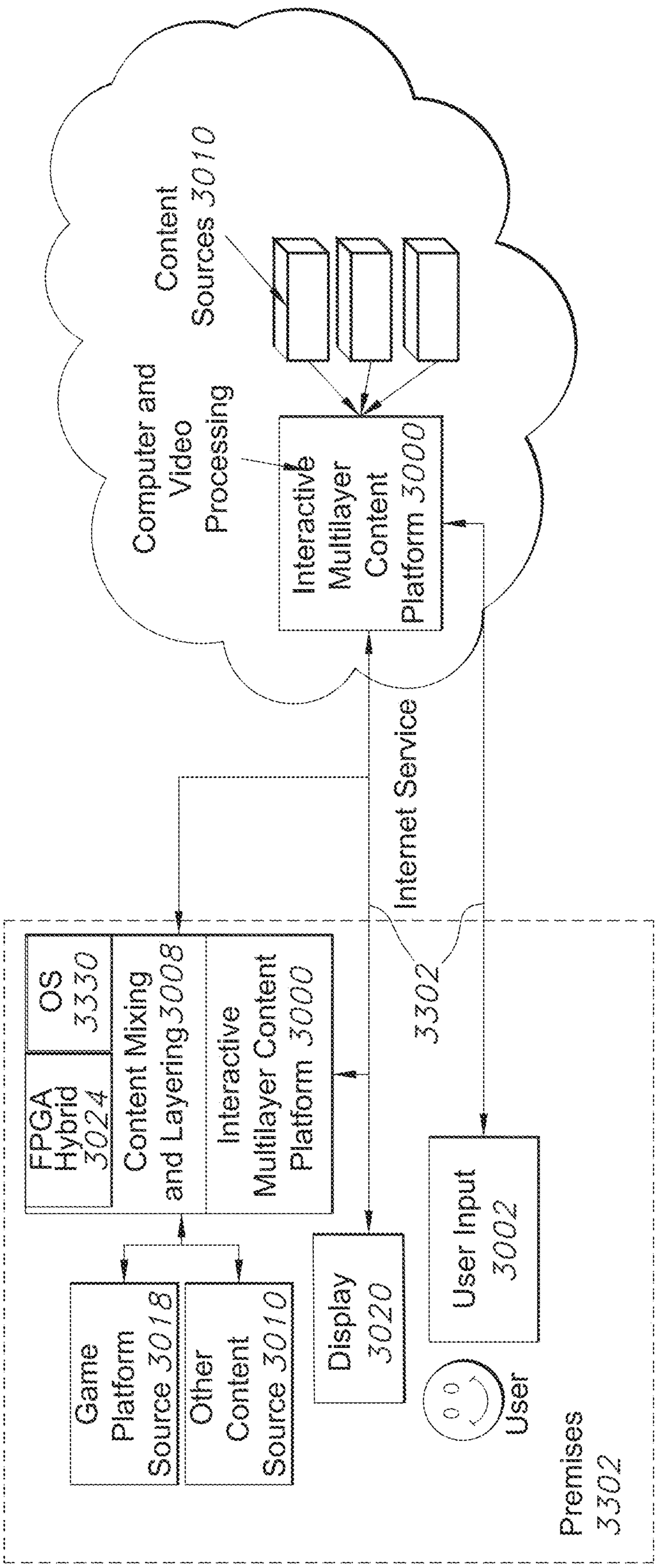
FIG. 34 is a diagrammatic view of the video display system configured to provide a cloud-based IML content platform that may coordinate with a local IML, content platform such that content from one or more content sources located elsewhere, such as in the user's home, can be mixed locally to produce an output stream for a display that mixes content in a stream from a cloud-deployed platform with local content in accordance with the present disclosure.

Referring to FIG. 34, in other embodiments a cloud-based IML content platform 3000 may coordinate with a local IML content platform 3000, such as one integrated into a display 3020 or one positioned in a box, such as a set top box, such that content from one or more content sources 3010 located elsewhere, such as in the user's home 3302, may be mixed locally, such as by allowing further content mixing and layering 3008, such as using one or more additional FPGAs 3024, which may provide further mixing and layering to produce an IML output stream 3004 for a display that mixes content in an interactive multi-layer output stream 3004 from a cloud-deployed platform 3000 with local content, such as from a game platform 3018 or other local source (such as a security camera, nanny camera, web camera, or the like). Thus, computer and video processing may be enabled by coordinated content layering and mixing 3008 using FPGAs that are deployed both in the cloud at the premises of a user, such as a home 3302 or other premises (such as enterprise premises, entertainment and hospitality venues, and the like). The FPGAs 3024 may be daisy chained or otherwise configured to handle many different input sources, such that layering may be highly flexible, using a range of cloud and local input sources.

In embodiments, the IML content platform 3000 creates a virtualized entertainment platform where all of a user's content (TV, video, computer, Internet, games, and the like) may be accessed, mixed, layered, displayed, and shared (such as by streaming to others) exactly according to user preferences.

In embodiments, sources are h.264/265 protocol sources. In embodiments, no compression or lite compression may be used. In embodiments, other compression standards may be used.

It may be noted that FPGAs have not conventionally been offered in cloud platforms, so that the cloud architectures described in connection with various embodiments of this disclosure would have required highly complex programming, provisioning, and arrangement of network hardware resources, making it impossible to provide the flexible processing necessary for real-time changes in IML content in response to user inputs in the absence of FPGAs or similarly flexible hardware for video processing at the user premises 3302. FPGAs are not conventionally used in video content delivery networks, and they are used in the cloud primarily for unrelated purposes, such as handling complex computational applications that require regular reconfiguration. In embodiments, the cloud platform may use FPGA hybrids 3024 such as using Xilinx™ FPGAs in a cloud platform like the Amazon Web Services (AWS)™ platform. In embodiments, the cloud platform uses FPGA hybrids 3024, comprising one or more FPGAs 3024 and one or more conventional processors. Thus, the platform 3000 may improve video content delivery networks by enabling flexible content mixing and layering to occur using FPGA or FPGA hybrids 3024 with other processors. In embodiments, the non-FPGA part of the FPGA hybrid 3024 may run code for handling various IML, capabilities (such as Linux™ code) and the FPGA part of the FPGA hybrid 3024 may enable deployment of a semiconductor circuit design that handles video processing functions at very high speeds.

It is the FPGA deployment in the cloud that enables the unique capabilities of the FPGA hybrid 3024. FPGA enables reconfigurable computing, meaning that the hardware circuit is reprogrammable through a software download. FPGAs have been around for over 15 years and are typically used in applications where there is heavy math and there are bandwidth problems, like medical imaging, production video, and large switch networking. They have been very expensive (e.g., $1000 per chip in low volume) because in most cases product companies use FPGAs only to figure out the circuit in prototype phases, then do dedicated circuits for commercial deployments.

Referring to FIG. 34, in other embodiments a cloud-based IML content platform 3000 may coordinate with a local IML content platform 3000, such as one integrated into a display 3020 or one positioned in a box, such as a set top box, such that content from one or more content sources 3010 located elsewhere, such as in the user's home 3302, may be mixed locally, such as by allowing further content mixing and layering 3008, such as using one or more additional FPGAs 3024, which may provide further mixing and layering to produce an interactive multi-layer output stream 3004 for a display that mixes content in an interactive multi-layer stream 3004 from a cloud-deployed platform 3000 with local content, such as from a game platform 3018 or other local sources (such as a security camera, nanny camera, web camera, or the like). Thus, computer and video processing may be enabled by coordinated content layering and mixing 3008 using FPGAs that are deployed both in the cloud at the premises of a user, such as a home 3302 or other premises (such as enterprise premises, entertainment and hospitality venues, and the like). The FPGAs 3024 may be daisy chained or otherwise configured to handle many different input sources, such that layering may be highly flexible, using a range of cloud and local input sources.

In embodiments, the IML, content platform 3000 creates a virtualized entertainment platform where all of a user's content (TV, video, computer, Internet, games, and the like) may be accessed, mixed, layered, displayed, and shared (such as by streaming to others) exactly according to user preferences.

In embodiments, sources are h.264/265 protocol sources.

It may be noted that FPGAs have not conventionally been offered in cloud platforms, so that the cloud architectures described in connection with various embodiments of this disclosure would have required highly complex programming, provisioning, and arrangement of network hardware resources, making it impossible to provide the flexible processing necessary for real-time changes in IML content in response to user inputs in the absence of FPGAs or similarly flexible hardware for video processing at the user premises 3302. FPGAs are not conventionally used in video content delivery networks, and they are used in the cloud primarily for unrelated purposes, such as handling complex computational applications that require regular reconfiguration. In embodiments, the cloud platform may use FPGA hybrids 3024 such as using Xilinx™ FPGAs in a cloud platform like the Amazon Web Services (AWS)™ platform. In embodiments, the cloud platform uses FPGA hybrids 3024, comprising one or more FPGAs 3024 and one or more conventional processors. Thus, the platform 3000 may improve video content delivery networks by enabling flexible content mixing and layering to occur using FPGA or FPGA hybrids 3024 with other processors. In embodiments, the non-FPGA part of the FPGA hybrid 3024 may run code for handling various IML capabilities (such as Linux™ code) and the FPGA part of the FPGA hybrid 3024 may enable deployment of a semiconductor circuit design that handles video processing functions at very high speeds.

It is the FPGA deployment in the cloud that enables the unique capabilities of the FPGA hybrid 3024. FPGA enables reconfigurable computing, meaning that the hardware circuit is reprogrammable through a software download. FPGAs have been around for over 15 years and are typically used in applications where there is heavy math and there are bandwidth problems, like medical imaging, production video, and large switch networking. They have been very expensive (e.g., $1000 per chip in low volume) because in most cases product companies use FPGAs only to figure out the circuit in prototype phases, then do dedicated circuits for commercial deployments.

Figure 35:
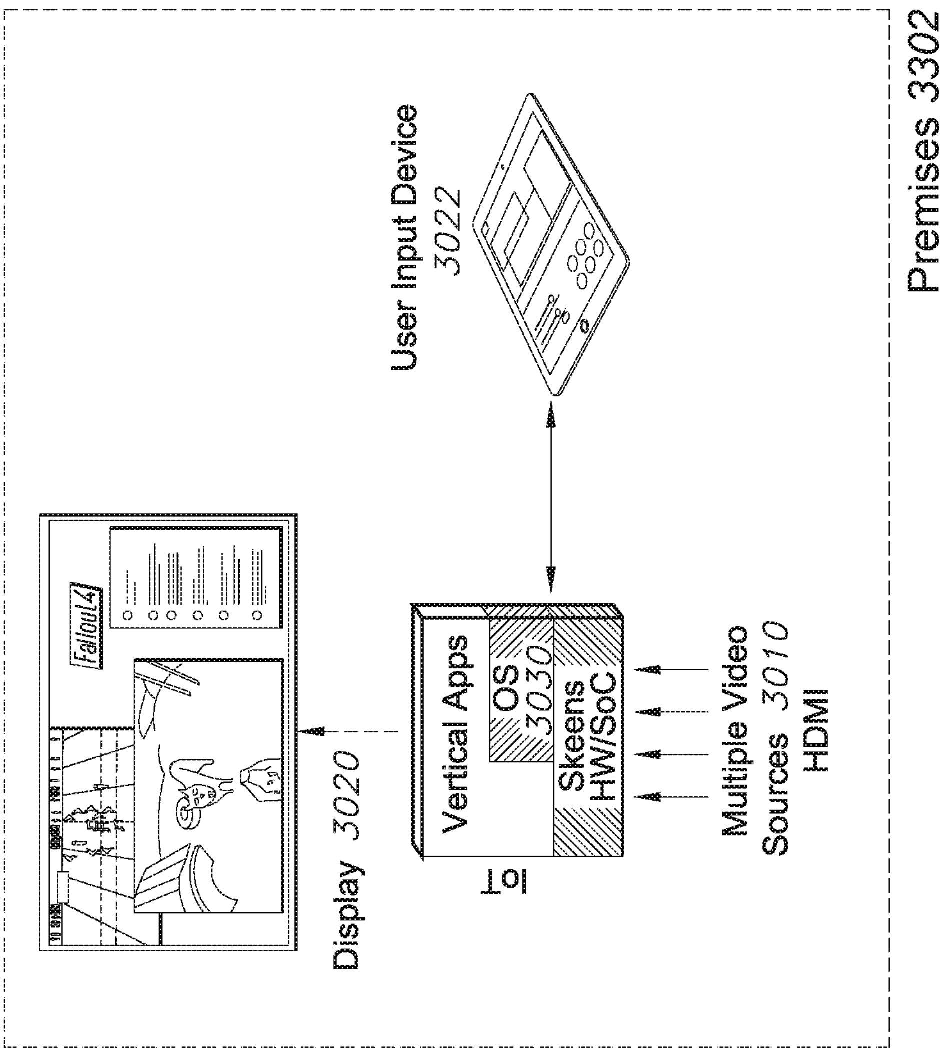
FIG. 35 is a diagrammatic view of the video display system configured to provide a platform for displaying content from one or more Internet of Things (IoT) content sources in accordance with the present disclosure.

Referring to FIG. 35, the platform 3000 may be useful for displaying content from one or more Internet of Things (IoT) content sources 3010, such as a web camera, a video camera, a nanny camera, a doorbell camera, a camera on an appliance, or the like, such as in a home or other premise 3302 of a user. IoT content may also include text, data, or other information, such as temperature data from a smart thermostat, alerts from one or more appliances, messages from a smart speaker, or the like. For example, a user may interact with an intelligent voice interface, such as the Alexa™ or Siri™ interfaces, such as on a mobile device or speaker, and resulting information may be displayed in a layer on the display 3020. The user may configure output from the IoT content source 3010 with other content on the display 3020, such as for watching a child or elderly person in a portion of the screen while also seeing TV, game, Internet, or other content. The user may, using the input device 3022, resize and re-layer as needed to monitor the IoT content while also consuming other content, such as entertainment content.

Figure 36:
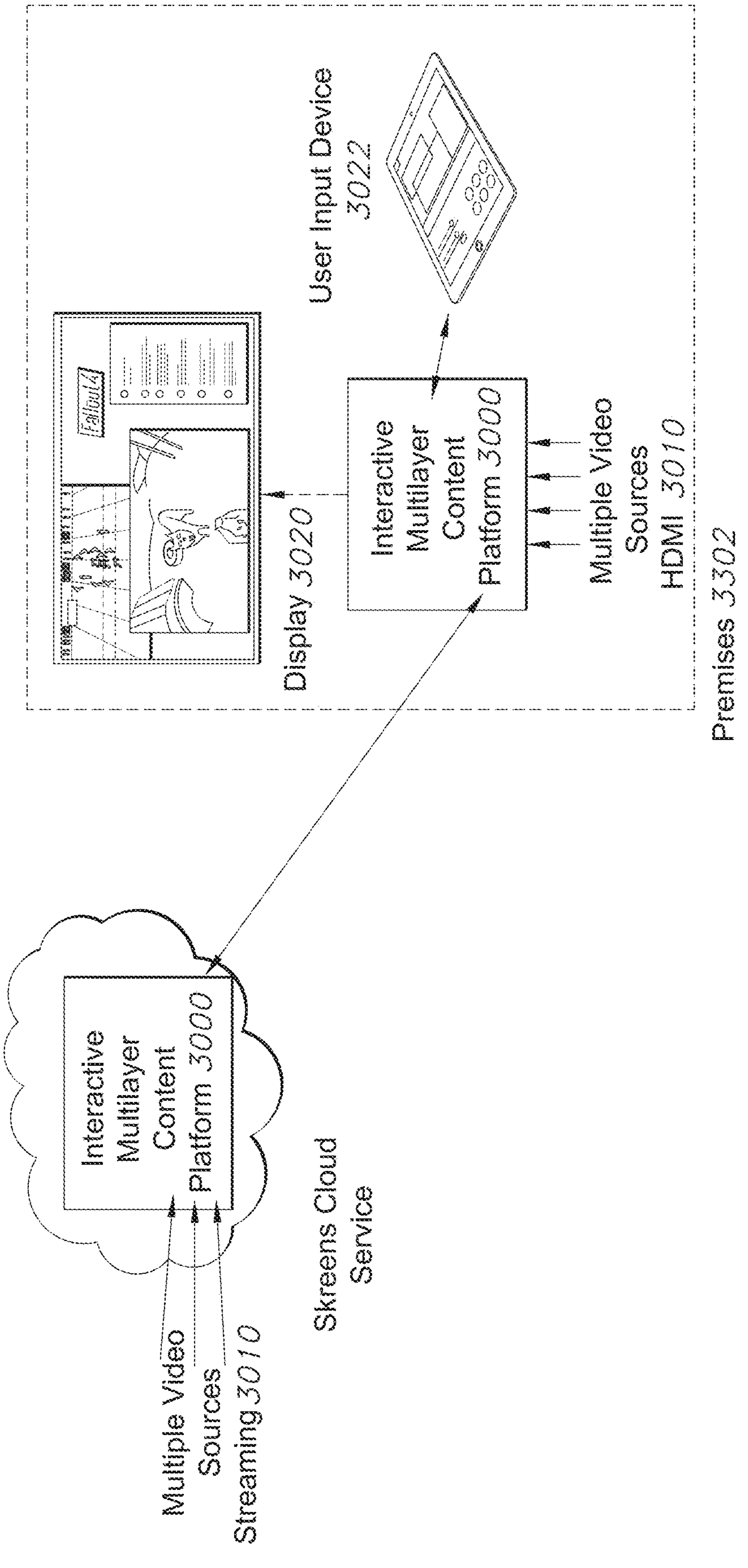
FIG. 36 is a diagrammatic view of the video display system configured to provide a platform with multiple video sources that may be combined with a deployment on premises so that under user control, such as using a user input device, layers on a display may be mixed, including mixes of IoT content with cloud-delivered video content in accordance with the present disclosure.

Referring to FIG. 36, a cloud deployment of the platform 3000 with multiple video sources (e.g., h.264 or h.265 sources) may be combined with a deployment on premises 3302, such as one where HDMI sources (including wireless HDMI sources that come from IoT devices), so that, under user control, such as using a user input device 3022, layers 3028 on a display 3020 may be mixed, including mixes of IoT content with cloud-delivered video content.

Figure 37:
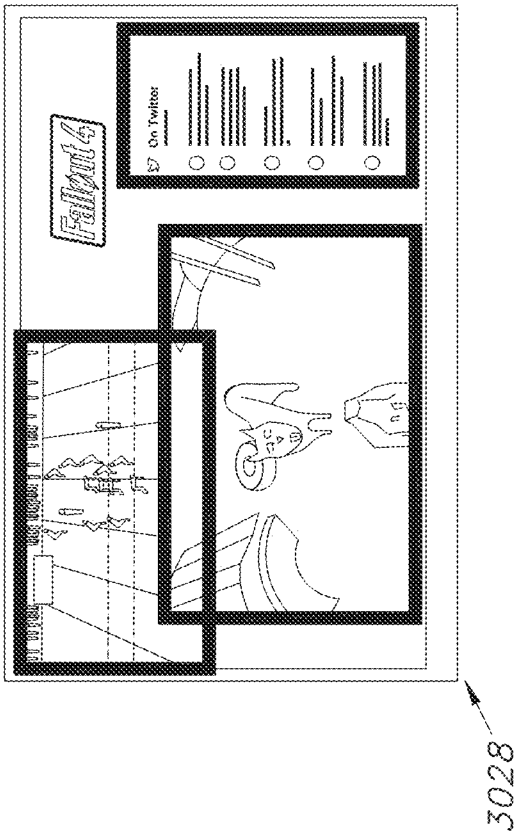
FIG. 37 is a diagrammatic view of the video display system configured to provide on screen displays of layers that may include transparency and overlapping effects and may display custom program applications and other web-enabled content types in accordance with the present disclosure.

Referring to FIG. 37, on screen displays of layers 3028 may include transparency effects, such as overlapping layers where there is a degree of transparency, green screen layers, and the like. HTML 5 web widgets and other web-enabled content types and objects may be displayed.

Figure 38:
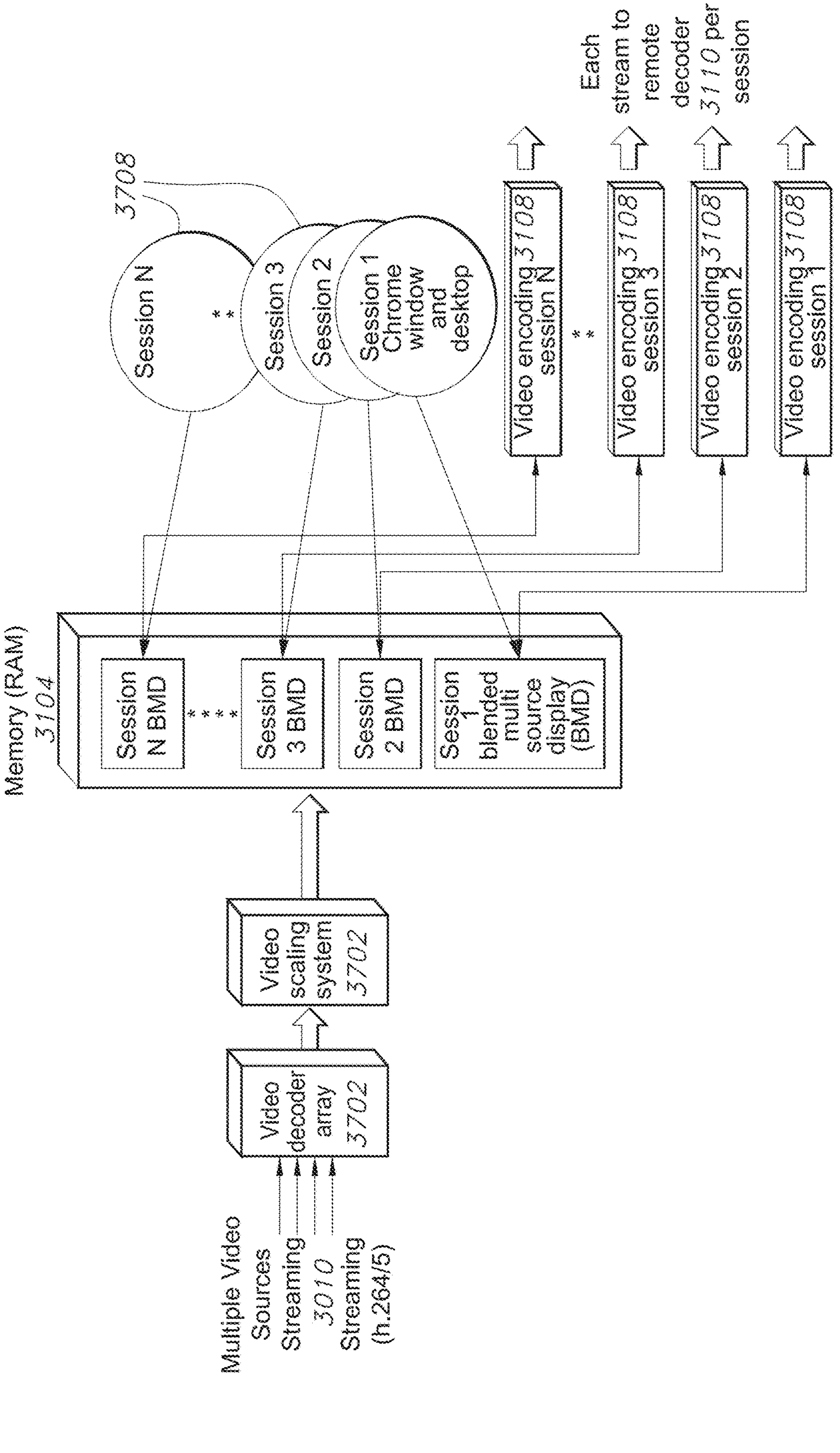
FIG. 38 is a diagrammatic view of the video display system configured to provide an architecture in an embodiment of a cloud-based deployment of the IML content platform in accordance with the present disclosure.

FIG. 38 provides a functional block diagram of an architecture in an embodiment of a cloud-based deployment of the IML content platform 3000. Sources 3010, such as a number M of multiple video sources (such as streaming h.264 or h.265 sources may be delivered to an array of video decoders 3702, which in turn may be processed in a video scaling system 3704. Scaling may be performed for a large number of layers, such as determined by multiplying the number of video channels available (M) by the number (N) of TV sessions to be handled and the number of unique linear screens per display buffer (a number L). Scaled video may be delivered to the memory 3104 (e.g., RAM or other computer-based memory for caching scaled video for sessions). In the memory 3104, the IML output stream 3004, corresponding to the mix of content (with related parameters for sizing, positioning, etc.) for each session of the blended multi-source display (BMD) is stored for further use. Sessions 3708 may be defined by the platform 3000, such as for combinations of the source type, the display device, and the display environment, so that each session may be provided to an appropriate encoder/decoder 3110 for the session, which is configured for the appropriate encoder/decoder 3110 for that display 3020 and environment. For example, the encoder/decoder 3110 may be a processor running a Linux™ OS on a desktop computer with an HTML5 enabled Chrome™ browser that may decode the encoded video for a session.

Figure 39:
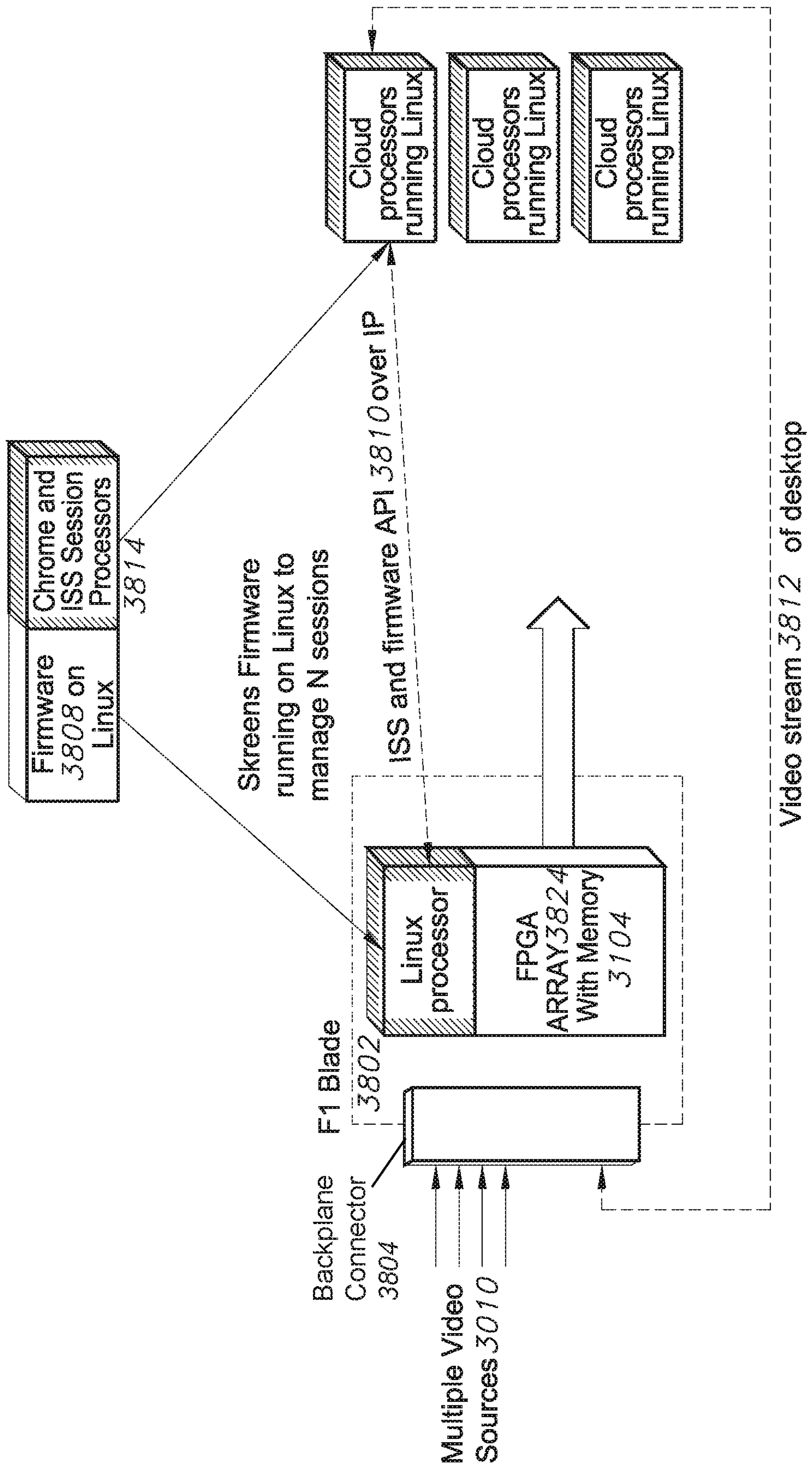
FIG. 39 is a diagrammatic view of the video display system configured to provide a scaling of a system using a platform and components thereof that may be further divided, such as running the FPGAs in an array and related memory on a blade that includes a backplane connector to handle many streaming video sources in accordance with the present disclosure.

Referring to FIG. 39, for scaling of a system using the platform 3000, components of the platform 3000 may be further divided, such as running the FPGAs in an FPGA array 3824 and related memory 3104 on a blade 3802, such as an F1 blade, where the blade includes a backplane connector 3804 to handle many streaming video sources 3010. The blade 3802 may include a processor, such as a Broadwell™ Linux™ processor on which firmware 3808 may be deployed for enabling high-performance video processing. The firmware 3808 on the blade 3802 and other capabilities thereon may be accessed by an API 3810, such as enabling interaction with platform components for handling sessions 3708, such as involving a browser or other decoder (such as a Chrome browser running ISS sessions and such as for enabling user input and control of sessions) and running on various cloud processors 3814, such as Kai ARM™ cores, and running the Linux™ OS. These processors 3814 may, for example, provide a video stream 3812 of desktop video that may be sent to the FPGA array 3824 on the blade 3802, such as in a remote desktop stream 3812. The ISS for sessions on the cloud processors 3814 and firmware 3808 on the blade 3802 may communicate, such as over IP protocol channels. The cloud processors 3814 may run an instance per N sessions. The FPGA array 3824 may run many h.265 streams per session over IP channels.

Embodiments of an architecture of M videos are available to N sessions (such as Chrome™ window sessions with decoding capability) may have many variations. In embodiments, a session, such as a Chrome™ session may act as a conductor for the IML experience. In embodiments, higher paying users may purchase larger bandwidth or processing capacity, more memory capacity, or the like for their sessions. In embodiments, sessions may be virtual Linux™ images running in parallel and/or one Linux™ application that may handle X number of sessions and device display memory, so each session has a Chrome browser instance. In embodiments, desktop video of each session, such as one per session only, may be routed back into the FPGA array 3824 as a linear input so it may enable the effects (transparency, layering, etc.), but in embodiments the raw video may be passed in a way so that the processors that run the session may be remote. In embodiments, the cloud embodiment of the platform 3000 may use combinations of FPGA arrays 3824 on blades 3802 and processor cards for the processors 3814.

In embodiments, a deployment may select an appropriate number M of video streams and an appropriate number of sessions, such as suitable for available hardware for a project. If the desktop video from N session are input to video processing in the FPGA array 3824 then the bandwidth of the system is related to M and N. A number L may characterize the maximum number of screens allowed per session, which may be large (e.g., 16, 32, 64, 128 or more). Thus, a user could, for example, put 64 or more simultaneous videos on a screen. The encoder may be a high-quality h.265 stream encoder. In embodiments, the processor session may manage the transport of the h.265 stream and may increase or decrease quality based on the bandwidth for the last mile to the display 3020. In embodiments, the FPGA/processor combinations may allow session-tunable adjustments in real time, such as to parameters relating to an h.265 stream.

The various embodiments described herein may allow the processing of user-controlled interactive multi-layer (IML)

output sessions (involving various mixes and layers of content from various optionally heterogeneous sources) in the cloud for encoding and delivery to one or more endpoint devices, where the session is decoded and displayed on a display screen.

The display screen may be any of a wide variety of screens, such as a large screen TV (LCD, LED, plasma, etc.), a smaller TV, a tablet, smartphone or other mobile device, a screen in a vehicle, a screen on an appliance or consumer product, or many others.

A local application deployed at least in part in the local environment of the device or on the device may interact with the host system, such as to indicate the type of display, the type of encoding that is appropriate for decoding of a session for the display, and the like, as well as to communicate other relevant state information about the display or the environment. In embodiments, a session controller in the cloud may query the local application or the display device to determine the appropriate encoding.

In embodiments, the display may be an augmented reality (AR) or virtual reality (VR) display device, such as augmented reality glasses, a smartphone with a camera or other camera-based AR system, a VR helmet, VR goggles, or the like.

Processing of IML sessions in the cloud applies to AR and VR. Field programmable gate arrays (FPGAs) and hardened silicon in the cloud interacting with the IML the front end may capture 4K, 8K or thicker video and provide a high-bandwidth connection to a user, at home for example, and additional processing in an on-site video capture device, for example, a helmet.

In an example of AR application of an IML session, a user may be sitting on the top of the Green Monster watching a Red Sox game in Boston, MA (USA). The user may tell a voice integration unit such as Alexa™ to "Put me in the dugout." The spouse of the user may send a text message note to the user saying "dinner" at the baseball game. The combination of these two actions may be shown to give the user an immersive experience.

A VR application of an IML session may operate similarly to an AR application of an IML session. However, a VR application may include a feedback system (indicating where the eyes of a user are looking) that may feedback to a processor FPGA to bend pixels in a direction that the eyes of a user do not notice (to create the illusion of VR that the pixels are being bent in real time).

When a user moves their head, an IML session may have a time window (under 50 milliseconds) before the user's brain notices the head movement. Importantly, it is this time window that allows an IML session to provide a user with an immersive experience. More specifically, it is the networking required to send head tracking data back to a processor and the processor bending the pixels in a way that is consistent with the user's eyes, all inside of the less than 50-millisecond envelope, which may be shown to create an immersive experience.

Increases in bandwidth have made it possible to move processing for virtual reality applications from a local location, for example on a helmet worn by a user to a cloud-based location via a direct connection, while still meeting the under 50-millisecond requirements. For example, a processor located in the Commonwealth of Virginia (USA) may bend the pixels and send the compressed video back to a local system in Boston in the Commonwealth of Massachusetts, uncompress it, and deliver it within the under 50-millisecond window. Increases in bandwidth may be shown to allow greater amounts of uncompressed data (i.e., video without software compression) to be streamed, which, in turn, may be shown to increase the amount of time available for processing the data.

When the process is done in the cloud to bend pixels, however, there is, among other things, no feedback on where the user's eyes are looking. In certain examples and in order to work for all users in a room, each user has to have their own information processed locally or in remote cloud facilities. The pixel information may be available at the processing location, either a local or cloud location. Each user may receive the raw data, copy it, and bend it to their own eyes.

When layers of content are bent (even if the content is transparent), the information from the internet of things (IoT) devices around a user may be represented and visualized in these layers because the IML is being performed at the pixel bending step. Applications that may particularly benefit from these IML sessions may be sports applications, medication applications, and the like. An example application of an IML session may include having a virtual meeting with real data, using bidirectional conference calls which include two 3D live cameras on either end, for example for technicians in an airplane terminal diagnosing an engine failure.

An AR experience may be a form of an IML session, as many AR experiences implement layering functionality. In these AR applications, intelligent information may get drawn on a display, such as a glass display or an otherwise transparent layer, that may overlay a view of the real world, such as through a lens or camera. Layering in these AR experiences may include taking voice, touch or other activated information and layering it on the end pixel-rendering device.

An IML session may take a camera and collect data related to a real surrounding and use it as a flexible layer. This may allow a user to transition between VR and AR using an IML session-enabled helmet. The user may physically wear the helmet and the room around the user may be represented with two or more cameras. The real-world experience for the user may be created from the data collected by the cameras. For example, an IML session could create an experience so the wall around a user appears to melt. In addition, video manipulation may be used to create effects like this and other effects, such as see through walls and the like. This may be shown to be useful in a situation when virtually walking through a yet-to-built structure or in an augmented reality example of walking through a partially-built structure and viewing yet-to-be-added structure as an augmented overlay with that ability to see through the walls in either example.

In embodiments, an IML session may support multiple viewers. When supporting multiple viewers, an IML session may bend pixels for each viewer through the VR of each user, while allowing users to share data with each other. An IML session may include support for multiple connections. Moreover, an IML session may support gaming. In embodiments, an IML session may support four connections from a computing cloud coming into a house with each connection feeding an individual headset. For example, an IML session may be configured to stream a single ten Megabit connection into a home. A connection may be an H.264/265 video stream connection. In this example, the bending and head tracking may be done at the helmet in the processor. The single ten Megabit connection may receive the data but then it may be copied (e.g., four times for four helmets/users) in the house. Each of four users in the house may receive their initial copy of the connection and the pixels may be bent based on the individual tracking at the headset of the individual users.

In embodiments, an IML session may be used to provide a virtual emergency training situation. In this example, a user participating in the training session may physically walk through objects, while video around the user is captured and manipulated to create a fire, add a person who is in trouble, simulate weakening structures, etc.

In embodiments, the audio in an IML session may be recalculated as a user moves their head. For example, when a user turns their head to the right, the user needs to hear the person on their right side more than a person on their left side. An IML session may also include intermixing audio commands and responses from a voice response system or voice integration unit, such as Amazon's Alexa™ voice response system. For example, a user may want their voice integration unit, such as Alexa™, to understand where they are in a virtual environment. In another example, a user may ask their voice integration unit, such as Alexa™ "What is Big Papi's average?" The voice integration unit may respond with a voice answer that may sound like a person to the left of the user, a narrative voice, another fan, and the like.

In embodiments, an IML session may also blend audio from a voice response system into the audio sound for a show. An IML session may include speech to text conversion. An IML session may send the audio, such as audio from a person or a TV show, into a voice channel. The audio sent into the voice channel may then get converted to text. An IML session may put the text on the screen or store it to a file.

In embodiments, an IML session may include a backend rights management and security system. A backend rights management and security system may validate that a user purchased access to specific content. For example, a backend rights management and security system may validate a user has access to view the Super Bowl™ program. By way of this example, a backend rights management and security system may include a repository for access credentials for a rights holder. The owner of a backend rights management system may be a reseller from the publisher. A backend rights management and security system may secure content from the buffer of FPGA RAM to a user using a secure TCP direct connection on a single user basis.

A backend rights management and security system may support digital rights management (DRM) algorithms like HTTPS and encryption, such as AES encryption. A backend rights management and security system may provide end-to-end encryption of an IML session using its own encryption encoder/decoder system. In an example, a user may initiate an IML session in the cloud to watch the Super Bowl™ program, which is content that typically must be purchased. The backend rights management and security system may indicate the user has permission to watch the Super Bowl™ program accessing the rights and content of the user from storage in a cloud network facility. In this example, the user may buy the right to view the Super Bowl™ program from the rights owner, which is the National Football League (NFL), and a certain cloud network facility may communicate with the NFL to validate the rights the user has and what permissions those rights grant the user. This may happen before the content is received in the local RAM, maintaining security and chain of custody for the content of the Super Bowl™ program.

In embodiments, an IML session may support individual encoders for individual users or mapping multiple users to an individual encoder. Unlike what is typically found where there are thousands if not millions of users for a single encoder, the IML session may support individual encoders or a few users having the ability to map to an individual encoder. It will be appreciated in light of the disclosure that television as a service is a unique concept that may take the processing of a TV and makes remote, sending video buffer over network to a LCD remote. This way content can come to a cloud processing location with larger bandwidth and greater security and can then be processed with more platform functions directly controlled by the person watching. Instead of the millions of viewers under one encoder compressing one live video channel with copies to millions of people and each person seeing the exact same video program as the others, the platform can provide effectively millions of encoders so each video program can be manipulated, shaped, and combined with independent additional content under the command of the viewer. Having processing in the cloud for the TV means that the TV can be upgraded for power without changing the LCD in the home or business. The platform may also follow the person and, therefore, they are not locked to any one TV. Toward that end, any display can be someone's TV. By way of this example, a user can watch their customized TV with the platform but on their friend's TV at their friend's house. Moreover, LCDs and other commercially available displays can be big screens, tablets, PCs, screens in automobiles, mobile or any device that can display pixels and the platform can adjust to any size display and the density of the display such as 4K, HD, SD, lower resolutions, or higher resolutions.

In embodiments, IML sessions may be hosted exclusively in 5G (or similar cellular networks) that have security inherent in the network infrastructure. By way of this example, a camera may be hosted on the 5G network and may observe live action at an NFL game. In embodiments, the signal from the camera may stay within the 5G network and be sent to homes without resorting to internet protocols or other parts of the cloud. In this scenario, the 5G network or the like acts as a cloud network and it may host and retain the components and their data.

In embodiments, the audio content of an IML, session may drive a voice interface. For example, an IML session may take feedback from audio content and feed it into a voice response system or voice integration unit, such as Alexa™. An IML session may share layers of an experience among multiple users, while also personalizing specific elements of an experience for individual or other subsets of users. For example, a common overlay layer of an experience may be shared among a group of users even if other elements of the experience are personalized to users within the group.

In embodiments, an IML session may ascertain commands from the text, for example, keywords. IML sessions enabled with voice response systems or voice integration units, such as Alexa™, could have command words designed in a specific show, for example, Aladdin so that certain events trigger audio in a house, for example via voice command, from the entertainment content. For example, saying "Ali Baba" may result in some personalized activity happening in the house, by establishing a connection between the audio and the voice command systems in the house. These IML session applications may be of particular interest to the medical and educational communities.

In embodiments, a shared layer of an IML session may include emojis, notes, stickers, IoT elements, alerts, warnings, and the like. In an example, shared layers may be used by teams to collaborate on projects, allowing teams to collaborate on notes and within development processes. Shared layers may allow multiple people to post a note and move it around, such as over a video or PowerPoint behind it. In embodiments, layers may include message overlay layers, also referred to as transparent overlays. Transparent overlays may include notes and stickers. An IML session may support hybrid scenarios that may include any combination of processing being done on a cloud and one or more local processors.

In embodiments, multiple cameras may be used per event such that viewers can select from fixed layouts or custom layouts with many camera angles. It will be appreciated in light of the disclosure that a Red Sox game may have 30 different video cameras and various networks can take from those and produces a single live game with a producer in a truck. The platform can ingest all 30 video cameras and make them accessible in cloud session per person and each person could select views, sizes and other content like other games, web statistics, fantasy sports statistics, betting lines, tickers, social media tickers, popups, smart home status like temperatures in a room, video conferencing with one more friends or people at the live event, and live content purchased from the live event and other content.

In embodiments, an IML session may include stream-able layers and non-stream-able layers. For example, DRM-protected content may be a non-stream-able layer. Stream-able layers may include any pixel that is not DRM-protected. Layers that are not stream-able may include any pixel that is DRM-protected. Layers that are not stream-able may be protected at the FPGA level, preventing theft. An IML session may stream content from a content delivery network (CDN). An IML session may stream content from a CDN using a custom streaming system to stream content licensed from content owners. A custom streaming system may include a permission algorithm to grant access to content and may base access on an IP address, for example. A custom streaming system may support multicasting, multiple content streams and multiple content rights associated with each stream. An IML session may synchronize multiple content streams to allow multiple users to view nearly the same frame of a stream at the same time.

In embodiments, an IML session includes voice communication. Voice communication may create a human machine/machine human, allowing a user to have a colloquial conversation with a machine. An IML session may authenticate a user based on the user's voice. An IML session may allow a user to access tiers of protected content using the user's voice. For example, a user may as a voice response system or voice integration unit, such as Alexa™, for a special licensed statistics package. The voice interaction through the voice integration units may enact content and display content that is secured based on authentication of the voice interaction.

In embodiments, tiers of protected content may be employed and include a user asking the voice integration units, such as Alexa™, for all messages of the day. Based on security criteria, the user may be provided messages based on secret clearance or their assigned knowledge stack. In embodiments, protected content tiers may include a bi-directional voice component. This may include serving ads based on the voice of a user and the interaction history of a user, allowing the voice interaction to become a point of sale.

In embodiments, an IML session may be hosted in a cloud computing infrastructure. An IML session in a cloud computing infrastructure may allow the owner of the cloud computing infrastructure to rent IML sessions to third parties. The rented IML sessions may be used to connect multiple cloud infrastructures, enabling services between and among clouds owned by multiple providers. An IML session managed by a third party on behalf of other parties may allow the third party to act as a trusted intermediary among other parties. For example, an IML session may be hosted in a cloud service hosted by IBM™. The IML session may connect a single user to a Comcast™ service and DirectTV™ service and because the user is connected to a single IML session, the user may able to interact with the Comcast and DirectTV services through the cloud hosted by IBM™ cloud all while accessing the services made available through IBM™.

By way of the above examples, an IML session running in a cloud may support multiple LCD or visualization surfaces. For example, if a user switches from a 1K to 4K TV, the IML session hosted in a cloud may upconvert based on where a user is watching the TV. The IML session may scale down when a user goes to their car, shaping the layered session for the display device. The end user application that makes the connection back to the cloud may make the determination of the user's location, such as by settings or querying the device it is playing on.

In embodiments and by way of the example of a user transitioning from a TV display to a mobile device to a car, the IML session, in the short term, may look to continue to run as the user disconnects from one application and then connects to another application as they are moving from device to device. In these examples, session information and layers may continue to run through the session and be scaled or just re-applied to next device. In embodiments, the session may sit behind an encoder for DRM information. As one application is disconnecting and another one may be connecting, the encoder may continue to supply the applications with the content requiring permission. As such, the encoder may be there for the pipe information and not to each device and each session may follow the user to different devices, as the user transitions among various devices. Session encoding may be managed by an interaction with a decoding app, which may query the user's end devices.

In embodiments, IML sessions may be mapped to users or accounts. Users may be mapped to a single account or multiple accounts. For example, a user may have an account for each TV in the user's home. An IML session may be mapped to a single user or account or multiple users or accounts. Multiple IML sessions may be mapped to a single user or account or multiple users or accounts.

In embodiments, each IML session may be provided through a NewTek NDI™ stream. An IML session may be an input to a third-party broadcast application, such as Wirecast™ from Telestream™. An IML session may be sent as an NDI™ stream into a computing device, so it becomes an input signal to another video processing agent. This may be shown to allow IML streams to function as inputs and outputs of standard IP flows for multiple third parties, enabling the creation of production and entertainment platforms. In an example, an IML session may allow a user to share video from an iPhone™ mobile device to an Apple TV™ device. An IML session may receive IP video streams from multiple inputs such as remote cameras, mix and layer the inputs (some or all of those devices configured to produce an NDI™ stream), then be sent to another system in a standardized video streaming format.

In embodiments, an IML session may allow video to be passed and processed faster than the under 50-millisecond envelope and thus may be applicable to video game processing, broadcaster processing video facial recognition, big data analytics on video frames, video conferencing and communications and the like. Processing an IML session in a FPGA may be done in parallel while staying within an under 50-millisecond window while maintaining a reasonable cost to the customer. As a result, an IML session may include face overlays, as video may be shared in one layer and the faces overlaid on another layer. In embodiments, IML sessions may support more accurate and higher quality video conferencing as a result of the performance increases as well. This may be shown to be useful in elder care applications and human companion examples. In embodiments, a user may access and control an IML session using a voice search command. By way of this example, a user may ask one of the voice integration units, such as Alexa™, to "find me Joe." The video display system may interpret this command through the voice integration unit and then connect the user to an IML session with Joe.

In embodiments, multiple inputs may be combined into a single IML session. The single IML session may be assigned resources including FPGAs that may be connected to additional RAM and dedicated processor resources. The single IML session may be encoded, decoded, and controlled with the assigned resources. Resources requirements may be assigned inversely proportionate to the bandwidth of the inputs. For example, higher bandwidth inputs may require fewer resources.

In embodiments, multiple IML sessions may be supported by a single processor, for example by running a processor quickly and time division multiplexing the processor. By way of this example, four sessions worth of video content may be provided with the ability to scale to larger numbers. An IML session may include encoding and decoding the session on the input side, processing for encoding on the session side and the like.

In embodiments, an IML session may take audio from an HDMI stream and translate to text. In doing so, the text may be displayed on the screen in connection with the HDMI video. In doing so, closed captioning service or tele-text service may be offered up to any video stream. Using APIs from the video display system, the text, session information, and other pieces of information may be fed to Watson™ with IBM™ or other cloud computing resource to interpret the text from the audio feed and increase its accuracy and with relation to the streaming content, the stream context, and the user profile.

In embodiments, the Watson™ service can begin to decipher and anticipate habits, emotions, moods, likes, and dislikes and the platform can incorporate this into video or web content to incorporate, for example, dynamic advertisements blended into the IML session. By way of this example, Watson™ sessions may determine that you are sad today, you like Disney, and you have not used your vacation time, so the platform can provide a one-time vacation package video that may pop up and be customized for the viewer and with pre-filled out information and itineraries. With the Watson™ service or the like, video and web content provided by the platform on the display can unify the presentation to the user and open machine human interaction for many applications. In one application, a doctor can prepare for surgery by reviewing imagery of the patient but simultaneously also asking the Watson™ services for its opinion and images and video of other operations and anatomies for visual comparison. In another example, a pilot may ask for radar information associated with an airport or other landing sites. In the landing procedures, the pilot can also check on cameras in the cabin and in the engine area to make sure everything is okay with all of the views available to the pilot.

Figure 40:
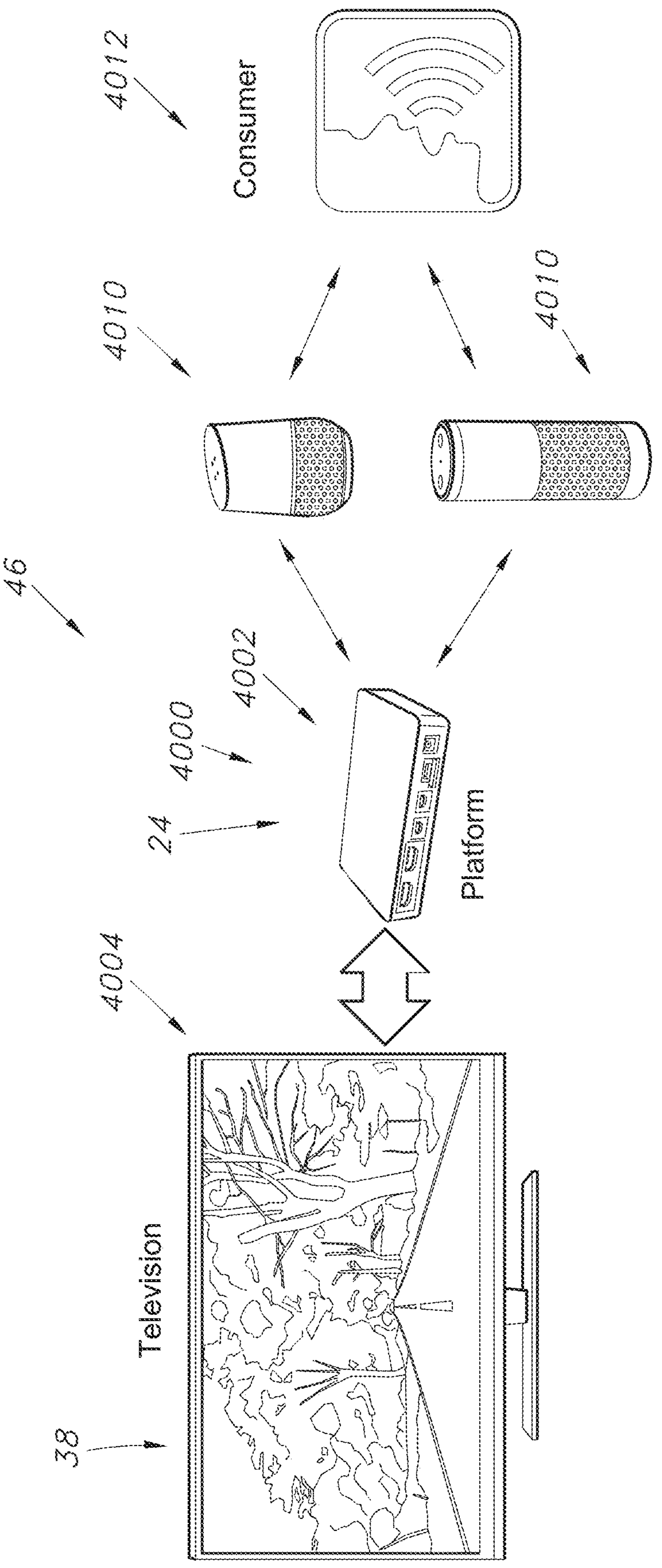
FIG. 40 is a diagrammatic view of the video display system configured to provide a video functionality layer add-on for interaction with voice integration units in accordance with the present disclosure.

Referring to FIG. 40, a video display system 46 includes a platform 4000 of a media processing system 24. The platform 4000 may be configured with a set top box 23 to present multiple views of content layered on a video display device 38 such as a LED TV, LCD monitors, the display 4004, or the like. The platform 4000 may interact with one or more voice integration units 4010 that may communicate with a consumer 4012 and other users. The voice integration units 4010 may be an Amazon™ voice product such as Amazon Echo™, Amazon Dot™, Amazon Alexa™, or the like. In other embodiments, the voice integration units 4010 may be Google™ products such as Google Home™. In other embodiments, the voice integration units 4010 may be other voice systems or devices that allow for network connectivity and are responsive to voice commands. The platform 4000 may be connected to the voice integration units 4010 so that portions of interactions or responses to interactions with the voice integration units 4010 may be displayed on the display 4004. It will be appreciated in light of the disclosure that one of the voice integration units 4010 may be deployed or multiple voice integration units may be deployed so that the consumer 4012 may walk from room-to-room, facility-to-facility, and the like and still engage with one of the voice integration units 4010, as needed. In embodiments, the platform 4000 may serve as a system integrator obtaining feedback from the consumer 4012 and, in return, the platform 4000 may interact with the consumer 4012 on screen displays as messages from the platform 4000 and as movable and configurable notes generated by the consumer 4012 for on the screen collaboration, reminders, demonstratives, or the like.

Figure 41:
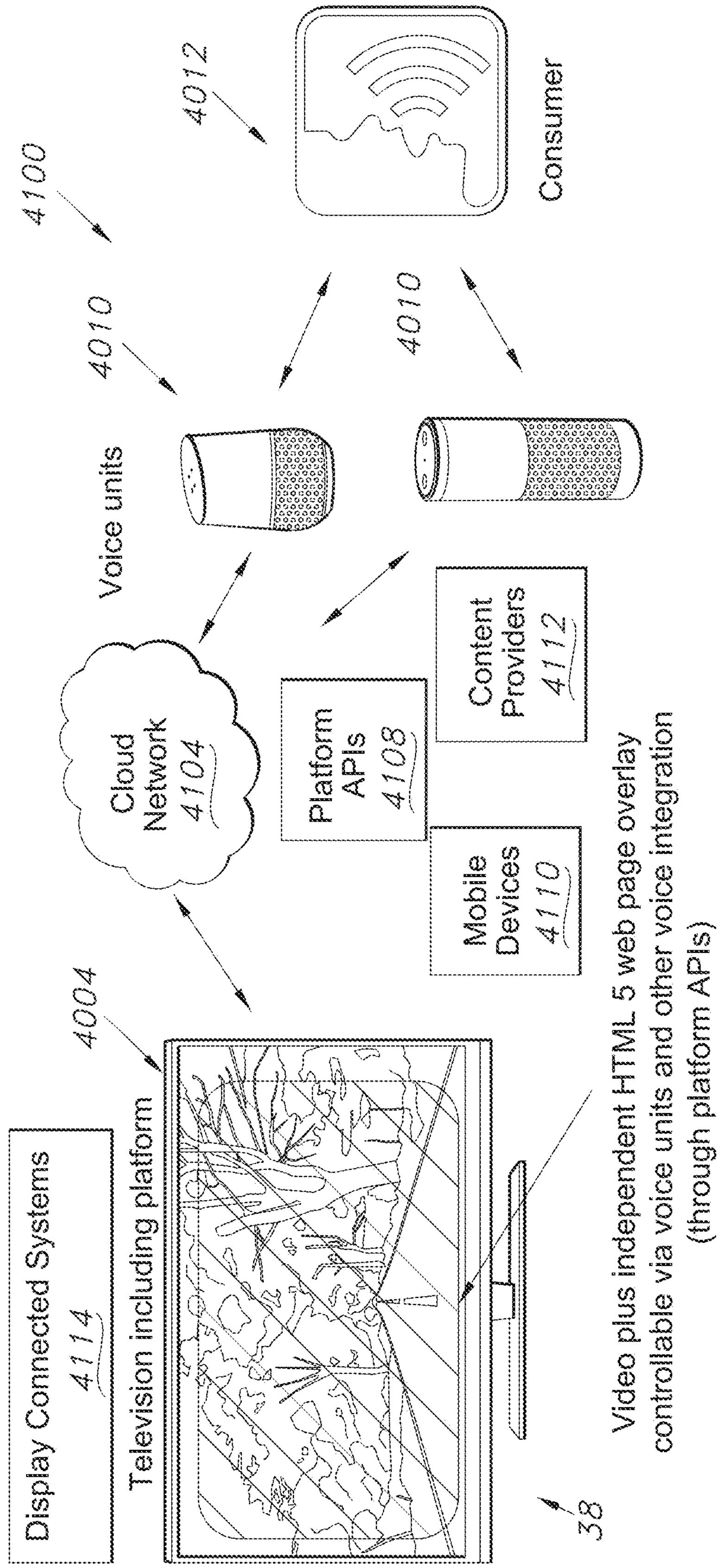
FIG. 41 is a diagrammatic view of the video display system configured to provide a video functionality layer add-on as cloud service for interaction with voice integration units in accordance with the present disclosure.

Referring to FIG. 41, the video display system 46 includes a cloud-based platform 4100 for presenting multiple views of layered content on the display 4004, LED TV, LCD monitors, or the like. The platform 4100 may interact with the voice integration units 4010 that may communicate with a consumer 4012 and other users. The systems and methods of the platform 4002 may be deployed as a cloud service and may be configured so as to not require any additional hardware local to the video display device 38 such as a set top box 23. The cloud service provided in the cloud-based platform 4100 may be configured to be available through a cloud network 4104. Through the cloud network 4104, the cloud service provided by the cloud-based platform 4100 may deploy platform APIs 4108 that may interact with the voice integration units 4010, mobile devices 4110, content providers 4112 and the connected systems 4114 of the video display device 38. In embodiments, the platform 4000, 4100 may be implemented with voice integration units 4010 and the many methods and systems disclosed herein and providing access to that functionality through voice commands and interactions with the video display device 38. It will be appreciated in light of the disclosure that the video display system 46 can be deployed with hardware, deployed as a cloud service and combinations thereof depending on the desired feature set and circumstances of the installation.

Figure 42:
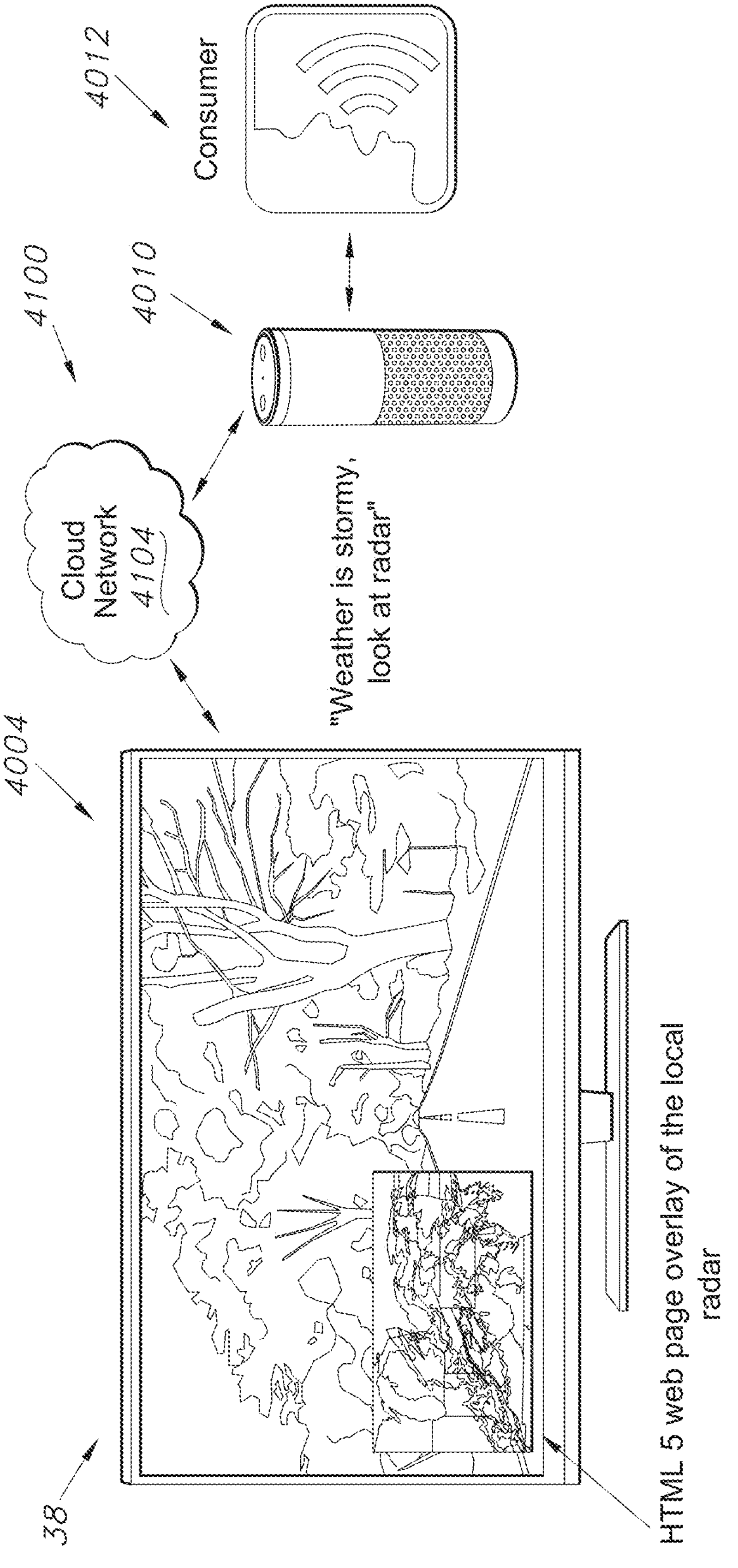
FIG. 42 is a diagrammatic view of the video display system configured to provide multiple layered video feeds directed to the video display device in response to commands from the consumer directed to the voice integration units in accordance with the present disclosure.

Referring to FIG. 42, the video display system 46 including for multiple layered video feeds 4200 directed to the video display device 38 in response to commands from the consumer 4012 directed to the voice integration units 4010. In embodiments, the consumer 4012 may ask the voice integration unit 4010, "What is the weather?" In response, the voice integration unit 4010 may respond with weather details. In one example, the voice integration unit 4010 may respond, "Weather is stormy, look at radar." By way of this example, the video display system 46 may layer a signal over other signals being displayed on the video display device 38 to, therefore, display a moving color radar stream 4202 on the display 4004. In embodiments, the location of the consumer 4012 may be linked to the location displayed in the moving color radar stream 4202. In embodiments, the consumer 4012 may cause the moving color radar stream 4202 to be zoomed in, zoomed out, re-centered, and the like by issuing similar voice commands to the voice integration unit 4010. After consideration of the moving color radar stream 4202, the consumer 4012 may dismiss the additional radar imagery by commanding the voice integration unit 4010 to remove the moving color radar stream 4202 from being displayed in the display 4004.

In embodiments, the video display system 46 may be further configured to accept commands to control one or more video display systems 46 such as the display 4004. By way of this example, the video display system 46 is configured to receive commands through one or more voice integration units 4010 and control features on the display 4004 or other video display device 38 such as channel up, channel down, zoom control, brightness control, input selection, volume up, volume down, second audio program controls, closed-captioning controls, and the like. Other controls include powering on or off the display, adjusting audio controls, adjusting video controls, and turning off and on mute volume controls.

In embodiments, the video display system 46 may be further configured to accept commands to control one or more video display systems 46 including services received through one or more IP streams 2402 (FIG. 24) such as social media, customer relations management software, web-based or mobile control panels for live sporting events and associated fantasy sport systems. By way of this example, the video display system 46 may interact with Twitter™, Snapchat™, Facebook™, Instagram™, LinkedIn™, and the like and the consumer 4012 may control portion of the social media interaction be voice commands and interaction with the voice integration units 4010. Also, by way of this example, the video display system 46 may interact with massive online multi-player games and other distributed gaming experiences and the consumer 4012 may control portion of the gaming experience, or merely check status on the games while enjoying other media, with voice commands and interaction with the voice integration units 4010.

In embodiments, the video display system 46 may interact with massive online multi-player games and other distributed gaming experiences and the consumer 4012 may control portions of the gaming experience, or merely check status on the games while enjoying other media, with voice commands and interaction with the voice integration units 4010.

In embodiments, the video display system 46 may control the video display device 38 and its connected systems 4114 so that the consumer 4012 may cause changes to layouts, skins audio focus, and other factors that control the look and feel of the display and content by speaking those commands to the voice integration unit 4010.

In embodiments, the video display system 46 may control the video display device 38 so that the consumer 4012 may cause the display of information from smart home components, automation systems, weather displays, social media systems, and the like by speaking the commands to the voice integration unit 4010. In embodiments, the video display system 46 may control the video display device 38 so that the consumer 4012 may cause the display of information related to the show that is currently being displayed on another of the LED TVs displays 4004 by speaking the commands to the voice integration unit 4010. In embodiments, the video display system 46 may control the video display device 38 so that the consumer 4012 may cause the display of information related to simple request such as "What is the score in pats game? or "what is a list of hot shows?" by speaking the commands to the voice integration unit 4010. In embodiments, the video display system 46 may control the video display device 38 so that the consumer 4012 may cause the display of information and content connection with Chromecast™ and Fire Stick™ by speaking the commands to the voice integration unit 4010.

Figure 43:
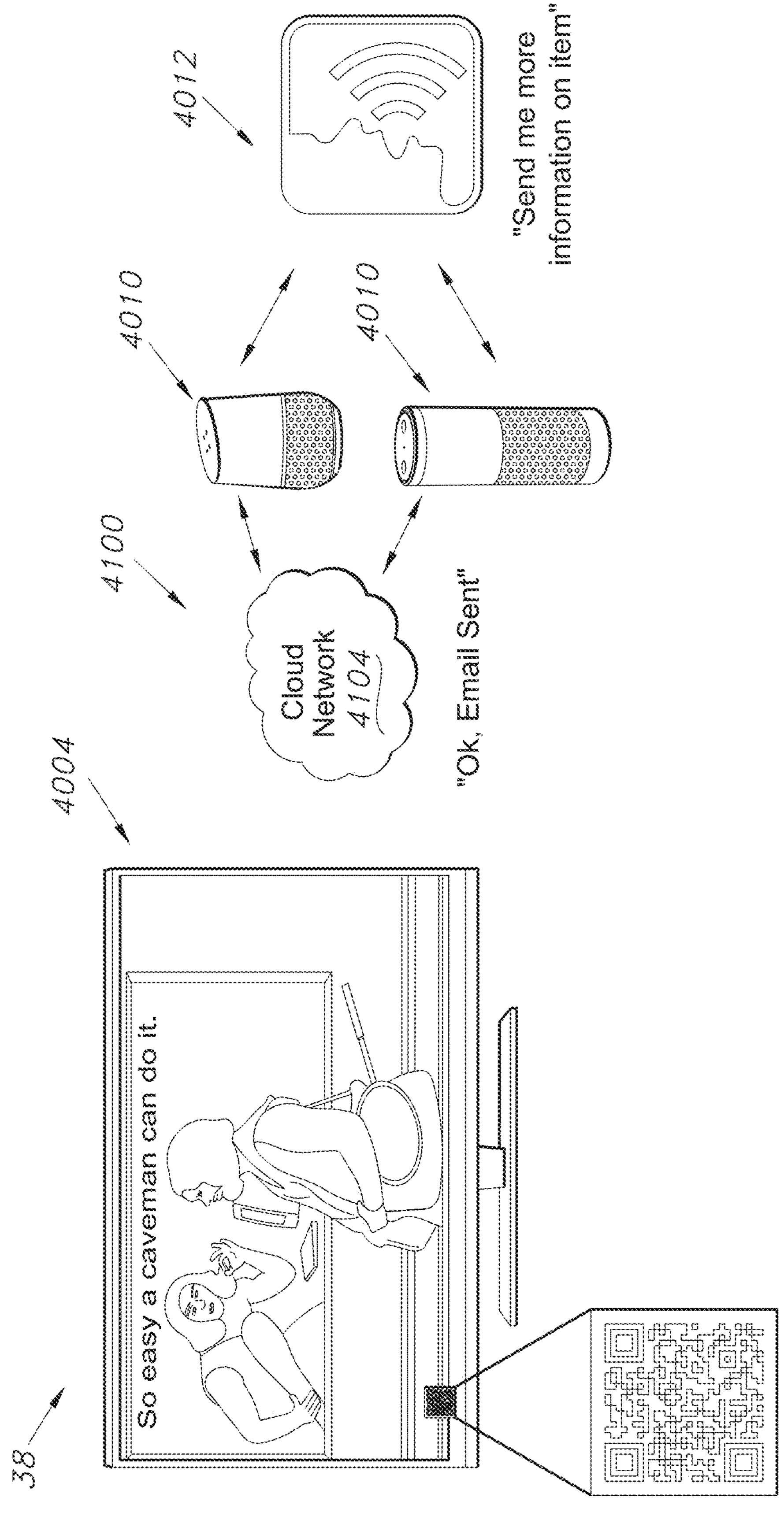
FIG. 43 is a diagrammatic view of the video display system configured to control the video display device so that the consumer may react to, show more interest in, question, and comment on the display of information on the video display device by speaking the commands to the voice integration units in accordance with the present disclosure.

Referring to FIG. 43, the video display system 46 may control the video display device 38 so that the consumer 4012 may react to, show more interest in, question, and comment on the display of information on the video display device 38 by speaking the commands to the voice integration unit 4010. By way of this example, the consumer 4012 may observe an advertisement 4300 on the video display device 38 and may take an interest in it. The consumer 4012 may then say, "Send me more information on the item." The voice integration unit 4010 may respond by saying, "Okay, email sent" or a similar message may be displayed on the video display device 38. The video display system 46 may determine the content of the advertisement 4300 and may link the consumer 4012 with an advertising all with the consumer 4012 merely speaking of the interest to the voice integration units 4010.

Figure 44:
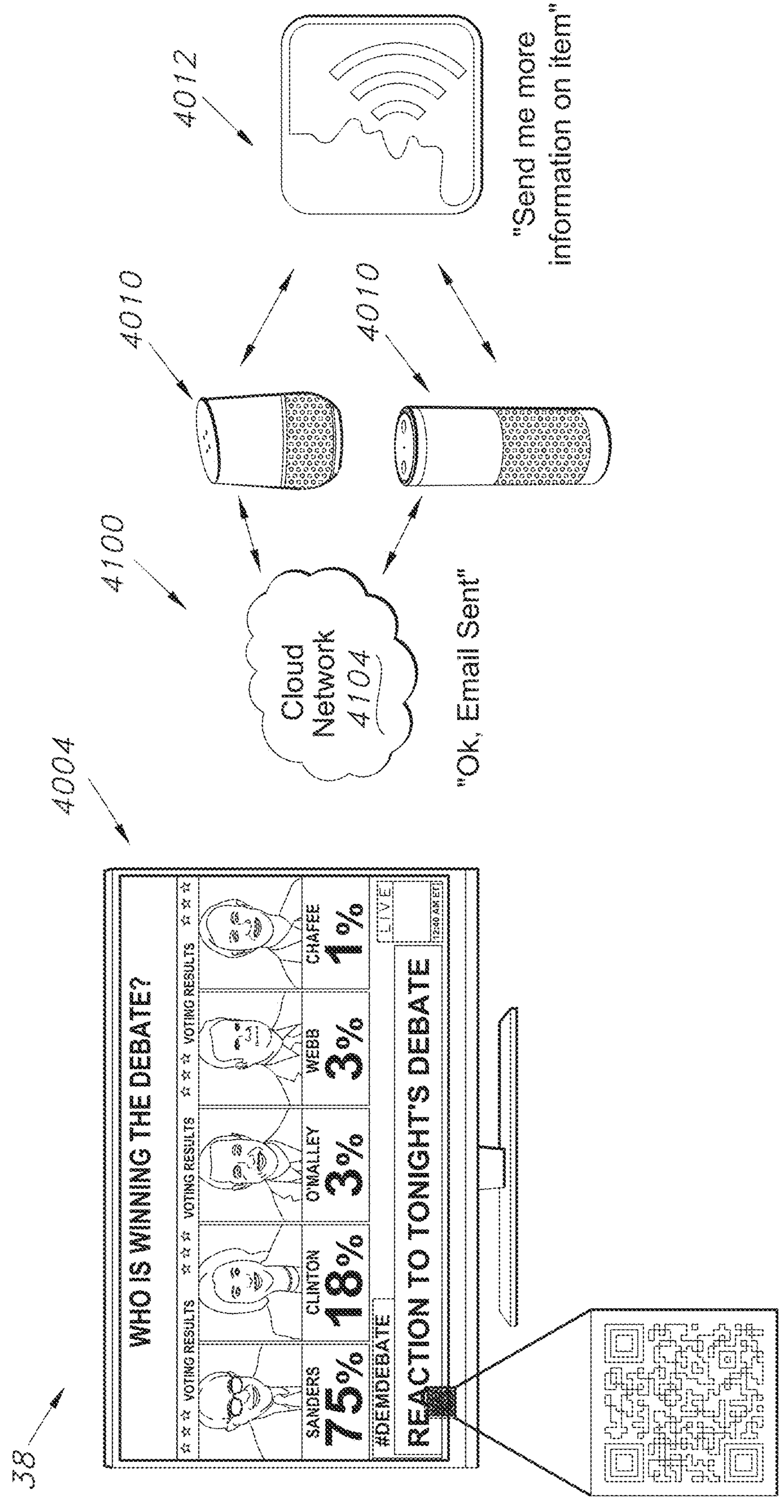
FIG. 44 is a diagrammatic view of the video display system configured to control the video display device so that the consumer may vote, be polled, or react to, the display of information on the video display device by speaking the commands to the voice integration units in accordance with the present disclosure.

Referring to FIG. 44, the video display system 46 may control the video display device 38 so that the consumer 4012 may interact with content 4400 on the video display device 38 by speaking the commands to the voice integration unit 4010. By way of this example, the consumer 4012 may observe the content 4400 in the form of a debate 4402, talent content, sports content, other competitions, or the like. The consumer 4012 may be prompted for a vote, a ranking, an approval, or the like based on activity occurring in the content 4400. The consumer 4012 may then say, "I vote Webb." The voice integration unit 4010 may respond by saying, "Okay, vote for Webb sent" or a similar message may be displayed on the video display device 38. The video display system 46 may determine show or media in the content 4400 and may link the consumer 4012 with the provider of the content 4400 so the vote, opinion, or the like of the consumer 4012 may be tallied and considered by merely speaking to the voice integration units 4010.

Referring to FIG. 45, the video display system 46 may control the video display device 38 so that the consumer 4012 may add overlay content 4500 on the video display device 38 by speaking the commands to the voice integration unit 4010. By way of this example, the consumer 4012 may add the overlay content 4500 in the form of smiley faces 4502, pictures 4504, check marks, other emoji and annotations, or the like based on activity occurring already on the video display device 38. The consumer 4012 may then say, "Add a happy face to the TV." The voice integration unit 4010 may respond by saying, "Okay, happy face added" or a similar message may be displayed on the video display device 38. As such, the video display system 46 may insert and display the overlay content 4500 by merely speaking to the voice integration units 4010.

Figure 46:
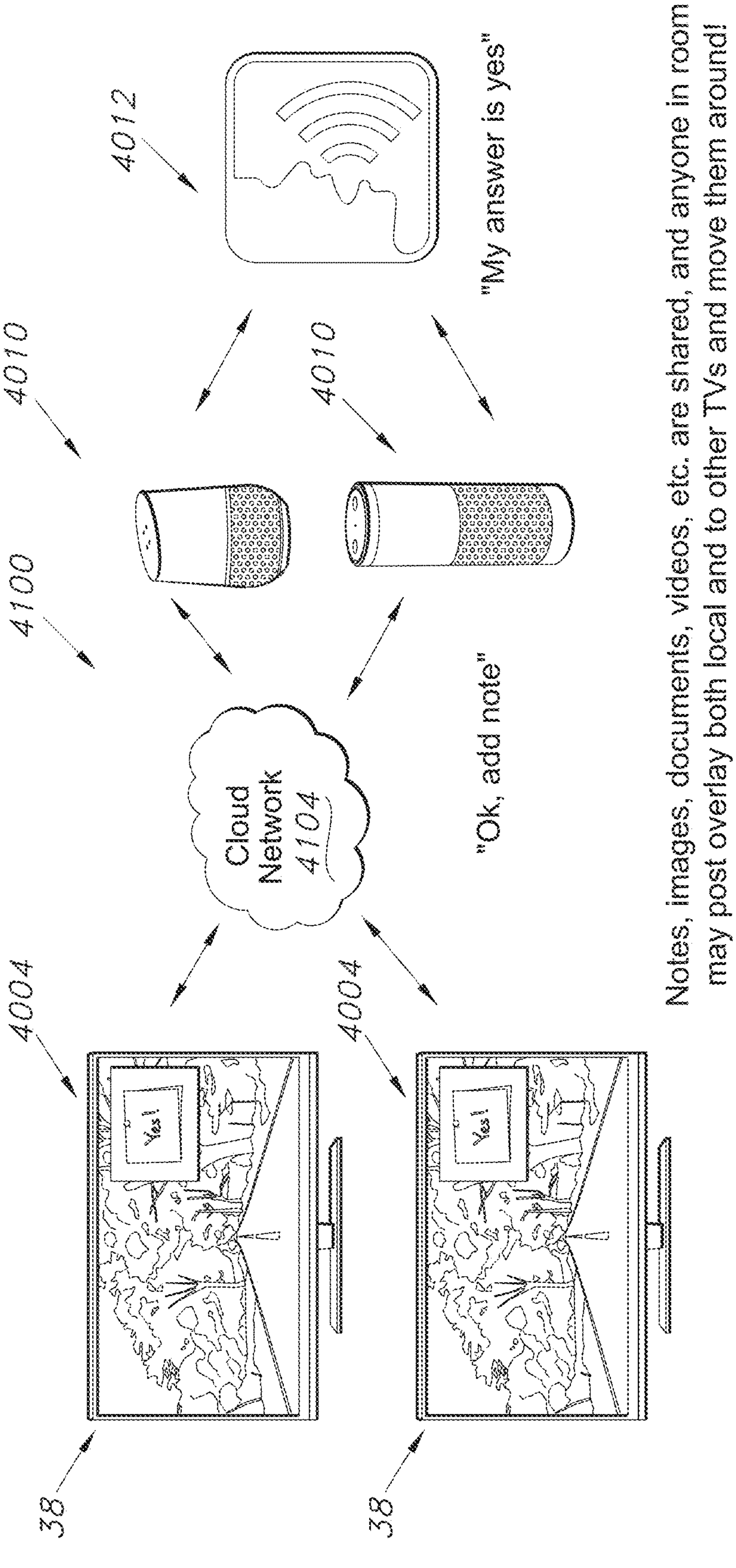
FIG. 46 is a diagrammatic view of the video display system configured to control the video display device so that the consumer may insert and react with notes and graphics in collaboration with other users that are placed on the video display device by speaking the commands to the voice integration units in accordance with the present disclosure.

Referring to FIG. 46, the video display system 46 may control the video display device 38 so that the consumer 4012 may add collaborative content 4600 on the video display device 38 by speaking the commands to the voice integration unit 4010. By way of this example, the consumer 4012 may add the collaborative content 4600 in the form of notes that may be seen by other consumers or users in the same household or business or may be purposely linked anywhere in the world to enter into this collaboration. The consumer 4012 may say, "Add a collaborative note that says YES." The voice integration unit 4010 may respond by saying, "Okay, note added for sharing" or a similar message may be displayed on the video display device 38. Any person who may connect with the video display system 46, may collaborate on the note and in doing so may add text, revise the text, assign tasks, move the notes, change the appearance of the note, and the like. As such, the video display system 46 may insert and display the collaborative content 4600 by merely speaking to the voice integration units 4010.

Figure 47:
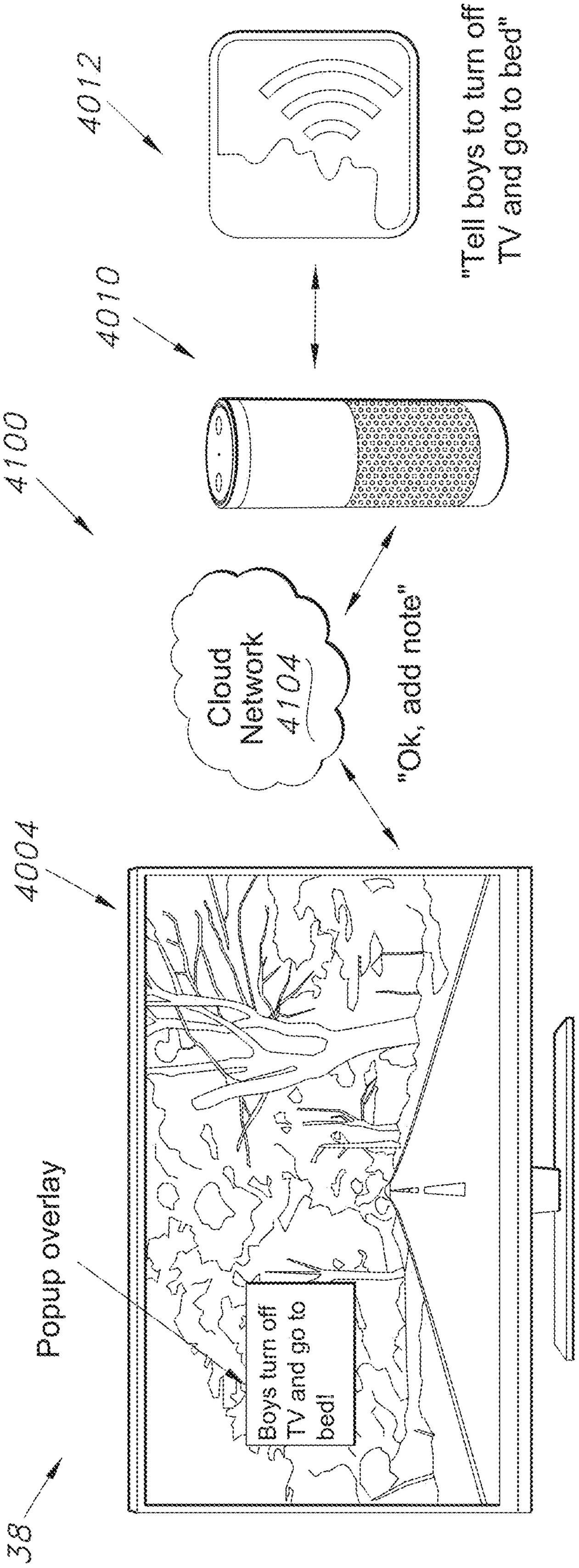
FIG. 47 is a diagrammatic view of the video display system configured to control the video display device so that the consumer may insert messages to other users that are placed on the video display device by speaking the commands to the voice integration units in accordance with the present disclosure.

Referring to FIG. 47, the video display system 46 may control the video display device 38 so that the consumer 4012 may add messages 4700 on the video display device 38 by speaking the commands to the voice integration unit 4010. By way of this example, the consumer 4012 may add the messages 4700 that may be seen by other consumers or users in the same household, business, location, and the like. By way of this example, the consumer 4012 may be a parent that speaks to the voice integration units 4010 to tell the children to go to bed. The consumer 4012 may say, "Tell the boys to turn off the TV and go to bed." The voice integration unit 4010 may respond by saying, "Okay, note added" or a similar message may be displayed on the video display device 38. Moreover, the messages 4700 may be displayed a particular video display device 38 in which another voice integration unit 4010 may be able to detect that the children are in the room and watching the particular video display device 38. In other examples, the messages 4700 may be displayed all video display systems 46 in the house, business, or local region by merely speaking to the voice integration units 4010.

Figure 48:
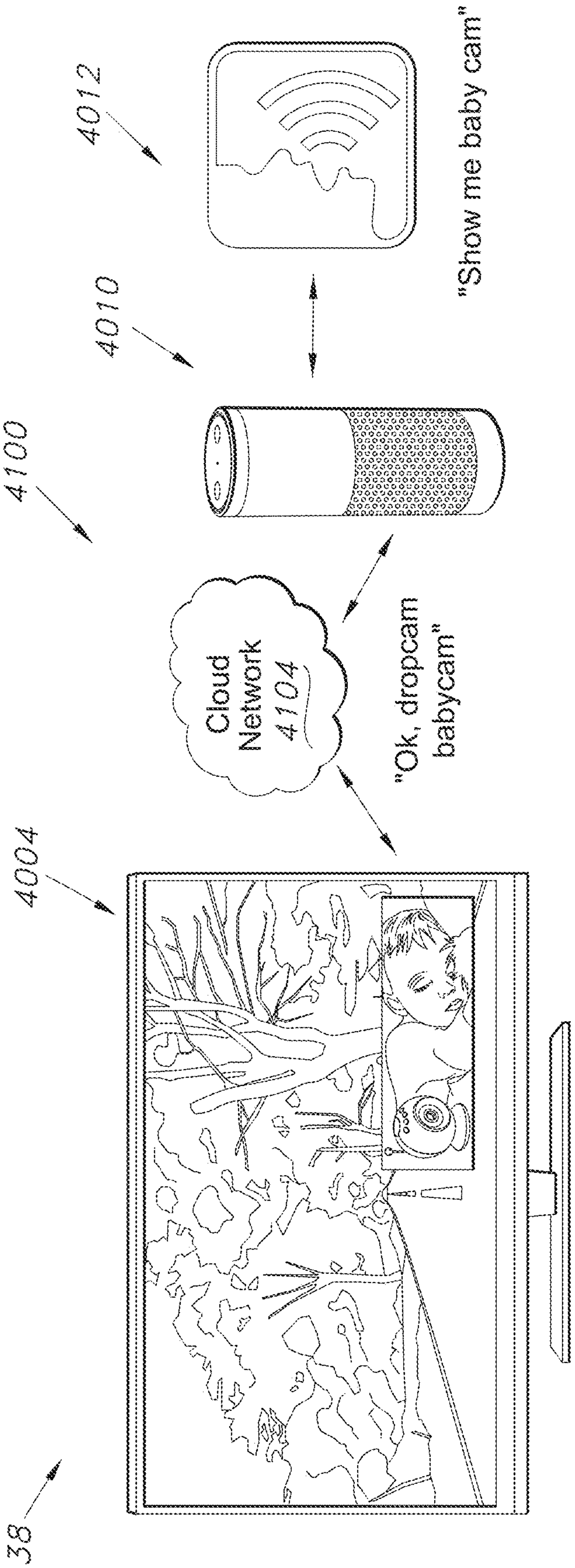
FIG. 48 is a diagrammatic view of the video display system configured to control the video display device so that the consumer may command that certain camera feeds such as from a baby cam are placed on the video display device by speaking the commands to the voice integration units in accordance with the present disclosure.

Referring to FIG. 48, the video display system 46 may control the video display device 38 so that the consumer 4012 may add a local video signal 4800 on the video display device 38 by speaking the commands to the voice integration unit 4010. By way of this example, the consumer 4012 may add the local video signal 4800 when the consumer 4012 is concerned about someone or something in or outside the home. The consumer 4012 may say, "Show me the baby camera." The voice integration unit 4010 may respond by saying, "Okay, baby cam displayed" or a similar message may be displayed on the video display device 38. In embodiments, the local video signal 4800 may include a baby camera, a front door camera, a back-door camera, a grill camera for monitoring food, a sewer and sump camera, an HVAC camera, and the like. In the various examples, the consumer 4012 may immediately see any camera, detector, or sensors on the video display device 38 by merely speaking to the voice integration units 4010.

In embodiments, the systems and methods disclosed herein may be deployed to serve a cloud facility, a closed cloud network, or the like including components and systems of the video display system 46 that may be configured and deployed to scale to facilitate parallel processing. The components and systems of the video display system 46 may be deployed in one or more drive configuration and enclosures. In embodiments, the drive configuration and enclosures may incorporate one or more off-the-shelf parts that can be configured to be deployed at scale and may be shown to relatively reduce power, increase speed, and reduce cost.

Figure 49:
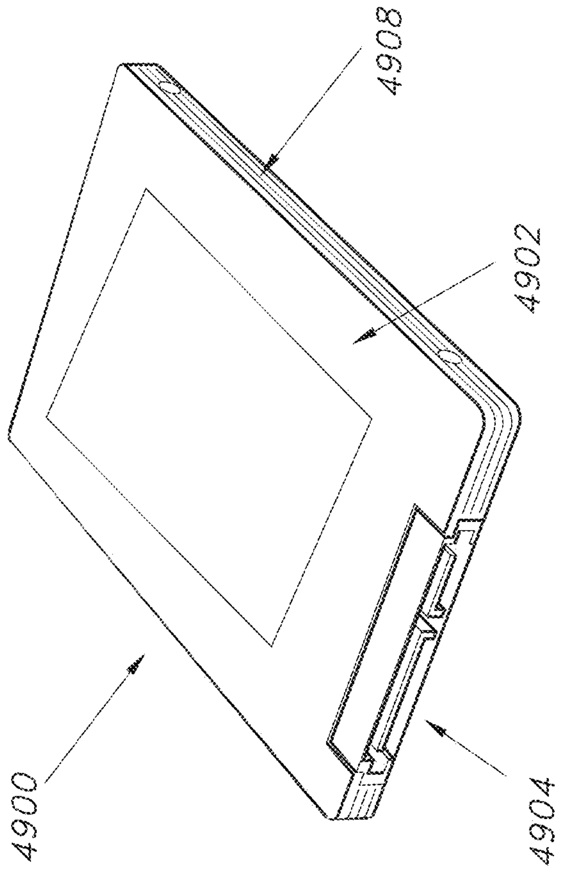
FIG. 49 is a diagrammatic view of a computerized media processing unit including a scalable drive enclosure to facilitate running field programmable gate arrays in an array and related memory and processor for streaming video sources in accordance with the present disclosure.

Referring to FIG. 49, a processor enclosure 4900 may be configured to deliver the one or more features and services of the video display system 46 and may be scaled to any number of the processor enclosures 4900 that can support one or more users over a cloud network facility or one or more closed network or closed cloud facilities. It will be appreciated in light of the disclosure that the processor enclosure 4900 can be configured with many different drive enclosure sizes such as an SSD format including an enclosure configured in a 3.5-inch (about 90 mm) storage drive profile 4902. The processor enclosure 4900 may be configured to include the field programmable gate arrays, processor and memory components, or the like that may be mounted within the processor enclosure 4900 in a form profile 4902 and a connector configuration 4904 that may permit connections to most network drive components, computing devices, enterprise racks including to connectors 4908, and the like. Examples of the field programmable gate arrays include Xilinx™ brand field programmable gate arrays.

Figure 50:
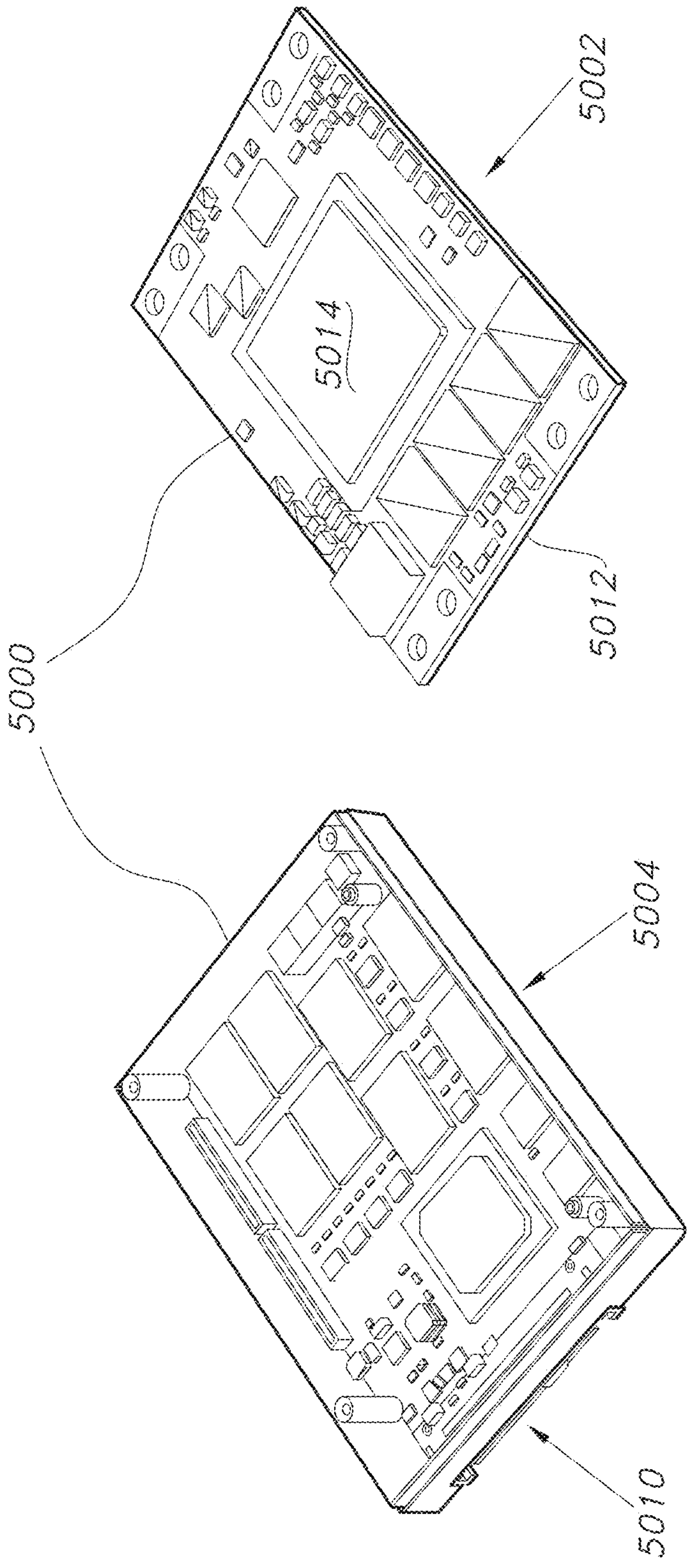
FIG. 50, FIG. 51, and FIG. 52 are diagrammatic views of examples of daughter boards connected to platforms to provide cooperatively scalable drive enclosures for parallel processing with a plurality field programmable gate arrays in an array and related memory and processor for streaming video sources in accordance with the present disclosure.

Referring to FIG. 50, a processor enclosure 5000 may be configured to deliver the one or more features and services of the video display system 46 and may be scaled to any number of the processor enclosures 5000 that can support one or more users over a cloud network facility or one or more closed network or closed cloud facilities. In embodiments, the processor enclosures 5000 can be configured to mate a daughter board 5002 to a platform 5004 to cooperatively form the processor enclosures 5000 that may be in the SSD format 5008 or the like for mounting and connection with existing electronics and connectors 5010. In embodiments, the daughter boards 5002 may include one or field programmable gate arrays (FPGAs), processors, memory, and the like. By way of this example, the daughter board may be configured with a Xilinx™ brand FPGAs. In one example, the Xilinx™ brand FPGA is a 5.2×7.6 cm (about two inches by about three inches) Xilinx™ Zync™ Ultrascale+™. In one example, the processor can deploy a 64-bit operating system using multiple gigabytes of random access memory such as 4 GB DDR4. In embodiments, the daughter board 5002 may be configured as a passive daughter board. In embodiments, the daughter board 5002 may be configured as to mate to typical SSD connectors 5012 to one or more field programmable gate arrays 5014 that may be mounted to the daughter board 5002. In embodiments, one example of the field programmable gate array 5014 is a Xilinx™ brand board. In embodiments, the daughter board 5002 may be a passive board that may be operatively coupled to the platform 5004 to form the processor enclosure 5000.

Figure 51:
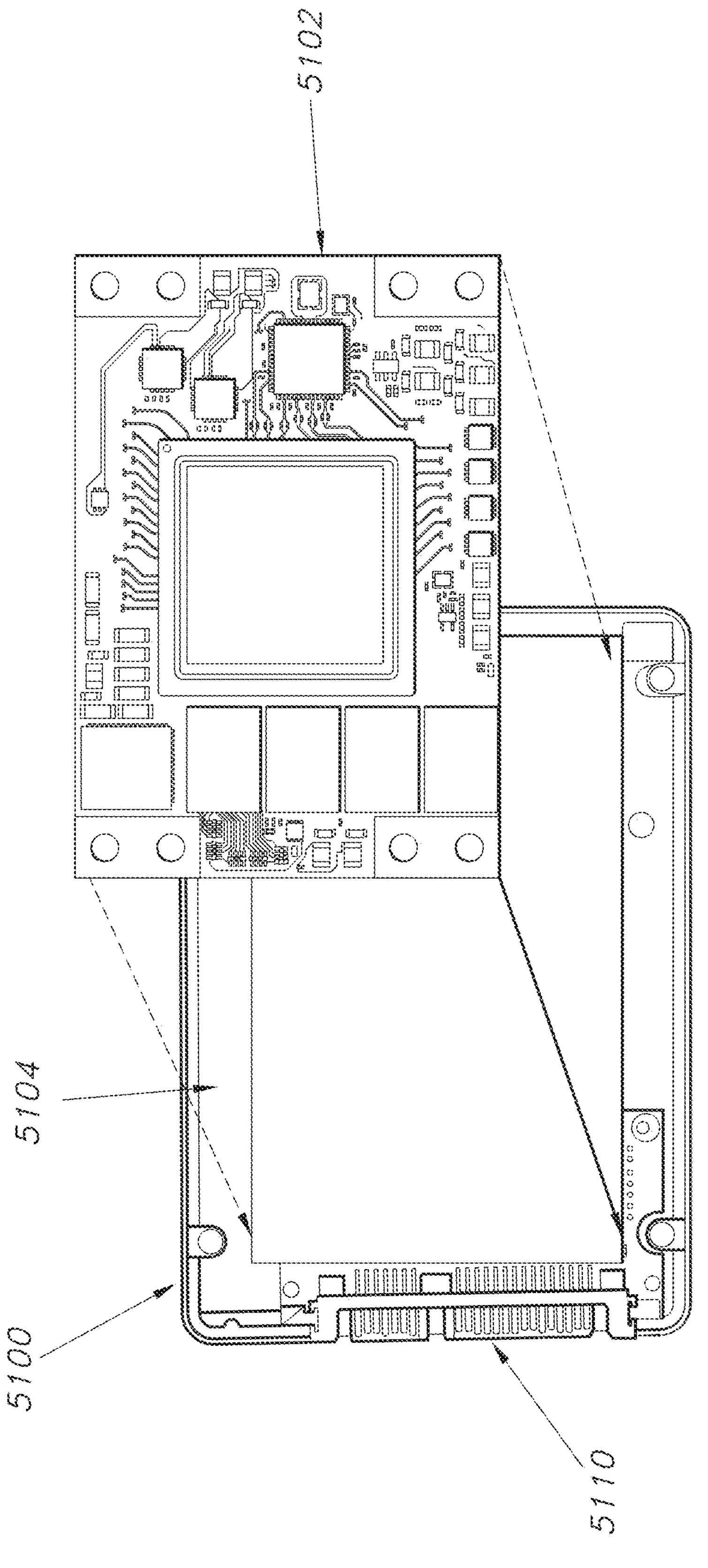

Referring to FIG. 51, a processor enclosure 5100 may be configured to deliver the one or more features and services of the video display system 46 and may be scaled to any number of the processor enclosures 5100 that can support one or more users over a cloud network facility or one or more closed network or closed cloud facilities. In embodiments, the processor enclosures 5100 can be configured to mate a daughter board 5102 to a platform 5104 to cooperatively form the processor enclosures 5100 that may be in the SSD format 5108 or the like for mounting and connection with existing electronics and connectors 5010. By way of this example, the daughter board 5102 may include one or field programmable gate arrays (FPGAs), processors, memory, and the like. In embodiments, the daughter board 5002 may be configured, in contrast, to be the active component while the platform 5104 may be a passive platform to provide the SSD platform and other connections 5112. In embodiments, the daughter board 5002 may be configured as to mate to typical SSD connectors 5110.

In embodiments, the video display system 46 may include a computerized media processing unit configured to receive a plurality of content from a plurality of content sources and configured to combine the plurality of content from the plurality of content sources to generate and output a video signal receivable by at least one display device. The computerized media processing unit may include the daughter board 5102 having a processor, memory, and field programmable gate arrays connected with a platform having drive connections such as the connectors 5110 through which plurality of content may be delivered. The daughter board 5102 and platform may cooperatively form the scalable drive enclosures 4900, 5000, 5100, and other examples disclosed herein.

Figure 52:
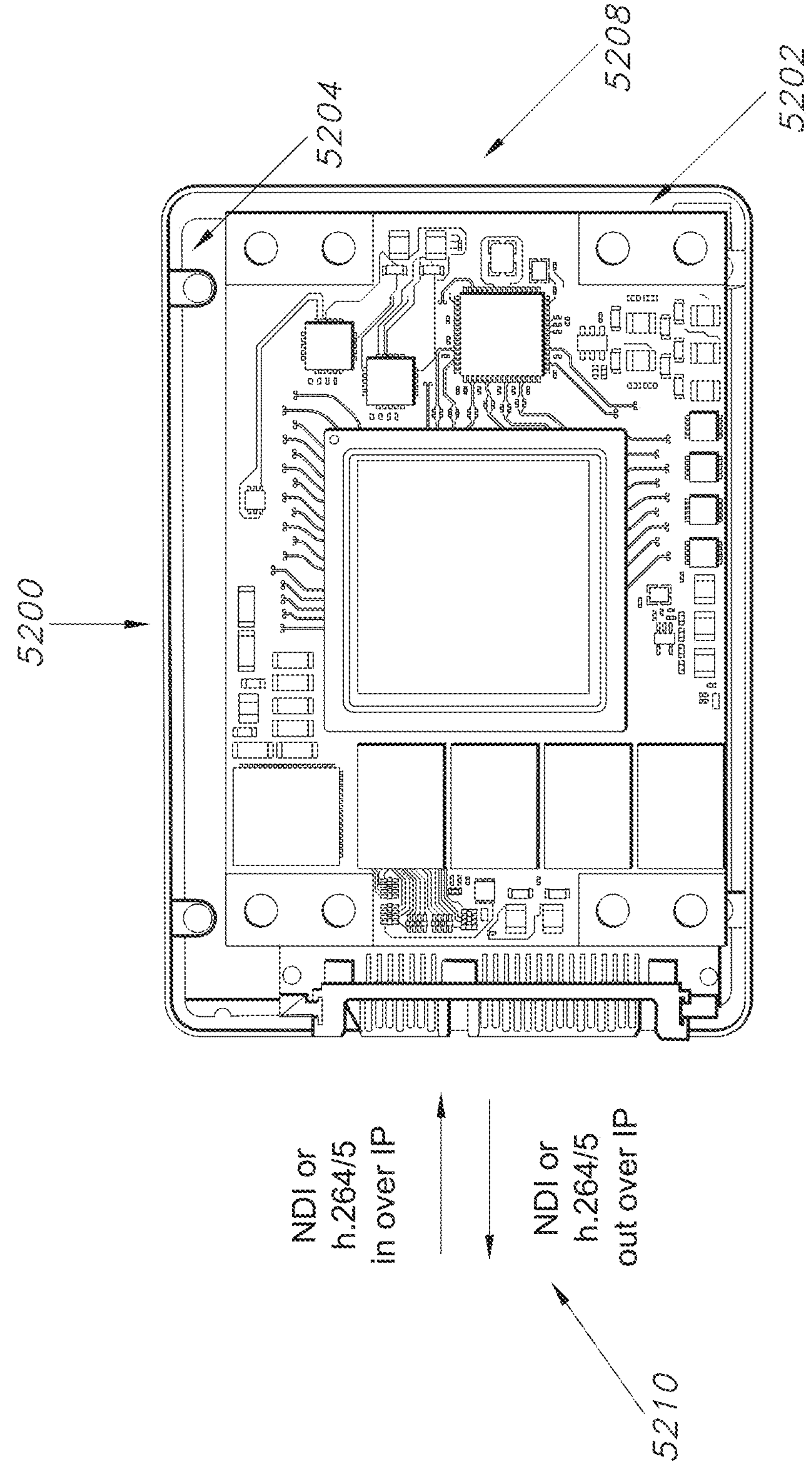

Referring to FIG. 52, a processor enclosure 5200 may be configured to deliver the one or more features and services of the video display system 46 and may be scaled to any number of the processor enclosures 5200 that can support one or more users over a cloud network facility or one or more closed network or closed cloud facilities. In embodiments, the processor enclosures 5200 can be configured to mate a daughter board 5202 to a platform 5004 to cooperatively form the processor enclosures 5000 that may be in the SSD format 5208 or the like for mounting and connection with existing electronics and connectors 5010. The field programmable gate arrays, processor, and memory on the daughter board 5202 may run all video and control processing. In embodiments, the daughter boards 5202 may include a hardened video control unit (VCU) that may decode or encode video streams in a h.264/5 format. In embodiments, a single 4K video can be encoded and decoded, a combination of 1K video streams can be encoded and decoded, or various applicable combinations. In embodiments, the video stream may be received and be sent as a h.264/5 format, a network device interface (NDI) format, an IP stream, or the like. In embodiments, the encoding and decoding may occur simultaneously. In embodiments, the processor enclosure can also be configured with Ethernet connectivity. In many examples, Ethernet connectivity may include speeds up to 10 GbE. In embodiments, the processor may be configured as quad ARM cores and graphics processing unit. In embodiments, the processor may be configured to run in a 64-bit environment. In embodiments, the processor enclosures 4900, 5000, 5100, 5200 can be configured to power up to 20 watts that can be shown to reduce overall costs.

Figure 53:
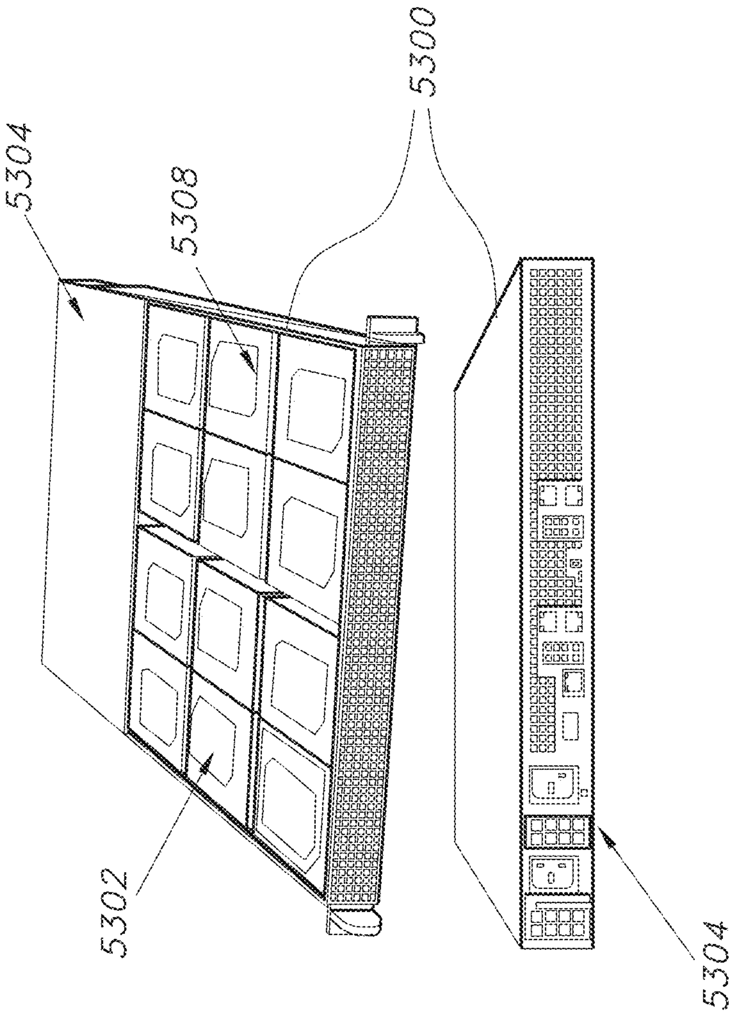
FIG. 53 is a diagrammatic view of a plurality of scalable drive enclosures of the computerized media processing unit assembled in an enterprise rack to facilitate parallel processing of streaming of video sources from a cloud network facility in accordance with the present disclosure.

Referring to FIG. 53, an array of processor enclosures 5300 may be configured to deliver the one or more features and services of the video display system 46 and may be scaled with multiple processor enclosures 5302 that can support parallel processing for one or more users over a cloud network facility or one or more closed network or closed cloud facilities. In embodiments, the processor enclosures 5300 can each be configured to mate with an enterprise frame 5304 to cooperatively form of the array of processor enclosures 5300 with each of the processor enclosures 5302 being in the SSD format 5308 or the like. In embodiments, the daughter board with the field programmable gate arrays, processor and memory may connect with the platforms having a network drive configuration to cooperatively form the scalable drive enclosures 4900, 5000, 5100, 5200, 5302 that can be deployed on the enterprise frames 5304. It will be appreciated in light of the disclosure that many drive enclosures may be deployed using pre-existing network drive infrastructure, e.g., SSD network drives, making it relatively inexpensive to deploy in a massive scale that may be configured to support cloud network facilities and closed cloud networks. In embodiments, the daughter boards may be configured to be combinable with otherwise commercially available Ethernet connections and SSD power and connectivity.

In embodiments, the array of processor enclosures can be deployed on the enterprise frame 5304 that can be configured to otherwise contain and connect to twelve drive enclosures 5302. The enterprise frame and include redundant Switch connectivity at each of the twelve connections with 16×1G downstream ports to the drive enclosures 5302. In embodiments, the enterprise frame can be similar to a Superstorage™ brand model SSG-K1048-RT rackmount chassis. In embodiments, twelve drive enclosures 5302 may be configured to be powered by about 240 watts using Ethernet connectivity. By way of this example, the enterprise frame 5304 may be configured to contain and connect to twelve drive enclosures 5302 and a rack may contain 32 enterprise frames 5304 thus providing at least 384 device enclosures per rack that can form part of parallel processing power available to the computerized media processing unit.

In embodiments, the video display system includes a cloud network facility including the computerized media processing unit configured with a plurality of scalable drive enclosures cooperatively formed by a daughter board having a processor, memory, and field programmable gate arrays connected with a platform having drive connections through which plurality of content is delivered to provide large-scale parallel processing.

In embodiments, the scalable drive enclosures are configured to fit in a 3.5-inch drive slot. In embodiments, the drive connections of the scalable drive enclosure are those that are configured to communicate with a solid-state device storage drive without modification. In embodiments, the drive connections of the scalable drive enclosure only provide data communication and power to the daughter board.

Figure 54:
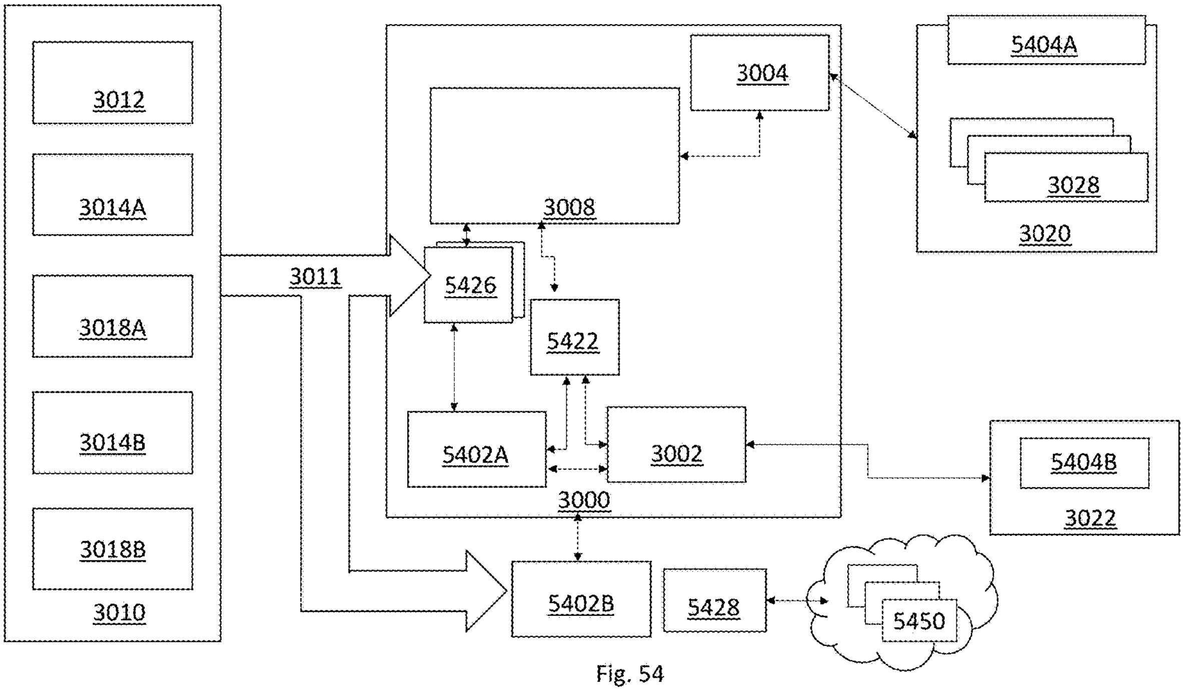
FIG. 54 illustrates components and interactions for an interactive multi-layer content platform that includes machine learning capabilities.

As noted throughout this disclosure and disclosed in connection with various embodiments, an interactive multi-layer content platform 3000 may provide for interactive, multi-layer content experiences by encoding a set of content streams from various heterogeneous content sources 3010 (such as HDMI or IP-based video, images, or animation, or other content types described throughout this disclosure and providing one or more display output streams (such as encoded as an IP-based stream, an HDMI stream, or the like) for consumption on a user display device 3020, such as a display screen of a TV, mobile device, or the like. FIG. 54, depicts the heterogeneous content sources 3010 as including game platform sources 3018A 3018B, Internet sources 3014A 3014B, and a linear TV source 3012. However, any, all, or combinations thereof of all of the various content sources described herein are contemplated as being part of the heterogeneous content sources 3010. Embodiments of the interactive multi-layer content platform 3000 may include a content mixing and layering system 3008 that may be deployed on premises in a hardware user video device, such as a set top box, such as in embodiments where the content mixing and layering system 3008 may use an FPGA to process the set of input content streams and encode a set of display output streams on a session-by-session basis. Embodiments of the interactive multi-layer content platform 3000 may include a plurality of input pipelines 5426 (FIG. 54) or content mixing and layering system 3008 in the cloud, or as a combination of cloud processing and on-premises hardware. Sessions may be controlled for a user, optionally including control by a user input device 3022 of a user, such as a mobile device (e.g., a smart phone, tablet, remote control, voice control device, or the like). In some instances, the user video device may be incorporated into the user display device.

Figure 55A:
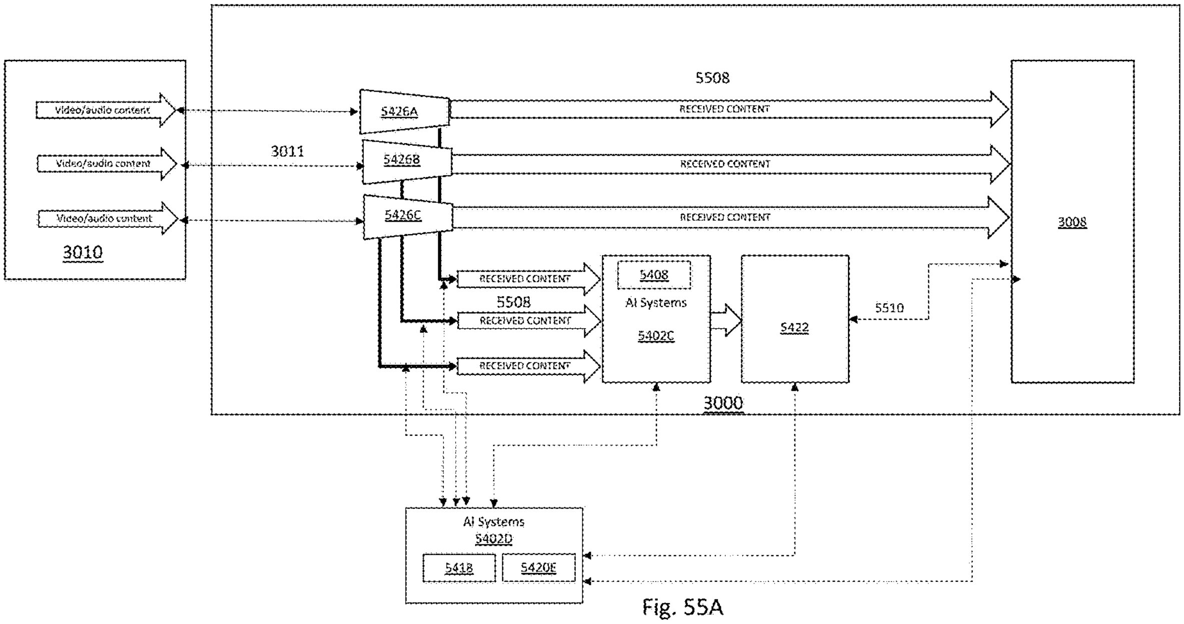
FIGS. 55A-B illustrate exemplary process flows of content streams using one or more machine recognition systems.
Figure 55B:
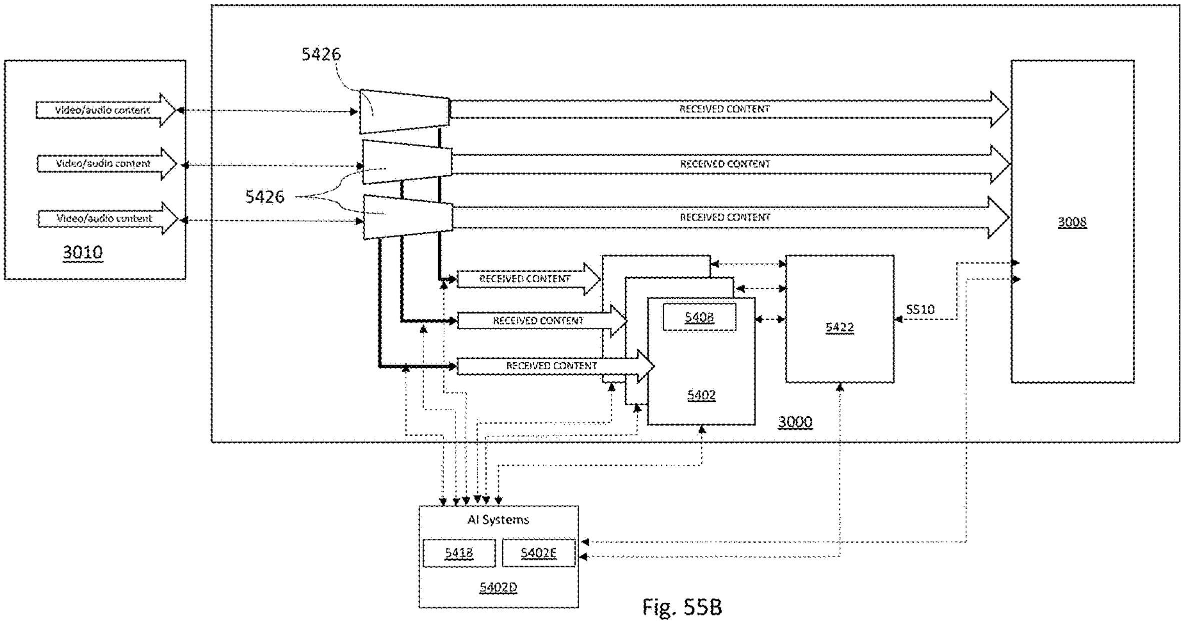

Referring to FIG. 54 and FIGS. 55A-B, one or more elements of the interactive multi-layer content platform 3000 may be improved by inclusion of, integration with, or use of, the results of one or more artificial intelligence (AI) systems 5402A 5402B (general instances of AI systems are referenced as 5402). Certain preferred embodiments involving the use of the one or more AI systems 5402 are described further herein. One or more of the AI systems 5402B may be external from the interactive multi-layer content platform 3000 or an AI system(s) 5402A incorporated as part of the platform or some combination thereof. Outputs of the one or more external AI systems 5402B may be provided to the interactive multi-layer content platform 3000, or generated by an AI system 5402A internal to the interactive multi-layer content platform 3000 to be used as inputs by any of the various systems, subsystems, processes, methods and components described throughout this disclosure, such as for content mixing and layering system 3008, encoding interactive multi-layer output stream 3004 into a display output stream, handling input parameters for a display device 3020, operating on user input, such as from a user input device 3022, and/or operating on images of the user, such as involving user identification, user gesture recognition or the like. Images of the user may be captured by one or more cameras 5404, such as a camera 5404B that may comprise a user input device 3022, be integrated on or with a user input device 3022, or a camera 5404A that is integrated on or with a display device 3020, such as a webcam on a user laptop device, a tablet, or a user-facing camera on a flat screen TV or other display. In embodiments, the one or more cameras 5404 may include a visual-spectrum camera, an IR camera, or other detection system and may be associated with a content user device.

Referring to FIGS. 55A-55B, the interactive multi-layer content platform 3000 may include a plurality of input pipelines 5426A 5426B 5426C (collectively referred to as 5426), each of which is configured to receive input content 3011 from a corresponding individual one of a plurality of various heterogeneous content sources 3010. The processing by the input pipeline 5426 may include one or more of decoding, if needed, of the input content 3011, subsampling the input content 3011, noise reduction, additional image manipulation, such as cropping, prior, subsampling and the like resulting in a processed input content stream, also known as a received content stream 5508, which may be shared with the content mixing and layering system 3008 to be combined into an display output stream, an IP stream of both. Referring to FIGS. 55A and 55B, one or more of the AI systems 5402C 5402D 5402E may analyze one or more of: the received content streams 5508, the results of a different AI system 5402, such as 5402D. The results of an AI system 5402C 5402D may be sent to an intelligent layering system 5422 which processes the results from a subset of the AI systems 5402 according to one or more of a set of rules and user input, to produce a layered output content stream 5510. An AI system 5402E may be part of a larger AI system 5402D and feed results to that AI system 5402D which may send the material to an intelligent layering system 5422 or on to another AI system 5402C. In embodiments, as shown in FIG. 55B, there may be a plurality of AI systems 5402 internal to the interactive multi-layer content platform 3000. Although not explicitly shown, a plurality of AI systems 5402 external to the interactive multi-layer content platform 3000 are also contemplated. The layered output content stream 5510 may be synchronized with at least one of the corresponding received content streams 5508. The layered content stream may include outlines of recognized objects or persons of interest, labelling of recognized objects or persons of interest, highlighting of recognized objects or persons of interest, and the like.

As noted herein, in many alternative embodiments, the interactive multi-layer content platform 3000 and the content mixing and layering system 3008 may decode and operate on a set of decoded content streams of heterogeneous types, such as video content streams from various heterogeneous content sources 3010. References to a video content stream in connection with use of AI systems 5402 should be understood to apply to any of the other heterogeneous types of content streams that may be encoded by the interactive multi-layer content platform 3000, except where content indicates otherwise.

Because the interactive multi-layer content platform 3000 optionally operates on each individual content stream using a corresponding input pipeline 5426, it is well positioned (whether located in a set top box or as a processor handling one or more sessions in the cloud) to output received content streams 5508 as either full resolution or subsampled versions to one or more AI systems 5402. There may be a one-to-one mapping of input content stream to an AI system 5402 or a single received content stream may map to a plurality of AI systems 5402.

Figure 56A:
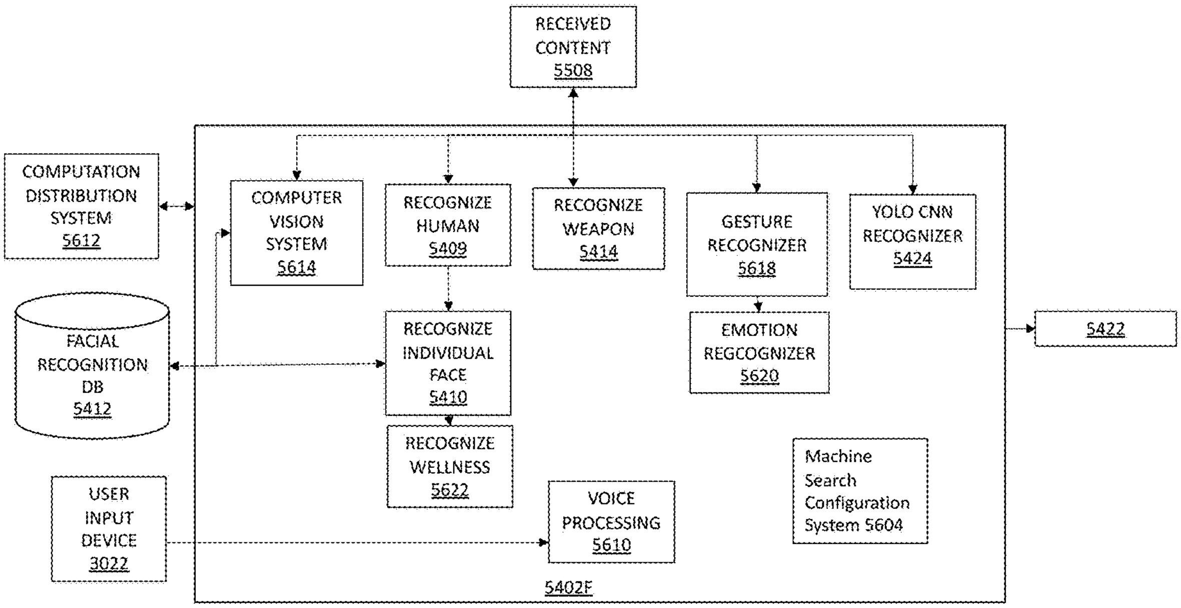
FIGS. 56A-B illustrate further components and interactions of exemplary machine learning systems in connection with an interactive multi-layer content platform.

As noted in FIG. 56A, an exemplary and non-limiting AI system 5402F may include one or machine recognition systems, also interchangeably and collectively known as recognizers 5408, where the set of recognizers 5408 may include various special-purpose systems that are configured for recognition of particular items, including third party recognition systems or modules, as well as recognition blocks that may be coded by a host of the interactive multi-layer content platform 3000, such as for integration into the interactive multi-layer content platform 3000. These recognizers 5408 may include computer vision systems 5614 and systems for recognizing a wide variety of items (such as by category, by attribute, by individual identity or the like) within video, still images, audio, or the like, including images of particular objects or individuals, facial recognition, natural language processing, speech recognition, pattern recognition system, voice recognition, motion prediction, object classification, action classification, a content recognition, and threat detection, gestures, voice signatures, speech content, audio content, biometric signatures, actions (including threats, behaviors of humans and other living things, movements of machines, processes, workflows, and a wide variety of others), and the like. A plurality of machine recognition systems 5408 configured to operate on a content stream in parallel, with each recognizer 5408 looking for a different object such as a human recognizer 5409, a weapon recognizer 5414, a gesture recognizer 5618, an emotion recognizer 5620, an You Only Look Once (YOLO), CNN recognizer 5424, and the like.

As shown in FIG. 56A, there may be a plurality of recognizers within an AI system 5402F. The recognizers 5409, 5410, 5412, 5414, 5618, 5424, 5620, 5622 may be independent from one another such that one or more recognizers 5408 of any given AI system 5402 may process the same individual received content stream 5508 for various purposes, such as to recognize the presence or absence of items within a set of received content streams 5508. Embodiments may include recognizers 5408 organized in parallel that recognize images, speech (e.g., searching for a topic in speech), audio (such as looking for signatures), and the like for a given received content stream 5508. Embodiments may include recognizers 5408 organized in series (sequentially) where application of a subsequent recognizer 5408 may be dependent on the output of a previous recognizer 5408. Embodiments may include various permutations of serial and parallel configurations.

In an illustrative and non-limiting example, as depicted in FIG. 56A, a first recognizer 5408 in a set of recognizers 5408 that are part of an AI system 5402F may be a human recognizer 5409 which may process the received content stream 5508 to identify the presence of a human being. If the presence of a human being is identified, a subsequent face recognizer 5410, in series with the previous, human recognizer 5409, may further process the received content stream 5508 and output from the human recognizer 5409 to determine, if possible, an identification of an individual. The face recognizer 5410 may process the recognized image of the human being to determine whether the face of the human being matches a library of faces in a facial recognition database 5412. Meanwhile, a weapon recognizer 5414, may process the same received content stream 5508 in parallel (concurrently) with the human recognizer 5409 to determine the presence or absence of a threatening object, such as a weapon. Output from a recognizer 5408, such as recognition of an image, a gesture, or the like, may be provided as an AI result, such as to the interactive multi-layer content platform 3000 or to any part of the interactive multi-layer content platform 3000, such as to be used as an input for further processing.

Figure 56B:
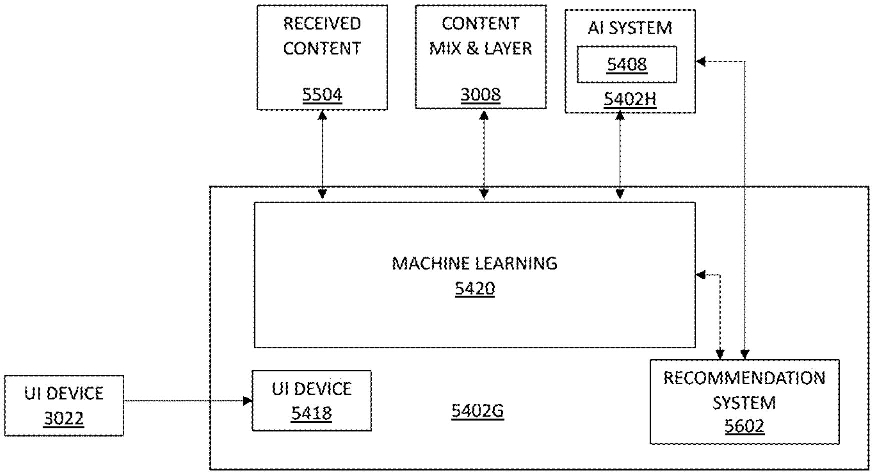

In embodiments as shown in FIG. 56B, the output of an AI system 5402H as described above may provide input to another AI system 5402G comprising a machine learning system 5420. The machine learning system 5420 may receive data from a plurality of sources such as received content streams 5504, the output of one or more AI systems 5402 processing the received content streams and the output of the content mixing and layering system 3008. The AI system 5402G, may include a user interface module 5418 to receive information from a user using a UI device 3022. The user interface module 5418 may be configured to received information from the user video device, the user display device or another user device, such as a smart phone, tablet, computer and the like.

The machine learning system 5420 may perform automatic learning on this data set or may combine this data with user input to train the machine learning system. The output of the machine learning system may be provided to a recommendation system 5602 that may suggest or automatically update one or more of algorithms, parameters, and the like to configure a set of recognizers 5408 to operate on a set of content streams in a way that is suitable for a given situation. These recommendations or updates may be provided to the one or more of the AI systems 5402H that were providing input to the machine learning system 5420.

In embodiments, configuration may include configuring the recognizers 5408 based on a time period or other variable; for example, a set of recognizers 5408 within an AI system 5402 for a set of video cameras inside a house may be configured for rapid threat detection during work hours (when the operator is away) and may be alternatively configured for other recognition tasks (such as activity type) during hours in which the homeowner is at home. In embodiments, a set of configuration templates may be provided for configuring recognizers within a machine recognition system 5408 for various purposes, such as threat detection, activity recognition, content generation, and others. These templates may be provided to an operator, such as an operator on behalf of a content consumer, or may be provided directly to the consumer, such as enabling configuration using an interface of a mobile device. In embodiments, a set of rules may be provided for automatically configuring the recognizers 5408 within an AI system 5402, such as where recognition of an item in a received content stream, receipt of an input from an operator, or receipt of external data (such as a trigger, alert or other event), results in a rules-based reconfiguration of the recognizers 5408 based on the recognition of the item, input or event. In embodiments, the set of rules may be governed by an automated machine learning configuration system 5420, such as one that adjusts configurations or the set of recognizers 5408 within an AI system 5402 based on a set of outcomes, such as outcomes from utilization of the interactive multi-layer content platform 3000 for various purposes.

Referring to FIGS. 57A-57E, embodiments may include a variety of different hardware configurations. These are meant to be illustrative and should not be considered limiting. The interactive multi-layer content platform 3000, including the AI systems 5402, the input pipelines 5426, the content mixing and layering system 3008, and the like, may be implemented on dedicated, rather than general, hardware. In embodiments, the components may be part of a user video device such as set top box 23, may be located on a single printed circuit board (PCB), may operate on a single FPGA, a hybrid FPGA, be distributed across a mix of FPGAs (both regular and hybrid), custom ASICS, or be spread across multiple PCBs. Some components may reside in a cloud computing environment. In each of these examples, the interactive multi-layer content platform may receive input from each of a plurality of heterogeneous content sources 3010 (including cloud-based content sources) and create and encode multi-layer content streams for a user display device 3020 (such as a television, tablet, or the like).

Figure 57A:
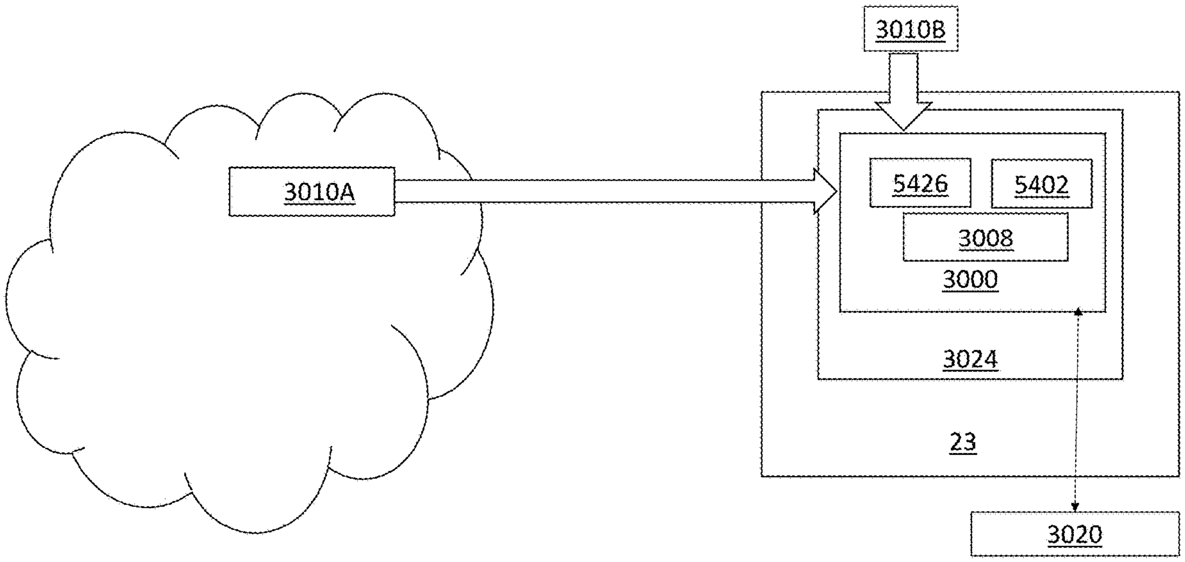
FIGS. 57A-E illustrate components and interactions for various exemplary configurations of an interactive multilayer content platform that includes machine learning capabilities.

Referring to FIG. 57A, the interactive multi-layer content platform 3000 may be located in a user video device, such as a set top box 23, that receives input from the plurality of heterogeneous content sources 3010A 3010B, located both locally and in a cloud environment, and creates and encodes multi-layer content streams. In this exemplary and non-limiting embodiment, the interactive multi-layer content platform 3000 resides on a single FPGA 3024 in set top box 23 and receives input from the plurality of heterogeneous input sources, both local heterogeneous input sources 3010B and cloud based heterogeneous input sources 3010A located in a cloud computing environment. Output from the interactive multi-layer content platform 3000 is sent to user display device 3020.

Figure 57B:
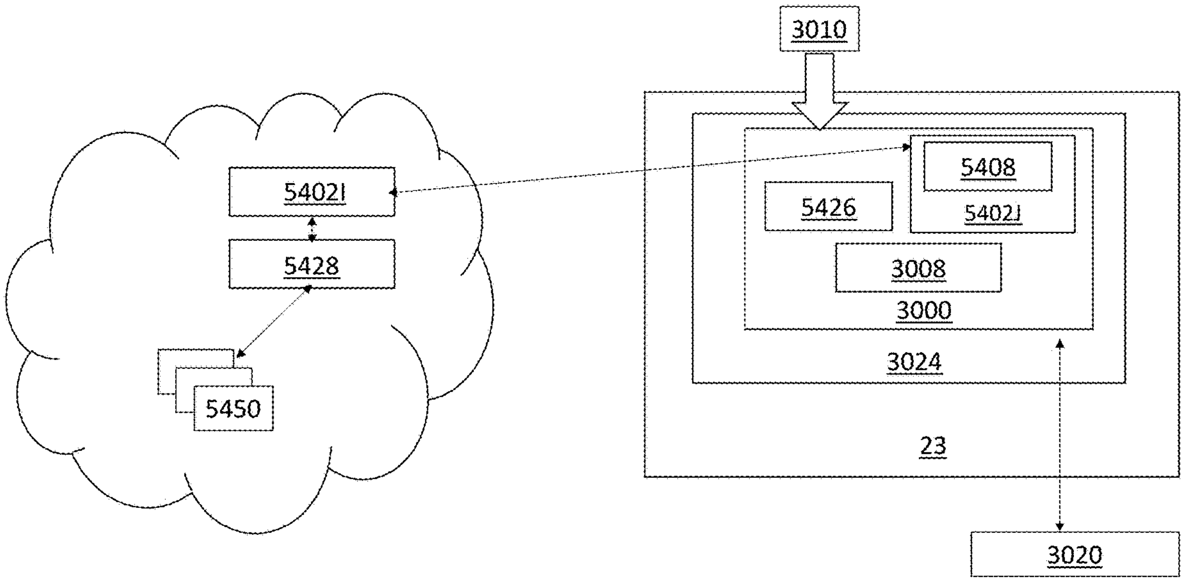

Referring to FIG. 57B, in embodiments the interactive multi-layer content platform 3000 may include an AI system 5402J located on a user video device, such as set top box 23, configured to package one or more display content streams with one or more results from one or more machine recognition systems 5408 located on the user video device, then send the package for further processing, such as by one or more cloud based AI systems 5402I. This may allow light weight processing for some purposes in a local, user video device, while allowing more complex processing, such as that requiring larger neural networks, to be done in a cloud computing environment, where additional hardware may be made available for processing, either in series or in parallel with processing on the local, user video device. The cloud based AI systems 5402I may include one or more application programming interfaces (APIs) 5428, such as a developer API, an end user API, or the like, for interfacing with third party AI systems 5450 operating in the cloud.

As noted above, machine learning may be nested. On one FPGA hybrid 3024, a system may include many (e.g., two hundred or more) neural nets (such as YOLOs), all independently running, which can be configured in various serial and parallel permutations. For example, an AI system 5402 may determine the nature of a content source 3010 (such as that the content source is a security camera) and another AI system 5402 may be loaded to undertake appropriate processing for that type of source (such as weapon or stranger detection).

Applications of AI systems 5402 and machine learning in connection with interactive multi-layer content may include assisting with broadcast creation, behavior detection, nested security (e.g., for home security, safe city and other security applications), and many others. For example, an interactive multi-layer content platform 3000 may include a YOLO machine recognition systems (recognizers) 5408 for each video camera that is provided as an input among a large number of cameras in a city. A machine recognition system 5408 may mark a video stream and pass it on, such as for further processing in the cloud. When a machine recognition system 5408 sees something happen, it can mark the stream and package it for processing, such as in the cloud. A second tier of processing, such as in the cloud, may process the image and provide an output, such as upgrading a potential threat to a "red" level.

In an illustrative and non-limiting example of a third party AI system 5450 operating in the cloud, a deep learning computer vision system 5614 such as Amazon™ Rekognition™, a cloud-based image analysis service, may be used for image and video analysis of objects, people, text, scenes and activities, as well as for detection of inappropriate content. This may include detection, analysis, and comparison of faces to a library of recognized faces, such as for user verification, activity tracking, and safety/security uses. In embodiments, pre-labeled data sets, such as of known faces, may be used, such as for recognition of individuals of interest for security purposes, for content generation purposes, and the like.

Figure 57C:
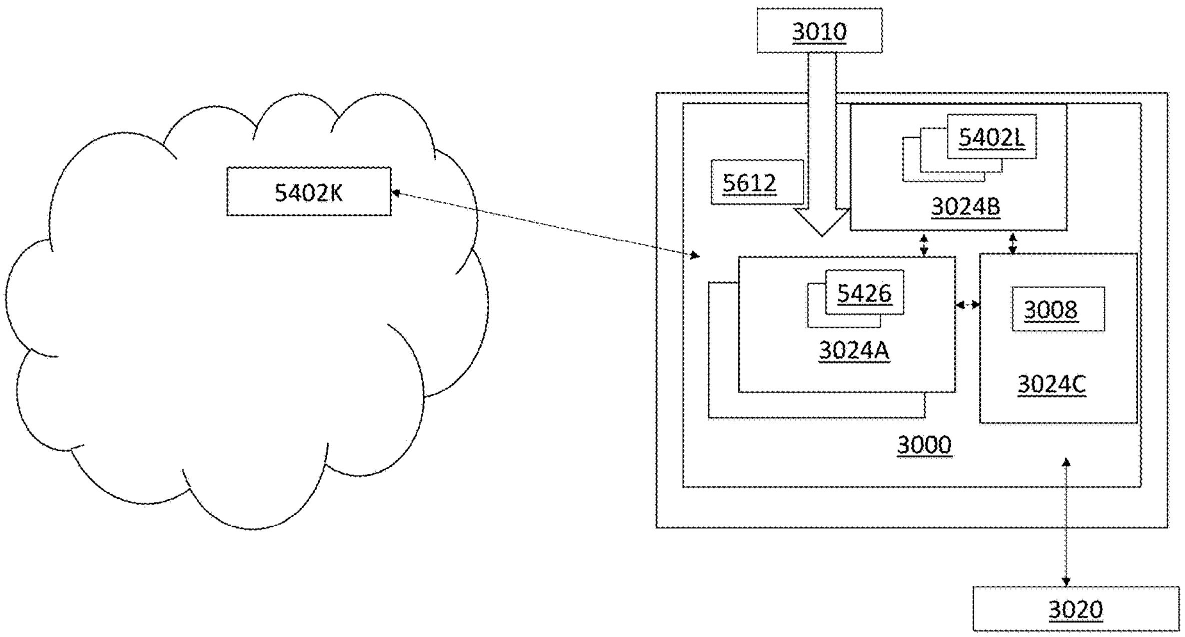

Referring to FIG. 57C, in embodiments, one or more of the set of AI systems 5402L, the input pipelines 5426, and the content mixing and layering system 3008 may operate on one or more FPGAs, such as an FPGA hybrid 3024A 3024B 3024C (collectively and generally referenced as 3024), or ASICs (on occasions where a single type of dedicated HW component is specified it may be assumed that the reference may refer to any of the variants such as FPGA, ASIC, hybrid FPGA, graphics processing unit (GPU), and the like). In embodiments, an FPGA may provide and/or execute control logic that progresses an image or other data structure, such as from a received content stream or an external AI system 5402K, through a sequence of layers of neurons in a neural network, such as a you only look once (YOLO) and/or convolutional neural network (CNN), where nodes at each layer perform a set of functions on the outputs of neurons at a preceding layer. In embodiments, functions at each node in at least a subset of layers of nodes in the neural network may be calculated by processing unit that is adapted to handle floating point calculations, such as a GPU. Thus, a neural network, such as a YOLO and/or CNN, that consists of a hybrid of an FPGA and a GPU may be used as a recognizer 5408, a machine learning system 5420, and/or other AI system 5402 as described throughout this disclosure. In embodiments, each node in a neural network of an AI system 5402 as described herein may comprise a computing engine that takes input, such as a number, based on a pixel of an image (e.g., a frame of video in a video content stream) or based on a function performed by a previous node. The nodes may perform a mathematical function, such as a zero to one math function, a step function, a continuous function, a discrete function, or the like. Each function is chosen in the configuration of the neural network to provide an output (e.g., to make a decision) based on an input, then to feed the resulting output downstream to the next layer of the neural network. In embodiments, an image, such as a frame of video in a content stream, is fed into the neural network and a statement, such as a "yes" or "no," or a numerical value, such as a zero, a one, or a fixed number representing a logical statement, is provided as an output. In embodiments, the output may be a truth table, such as indicating the presence or absence of a recognized item in a machine recognition system 5408. For example, a neural network may be trained (configured), by adjusting functions and weights of the nodes of various layers, to produce a true or false outcome representing whether an image fed into the neural network is, for example, an image of a cat. The neural network may be trained with a training set of images that includes images of cats (for which the neural network is supposed to indicate "true" or "yes") and images that don't include cats (for which the neural network is supposed to indicate "false" or "no"). The neural network may be seeded with the training set, and weights and/or functions may be adjusted (or otherwise configured) to improve the accuracy of the neural network in correctly processing the training data set to produce accurate recognition of, for example, cats in images.

In embodiments, a computation distribution system 5612 such as TensorFlow™ (an open source software library for high performance numerical computation) may be included in or integrated with an AI system 5402 and may be used for deployment of computation across a variety of hardware platforms (both local and cloud based) to execute the calculations for AI systems 5402 as described herein, including CPUs, GPUs, TPUs, and/or FPGAs, or hybrids or combinations of the same.

In embodiments, a neural network, such as a CNN, YOLO, or the like, may be embodied for any of the purposes noted herein on an FPGA or a hybrid of an FPGA and a GPU. An FPGA may have limited processing capacity, in particular where processing a high definition image, such as a 4K or greater image. To process an image with an AI system 5402 within a smaller engine, like an FPGA within a cloud-based interactive multi-layer content platform 3000, the pipeline 5426 may deprecate a video source, removing some pixels to allow a high-resolution image to be reduced, such as to 240 by 240 pixels, for processing by an AI system 5402 on a local FPGA at a reasonable rate (e.g., dozens of frames per second or faster). The resulting reduced image data can be fed into a neural net on the FPGA for processing. In embodiments, the input pipeline 5426 within the content mixing and layering system 3008 may provide a bufferless, low latency pipeline that provides scaled images to the FPGA or to other AI systems 5402 as described throughout this disclosure. In embodiments involving an FPGA (such as, without limitation, on premises deployments where an FPGA is in a set top box or similar hardware), an AI system 5402 may be implemented locally, such as on deprecated image data, and the output of an AI system 5402, such as recognition of an image, a gesture, a speech signal, or the like, may be packaged with the content source data and sent to a more powerful AI system 5402, such as one located in the cloud. In embodiments, a neural net can be all on one FPGA, or it can be distributed (such as by a computation distribution system 5612) to various independent computing elements.

In embodiments, a FPGA is deployed as an FPGA hybrid 3024 with a GPU. A GPU may perform certain functions very well, such as calculating floating point functions required to complete processing for a given node in a neural net. Meanwhile, an FPGA element in an FPGA hybrid 3024 may perform other functions well, such as moving outputs from a node or set of nodes to a next set of nodes for further processing within a neural net.

Figure 57D:
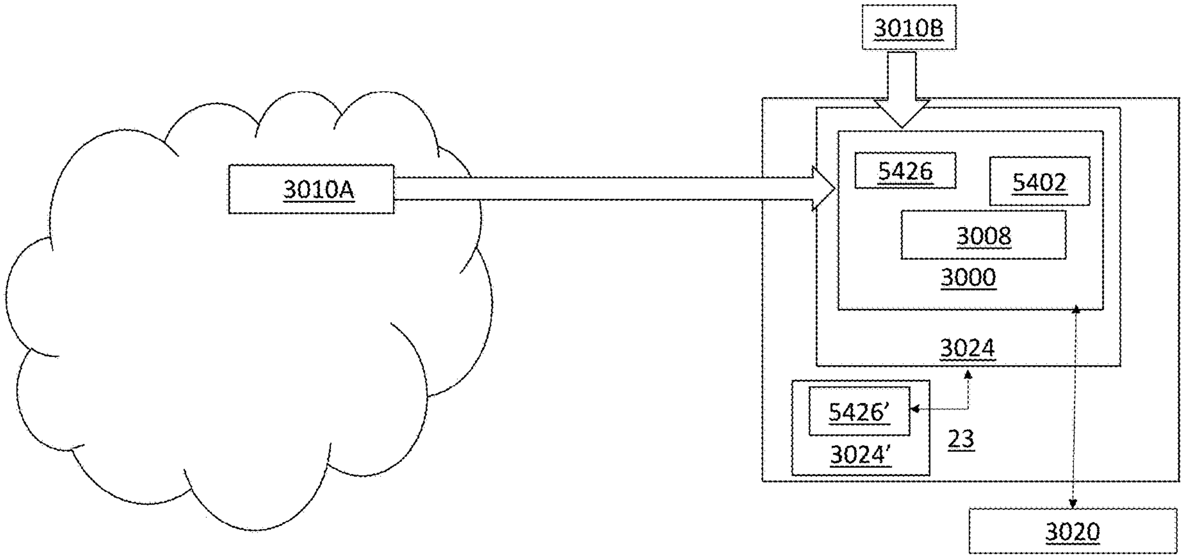

Referring to FIG. 57D, in embodiments, one or more of the pipelines 5426' may be provided by a third party and be external to the interactive multi-layer content platform 3000. The pipeline may be on the same user video device but implemented on a separate FPGA 3024' or ASIC from the dedicated hardware implementing the interactive multi-layer content platform 3000. The external pipeline 5426' may provide the decoding, and possible deprecation or the incoming content stream. The various heterogenous content sources 3010A 3010B may be located on the cloud or locally.

Figure 57E:
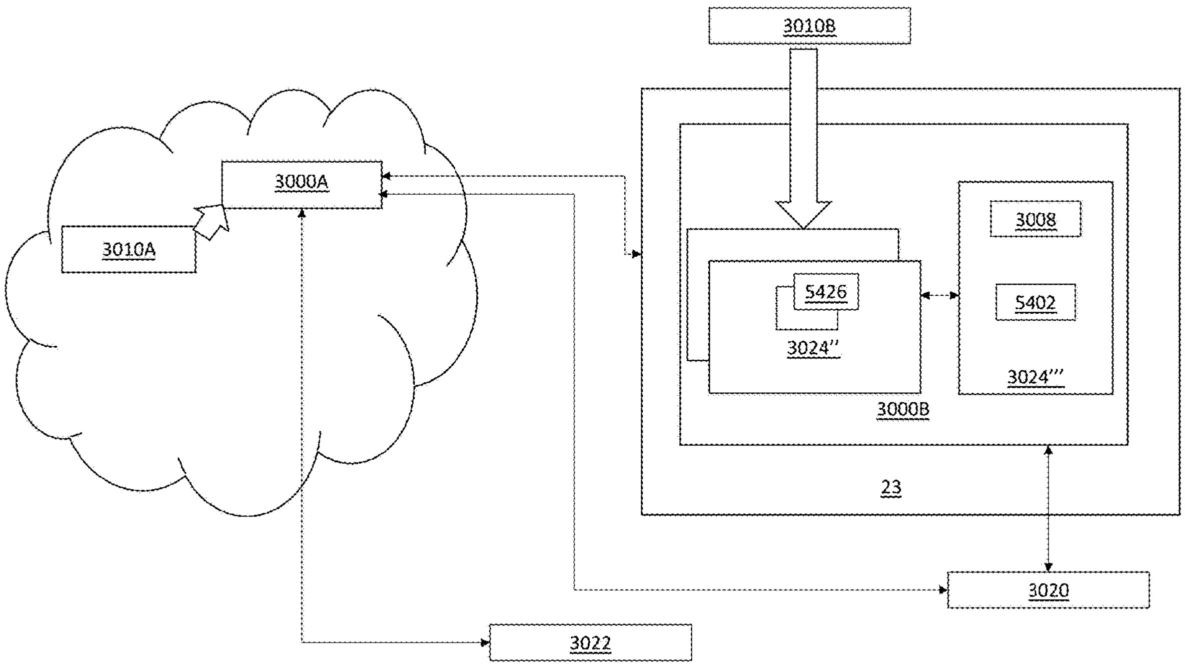

Referring to FIG. 57E, there may be an interactive multi-layer content platform 3000A located in a cloud computing environment, such as on a video delivery edge device. This cloud based interactive multi-layer content platform 3000A may process a plurality of online heterogeneous content sources 3010A and provide an interactive multi-layer content session, via an IP connection, as input to a local interactive multi-layer content platform 3000B located on a user video device and/or may provide output to the user display device 3020 or user input device 3022. The local interactive multi-layer content platform 3000B may receive input from local heterogeneous content sources 3010B as well. The local interactive multi-layer content platform 3000B may include multiple FPGAs 3024" 3024'" supporting a variety of functions such as input pipelines 5426, content mixing and layering system 3008, AI systems 5402, and the like.

In embodiments, an AI system 5402 may use a small YOLO on the same chip (an FPGA, an FPGA hybrid or the like) that can process limited distinct object types at frame rates that are very close to frame rates at which video is presented to the ship. However, not every frame is needed for machine learning inspection. For example, human faces typically move much more slowly than 60 times per second, so a typical video stream frame rate of 60 frames per second or more is faster than necessary to recognize facial gestures, emotions, or the like. Similarly, many hand motions can be detected at much slower frame rates by a relatively small YOLO. In embodiments, the ability to detect visual inputs in a small chip can save power and reduce reliance on touch screen hardware for mobile applications and devices.

In embodiments, a larger AI system 5402 can be used to detect larger numbers of objects, to detect subtle details (such as rapid changes that might be missed by the human eye), or the like. This may include embodiments on a single larger chip (FPGA, hybrid, ASIC or other type) or embodiments using a set of two or more chips, such as ones that are connected by a data communication protocol, such as PCIe, Ethernet, or the like. Video may be reduced and packed for machine learning digestion and moved without lag to and from an AI system 5402, which may run independently. Such embodiments allow more than one input content source 3010 input to be sent to a larger AI system 5402 for machine learning at the same time. As an example, a large AI system 5402 can handle 120 (or more) frames per second without lag.

In embodiments, a small YOLO may be used for detecting specific details, such as limited gestures, and gross details of high-level events, such as the presence of people in a frame, the presence of an entirely black screen (suggesting the system is down), and the like, while also using a larger AI system 5402 for deeper inspection and processing on the content of the frame. For example, if a human is detected in a security camera feed by a small YOLO, the feed can be sent for further processing by a larger AI system 5402 for face recognition, object detection, and the like. The small AI system acts an input device and can even update the large AI system to change is configuration or operation, such as based on a user gesture; for example, a AI learning system that is processing broadcast content may be looking for the presence of alcohol in an image, but on recognition of a standard gesture, the AI system could be re-directed to detect other types of content that may be inappropriate for a particular audience, such as nudity.

In embodiments, a small YOLO AI system 5402 may be used to filter everything out that does not have a target type of object, thereby reducing traffic to a larger AI system 5402. In this case, the larger AI system 5402 is only engaged for deep analysis with the recognized object is present. For example, if there is no person in a frame, then nothing is sent on to a larger AI system that handles processing of human images. Additional AI systems 5402 can be used to widen the inspection, in serial and parallel configurations, so that each one looks for something different. The outputs can be aggregated, such as by summing them together. The system can store the history of outputs and take action based on the output, such as based on looking for particular objects at particular times, looking for gestures, looking for emotions and the like. Particular combinations, such as recognizing a gun and the emotion of fear in a set of frames, can trigger actions, such as displaying the frame with the gun highlighted to a security person on a display device 3020. In embodiments, a small yolo may be used to watch for a gesture, and then multiple larger AI systems 5402 may be trained on an image, or a portion of an image, with combined results reported to and processed within the interactive multi-layer content platform 3000, such as based on logic that is configured for the particular situation.

In embodiments, an entertainment digital signage system may be where a person is located in a camera image using a small YOLO, then use cropping, resizing, or the like to focus a gesture recognizer 5618 on the hand location of the person, so that the gesture recognizer 5618 only needs to process relevant image portions, making it faster and more accurate.

In embodiments, an AI system 5402 may be used on or in connection with a feedback system, such as one that takes input from a user input device 3022 or from a system, such as a camera 5404 that captures feedback from a user, such as by gesture recognition. In such a case, an AI system 5402 may operate on such information and provide an input to the content mixing and layering system 3008, such as to an encoder within the content mixing and layering system 3008 that may improve the efficiency of encoding. An AI system 5402 including a machine learning system 5420 may learn, for example that movement occurring within an image is on a part of the screen that doesn't matter to the end user, in which case it can provide an input to the encoder that indicates that those elements of change in the image do not need to be processed (in which case the AI system 5402 improves the speed and quality of encoding). This may include providing information to encoding systems like h.264, h.265, VP9/8, VC1 and the like that use frequency-based encoding and iFrames at selected distances. In such systems, an AI system 5402 processing image content, as trained by outcomes in the interactive multi-layer content platform 3000, can provide information to encoding about what elements of an image matter, so that parameters of encoding, or a type of encoding, can be adjusted to automatically optimize encoding.

In systems that use backwards predictive framing and/or forward predictive framing, changes in images (deltas) are used, and the systems send the changes in information. There is a balancing act between the distance between IFrames and the amount of quality desired. Increasing quality happens by sending IFrames more frequently and by having more granularity in the changes, but at the expense of processing speed. With an AI system 5402, an understanding of the value of actual image content can emerge. For example, if there is something in an image that only appears in one frame (too short a duration for a person to see other than as a flicker), an AI system 5402 can detect the flicker, such as in a corner of an image, and tell the encoder to discard that information, rather than sending it as a change. Similarly, if the AI system 5402 finds changes in images with regard to elements that don't matter to human viewers (such as out of the main viewing subject of an image), then the AI system 5402 can inform an encoding system not to send that image information. This allows good quality at higher big rates by removing information that doesn't need to be encoded.

For encoding, an AI system 5402 can be trained to find unwanted or unneeded flicker, to find the subject of an image (such as to have an encoder encode the subject with higher granularity than other parts of an image), to find an object of interest (e.g., a license plate, where other parts of the image need not be encoded at high resolution). Thus, an AI system 5402 may configure a set of encoders to encode relevant image portions at preferred resolutions, while other portions are encoded at lower resolutions to optimize quality and processing speed.

As an example, an AI system 5402 may detect the empty room, so that an encoder may be provided input indicating that it doesn't need to send any data, even if there are small changes in the image data, such as resulting from movement of shadows, camera artifacts, or the like.

In embodiments, an AI system 5402 may be used for isolating what has changed frame-to-frame in a stream of images. An encoder typically has to buffer several frames in order to perform computations needed for encoding. Providing an AI system 5402 to identify changes may be used as an input to an encoder to reduce the amount of buffering required in order to determine whether changes have occurred. This would allow video processing to occur in closer to real time.

In embodiments, processed output from a set of recognizers from a machine recognition system 5408 is provided as one or more elements to the content mixing and layering system 3008 for mixing into an encoded output stream, whether as a visible element, a hidden (e.g., metadata) element, or both, embodied in a layered output stream, or as a change to the rules, parameters, and algorithms of the content mixing and layer system 3008. Such elements may be used to highlight objects or actions recognized in a stream, such as to alert a viewer to threats, to identify interesting content, to identify content that is being sought (such as finding examples of a particular type of activity) and for many other uses. Visible elements may include circling an item, highlighting a subject, highlighting a recognized activity, labelling an object and the like. Hidden elements may include a tag for the content stream, a label for the content stream, metadata, an annotation, and the like.

In embodiments the output from a set of recognizers 5408 may be provided to the content mixing and layering system 3008, to an intelligent layering system 5422, or to another element of the interactive multi-layer content platform 3000, or to an external device such as to a consuming display device 3020. The output may trigger or be used as an indicator of recognition of an item in a content stream (which may optionally be provided separate from the content stream), an addition or enhancement of a content stream that is visible to a viewer (such as circling an item that has been identified as a threat, highlighting a recognized activity, highlighting a subject, labeling an item, or the like), an addition or enhancement of a content stream that is not visible (such as by tagging a content stream, adding to metadata or annotation (such as in an invisible region of the content stream), or the like. A set of such outputs may be provided for a set of streams, on a stream-by-stream basis and/or on an encoded combination of the streams. Outputs of separate recognizers from a machine recognition system 5408 may be handled separately, or they may be combined, such as according to a set of rules governing the interactions among them.

In embodiments, one or more recognizers in a machine recognition system 5408 may operate on video, audio or other content streams to recognize undesired content, such as obscenity, adult content, violent content, content not enjoyed by a user, or the like, including images, speech, sounds, text and the like.

Figure 59:
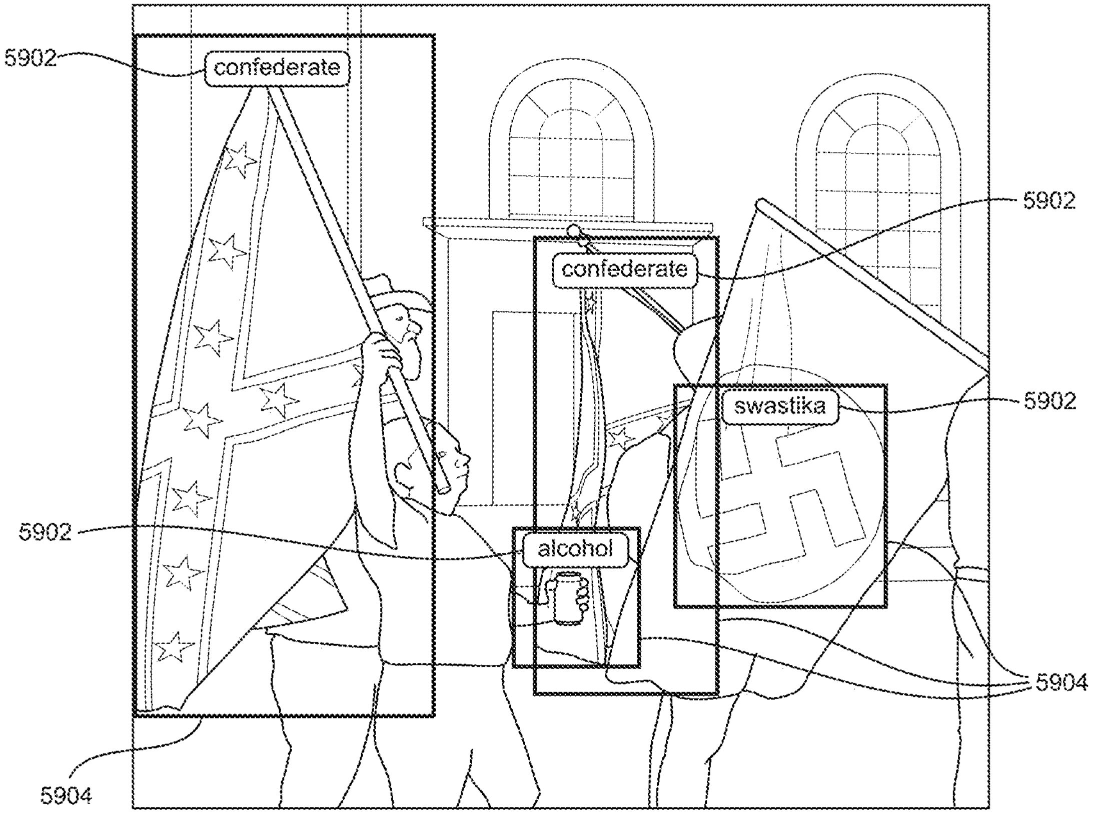
FIG. 59 illustrates an exemplary output of a content mixing and layering where content to be flagged may be highlighted or labeled.

Referring to FIG. 59, in an exemplary and non-limiting example, the output of a content mixing and layering system 3008 is depicted where content to be flagged may be highlighted with boxes 5904 or labeled with a label 5902. Additional rules might result in scenes having the flagged content manipulated to eliminate (such as by cropping) or obscuring the flagged content. Content may be flagged based for a number of reasons which a user may alter at any time. Content may be filtered for various reasons, such as being offensive (e.g., filtering out the swastika shown in FIG. 59), showing alcohol or drug usage, showing nudity, having profanity in the audio track, and the like.

In embodiments, received content streams may be used to control elements of the interactive multi-layer content platform 3000, including IML, output stream 3004, based on gesture recognition, such as captured by a camera 5404 or other device and analyzed by the machine recognition system 5408 or by another system capable of gesture recognition and analysis. Recognized output may be used as inputs to the content mixing and layering system 3008 or the intelligent layering system 5422, to control or serve as an input to the content mixing and layering system 3008, such as to govern how a set of input streams are encoded to form an output stream. For example, if a recognizer within a machine recognition system 5408 recognizes a threat in a security camera, then upon receiving an input from the recognizer within a machine recognition system 5408, the content mixing and layering system 3008 may be configured (such as with a set of rules) to enlarge a content area showing the video feed from the security camera; conversely, if the recognizer within a machine recognition system 5408 finds no threat, then the video feed from the security camera can be de-emphasized or omitted when presented as part of a set of content layers in an interactive, multi-layer experience. In embodiments, layering in the content mixing and layering system 3008 may be governed by an intelligent layering system 5422. This may include moving, re-sizing, adjusting transparency, adjusting audio, selecting what content sources to display, and other configurations of encoded content streams, such as involving any of the parameters, settings, or attributes described throughout this disclosure. The intelligent layering system 5422 may configure and encode an output stream based on a set of inputs received from a set of recognizers within a machine recognition system 5408.

The intelligent layering system 5422 may adapt over time. In embodiments the intelligent layering system 5422 may learn, such as on a training set of configurations created by human operators, such as consumers of content. In embodiments, the intelligent layering system 5422 may learn in real-time based on overall outcomes measured by or for the interactive multi-layer content platform 3000, or based on other inputs. The intelligent layering system 5422 may learn in real-time or learning may occur off-line and the intelligent layering system 5422 updated based on the new, off-line, learning.

In embodiments, one or more AI systems 5402 used in the interactive multi-layer content platform 3000 for the various purposes above, such as recognition, configuration of system topologies (such as arrangements of recognizers), layering of content streams, and the like may employ a neural network, which in embodiments may include a convolutional neural network (CNN), a YOLO (you only look once) neural network, a feedback neural network, a feed forward neural network, a hybrid neural network, a set of serial and/or parallel neural networks, and the like. In embodiments a machine recognition system 5408 may be a YOLO, CNN system that determines on a single pass of an image within a content stream the presence or absence of an item or object and provides a numerical output indicating the presence or absence, based on which the content mixing and layering system 3008 decorates the screen containing the content stream with an indicator of the presence and/or absence. The indicator may include an icon, a text box (such as indicating the name of the recognized item and a confidence level that the item is present), a highlighting element (such as a box, circle or arrow pointing to or surrounding an item). The output of the YOLO, CNN recognizer 5424 may also be provided directly to a mobile device or display, which may be configured to display the input on the screen when the content stream is displayed, or otherwise.

In embodiments, output from a recognizer within a machine recognition system 5408 may be used to populate metadata for a content stream. For example, pixels in the content stream in which a person who is riding a bike may be encoded to tag the content stream as one having a bike rider, such that a set of content streams may be searched, using metadata, to find a set of content streams that contain content matching search criteria (e.g., a search for videos of bike riders). A content stream may be encoded with metadata, tags, or the like from each of a set of recognizers within a machine recognition system 5408, or with metadata, tags, or the like that represent combined output from a set of recognizers from a machine recognition system 5408, such as output generated by applying one or more rules. Such embedded metadata may be provided on a frame-by-frame basis, so that it can be used to search within a content stream, such as allowing a system to automatically fast forward to the location in a video content stream where a person was shown riding a bike. Thus, the interactive multi-layer content platform 3000 facilitates automated tagging of content streams to facilitate content recognition, enhancement and searching.

In embodiments, output from the recognizers in the machine recognition system 5408 may be used by the content mixing and layering system 3008 or other system of the interactive multi-layer content platform 3000 to trigger the initiation or configuration of a related content stream, using a machine search configuration system 5604, such as automatically initiating an Internet search for related content when a person is recognized in an image (e.g., pulling news content from a news site about a politician when an image of the politician is recognized in a video stream that is currently on display, pulling a social media feed from or about the politician, or the like). Similarly, the content mixing and layering system 3008 may reconfigure content streams that are already included in an encoded stream based on recognition of content by a set of recognizers in the machine recognition system 5408, such as to configure or emphasize streams that have related content (such as video highlights of an event and a web-based feed about the event). In embodiments, the content mixing and layering system 3008 or other system of the interactive multi-layer content platform 3000 (such as a mobile device or application) may be configured to wait for a signal that an item of content has been recognized in an available content feed and to display that feed once the item is recognized. For example, a set of channels of video content that are available to a user may be monitored as input streams by a set of recognizers in a machine recognition system 5408 until a favorite actress is recognized, at which point the content mixing and layering system 3008 may be automatically tuned to show the video feed containing the actress. In embodiments a user interface, such as of a control device, such as a smart phone, tablet, or remote control, may be configured to allow a user to indicate a set of content items to be recognized, as well as to configure a set of actions to occur when the recognition happens (such as resizing a content stream, tuning to a content stream, recording a content stream, or the like). In embodiments, the set of items may be recommended to a user using a recommendation system 5602, such as one that uses collaborative filtering, such as by learning preferences of similar users, including based on user input or ratings, or by tracking user actions with respect to content. Such a recommendation system may be included in, integrated with, or in communication with the interactive multi-layer content platform 3000, the user input device 3022, the display device 3020, or other system by which a user may receive a recommendation.

In embodiments, output from the recognizers from a machine recognition system 5408 may be configured as search terms for a search engine, which may search for available content streams from content sources 3010, such as content streams on a cloud platform that hosts the interactive multi-layer content platform 3000, content streams to which an end user has subscribed, or content streams available on the Internet. In embodiments, a machine search configuration system may be included within or may use machine learning to configure searches based on output of the recognizers from a machine recognition system 5408, which may be trained on a training set of searches executed by human operators or may be configured by learning on feedback from a set of outcomes tracked in the interactive multi-layer content platform 3000, such as user feedback outcomes, utilization outcomes, viewing outcomes, and the like. This may include searches for relevant content sources 3010, including based on context, user input (including recognized gestures) and the like.

In embodiments, a set of AI systems 5402 may include machine learning on user inputs, such as a voice processing system 5610, such as for learning to parse one or more voice responses received from a user, such as via a remote control (e.g., a Fire Stick™ from Amazon™ using Alexa™, a system using IBM™ Watson™ or other system), to parse a gesture or other user input, or the like. For example, a set of AI systems 5402 may include separate recognizers 5408 for different individuals, such as for processing voices of multiple individuals during a video conference call for which a video stream is handled by the interactive multi-layer content platform 3000.

AI systems 5402 in connection with an interactive multi-layer content platform 3000 may be used for a wide variety of applications. In embodiments, AI systems 5402 may be used for recognizing a text message, such as a message moving around a dark display screen that indicates a problem with a user's display. An AI system 5402 providing the information that a "no cable connected" message is moving around may be useful for diagnosing a problem with a system and initiating correction.

AI systems 5402 may be used for creation of composites of images or streams.

AI systems 5402 may be used for audio detection.

AI systems 5402 may be used for image creation, image distortion, warping of images, and the like.

In embodiments, the interactive multi-layer content platform 3000 may include one or more application programming interfaces (APIs) 5428, such as a developer API, an end user API, or the like, for configuring a AI system 5402 to enable various purposes, such as for entertainment applications, home security and automation applications, video conferencing applications, and many others, each of which may involve a set of special purpose AI systems 5402, such as image and object recognizers 5408, audio processors, gesture processors, and others.

In embodiments, output from an AI system 5402 may be used to configure mixing and layering in the content mixing and layering system 3008, such as including selection of what content sources 3010 to show, selecting the timing of display of content within a feed (such as showing the feed when a particular person or object appears), grouping of content sources 3010 into composites, layering of sources (such as involving transparency effects), annotation of content, sizing, re-sizing and placement of sources, and many other parameters described throughout this disclosure. An AI system 5402 for machine learning may, for example, organize related content, such as by determining a content category and showing related content together (such as a video feed of an event, a Twitter feed about the event, and other Internet content related to the event).

Output from an AI system 5402 may be used to trigger various actions, such as adding a content source 3010, highlighting an item, selecting content, configuring content, moving to a location within content, finding content, configuring mixing and layering of content, changing detection modes within content, and the like.

In an embodiment, an AI system 5402 may be used to assist in creating broadcast content, such as by choosing camera views available as content sources 3010 for custom layouts. For example, among many cameras in a stadium, a production person in a broadcast truck may have difficulty selecting views. An AI system 5402 for machine learning can learn, such as on a training set of images processed by producers, to select appropriate views (and layouts involving multiple views) from among available ones.

An AI system 5402 may be used for behavior detection, such as reading the action of a user (including gestures) and providing output for content configuration that is appropriate, including based on learning from a training set of data that is based on user configuration or other output feedback from the interactive multi-layer content platform 3000.

An AI system 5402 can monitor user input, such as monitoring game player reaction time, game player interaction decisions, and the like, and provide feedback, such as based on training data or data for other players.

Figure 58:
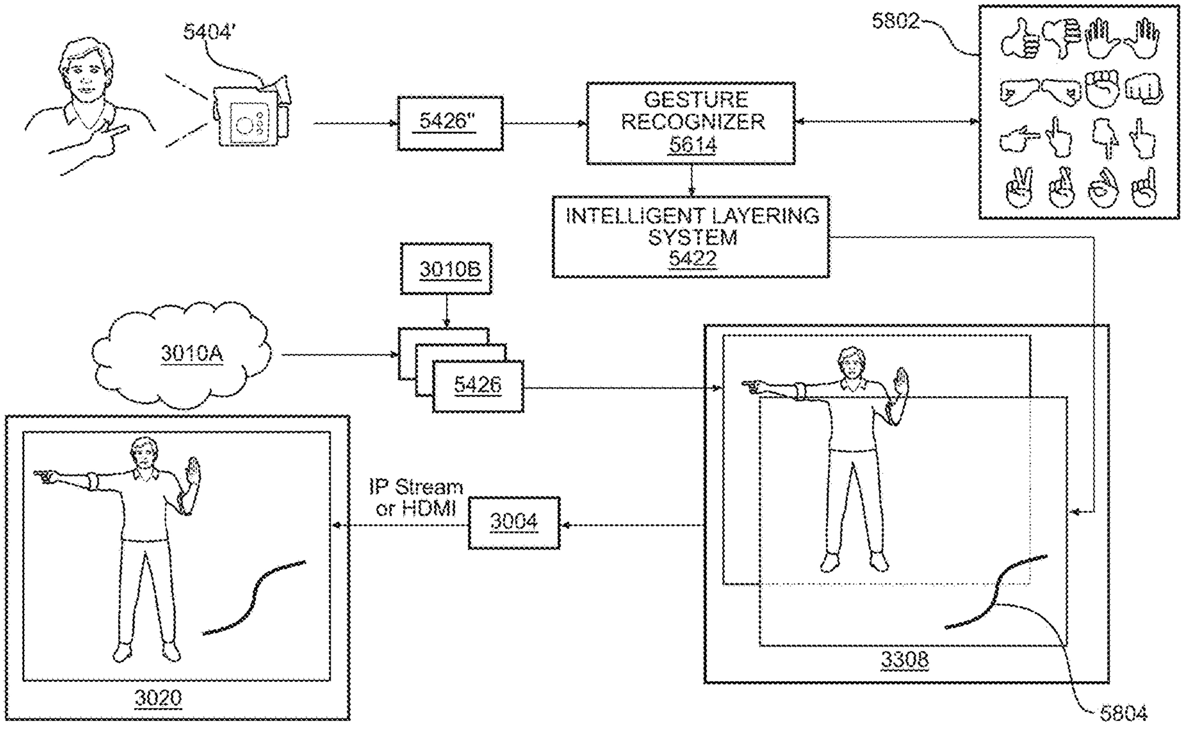
FIG. 58 illustrates an embodiment of an interactive multiplayer content platform that includes machine gesture recognition with respect to gestures of a user.

Referring to FIG. 58, in embodiments, an AI system 5402 is used for processing gestures of a user, such as captured by a camera 5404'. This may include an infrared camera that detects gestures while preserving privacy of a user relative to one that captures visual video images. Input from a camera 5404' may be processed through an input pipeline 5426" and sent to a gesture recognizer 5614. Gesture detection may include learning a set of hand gestures, arm gestures, head gestures, or the like. Learned gestures and their meanings may be stored in a gesture database 5802. Detected gestures may be mapped as inputs to the content mixing and layering system 3008, such as to allow a gesture to cause a mark on the screen, to highlight an element, to re-size a window, to write on a display, other otherwise configure any parameter of an output stream that appears on the display device 3020. In embodiments, an overlay 5804A, such as a web-based green screen overlay, may be layered over a video image, so that annotation elements can be placed on the video in response to user gestures. Thus, with recognition of gesture input by an AI system, 5402, a user can draw using hand gestures, and the results may appear on the screen.

Use of an AI system 5402 for processing of input, such as of gestures, a user's appearance, a user's image, or the like, such as captured by a camera 5404' (including IR and other detectors) may be applied in a range of applications and markets that use video display devices, touch screens, or the like, such as ones involving gaming, betting, collaboration, health care, wellness, and many others. For example, an AI system 5402 using a reliable You Only Look Once (YOLO) method or other machine learning techniques for detection of specific shapes, gestures, hand positions, or the like, and because the interactive multi-layer content platform 3000 processes and encodes a range of video content sources 3010 with low latency encoding of interactive multi-layer content streams to a display device 3020, the interactive multi-layer content platform 3000 can overlay content and take other actions triggered by machine learning on the content sources 3010 streams. As noted above, an AI system 5402 can take actions based on user input, whether as a gesture or as input to a user input device 3022. User inputs may include acceptance of an identification, rejection of an identification, verification of a presence of an object, verification of an absence of an object, a relocation of a highlight element, a relocation of a concealing element, a correction of an alert, a selection between options, a new rule, and the like.

The interactive multi-layer content platform 3000 can use processing and history of events to enhance decisions, take various types of network-communicated events and optionally produce visual feedback on a display device 3020 with minimal or no lag. An AI system 5402 may act on camera 5404' input and can be applied to input from visual video cameras or other cameras, like infra-red, to protect privacy, as well as other imaging systems that can create or track a signaling system, which may be as simple as a "thumbs up/thumbs down," "yes/no," or semaphore-like signal, among others. The above can be understood by a set of gesture recognizers 5618.

In embodiments, an AI system 5402 enables a user to use a finger to draw in the air and cause corresponding markings to appear on the display device 3020 as part of an interactive multi-layer content stream. This may include machine learning sub-systems for recognizing the initiation and cessation of an input session (such as by a special gesture, an audio signal, or the like). Techniques may include display of menus and choices for user hand gestures, such as a pop-up menu that takes focus and asks whether the user wants more information (e.g., allowing a thumbs up "yes", thumbs down "no" or the like); triggering a "like" on a social media feed, selecting a layout with finger movement, swiping right or left for new content, closing with a first gesture, or the like. In embodiments swipe motion may be handled by AI systems 5402 or by frame-based tracking. Head turning and other gestures may also be tracked. In embodiments recognition is by a YOLO engine.

Existing video conferencing and group video chat systems (such as Skype™ Google Hangout™, etc.) typically have cameras on the user's face and/or whole body. The interactive multi-layer content platform 3000 can take video feeds to a cloud location for a video conferencing or chat session and stream back content without lag. In such a system, AI systems 5402 such as gesture recognizers 5618 can take input such as hand input, facial recognition input, face/head tracking input, wand or object movement, or the like and provide input to the interactive multi-layer content platform 3000, which can have various features and functions for supporting video conferencing, such as via menus that respond to the inputs. To start a function, an initiation hand signal could be recognized, before which gestures don't initiate activity. Gestures can be recognized to enable drawing or marking on a screen, clearing a screen, bringing up a web page or presentation, closing a call, opening a call, or other video conferencing function. An end signal gesture can end the use of user input captured by the camera.

The interactive multi-layer content platform 3000 can process gestures using a TV camera 5404 with an AI system 5402 on the gestures, such as by a gesture recognizer 5618, such as to enable screen elements like "stickers" to be selected, moved, cleared, sized, or the like, such as forming overlays on TV content for entertainment, social sharing, and the like. Gestures can be used for TV menus, universal remote control functions, and the like, such as by gestural input to onscreen or on-remote menus. Signals to the TV can trigger smart home functions apart from the visual display, such as where a thumbs down or similar gesture triggers the interactive multi-layer content platform 3000 to send a command to a smart home system to close window shades automatically or take other action, where putting two fists together signals to lock down the house, where a gesture indicates to call 911, or where a gesture causes the interactive multi-layer content platform 3000 to tweet IoT content, such as Nest™ thermostat temperatures to a recipient, among many other possibilities.

The interactive multi-layer content platform 3000 may be used to provide interactive multi-layer content in a picture-in-picture mode where hand gestures are recognized to resize and reposition windows or screens without the need for touchscreen hardware. Initial configuration may be provided with a protocol to set parameters.

Head tracking may be used, such as rotation to move a scene on a display device 3020.

Gestures may be used for various VR and AR applications, optionally including initiation and closing gestures to put the system into and take the system out of gesture recognition mode. A configuration protocol can allow the system to set recognition parameters for a user, such as based on head position, hand position, screen position and the like.

In embodiments machine recognition of gestures by a gesture recognizer 5618 can allow a user to play video games with hands or body as an input to a video game that is displayed as a content source 3010 in a multi-layer content stream handled by the interactive multi-layer content platform 3000. In addition to a gamer using hands to control a game, the interactive multi-layer content platform 3000 can use an AI system 5402 for automated understanding of eye and mouth input, either independent of or in coordination with hand gesture recognition, such as to take input to a game, start streaming of a gaming session, mix game content with other content, or the like.

In embodiments, the interactive multi-layer content platform 3000 may recognize gestures made with wands or objects, including where color, shape and other object properties are used to trigger menus, actions, or the like. For example, a user may play a video game where color, shape and object recognition trigger different menus and actions. For example, a video game may use a blue wand that has certain keys in the game to open doors, where the red wand enables use of a fire bolt. Embodiments may use a universal control using visible light colors that correspond to different available content sources 3010, such as blue as a signal to use the cable box, red light as a signal to use an xBox™, or the like.

In embodiments, digital signage systems, kiosks and the like can use cameras 5404 to take gestural input. Any person in front of such a system or a TV can gesture to buy items, change layout of content, look at different menus (such as for food), interact with functions and menus, and the like to provide interactive input to a digital signage system without requiring a user to actually touch a screen.

In embodiments, the interactive multi-layer content platform 3000 can use a machine recognition system 5408 to respond to sign language, such as for the hearing impaired, and the system can learn to respond with sign language, such as by an animated avatar and/or display a text translation of an audio response on the screen.

In embodiments, gestural recognition by a machine learning gesture recognizer 5618 can be used to enable betting, such as on sports, fantasy sports, and the like. A hand gesture may log a user into a gaming or fantasy sports system, like DraftKings™, by initiating a stream from a content source 3010, such as a website. Gestures can be made for interaction with on-screen content, such as in a multi-layer content stream that includes gambling content that is displayed on a display device 3020. Interactivity with content on a display device 3020 may be very useful for live sports betting, enabling an improved interactive experience that doesn't require a separate input device, such as a phone. The interactive multi-layer content platform 3000 may enable popup areas that provide focus on particular content, such as betting propositions, which may time out when they are no longer relevant. A set of gesture recognizers 5618 can use a hand sequence that is defined by a user (such as to avoid accidental betting). The interactive multi-layer content platform 3000 may include a system for authentication of a user, such as ensuring the user has logged in and has authority to bet. In embodiments, content may be added to frames that render content for a gambling interaction, such as showing statistics that are personal to a user's gambling.

In embodiments, in addition to gesture recognizers 5618, a machine learning system may include a system for processing facial image data for recognition of emotion. An emotion recognizer 5620 may be used in series or in parallel with a gesture recognizer 5618 or with other AI systems 5402 as noted throughout this disclosure. Based on an output from machine learning of a recognized emotion, the interactive multi-layer content platform 3000 may take a wide range of actions, such as selecting content, configuring content, providing assistance (such as where a confused state is recognized), providing an opportunity for an alert or a call for help (such as where fear is recognized), and many others. Full body postures can also be recognized to trigger actions; for example, if a gesture recognizer 5618 processing input from a camera 5404 on a TV display recognizes that a TV viewer is asleep and alone in a room, then the system can shut off the TV, lock doors in the home, and the like.

In embodiments, the interactive multi-layer content platform 3000 may use images from a set of cameras 5404 to watch faces, body size, body posture, body size, skin condition, and other image-based factors that can serve as indicators of health and wellness, including tracking changes over time, such as using one or more machine wellness recognizers 5622. Indicators of health and wellness or changes in health and wellness may be provided as an alert or overlay to a user. The information may be provided to an Electronic Health Record (EHR) associated with the individual being observed.

In a clinical setting, a gesture recognizer 5618 may be used to recognize a gesture of a doctor, nurse, physician's assistant, or other provider who may preferably not wish to touch a screen in order to interact with content, such as a screen of a device showing displays of medical images on a display device 3020, a user interface of a smart device that runs an application relevant to a health care workflow, or the like. Instead of using the touch screen, the provider can interact by gestures, such as interacting with menu elements, using hand movements to mark elements in a radiology image, or the like. This may be combined with voice recognition, such as involving a conversational agent like Google™ Assistant™ Amazon™ Alexa™, or IBM™ Watson™ to provide a non-touch interface for visual content in the health care field.

Figure 68:
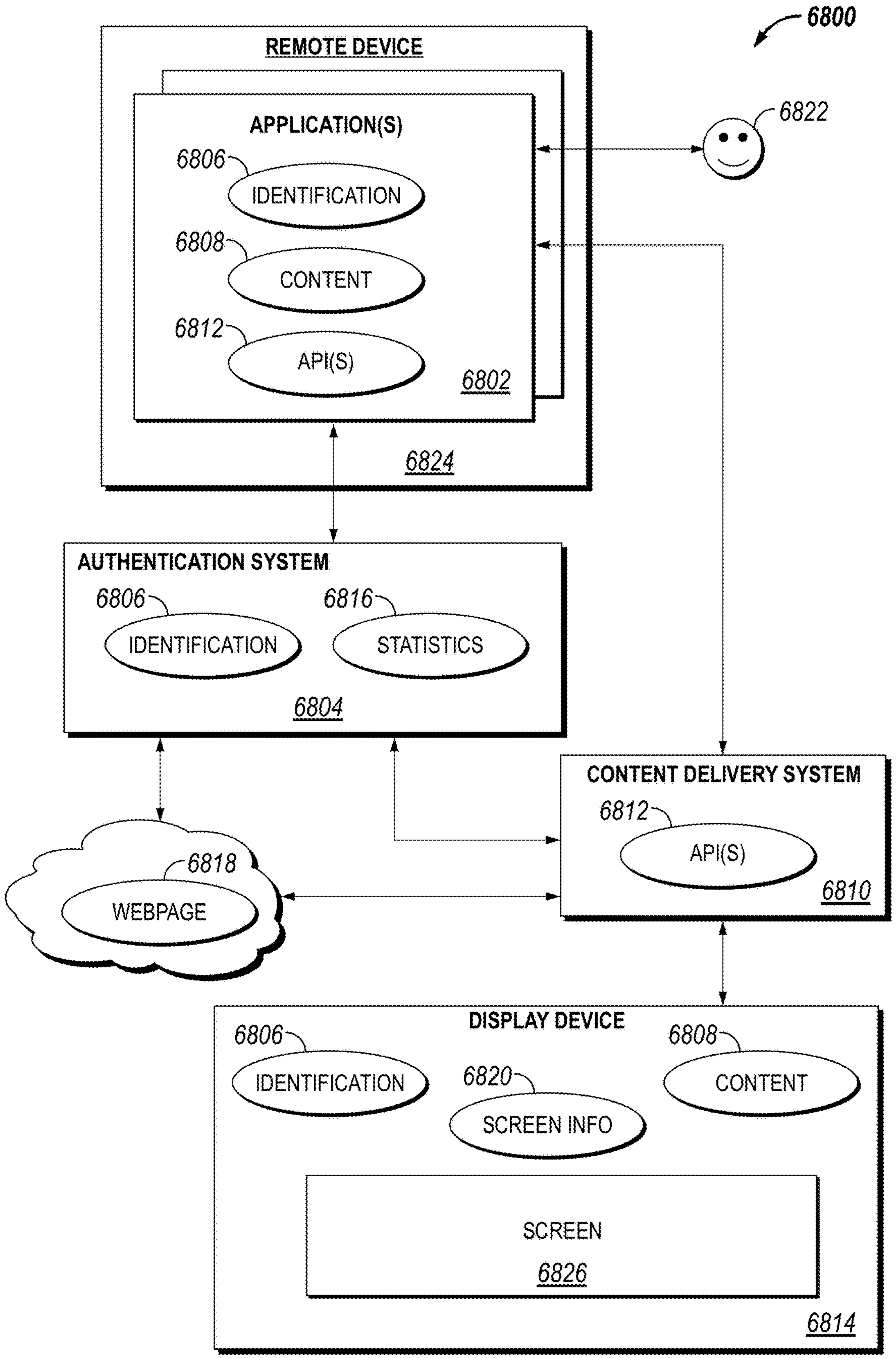
FIG. 68 illustrates an embodiment of a content display system.

With reference to FIG. 68, which depicts an illustrative and non-limiting example of a content display system 6800, the system 6800 may include an authentication system 6804 configured to receive a request from an application 6802 to authenticate the application 6802. Furthermore, the authentication system 6804 may be configured to send an instruction to a content delivery system 6810 to provide an application programming interface (API) 6812 to the application 6802 based on authenticating the application 6802. In some examples, the content delivery system 6810 may be instructed to provide the API 6812 to the application by providing application 6802 with an API key or other manner of authenticating with the API 6812, such as an authentication code. However, embodiments are not limited thereto, and in other examples, it may be the authentication system 6804 that may provide the application 6082 with the API key or other manner of authenticating with the API 6812, such as an authentication code.

In some embodiments, the application 6802 may have registered with the authentication system 6804 and/or content delivery system 6810 prior to authenticating with the authentication system 6804, and may have an authentication identification (ID) with which it authenticates. In some examples, registration may be based on a license held by the application to display content including content 6808.

The API 6812 described herein with reference to system 6800 is illustrative and non-limiting, and in some embodiments, the system 6800 may include any mechanism for permitting the application 6802 to communicate with the content delivery system 6810, e.g., upon instruction by the authentication system 6804.

The content delivery system 6810 may be configured to provide the API 6812 to the application 6802 based on receiving the instruction from the authentication system 6804, to receive a call from the application 6802 to the API 6812 to display content 6808, and to cause the content 6808 to be displayed on a display device 6814 based on the call to the API 6812. In some examples, as discussed above, the content delivery system 6810 may provide the API 6812 to the application 6802 by providing the application 6802 with an API key. The API key may define a particular set of permissions, e.g., certain calls permitted to be made by the application 6802. For example, a particular application 6802 may have permission to call the API to request, e.g., to open a video window or "container" in the lower left corner of a screen 6826 of the display device 6814 and display video content therein. API 6812 permissions may vary depending on the application 6802, and may relate to attribute(s) of the window (or "container") in which it may display content 6808 (for example such as size, overlay, transparency, form factor, and the like). The content delivery system 6810 may control the function(s) of each API 6812 as a function of time.

In some examples, the content delivery system 6810 may receive the call from the application 6802 to the API 6812 using the API key. If the application 6802 does not include the API key in its call to API 6812, the application 6802 may not be authenticated by the API 6812 and the API 6812 may not take any action.

In some examples, the content 6808 may include anything capable of being output by the display device 6814, including but not limited to video (such as live video for events including sports), webpages (e.g., including HTML5), pictures, audio, audio mixing, gaming, video conferences, and/or other forms of media, as described elsewhere in this application. The content delivery system 6810 may encode the content 6808 for display by the display device 6814. In some embodiments, the content 6808 may interact with the user 6822, such as through an interactive layer, using a device such as a remote control, smartphone, or other device, as may be described elsewhere in this application.

In some examples, the application(s) 6802 may relate to any number of services, such as but not limited to social media, internet video streaming, video broadcasting, a personal calendar, personal photos and/or videos, online cameras, other cameras, fantasy and/or online sports betting, online sports news and/or highlights, cable news, professional connectors, video conferencing, automobiles, other products, shopping services, etc. The user 6822 may be logged into one or more different ones of these applications 6802 on, for example, a remote device 6824. In some embodiments, the user 6822 may be able to configure the content 6808—for example, the content itself or attributes of a window or "container" in which it is displayed—to fit the personal experience they desire.

The content 6808 may relate to any number of different markets, such as sports and other entertainment, telemedicine, defense video, security, healthcare, education, etc. In one example, any market with more than one entity that may provide some content but not all desired by a user 6822 may provide content 6808 for display. Some of the content 6808 may be personalized for the user 6822 by the application 6802. As described elsewhere in this application, the content may be linear content from sources such as, but not limited to, broadcast television, cable/satellite stations, and others. Content 6808 that includes video content may further include video on demand content such as movies that get delivered on command from a user 6822. The video content may also be delivered over the Internet or streaming video. Any video source that may be displayed on a viewing screen of display device 6814 may serve as content 6808 for the system 6800, including live video. Additionally, any media that may be displayed in or on an entertainment device, such as a PC, mobile device, or television, may be a content source, including digital radio, web page interaction, video game input and output and others.

Figure 65:
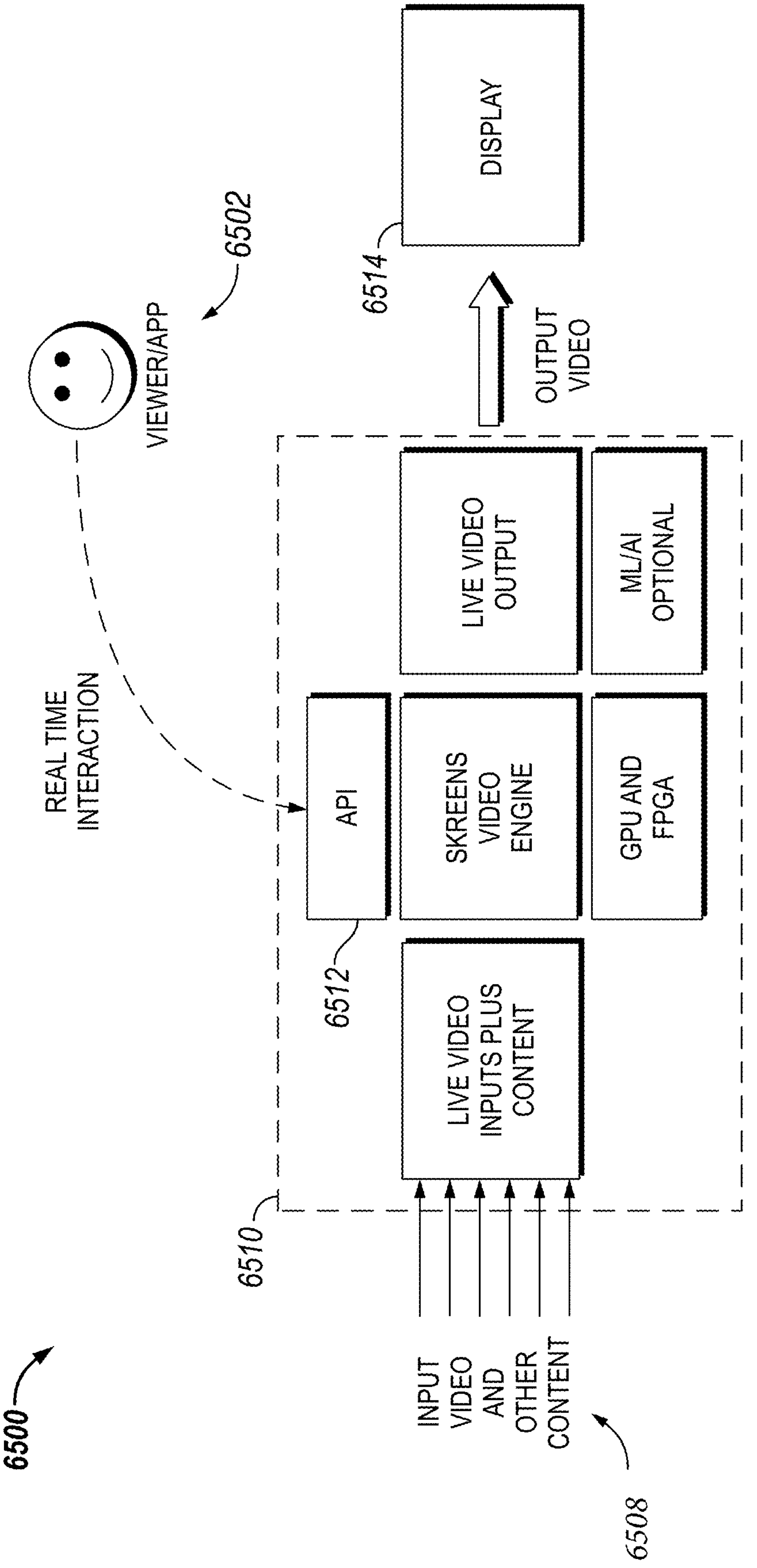
FIG. 65 illustrates an embodiment of a content display system.

In some embodiments, the content 6808 may be streamed from the application 6802 to the content delivery system for encoding. However, embodiments are not limited thereto, and in other embodiments, the content 6808 may be obtained from any source of video or other media, as described above and elsewhere in this application. For example, as shown in FIG. 65, which illustrates an illustrative and non-limiting example of a content display system 6500, various input video and other content may be provided to a content delivery system 6510 per a call to API 6512 by authenticated application 6502, which may be processed with other content as described herein according to, for example, an interactive multi-layering system, encoded as a video, and output as the video to a display device 6514 for decoding and display thereon.

Figure 63:
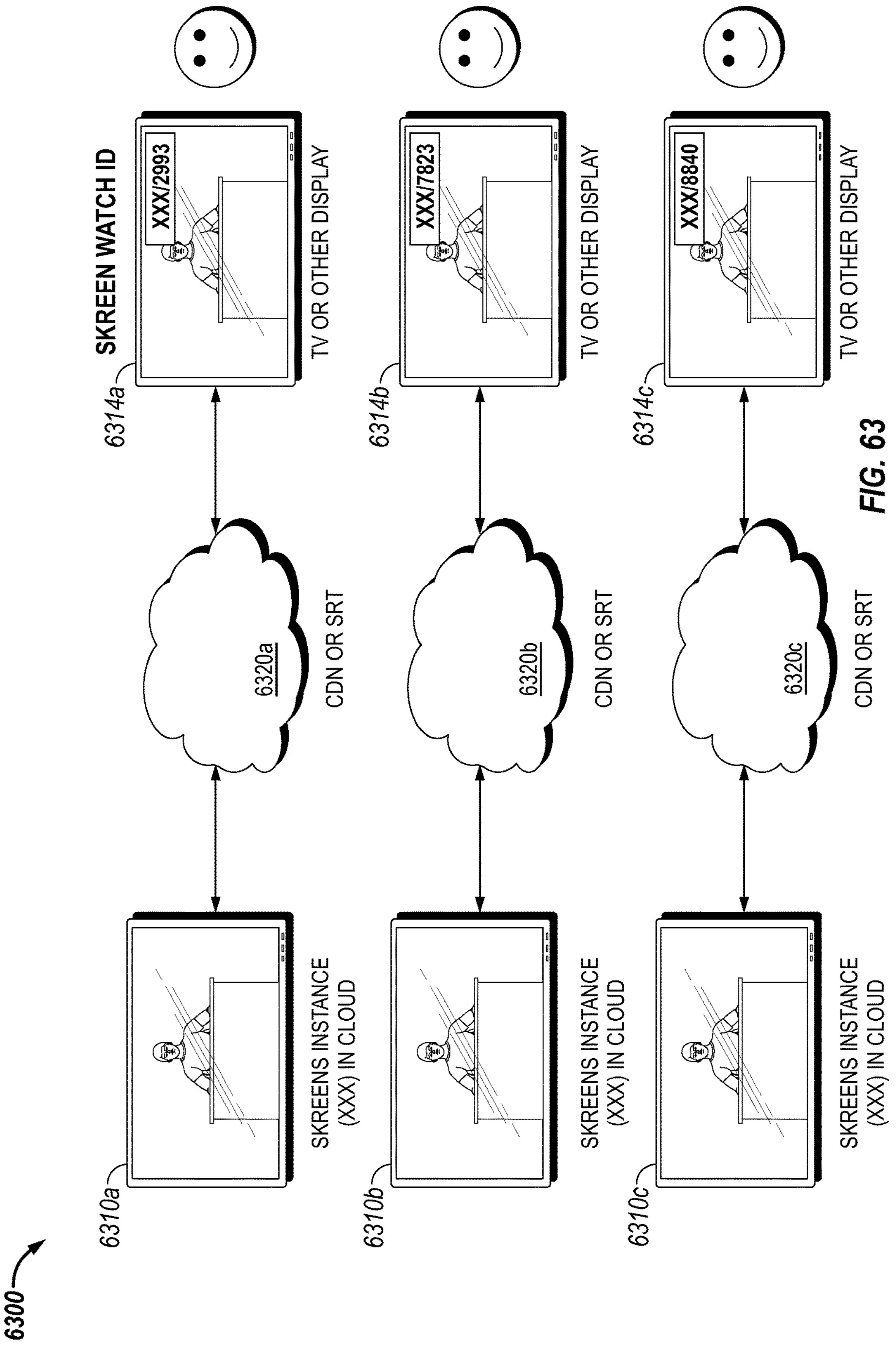
FIG. 63 illustrates an embodiment of a content display system.

With reference again to FIG. 63, which illustrates an illustrative and non-limiting example of a content display system 6300, in some embodiments, the content delivery system 6810 may be one of a plurality of instances 6310*a*, 6310*b*, 6310*c* of the content delivery system 6810. The content delivery system 6810 may execute on one of various devices, such as a cloud server or other server remote from the display device 6814, and, as shown in the example content display system 6300 of FIG. 63, may communicate with the display device 6814 (e.g., each instance may communicate respectively with a display device 6314*a*, 6314*b*, 6314*c*) over a communication network 6320 such as a content delivery network (CDN) and/or using secure reliable transport (SRT) protocol (e.g., communication network(s) 6320*a*, 6320*b*, 6320*c*). However, embodiments are not limited thereto, and in other examples, the content delivery system may execute on, e.g., a set top box, such as a cable set top box or a satellite set top box, a gaming station, a streaming video set top box, a DVD player, a computing device such as a PC, laptop, tablet, or smartphone, a smart TV, or any device that provides output for the display device 6814 through, e.g., a local connection to the display device 6814 (e.g., through HDMI, a coaxial cable, wireless network, etc., as described elsewhere herein). In some embodiments, the content delivery system 6810 may execute both on a server remote from the display device 6814, which may encode content 6808, and local to the display device 6814—for example, the display device 6814 itself or a set top box associated therewith.

Figure 61:
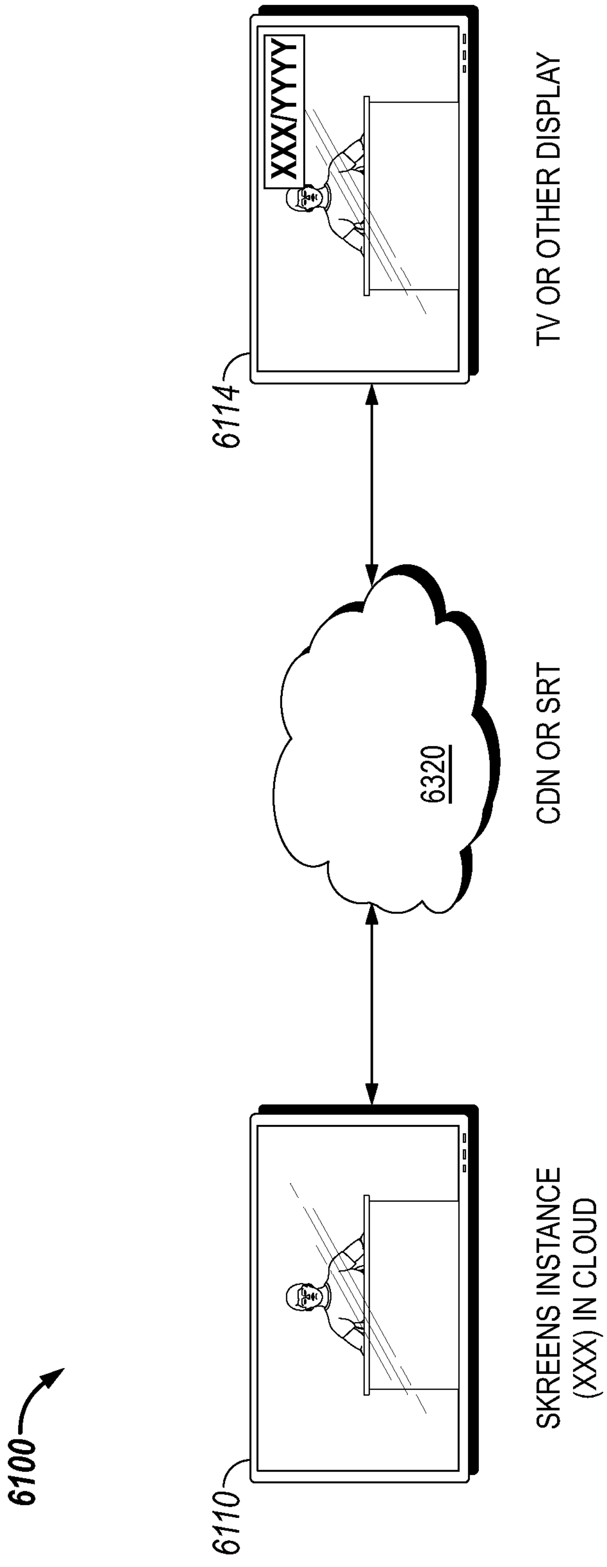
FIG. 61 illustrates an embodiment of a content display system.
Figure 62:
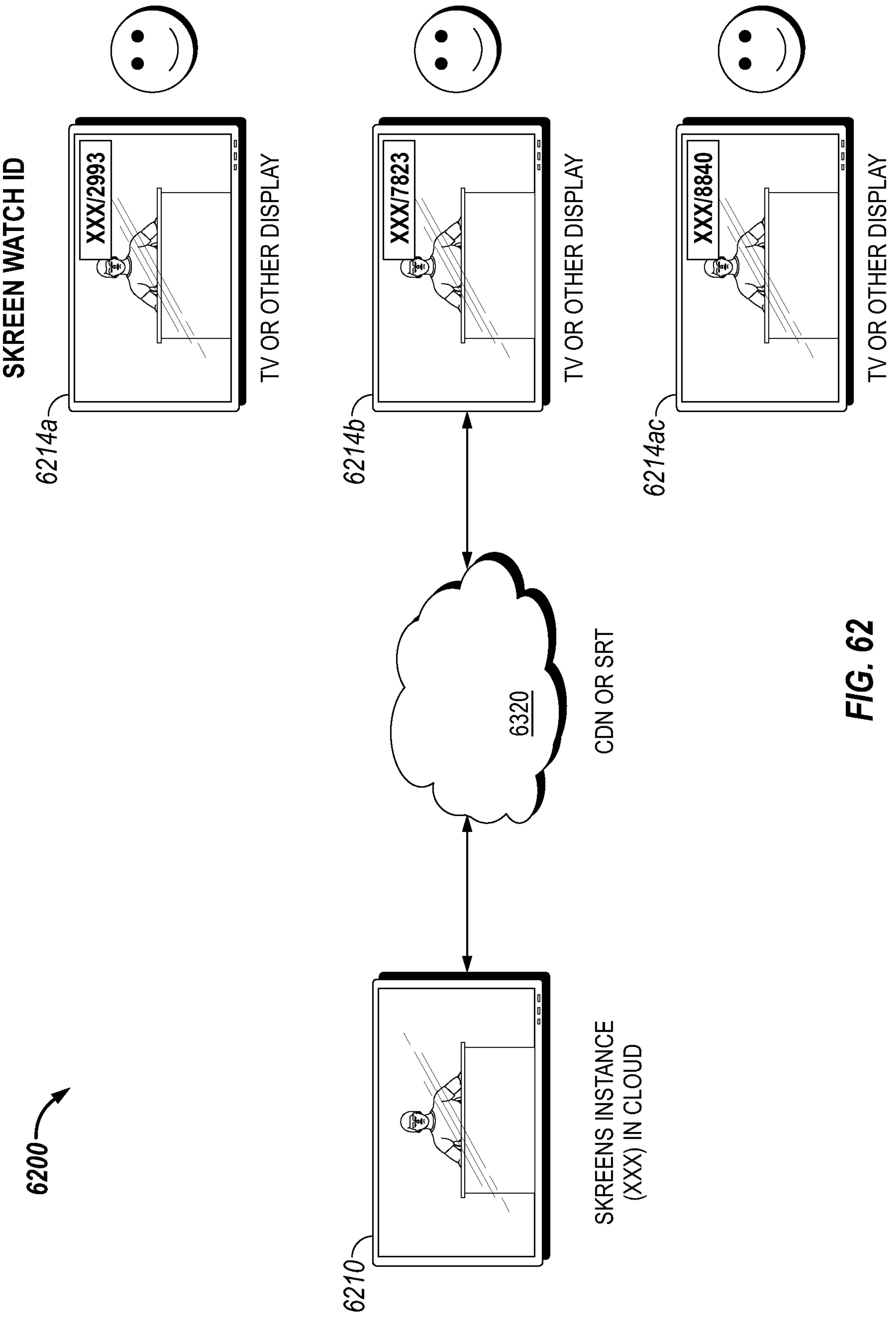
FIG. 62 illustrates an embodiment of a content display system.

With reference to FIG. 62, which depicts an illustrative and non-limiting example of a content display system 6200, in some embodiments, one instance of content delivery system 6210 may communicate with a plurality of display devices 6214*a*, 6214*b*, 6214*c*, as discussed herein. Also, with reference to FIG. 61, which depicts an illustrative and non-limiting example of a content display system 6100, in some embodiments, one instance of content delivery system 6110 (which may or may not be remote) may communicate with one display device 6114.

In some embodiments, the content delivery system 6810 may edit or otherwise manipulate the pixels and layers in real time, and effectively provide the application 6802 with the ability to lease pixel space on the screen. The content delivery system 6810 may combine video and/or other content through a layering system, such as an interactive layering system, and encode the contents into a video stream for display by the display device 6814.

With reference to FIG. 68, in some embodiments, the display device 6814 may be a television or other device capable of displaying an image and/or video, as described elsewhere in this application Furthermore, the display device 6814 may execute code and/or circuitry configured to receive the content 6808 as encoded by the content delivery system 6810, decode the content 6808, and cause the display device 6814 to display the content 6808 on a screen 6826. In some embodiments, a separate system executing on the display device 6814 or set top box associated therewith (e.g., a client system such as an application or "app" running on the display device 6814) may decode the content 6808 for display on a screen of the display device 6814. In some embodiments, this decoding system may be part of the content delivery system 6810.

In some embodiments, the content delivery system 6810 may include the code and/or circuitry configured to perform the functions described herein, as consistent with a "system" described in this application, and may be located on a cloud server or other server remote from the display device 6814.

In some embodiments, the authentication system 6804 may execute on one of various devices, such as a cloud server or other server remote from the display device 6814, and/or remote from the content delivery system 6810, and may include code and/or circuitry configured to perform the functions described herein, as consistent with a "system" described in this application. However, embodiments are not limited thereto, and in some embodiments, the authentication system 6804 may execute on a same server as the content delivery system 6810.

In some embodiments, the authentication system 6804 may be further configured to authenticate the application 6802 based on an identification 6806. For example, the identification 6806 may include a login identification (ID) of a user 6822 for the application 6802, which may be provided by the user 6822 to the application 6802 via a user interface of the remote device 6824. In another example, the identification 6806 may include an identification of the application 6802 itself (e.g., an application or "app" ID).

Figure 60:
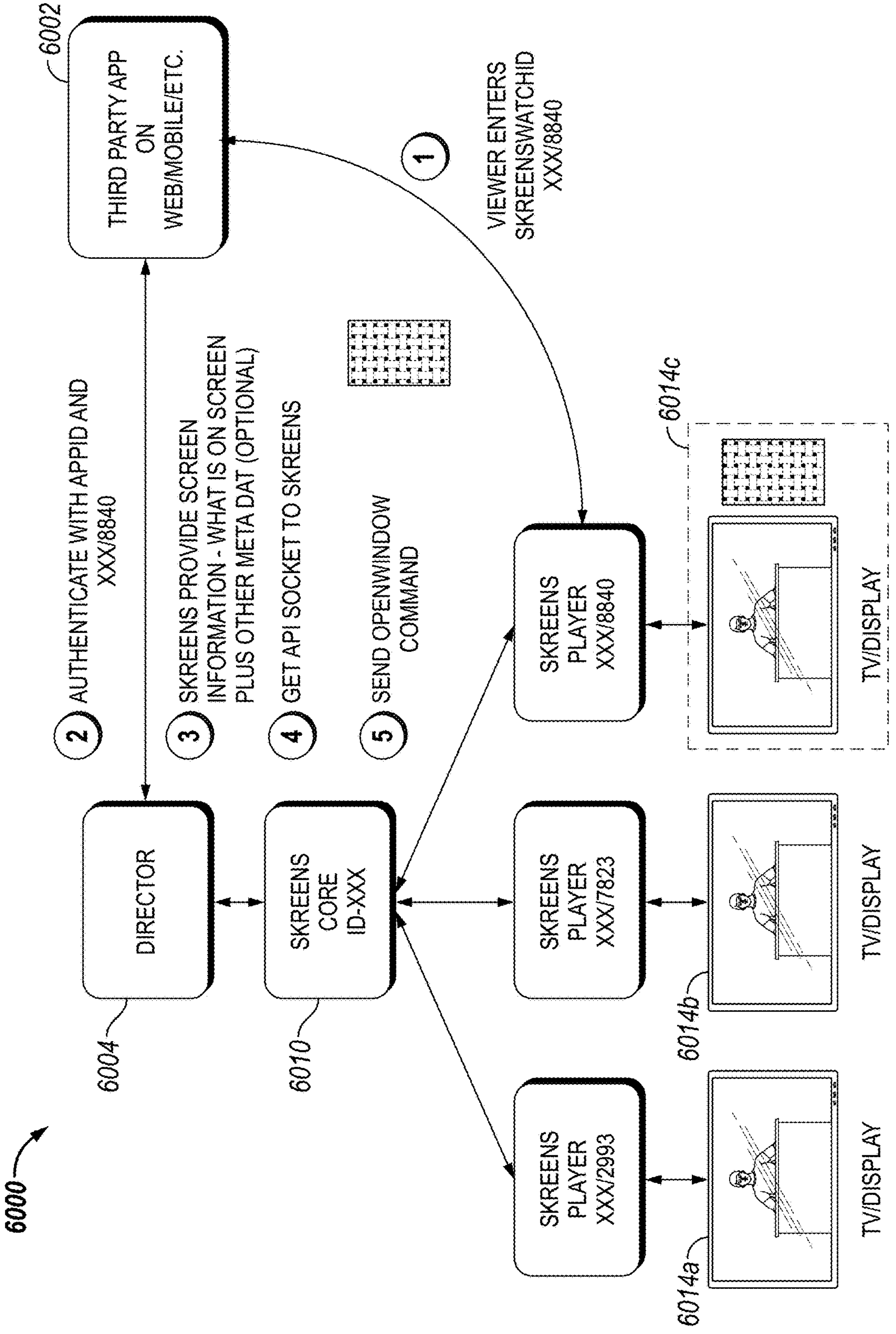
FIG. 60 illustrates an embodiment of a content display system.

In some embodiments, the content delivery system 6810 may be further configured to display, on the display device 6814, an identification 6806. The identification may be a code such as a numerical code, a QR code, a barcode, etc. As an example, with reference to FIG. 60, which depicts an illustrative and non-limiting example of a content display system 6000, the identification may be displayed on a screen of display device 6014*c* as "XXX/8840" to identify a specific instance of the content delivery system 6810 that is to provide the content 6808 for display on the display device 6014*c*. The user 6822 may provide this code to the authentication system 6804, for example through a website or the application 6002, as the identification 6806. Additionally, the application 6002 may authenticate with the authentication system ("director") 6004, using, for example, an application ID. However, the identification 6806 is not limited thereto, and in other embodiments, the identification 6806 may be provided via RFID, Bluetooth, etc.

As described above, with reference again to FIG. 68, the authentication system 6804 may be further configured to receive the identification 6806 from the application 6802 as entered by the user 6822 of the application 6802, and to authenticate the application 6802 based on the identification 6806. In one example, the display device 6814 may display a QR code as the identification 6806, and the QR code may include information that the authentication system 6804 may use to identify the specific instance of the content delivery system 6810 that is to provide the content 6808 for display on the display device 6814, such as an address (IP address, MAC address, etc.) of the server on which the content delivery system 6810 is executing. Additionally, the QR code may include any information that the authentication system 6804 may use to authenticate the application 6802 and provide the API 6812 to the application 6802.

For example, in some embodiments, the user 6822 may log in to the application 6802, and the authentication system 6804 may be provided with the user 6822's login or other account information as part of the identification 6806. Based on, for example, the user's account information and/or the identification of the specific instance of the content delivery system 6810 identified in, e.g., a QR code, the authentication system 6804 may determine that the application 6802 is authorized to display content 6808 on display device 6814, and therefore provide the application 6802 with a key with which to call an API 6812. To determine that the application 6802 is authorized, the authentication system 6804 may consult a database or other record with reference to the user 6822, the user's account information, and/or the application 6802.

In some embodiments, the authentication system 6804 may be further configured to determine the API 6812 to provide to the application 6802 according to the identification 6806. For example, the identification 6806 discussed above by example may be used by the authentication system 6804 to determine which API 6812 to provide to the application 6802 by use of, e.g., a key, and may be associated with an account for the content delivery system 6810, which may be related to a license held by the application 6802.

Figure 64:
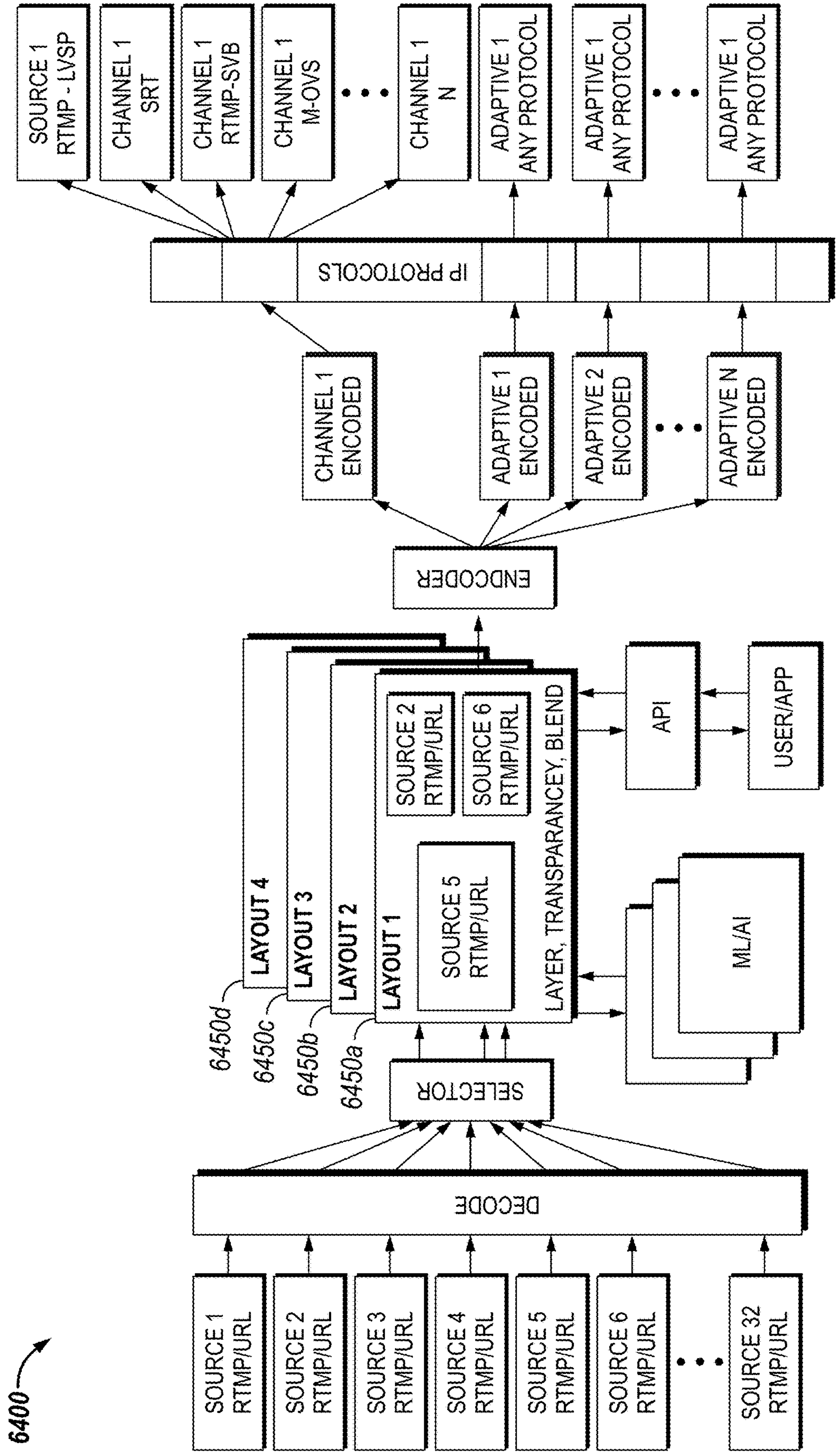
FIG. 64 illustrates an embodiment of a content display system.

The API 6812 or other functionality may define the access to screen 6826 provided to the application 6802. For example, the API 6812 may define which area of the screen 6826 (e.g., a window or "container") in which the application 6802 may provide content 6808, a shape and/or size of the area of the screen 6826 in which the application may provide the content 6808, whether and to what degree the content 6808 may be overlayed with/be overlayed by other content provided on the screen 6826, and/or various other attributes. In some embodiments, the content 6808 may not be limited to a certain area (e.g., window or "container") of the screen 6826. For example, in some embodiments, the content 6808 may be overlayed onto other content, e.g., and may include graphics such as animations, emojis, gifs, confetti, etc. In this way, the content 6808 may overlay or "blend" with a primary video stream underneath. In some examples, the content delivery system 6810 may distort a video that it encodes for display by, e.g., bending the image. In some examples, windows for different contents may overlap with each other at varying levels of transparency, as may be defined by their respective APIs 6812. For example, with reference to FIG. 64, which depicts an illustrative and non-limiting example of a content display system 6400, various windows 6450*a*, 6450*b*, 6450*c*, 6450*d* may be overlayed with each other and encoded to be sent to a display device.

In some embodiments, definitions of how content 6808 may be provided on the screen 6826 may be in accordance with a layering system, e.g., interactive multi-layers or "MILs." In accordance with the functions described herein, an application 6802 may be provided with an interactive layer on the screen 6826 for its exclusive control.

In some embodiments, the authentication system 6804 may be further configured to instruct the content delivery system 6810 to provide a plurality of APIs 6812 to the application 6802 according to the identification 6806. In some examples, each of the plurality of APIs 6812 may provide different access to the screen 6826 for the application 6802 (e.g., as described above, attributes such as location of content 6808, size and/or shape of an area of display of the content 6808, etc., which may be provided in accordance with a layering system, such as an interactive multi-layer system).

In some embodiments, the authentication system 6804 may be further configured to define an area of a screen 6826 of the display device 6814 in which to display the content 6808 according to the identification 6806. For example, as described above, the area (e.g., size and/or shape) of the screen 6826 of the display device 6814 in which to display the content 6808 may be provided according to the API(s) 6812 provided to the application 6802, and in accordance with a layering system, e.g., an interactive multi-layer system.

In some embodiments, the application 6802 may be executed on a device 6824 that is remote from the authentication system 6804 and the content delivery system 6810. In some examples, the device 6824 may be a mobile or PC device, and may communicate with other devices and systems of system 6800 over a communication network such as the Internet. Also, in some examples, the application 6802 may be executable code configured to be executed by a processor of the device 6824. However, embodiments are not limited thereto. The application 6802 may be a "third-party" application, such as an application by an entity different from that of the content delivery system 6810 and/or the authentication system 6804.

In some embodiments, the authentication system 6804 may be further configured to track at least one statistic 6816, which may include at least one of a number of applications 6802 registering and/or authenticating over time, a number of calls to the API 6812, one or more types of the content 6808, or an area of a screen 6826 of the display device 6814 used over time. In some embodiments, these statistics may be provided as part of a legal agreement accompanying an application 6802's registration with the authentication system 6804, and in an example where an application 6802 is an online gambling application, statistics may further include gambling statistics such as a number of bets, an amount of bets, a number of users, a number of viewers, etc.

In some embodiments, the authentication system 6804 may be further configured to retrieve screen information 6820 of the display device 6814 from the content delivery system 6810, and to share the screen information 6820 with the application 6802. In some examples, the screen information 6820 may be provided to the application 6802 via an API call. In some examples, the screen information 6820 may include the type of content 6808 being displayed on the display device 6814—for example, what type of sports game(s) are being displayed, and/or what teams are playing—as well as the layout of the content 6808 on the screen 6826 of the display device 6814, as may be provided by a layering system such as an interactive multi-layer system, and including attributes of windows for the various content 6808. Thus, the application 6802 may be able to make determinations as to how to tailor its content to be displayed on the screen 6826 of the display device 6814 based on the screen information 6820.

In some embodiments, the content delivery system 6810 (and/or authentication system 6804) may be configured to obtain a webpage 6818 requested by the application 6802, and to provide the webpage 6818 to be displayed on the display device 6814. For example, in some embodiments, a set top box associated with the display device 6814, and/or the display device 6814 itself, may not permit webpages to be published on a screen 6826 of the display device 6814 due to hardware or other firmware/software constraints. Therefore, in some embodiments, the content delivery system 6810 may receive a request from the application 6802 to display a webpage 6818 on the display device 6814, load the webpage 6818 in a browser that is, for example, executed on a same server as the content delivery system 6810 (e.g., a cloud server), and stream captured images of the webpage at set time intervals (e.g., 1 second intervals) to the display device 6814 and/or a set top box associated with the display device 6814. In some examples, the intervals may be short enough (e.g., 1 second) that the user may interact with the captured-image-based webpage displayed on the display device 6814 as they would with a live webpage loaded in a web browser. Embodiments are not limited to the image capturing of webpages to be displayed as content on the display device 6814. Instead, anything with a video output may be image captured by the content delivery system 6810 (e.g., at set time intervals) and the images transferred to the display device 6814 for display. Thus, the system 6800 may overcome technical restraints of the display device 6814 and/or set top box associated therewith.

In some embodiments, the content delivery system 6810 may expand or contract a window (or "container") of content 6808 corresponding to a specific application 6802 depending on various logic, such as whether the user 6822 has viewed a sufficient number of commercials, what else the user 6822 is watching on screen 6826, how large the screen 6826 is, how many other users are watching the same content as user 6822, etc. In some examples, such logic may be determined by a machine learning algorithm.

In some embodiments, the application 6802 may include a plurality of applications 6802, and the authentication system 6804 may be further configured to instruct the content delivery system 6810 to provide a plurality of APIs 6812 to the respective plurality of applications 6802. This may enhance the security of system 6800, because the data of the respective applications 6802 may not cross paths, and user account information of the respective applications 6802 and the user 6822 may be kept secure between the respective applications 6802 and the user 6822 and not shared between them. The content delivery system 6810 may be further configured to provide the plurality of APIs 6812 to the respective plurality of applications 6802, and to receive, from the applications 6802, calls to the respective APIs 6812 to display respective contents 6808 of the plurality of applications 6802. Additionally, the content delivery system 6810 may be configured to cause to display, on respective portions of the display device 6814 (e.g., on respective portions of screen 6826), the respective plurality of contents 6808 in parallel—e.g., simultaneously—in their own respective layers and, for example, in windows or "containers" that may have the properties heretofore described and defined by the respective APIs 6812. For example, each of the plurality of applications 6802 may be provided with its own API(s) 6812, which may define in which portions of the screen 6826 the respective applications 6802 have access, such as location, size, shape, overlay, and other attributes, as may be in accordance with a layering system.

Thus, in some examples, the content delivery system 6810 may considered a multiplexer that takes the contents 6808 requested by plurality of applications 6802 and causes the respective contents 6808 to be displayed on respective portions of a screen 6826 of the display device 6814—for example, through a single video stream that is created through manipulation of pixels by the content delivery system 6810 and encoded for display by the display device 6814.

In some examples, the content delivery system 6810 may provide each of the respective contents 6808 with its own "layer," according to, e.g., an interactive multi-layering system. The resulting "layering" may be taken into account by the content delivery system 6810 when it generates the video stream.

In some embodiments, the content delivery system 6810 may be further configured to synchronize the plurality of contents 6808 with each other. For example, each of the plurality of contents 6808 may have a timestamp, and the content delivery system 6810 may buffer some of the contents 6808 so that respective contents 6808 are displayed when the timestamps are equal or close. However, embodiments are not limited thereto. For example, the content delivery system 6810 may ignore the timestamps in order to provide the contents 6808 quickly and, in some embodiments, with minimum latency.

In some embodiments, and as described above, the content delivery system 6810 may be further configured to combine the respective plurality of contents 6808 into a video signal, and to output the video signal to the display device 6814 to cause the display device 6814 to display the respective plurality of contents 6808 on the respective portions of the display device 6814. For example, the video signal may be encoded before being send to the display device 6814.

In some embodiments, the authentication system 6804 may be further configured to provide the content 6808 to a plurality of content delivery systems 6810 to be displayed on a respective plurality of display devices 6814. For example, the content delivery system 6810 may provide scores of sports game to each of the display devices 6814, while providing a user 6822 with their personal fantasy statistics on only their respective one of the display devices 6814.

Figure 66:
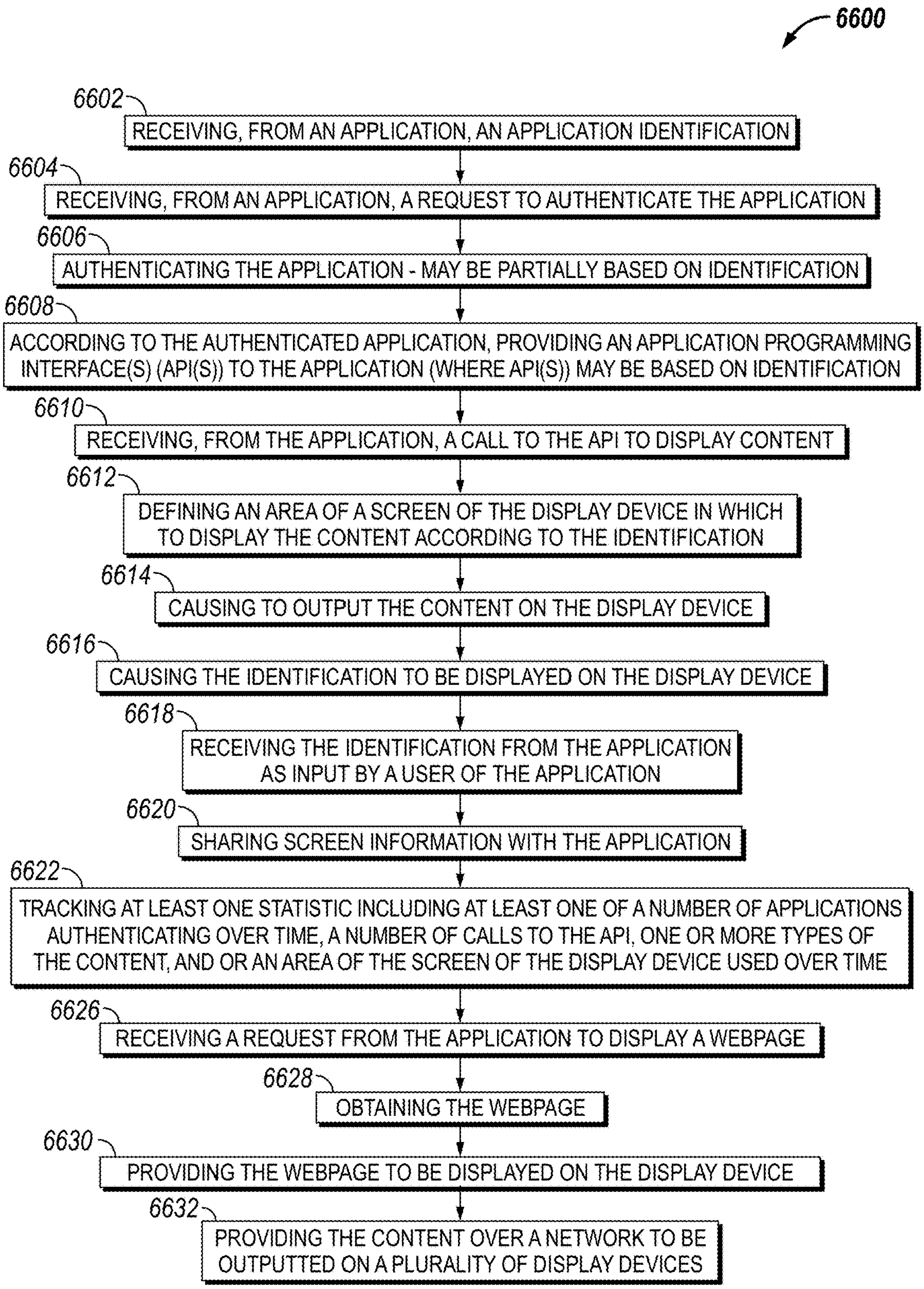
FIG. 66 illustrates an embodiment of an operation for displaying content on a display device.

With reference to FIG. 66, an illustrative and non-limiting example method 6600 of displaying content on a display device is depicted. The method 660 may include an operation 6604 of receiving, from an application, a request to authenticate the application; an operation 6606 of authenticating the application; an operation 6608 of, according to the authenticated application, providing an application programming interface (API) to the application; an operation 6610 of receiving, from the application, a call to the API to display content; and an operation 6614 of causing to output the content on the display device.

In some embodiments of method 6600, the operation 6606 of authenticating the application may be based on receiving an identification from the application.

Figure 67:
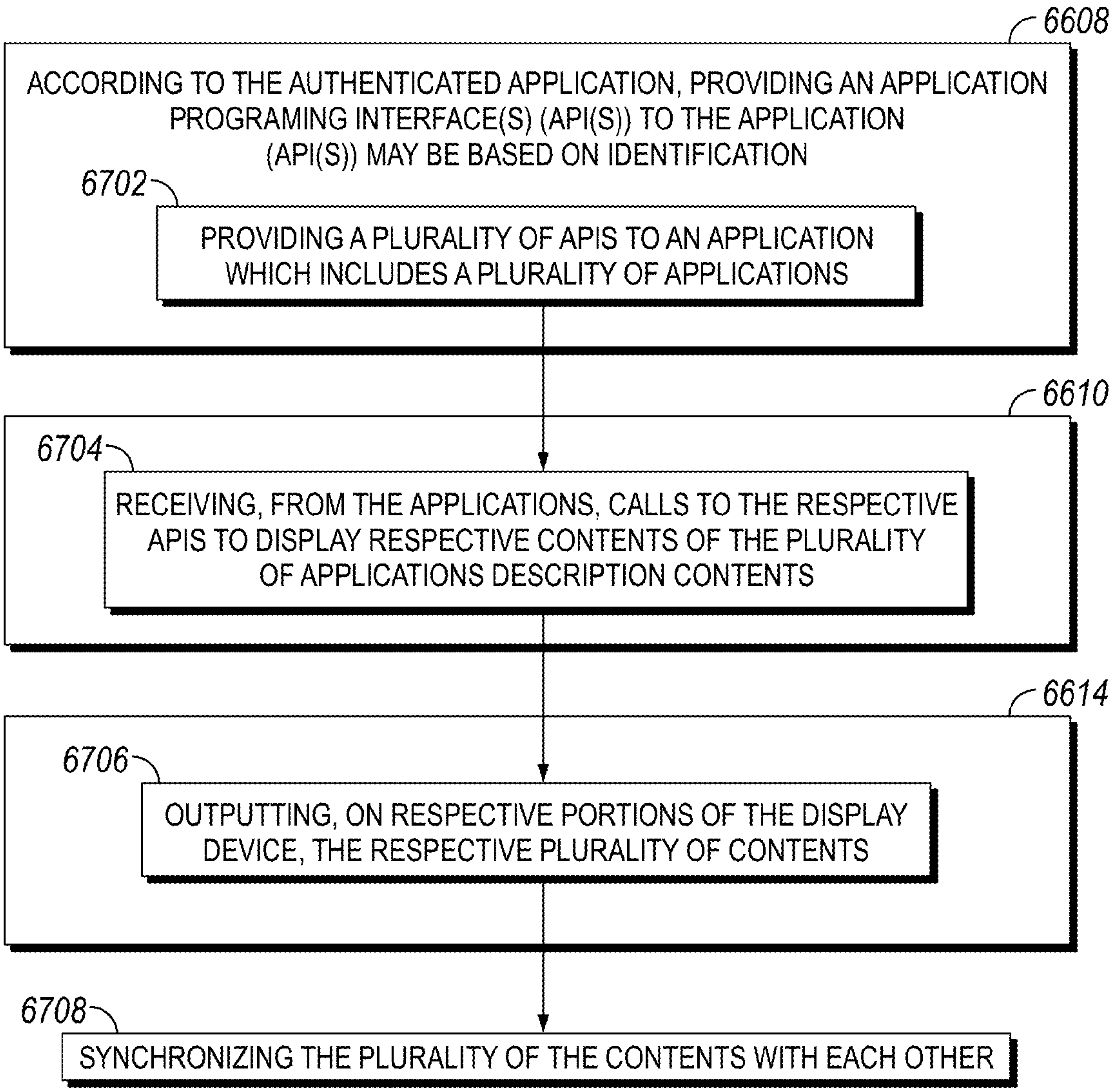
FIG. 67 illustrates an embodiment of an operation for displaying content on a display device.

With reference to FIG. 67, which illustrates an illustrative and non-limiting example of the method 6600, the operation 6608 of providing an API to the application may further include providing the API for access by the application according to the identification.

In some embodiments of method 6600, the operation 6608 of providing an API to the application may include an operation 6702 of providing a plurality of APIs to the application according to the identification.

With reference to FIG. 66, in some embodiments of method 6600, the method 6600 may further include an operation 6612 of defining an area of a screen of the display device in which to display the content according to the identification.

In some embodiments of method 6600, the application may be executed on a remote device.

In some embodiments of method 6600, the method 6600 may further include an operation 6622 of tracking at least one statistic including at least one of a number of applications authenticating over time, a number of calls to the API, one or more types of the content, or an area of a screen of the display device used over time.

In some embodiments of method 6600, the method 6600 may further include an operation 6620 of sharing screen information of the display device with the application.

In some embodiments of method 6600, the method 6600 may further include an operation 6626 of receiving a request from the application to display a webpage, an operation 6628 of obtaining the webpage, and an operation 6630 of providing the webpage to be displayed on the display device.

With reference to FIG. 67, in some embodiments of method 6600, the application may include a plurality of applications, and the operation 6608 of providing an API to the application may further include an operation 6702 of providing a plurality of APIs to the respective plurality of applications. Furthermore, the method 6600 may further include an operation 6704 of receiving, from the applications, calls to the respective APIs to display respective contents of the plurality of applications, and an operation 6704 of outputting, on respective portions of the display device, the respective plurality of contents.

In some embodiments of method 6600, the method 6600 may further include an operation 6708 of synchronizing the plurality of contents with each other.

With reference to FIG. 66, in some embodiments of method 6600, the method 6600 may further include an operation 6632 of providing the content over a network to be outputted on a plurality of display devices.

In some embodiments of method 6600, the method 6600 may further include an operation 6616 of causing the identification to be displayed on the display device, and an operation 6618 of receiving the identification from the application as entered by a user of the application.

The term "set" as used herein includes a group of one more members.

While many aspects of the present disclosure have been shown and described, it will be appreciated in light of the disclosure that many changes and modifications may be made thereto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In many aspects of the present disclosure, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In many aspects of the present disclosure, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above, and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with many examples shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will appreciate in light of the disclosure that the existence of variations, combinations, and equivalents of the specific aspects, embodiments, structures, modules, methods, and examples herein. The disclosure should therefore not be limited by the above-described examples and includes all aspects of the present teachings within the scope and spirit of the disclosure.

Detailed aspects of the present teachings are disclosed herein; however, it is to be understood that the disclosed aspects are merely exemplary of the disclosure, which may be constructed, modified, and combined in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition). The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific aspects, method, and examples herein.

While only some aspects of the present disclosure have been shown and described, it will be appreciated in light of the disclosure that many changes and modifications may be made thereunto without departing from the spirit and scope of the present disclosure as described. The aspects of the present disclosure may be combined with, compliment, or otherwise work in conjunction with the aspects described in Video Display methods, systems, and apparatus described in International Application No.: PCT/US2017/056534, U.S. Provisional Patent Application No. 62/648,709, and U.S. Provisional Patent Application No. 62/680,395.

All documents referenced herein are hereby incorporated by reference as if fully set forth herein.

What is claimed is:

1. A method of displaying content on a display device, comprising:

displaying, using a content delivery system, an identification to a user via a display device, wherein the identification includes a code that identifies an instance of the content delivery system;

receiving, from an application, a request to authenticate the application;

after displaying the identification including the code to the user via the display device, receiving the identification including the code from the user;

authenticating the application based at least in part on the identification;

using the code, identifying the instance of the content delivery system as corresponding to a specific instance that is to receive, via streaming, content of the application and provide the content of the application to be displayed on the display device;

according to the authenticated application, providing, by the content delivery system, an application programming interface (API) to the application;

receiving, from the application, a call to the API to display the content of the application;

receiving, via streaming, the content of the application; and causing to output the content of the application on the display device.

2. The method of claim 1, further comprising:

providing the API for access by the application according to the identification.

3. The method of claim 1, further comprising:

providing a plurality of APIs to the application according to the identification.

4. The method of claim 1, further comprising:

defining an area of a screen of the display device in which to display the content according to the identification.

5. The method of claim 1, wherein the application is executed on a remote device.

6. The method of claim 1, further comprising:

tracking at least one statistic including at least one of a number of applications authenticating over time, a number of calls to the API, one or more types of the content, or an area of a screen of the display device used over time.

7. The method of claim 1, further comprising:

sharing screen information of the display device with the application.

8. The method of claim 1, further comprising:

receiving a request from the application to display a webpage;

obtaining the webpage; and providing the webpage to be displayed on the display device.

9. The method of claim 1, wherein the application includes a plurality of applications, and the method further comprises:

providing a plurality of APIs to the respective plurality of applications;

receiving, from the applications, calls to the respective APIs to display respective contents of the plurality of applications; and outputting, on respective portions of the display device, the respective plurality of contents.

10. The method of claim 9, further comprising:

synchronizing the plurality of contents with each other by buffering some of the plurality of contents such that the plurality of content are displayed relative to a same timestamp.

11. The method of claim 1, further comprising:

providing the content over a network to be outputted on a plurality of display devices.

12. A content display system, comprising:

a content delivery system configured to display to a user, via a display device, an identification including a code that identifies an instance of the content delivery system;

an authentication system configured to:

receive a request from an application to authenticate the application, wherein the application is executed on a device that is remote from the authentication system, the content delivery system, and the display device;

receive the identification including the code from the user after the content delivery system displays the code to the user via the display device;

authenticate the application based at least in part on the identification;

using the code, identify the instance of the content delivery system as corresponding to a specific instance that is to receive, via streaming, content of the application and provide the content of the application to be displayed on the display device; and send an instruction to the content delivery system to provide an application programming interface (API) to the application based on authenticating the application; and the content delivery system further configured to provide the API to the application based on receiving the instruction from the authentication system, to receive a call from the application to the API to display the content of the application, to receive the content via streaming, and to cause the content of the application to be displayed on the display device based on the call to the API.

13. The content display system of claim 12, further comprising:

the authentication system further configured to determine the API to provide to the application according to the identification.

14. The content display system of claim 13, further comprising:
the authentication system further configured to instruct the content delivery system to provide a plurality of APIs to the application according to the identification.

15. The content display system of claim 12, further comprising:
the authentication system further configured to define an area of a screen of the display device in which to display the content according to the identification.

16. The content display system of claim 12, further comprising:
the authentication system further configured to track at least one statistic including at least one of a number of applications authenticating over time, a number of calls to the API, one or more types of the content, or an area of a screen of the display device used over time.

17. The content display system of claim 12, further comprising:
the authentication system further configured to retrieve screen information of the display device from the content delivery system and to share the screen information with the application.

18. The content display system of claim 12, further comprising:
the authentication system further configured to obtain a webpage requested by the application, and to provide the webpage to the content delivery system to be displayed on the display device.

19. The content display system of claim 12, further comprising:
the application including a plurality of applications;
the authentication system further configured to instruct the content delivery system to provide a plurality of APIs to the respective plurality of applications; and
the content delivery system further configured to:
provide the plurality of APIs to the respective plurality of applications;
receive, from the applications, calls to the respective APIs to display respective contents of the plurality of applications; and
cause to display, on respective portions of the display device, the respective plurality of contents.

20. The content display system of claim 19, further comprising:
the content delivery system further configured to synchronize the respective plurality of contents with each other by buffering some of the plurality of contents such that the respective plurality of contents are displayed relative to a same timestamp.

21. The content display system of claim 19, further comprising:
the content delivery system further configured to combine the respective plurality of contents of the plurality of applications, encode the combined respective plurality of contents into a single video stream, and output the single video stream to the display device to cause the display device to display the single video stream including the respective plurality of contents on the respective portions of the display device.

22. The content display system of claim 12, further comprising:
the authentication system further configured to provide the content to a plurality of content delivery systems to be displayed on a respective plurality of display devices.

23. The content display system of claim 12, wherein the authentication system, the content delivery system, the display device, and the device on which the application is executed are each remote from each other.

24. The content display system of claim 12, further comprising:
the content delivery system further configured to cause the content of the application to be displayed in an area of a screen of the display device, wherein the area is defined by the authentication system and includes at least one of a shape or a size; and
the authentication system further configured to track a statistic including the at least one of the shape or the size of the area of the screen of the display device used over time.

25. The content display system of claim 12, wherein the application provides the content to the content delivery system via an external video source.

26. The content display system of claim 12, wherein the application provides the content to the content delivery system by streaming the content from the application to the content delivery system for encoding.

27. The method of claim 1, wherein the application provides the content via at least one of: an external video source, or streaming the content from the application.

28. The content display system of claim 12, further comprising:
the application including a plurality of applications;
the authentication system further configured to instruct the content delivery system to provide a plurality of APIs to the respective plurality of applications; and
the content delivery system further configured to:
provide the plurality of APIs to the respective plurality of applications;
receive, from the applications, calls to the respective APIs to display respective contents of the plurality of applications; and
cause to simultaneously display, on respective different portions of the display device, the respective plurality of contents of the plurality of applications.

29. A content display system, comprising:
a content delivery system configured to display to a user, via a display device, an identification including a code that identifies an instance of the content delivery system;
an authentication system configured to:
receive a request from an application to authenticate the application, wherein the application is executed on a device that is remote from the authentication system, the content delivery system, and the display device;
receive the identification including the code from the user after the content delivery system displays the code to the user via the display device;
authenticate the application based at least in part on the identification;
using the code, identify the instance of the content delivery system as corresponding to a specific instance that is to receive, via streaming, content of the application and provide the content of the application to be displayed on the display device; and
send an instruction to the content delivery system to provide an application programming interface (API) to the application based on authenticating the application,
wherein the authentication system includes a machine that executes instructions on a processor, and the content delivery system includes another machine that executes instructions on another processor; and the content delivery system further configured to provide the API to the application based on receiving the instruction from the authentication system, to receive a call from the application to the API to display the content of the application, to receive the content via streaming, and to cause the content of the application to be displayed on the display device based on the call to the API.

30. The content display system of claim 29, wherein the application provides the content to the content delivery system by streaming the content from the application to the content delivery system for encoding.

31. The content display system of claim 29, wherein the application provides the content to the content delivery system via an external video source.

32. The content display system of claim 29, further comprising:

the application including a plurality of applications;

the authentication system further configured to instruct the content delivery system to provide a plurality of APIs to the respective plurality of applications; and the content delivery system further configured to:

provide the plurality of APIs to the respective plurality of applications;

receive, from the applications, calls to the respective APIs to display respective contents of the plurality of applications; and cause to simultaneously display, on respective different portions of the display device, the respective plurality of contents of the plurality of applications.

33. The content display system of claim 12, wherein the authentication system receives the identification including the code from the user via the application.

34. The content display system of claim 12, wherein the code is at least one of a numerical code, a QR code, or a barcode.

35. The method of claim 1, further comprising:

causing the content of the application to be displayed in an area of a screen of the display device, wherein the area is defined by an authentication system and includes at least one of a shape or a size; and tracking a statistic including at least one of the shape or the size of the area of the screen of the display device used over time.

36. The content display system of claim 12, wherein the content delivery system includes a plurality of instances to provide content to the application on respective display devices to be displayed on the respective display devices, and the plurality of instances include the specific instance.

37. The content display system of claim 36, wherein the specific instance of the content delivery system is executed on a set-top box.

38. The content display system of claim 12, wherein the content is video content, and the application streams the video content to the content delivery system via the API.

39. The content display system of claim 36, wherein each instance of the content delivery system communicates respectively with one of the display devices.

40. The content display system of claim 12, wherein the authentication system is further configured to send the instruction to the specific instance of the content delivery system to provide the API to the application based on authenticating the application.

41. The content display system of claim 21, wherein the content delivery system is further configured to combine the respective plurality of contents of the plurality of applications by manipulating pixels of video streams of the respective plurality of contents.

42. The content display system of claim 12, wherein the content delivery system is local to the display device and connected to the display device via a local connection.

* * * * *